(12) United States Patent
Klassen

(10) Patent No.: US 11,043,862 B2
(45) Date of Patent: Jun. 22, 2021

(54) ELECTRIC MACHINE

(71) Applicant: GENESIS ROBOTICS AND MOTION TECHNOLOGIES CANADA, ULC, Wichita, KS (US)

(72) Inventor: James Brent Klassen, Langley (CA)

(73) Assignee: GENESIS ROBOTICS AND MOTION TECHNOLOGIES CANADA, ULC, Langley (CA)

( * ) Notice: Subject to any disclaimer, the term of this patent is extended or adjusted under 35 U.S.C. 154(b) by 1 day.

(21) Appl. No.: 16/324,448

(22) PCT Filed: Aug. 11, 2017

(86) PCT No.: PCT/CA2017/050957
§ 371 (c)(1),
(2) Date: Feb. 8, 2019

(87) PCT Pub. No.: WO2018/027330
PCT Pub. Date: Feb. 15, 2018

(65) Prior Publication Data
US 2020/0144880 A1 May 7, 2020

Related U.S. Application Data

(63) Continuation-in-part of application No. 15/235,088, filed on Aug. 11, 2016, now Pat. No. 10,476,323.

(51) Int. Cl.
*H02K 1/27* (2006.01)
*H02K 21/22* (2006.01)
(Continued)

(52) U.S. Cl.
CPC ............. *H02K 1/2793* (2013.01); *B25J 9/12* (2013.01); *H02K 1/2786* (2013.01); *H02K 21/22* (2013.01);
(Continued)

(58) Field of Classification Search
CPC ........ H02K 1/27; H02K 1/274; H02K 1/2753; H02K 21/044; H02K 2201/12;
(Continued)

(56) References Cited

U.S. PATENT DOCUMENTS 2,665,243 A 1/1954 Young et al.
3,383,534 A 5/1968 Ebbs
(Continued)

FOREIGN PATENT DOCUMENTS

CA 2187096 C 6/2004
CN 101978578 A 2/2011
(Continued)

OTHER PUBLICATIONS

Supplementary partial European search report received for EP application No. 17838273.5, dated Aug. 13, 2020, 14 pages.
(Continued)

*Primary Examiner* — Burton S Mullins

(57) ABSTRACT

A rotor for an electric machine having posts extending partially or completely between end irons. Each end iron is formed of a single piece of magnetic material with the posts extending from it, including the other end iron where the posts extend completely between them. Magnets are arranged between the posts with poles facing the posts to concentrate flux. In order to prevent too much of the flux from being drawn into flux paths through the end irons, the total magnetic flux is made to exceed a saturation flux of at least a portion of the flux path. This may be achieved by using interdigitated posts extending only partially between the end irons to provide gaps in the flux path, by providing flux resistors in the end irons to reduce a saturation flux below the total flux, or by using high aspect ratio magnets or posts so that the magnetic flux exceeds a saturation flux of the posts or end irons.

19 Claims, 112 Drawing Sheets

(51) Int. Cl.
*H02K 21/24* (2006.01)
*H02K 41/03* (2006.01)
*B25J 9/12* (2006.01)
*H02K 1/06* (2006.01)
*H02K 1/22* (2006.01)
*H02K 1/28* (2006.01)

(52) U.S. Cl.
CPC ............ *H02K 21/24* (2013.01); *H02K 41/031* (2013.01); *H02K 1/06* (2013.01); *H02K 1/22* (2013.01); *H02K 1/28* (2013.01); *H02K 2201/00* (2013.01)

(58) Field of Classification Search
CPC .... H02K 1/2793; H02K 1/2786; H02K 21/22; H02K 41/031; H02K 2201/00; H02K 1/00; H02K 1/06; H02K 1/243; H02K 1/22; B25J 9/12
USPC .......................... 310/156.01, 156.66, 156.71
See application file for complete search history.

(56) References Cited

U.S. PATENT DOCUMENTS

| | | | |
|---|---|---|---|
| 4,245,870 A | 1/1981 | Punshon et al. | |
| 4,307,309 A | 12/1981 | Barrett | |
| 4,310,390 A | 1/1982 | Bradley et al. | |
| 4,319,152 A | 3/1982 | Van | |
| 4,394,594 A | 7/1983 | Schmider et al. | |
| 4,398,112 A | 8/1983 | Van | |
| 4,501,980 A | 2/1985 | Welburn | |
| 4,568,862 A | 2/1986 | Tassinario | |
| 4,658,165 A | 4/1987 | Vanderschaeghe | |
| 4,716,327 A | 12/1987 | Stone | |
| 4,900,965 A | 2/1990 | Fisher | |
| 4,959,577 A | 9/1990 | Radomski | |
| 5,004,944 A | 4/1991 | Fisher | |
| 5,010,267 A | 4/1991 | Lipo et al. | |
| 5,010,268 A | 4/1991 | Dijken | |
| 5,091,609 A | 2/1992 | Sawada et al. | |
| 5,128,575 A | 7/1992 | Heidelberg et al. | |
| 5,144,183 A | 9/1992 | Farrenkopf | |
| 5,212,419 A | 5/1993 | Fisher et al. | |
| 5,252,880 A | 10/1993 | Kazmierczak et al. | |
| 5,334,899 A | 8/1994 | Skybyk | |
| 5,396,140 A | 3/1995 | Goldie et al. | |
| 5,445,456 A | 8/1995 | Isoda et al. | |
| 5,604,390 A | 2/1997 | Ackermann | |
| 5,616,977 A | 4/1997 | Hill | |
| 5,625,241 A | 4/1997 | Ewing et al. | |
| 5,642,009 A | 6/1997 | McCleer et al. | |
| 5,642,013 A | 6/1997 | Wavre | |
| 5,646,467 A | 7/1997 | Floresta et al. | |
| 5,744,888 A | 4/1998 | Zajc et al. | |
| 5,834,864 A | 11/1998 | Hesterman et al. | |
| 5,942,830 A | 8/1999 | Hill | |
| 5,955,808 A | 9/1999 | Hill | |
| 5,982,074 A | 11/1999 | Smith et al. | |
| 6,006,792 A | 12/1999 | Krumm et al. | |
| 6,081,059 A | 6/2000 | Hsu | |
| 6,147,428 A | 11/2000 | Takezawa et al. | |
| 6,239,516 B1 | 5/2001 | Floresta et al. | |
| 6,242,831 B1 | 6/2001 | Khan | |
| 6,261,437 B1 | 7/2001 | Hernnaes et al. | |
| 6,313,556 B1 | 11/2001 | Dombrovski et al. | |
| 6,348,751 B1 | 2/2002 | Jermakian et al. | |
| 6,376,961 B2 | 4/2002 | Murakami et al. | |
| 6,417,587 B1 | 7/2002 | Komatsu et al. | |
| 6,590,312 B1 | 7/2003 | Seguchi et al. | |
| 6,601,287 B2 | 8/2003 | Pop, Sr. | |
| 6,664,704 B2 | 12/2003 | Calley | |
| 6,700,297 B2 | 3/2004 | Hsu et al. | |
| 6,768,238 B2 | 7/2004 | Knauff et al. | |
| 6,833,647 B2 | 12/2004 | Saint-Michel et al. | |
| 6,933,643 B1 | 8/2005 | Heine et al. | |
| 6,936,948 B2 | 8/2005 | Bell et al. | |
| 6,975,057 B2 | 12/2005 | Gauthier et al. | |
| 6,987,342 B2 | 1/2006 | Hans | |
| 6,995,494 B2 | 2/2006 | Haugan et al. | |
| 7,109,625 B1 | 9/2006 | Jore et al. | |
| 7,141,905 B2 | 11/2006 | Vollmer | |
| 7,157,827 B2 | 1/2007 | Heideman et al. | |
| 7,190,101 B2 | 3/2007 | Hirzel | |
| 7,215,056 B2 | 5/2007 | Dressel | |
| 7,385,329 B2 | 6/2008 | Hill | |
| 7,425,772 B2 | 9/2008 | Vidal | |
| 7,548,003 B2 | 6/2009 | Nickel-Jetter et al. | |
| 7,554,226 B2 | 6/2009 | Kojima et al. | |
| 7,586,217 B1 | 9/2009 | Smith et al. | |
| 7,597,025 B2 | 10/2009 | Narita et al. | |
| 7,646,124 B2 | 1/2010 | Himmelmann et al. | |
| 7,663,283 B2 | 2/2010 | Holtzapple et al. | |
| 7,675,213 B2 | 3/2010 | Tenhunen | |
| 7,679,260 B2 | 3/2010 | Yamamoto et al. | |
| 7,687,962 B2 | 3/2010 | Imai et al. | |
| 7,692,357 B2 | 4/2010 | Qu et al. | |
| 7,741,750 B1 | 6/2010 | Tang | |
| 7,800,471 B2 | 9/2010 | Fullerton et al. | |
| 7,816,822 B2 | 10/2010 | Nashiki | |
| 7,836,788 B2 | 11/2010 | Kamon et al. | |
| 7,851,965 B2 | 12/2010 | Calley et al. | |
| 7,868,508 B2 | 1/2011 | Calley et al. | |
| 7,868,721 B2 | 1/2011 | Fullerton et al. | |
| 7,898,123 B2 | 3/2011 | Usui | |
| 7,911,107 B2 | 3/2011 | Nashiki | |
| 7,915,776 B2 | 3/2011 | Takahata et al. | |
| 7,923,881 B2 | 4/2011 | Ionel et al. | |
| 7,923,886 B2 | 4/2011 | Calley et al. | |
| 7,948,340 B2 | 5/2011 | Rastogi et al. | |
| 7,965,011 B2 | 6/2011 | Liao | |
| 7,990,011 B2 | 8/2011 | Yoshino et al. | |
| 8,004,127 B2 | 8/2011 | Potter | |
| 8,053,944 B2 | 11/2011 | Calley et al. | |
| 8,084,879 B2 | 12/2011 | Stiesdal | |
| 8,179,126 B2 | 5/2012 | Li et al. | |
| 8,179,219 B2 | 5/2012 | Fullerton et al. | |
| 8,222,786 B2 | 7/2012 | Calley et al. | |
| 8,242,658 B2 | 8/2012 | Calley et al. | |
| 8,264,113 B2 | 9/2012 | Takemoto et al. | |
| 8,330,317 B2 | 12/2012 | Burch et al. | |
| 8,395,291 B2 | 3/2013 | Calley et al. | |
| 8,395,292 B2 | 3/2013 | Amari et al. | |
| 8,405,275 B2 | 3/2013 | Calley et al. | |
| 8,415,848 B2 | 4/2013 | Calley et al. | |
| 8,450,899 B2 | 5/2013 | Umeda et al. | |
| 8,487,497 B2 | 7/2013 | Taniguchi | |
| 8,497,615 B2 | 7/2013 | Kimura et al. | |
| 8,558,426 B2 | 10/2013 | Stiesdal | |
| 8,593,029 B2 * | 11/2013 | Inoue ................... | H02K 21/048 310/156.66 |
| 8,704,626 B2 | 4/2014 | Fullerton et al. | |
| 8,736,133 B1 | 5/2014 | Smith et al. | |
| 8,749,108 B2 | 6/2014 | Dyer et al. | |
| 8,760,023 B2 | 6/2014 | Calley et al. | |
| 8,836,196 B2 | 9/2014 | Calley et al. | |
| 8,847,454 B2 | 9/2014 | Saito et al. | |
| 8,847,522 B2 | 9/2014 | Nashiki et al. | |
| 8,854,171 B2 | 10/2014 | Janecek | |
| 8,916,999 B2 | 12/2014 | Imai et al. | |
| 8,946,960 B2 | 2/2015 | Camilleri et al. | |
| 8,952,590 B2 | 2/2015 | Calley et al. | |
| 8,987,968 B2 | 3/2015 | Morishita et al. | |
| 9,006,941 B2 | 4/2015 | Zhao | |
| 9,006,951 B2 | 4/2015 | Janecek et al. | |
| 9,054,566 B2 | 6/2015 | Woolmer | |
| 9,059,621 B2 | 6/2015 | Aoyama | |
| 9,071,117 B2 | 6/2015 | Woolmer | |
| 9,111,673 B2 | 8/2015 | Fullerton et al. | |
| 9,126,332 B2 | 9/2015 | L'Ecuyer et al. | |
| 9,130,425 B2 * | 9/2015 | Nord ..................... | H02K 1/274 |
| 9,154,024 B2 | 10/2015 | Jore et al. | |
| 9,178,399 B2 | 11/2015 | Parviainen | |
| 9,281,735 B2 | 3/2016 | Gandhi et al. | |
| 9,287,755 B2 | 3/2016 | Woolmer et al. | |

(56) References Cited

U.S. PATENT DOCUMENTS

| | | |
|---|---|---|
| 9,475,199 B2 | 10/2016 | Burridge et al. |
| 9,537,362 B2 | 1/2017 | Jansen et al. |
| 2003/0094880 A1 | 5/2003 | Hsu |
| 2003/0111926 A1 | 6/2003 | Decristofaro et al. |
| 2004/0021386 A1 | 2/2004 | Swett |
| 2005/0140227 A1 | 6/2005 | Kuwert |
| 2005/0179336 A1 | 8/2005 | Hasebe et al. |
| 2006/0238053 A1 | 10/2006 | Kascak et al. |
| 2006/0284507 A1 | 12/2006 | Murakami |
| 2007/0222306 A1 | 9/2007 | Hultman et al. |
| 2007/0236090 A1 | 10/2007 | Hoppe et al. |
| 2007/0252469 A1 | 11/2007 | Nishiura |
| 2007/0278865 A1 | 12/2007 | Matscheko |
| 2008/0001488 A1 | 1/2008 | Pyrhonen et al. |
| 2008/0214347 A1 | 9/2008 | Scharfenberg et al. |
| 2008/0224558 A1 | 9/2008 | Ionel |
| 2009/0001835 A1 | 1/2009 | Kojima et al. |
| 2010/0019586 A1 | 1/2010 | Lu |
| 2010/0109466 A1 | 5/2010 | Kondo et al. |
| 2010/0164313 A1 | 7/2010 | Langford et al. |
| 2010/0183460 A1 | 7/2010 | Qin et al. |
| 2011/0025146 A1 | 2/2011 | Goodzeit et al. |
| 2011/0033321 A1 | 2/2011 | Mikkelsen et al. |
| 2011/0037329 A1 | 2/2011 | Nord et al. |
| 2011/0109099 A1 | 5/2011 | Stiesdal |
| 2011/0260566 A1 | 10/2011 | Odvarka et al. |
| 2011/0285141 A1 | 11/2011 | Groendahl et al. |
| 2011/0309699 A1 | 12/2011 | Woolmer et al. |
| 2012/0001018 A1 | 1/2012 | Gilleran et al. |
| 2012/0001511 A1 | 1/2012 | Matt et al. |
| 2012/0047523 A1 | 2/2012 | Smirnov et al. |
| 2012/0104895 A1 | 5/2012 | Ramu |
| 2012/0212085 A1 | 8/2012 | Fu et al. |
| 2012/0267967 A1 | 10/2012 | Trago et al. |
| 2012/0279338 A1 | 11/2012 | Ihrke et al. |
| 2012/0299430 A1 | 11/2012 | Pennander et al. |
| 2013/0113320 A1 | 5/2013 | Calley et al. |
| 2013/0140920 A1 | 6/2013 | Wei et al. |
| 2013/0147291 A1 | 6/2013 | Woolmer et al. |
| 2013/0187492 A1 | 7/2013 | Woolmer |
| 2013/0249330 A1 | 9/2013 | King et al. |
| 2013/0249342 A1 | 9/2013 | Funk et al. |
| 2013/0342048 A1 | 12/2013 | Hogmark |
| 2014/0035417 A1 | 2/2014 | Nadeau et al. |
| 2014/0035423 A1 | 2/2014 | Veronesi et al. |
| 2014/0049124 A1 | 2/2014 | Gandhi et al. |
| 2014/0054062 A1 | 2/2014 | Yoshida et al. |
| 2014/0132102 A1 | 5/2014 | Peng et al. |
| 2014/0197701 A1 | 7/2014 | Hossain et al. |
| 2014/0217944 A1 | 8/2014 | Yang |
| 2014/0299668 A1 | 10/2014 | Fullerton et al. |
| 2014/0333171 A1 | 11/2014 | Lange et al. |
| 2014/0346910 A1 | 11/2014 | Nakano et al. |
| 2015/0001969 A1* | 1/2015 | Aoyama ............... H02K 41/031 310/12.25 |
| 2015/0048712 A1 | 2/2015 | Janecek et al. |
| 2015/0091403 A1 | 4/2015 | Ueda |
| 2015/0171682 A1 | 6/2015 | Fujisawa et al. |
| 2015/0229194 A1 | 8/2015 | Sromin |
| 2015/0244219 A1 | 8/2015 | Woolmer |
| 2015/0270760 A1 | 9/2015 | Kreidler et al. |
| 2015/0308438 A1 | 10/2015 | Janecek |
| 2015/0318745 A1 | 11/2015 | Matsuoka |
| 2015/0364956 A1 | 12/2015 | Woolmer et al. |
| 2016/0164394 A1 | 6/2016 | Knaian et al. |
| 2016/0315510 A1 | 10/2016 | Kawamata et al. |
| 2017/0201164 A1 | 7/2017 | Copeland, Jr. |

FOREIGN PATENT DOCUMENTS

| | | |
|---|---|---|
| CN | 102577030 A | 7/2012 |
| CN | 102624108 A | 8/2012 |
| CN | 103779990 A | 5/2014 |
| CN | 104081637 A | 10/2014 |
| CN | 203827088 U | 10/2014 |
| CN | 105196889 A | 12/2015 |
| DE | 3320805 A1 | 12/1984 |
| DE | 4216489 C2 | 10/1996 |
| DE | 19851439 A1 | 3/2000 |
| DE | 19954196 A1 | 6/2000 |
| DE | 102012219003 A1 | 4/2014 |
| EP | 1734645 A2 | 12/2006 |
| EP | 2381559 A2 | 10/2011 |
| EP | 2485368 A1 | 8/2012 |
| EP | 2773023 A1 | 3/2014 |
| EP | 2156536 B1 | 7/2014 |
| EP | 2765633 A1 | 8/2014 |
| EP | 2873551 A2 | 5/2015 |
| EP | 2873601 A1 | 5/2015 |
| EP | 2874227 A1 | 5/2015 |
| EP | 2874277 A2 | 5/2015 |
| EP | 2869433 B1 | 9/2016 |
| FR | 2519483 A1 | 7/1983 |
| JP | H06-335191 A | 12/1994 |
| JP | 2005-045868 A | 2/2005 |
| JP | 2006-166634 A | 6/2006 |
| JP | 2008011692 A | 1/2008 |
| JP | 2008-048498 A | 2/2008 |
| JP | 2008-113531 A | 5/2008 |
| JP | 2009044866 A | 2/2009 |
| JP | 2011516017 A | 5/2011 |
| JP | 5292541 B2 | 9/2013 |
| KR | 20140140185 A | 12/2014 |
| LV | 14007 B | 11/2009 |
| WO | 88/06375 A1 | 8/1988 |
| WO | 92/10024 A1 | 6/1992 |
| WO | 03/073591 A1 | 9/2003 |
| WO | 2007/026047 A1 | 3/2007 |
| WO | 2008/135628 A1 | 11/2008 |
| WO | 2012/101327 A1 | 8/2012 |
| WO | 2012/142230 A2 | 10/2012 |
| WO | 2012/156719 A2 | 11/2012 |
| WO | 2013/002658 A2 | 1/2013 |
| WO | WO2013124875 A1 | 8/2013 |
| WO | 2014/090516 A1 | 6/2014 |
| WO | 2014/100255 A1 | 6/2014 |
| WO | 2014/205523 A2 | 12/2014 |
| WO | 2015/019107 A2 | 2/2015 |
| WO | 2015/032704 A1 | 3/2015 |
| WO | 2015/032705 A1 | 3/2015 |
| WO | 2015/032707 A1 | 3/2015 |
| WO | 2015/032708 A2 | 3/2015 |
| WO | 2015/032709 A1 | 3/2015 |
| WO | 2015/036779 A2 | 3/2015 |
| WO | 2015/036780 A2 | 3/2015 |
| WO | 2015/055265 A2 | 4/2015 |
| WO | 2015/070938 A1 | 5/2015 |
| WO | 2015/070978 A1 | 5/2015 |
| WO | 2015/070984 A1 | 5/2015 |
| WO | 2015/071012 A1 | 5/2015 |
| WO | 2015/071088 A1 | 5/2015 |
| WO | 2015/071096 A1 | 5/2015 |
| WO | 2015/071121 A1 | 5/2015 |
| WO | 2015/071127 A1 | 5/2015 |
| WO | 2015/071144 A1 | 5/2015 |
| WO | 2015/071186 A1 | 5/2015 |
| WO | 2015/071340 A1 | 5/2015 |
| WO | 2015/071400 A1 | 5/2015 |
| WO | 2015/071468 A2 | 5/2015 |
| WO | 2015/071469 A2 | 5/2015 |
| WO | 2015/071470 A1 | 5/2015 |
| WO | 2015/071576 A1 | 5/2015 |
| WO | 2015/072173 A1 | 5/2015 |
| WO | 2015/072299 A1 | 5/2015 |
| WO | 2015/089518 A1 | 6/2015 |
| WO | 2015/124922 A1 | 8/2015 |
| WO | 2016/203101 A1 | 12/2016 |

(56) References Cited

FOREIGN PATENT DOCUMENTS

| WO | 2018/010031 A1 | 1/2018 |
|----|----------------|--------|
| WO | 2018/010032 A1 | 1/2018 |

OTHER PUBLICATIONS

Libert et al., Investigation on Pole-Slot Combinations for Permanent-Magnet Machines with Contrated Windings Jan. 2004, 7 pages.
International Search Report and the Written Opinion received for PCT Application No. PCT/CA2017/050470, dated Aug. 15, 2017, 10 pages.
International Search Report and the Written Opinion received for PCT Application No. PCT/CA2017/050471, dated Jul. 27, 2017, 8 pages.
International Search Report and the Written Opinion received for PCT Application No. PCT/CA2017/050856, dated Oct. 19, 2017, 8 pages.
International Search Report and the Written Opinion received for PCT Application No. PCT/CA2017/050857, dated Oct. 24, 2017, 13 pages.
International Search Report and the Written Opinion received for PCT Application No. PCT/CA2017/050957, dated Dec. 11, 2017, 9 pages.
International Search Report and the Written Opinion received for PCT Application No. PCT/CA2017/050858, dated Sep. 18, 2017, 8 pages.
Magnax Specification Sheet, "Magnax Axial Flux Synchronous Motor/Generator", Feb. 22, 2017, pp. 1-4.
Mezzarobba Thesis, "Study of innovative electric machines for high efficiency vehicular Traction applications" 2013, pp. 1-165.
Christopher A. Gallo, "Halbach Magnetic Rotor Development", Feb. 2008, NASAITM, 25 pages.
Xo Wang, "Delicious Axial Flux Flap Jack"; Retrieved from Internet URL:< www.geekshavefeelings.com>, Feb. 24, 2013, 12 pages.
Ate, Axial-Flux-Motors (AF), Retrieved from Internet URL: <https://www.ate-system.de/en/products/af.html>, Accessed on Jan. 20, 2018, pp. 1-2.
Moreels et al., "High Efficiency Axial Flux Machines: Why Axial Flux Motor and Generator Technology Will Drive the Next Generation of Electric Machines", V1.2; Jan. 2018, pp. 1-20.
Bures et al., "Electric Properties of Fe Based Soft Magnetic Composite", Euro PM2011, pp. 1-64, (2011).
Baserrah et al., "Transverse flux machines with distributed windings for in-wheel Applications; Institute for Electrical Drives, Power Electronics and Devices", 2009, pp. 102-108.
Woolmer et al., Analysis of the Yokeless and Segmented Armature Machine, 2007, 7 pages.
Axco Motors, "Axial flux technology," Retrieved from the Internet URL: <www.axcomotors.com/axialfluxtechnology.html> , Feb. 22, 2017, 5 pages.
Bannon et al., "Axial Flux Permanent Magnet Generator", Retrieved from the Internet URL: <https://depts.washington.edu/nnmrec/docs/Generator%20Final%20Report%20ME%20495%20Autumn%202013.pdf>, 2013, 24 pages.
Benlamine et al., "Design of an Axial-Flux Interior Permanent-Magnet Synchronous Motor for Automotive Application: Performance Comparison with Electric Motors used in EVs and HEVs", IEEE Vehicle Power and Propulsion Conftrence (VPPC), 2014, 6 pages.
Boglietti et al., "Evolution and Modem Approaches for Thermal Analysis of Electrical Machines", IEEE Transactions on Industrial Electronics, vol. 56, No. 3, 2009, pp. 871-882.
Capponi et al., "Recent Advances in Axial-Flux Permanent-Magnet Machine Technology", IEEE Transactions on Industry Applications, vol. 48, No. 6, 2012, pp. 2190-2205.
Cavagnino et al., "A Comparison Between the Axial Flux and the Radial Flux Structures for PM Synchronous Motors," IEEEXplore, 2001, pp. 1611-1618.
Cavagnino et al., "A Comparison Between the Axial Flux and the Radial Flux Structures for PM Synchronous Motors," IEEE Transactions on Industry Applications, vol. 38, No. 6, 2011, 1517-1524, 2002.
Celeroton AG, "Ultra-High-Speed Magnetic Bearings", Retrieved from the Internet URL: http://www.celeroton.com/en/technology/magnetic-bearings.html, Jul. 2, 2016, 3 pages.
Chau, "Electric Vehicle Machines and Drives: Design, Analysis and Application", Wiley, Kindle Edition, 2015, 9 pages.
Chau, Electric Vehicle Machines and Drives: Design, Analysis and Application, Wiley—IEEE Press, John Wiley and Sons, Google books publication information, Retrieved from the Internet URL: <https://books.google.ca/books?id=03FXCQAAQBAJ&pg=PA10I&lpg#v=onepage&q&f=false>, Sep. 23, 2015, 1 page.
Cheng et al., "Advanced Electrical Machines and Machine-Based Systems for Electric and Hybrid Vehicles", Energies, vol. 8, 2015, pp. 9541-9564.
Choi et al., "Design and Parametric Analysis of Axial Flux PM Motors With Minimized Cogging Torque", IEEE Transactions on Magnetics, vol. 45, No. 6, Jun. 2009, pp. 2855-2858.
Gogue et al., "Theory & Practice of Electromagnetic Design of DC Motors & Actuators", Technical Report, Chapter 7, Motor Design, 1993, 24 pages.
Commonplace Robotics GMBH, "SRA Service Robot Arm Version SRA 1000 HD", 2016, 1 page.
Commonplace Robotics GMBH, "Robot Arm Mover4", User Guide, 2012, 32 pages.
Core Gasless Power, "Technology", Retrieved from the Internet URL:<coreoutdoorpower.com/technology>, 2015, 3 pages.
Laser Technologies, Inc., "Image from Chicago Trade Center", Cornelius, Oct. 6, 2015, 1 page.
Cugat et al., "Magnetic Micro-Actuators and Systems (MAG-MAS)", IEEE Transactions on Magnetics, vol. 39, No. 5, Nov. 2003, pp. 3607-3612.
Custom Coils Inc., "Custom Coil Manufacturing", Retrieved from the Internet URL:< http://www.ccoils.com/Custom-coil-manufacturing.html>, 2014, 3 pages.
Toro, "Basic Electric Machines", Prentice Hall, 1989, pp. 2-3, 9-11, 124-126, 561-563, 141-143, 15 pages.
Desfosse, "What Drives CORE's Quiet Gasless Motors", Retrieved from the Internet URL: <www.popularmechanics.com/home/reviews/a905 2/what-drives-cores-quiet-gasless-motors-15558520>, Jun. 5, 2013, 12 pages.
Gerlando et al., "Axial Flux PM Machines With Concentrated Armature Windings: Design 22 Analysis and Test Validation of Wind Energy Generators", IEEE Transactions on Industrial Electronics, vol. 58, No. 9, Sep. 2011, pp. 3795-3805.
Electric Torque Machines (ETM), "Key Technology Attributes", Retrieved from the Internet URL: <http://etmpower.com/technology>, Jan. 24, 2016, 3 pages.
EMRAX, "EMRAX motors/generators", Roman Susnik Electric Motor Patent Application, Retrieved from the Internet URL: <http:/ /www.enstroj .si/Electric-products/emraxmotorsgenerators.html>, Feb. 18, 2016, 2 pages.
Enstroj, "Manual for EMRAX motors", Owner's manual for the brushless AC synchronous motor EMRAX, V2.0, 2014, 36 pages.
Finken et al., "Study and Comparison of several Permanent-Magnet excited Rotor Types regarding their Applicability in Electric Vehicles", Emobility—Electrical Power Train, 2010, 7 pages.
Fourie, "Transverse Flux Electric Motor," Retrieved from the Internet URL: <http://www.danielfourie.net/motor.html>, Nov. 7, 2016, 2 pages.
Galea et al., "Development of an aircraft wheel actuator for Green Taxiing", International Conference on Electrical Machines (ICEM), 2014, pp. 2492-2498.
Galea et al., "Torque Density Improvements for High Performance Machines", IEEE International Electric Machines & Drives Conference (IEMDC), 2013, pp. 1066-1073.
Galea, "High Performance, Direct Drive Machines for Aerospace Applications", Department of Electrical and Electronic Engineering, Feb. 2013, 221 pages.

(56) References Cited

OTHER PUBLICATIONS

Gholamian et al., "Selecting of Slotted AFPM Motors with High Torque Density for Electric Vehicles", International Journal of Scientific & Engineerin Research, vol. 2, Issue 6, Jun. 2011, pp. 1985-1991.
Gieras, "Axial Flux Permanent Magnet Brushless Machines," Second Edition, Springer, 2008, 2 pages.
Gieras, "Axial Flux brushless PM machines", Second Edition, Springer, 2008, 1 page.
Yang, et al., "Optimal Design and Control of a Torque Motor for Machine Tools," J. Electromagnetic Analysis &. Applications, 2009, pp. 220-228.
The Timken® Company, "Angular Contact", Retrieved from the Internet URL: <https://www.timken.com/products/timken-engineered-bearings/ball/angular-contact/>, Jan. 9, 2017, 4 pages.
Green Car Congress, "Delta Wing partners with DHX Electric Machines; ultra high-torque motors for automotive applications," Retrieved from the Internet URL:< http://www.greencarcongress.com/2016/0I/20160126-dhx.html>, Feb. 7, 2016, 4 pages.
Grundfos, "Motor Book", Grundfos Management A/S, 2004, 252 pages.
Hendershot, "Recent Advances in Electric Machine Design and Operation", IEEE Miami Section in conjunction with Energy Systems Research Laboratory, 2013, 41 pages.
Henneberger et al., "Development of a New Transverse Flux Motor", The Institution of Electrical Engineers, 1997, 6 pages.
Hochberg et al., "Evaporative Cooling of Actuators for Humanoid Robots", Proceedings of 8th Workshop on Humanoid Soccer Robots, 13th IEEE-RAS International Conference on Humanoid Robots (Humanoids), 2013, 6 pages.
Hoganas, "Compact, Light and Cost-Efficient Solutions", Somaloy® Technology, 2013, 3 pages.
Infolytica Corporation, "Axial Flux Motor," Retrieved from the Internet URL: <http://www.infolytica.com/en/applications/ex0072/>, 2016, 2 pages.
Infolytica Corporation, "Iron loss separation in high-torque BLDC Motors", Retrieved from the Internet URL: <http://www.infolytica.com/en/applications/ex0156/>, 2015, 2 pages.
Instructables, "Make Your Own Miniature Electric Hub Motor," Retrieved from the Internet URL:<http://www.instructables.com/id/Make-Your-Own-Miniature-Electric-Hub-Motor/> Sep. 14, 2015, 6 pages.
International Search report and Written Opinion received for PCT Application No. PCT/CA2016/050947, dated Jan. 12, 2017, 13 pages.
Tanaka et al., "Study on a High Torque Density Motor for an Electric Traction Vehicle," Retrieved from the Internet URL: <http://papers.sae.org/2009-01-1337/>, 2016, 1 page.
Jack, "Advances in Electric Machines: Topology, Materials and Construction," University of Newcastle upon Tyne, Newcastle Drives and Machines Group, 2011, 52 pages.
Joby Motors, "Introducing the JM IS motor", Retrieved from the Internet URL: <http://www.jobymotors.com/public/views/pages/products.php>, 2011, 2 pages.
Jung et al., "Unique Axial Flux Motor Design Delivers Superior Torque Density", EET European Ele-Drive Conference International Advanced Mobility Forum, 2008, 6 pages.
Jungreuthmayer et al., "A Detailed Heat and Fluid Flow Analysis of an Internal Permanent Magnet Synchronous Machine by Means of Computational Fluid Dynamics", IEEE Transactions on Industrial Electronics, vol. 59, No. 12, 2012, pp. 4568-4578.
Kasinathan et al., "Force Density Limits in Low-Speed Permanent-Magnet Machines Due to Saturation," IEEE Transactions on Energy Conversion vol. 20, No. 1, 2005, pp. 37-44.
Kastinger, "Design of a novel transverse flux machine", Proceedings of the International Conference on Electrical Machines (ICEM), 2002, 6 pages.
Lee et al., "Design of an Axial Flux Permanent Magnet Generator for a Portable Hand Crank Generating System," IEEE Transactions on Magnetics vol. 48, No. 11, 2012, pp. 2977-2980.

Libert, "Design, Optimization and Comparison of Permanent Magnet Motors for a Low-Speed Direct-Driven Mixer", Royal Institute of Technology Department of Electrical Engineering Electrical Machines and Power Electronics, 2004, 142 pages.
Lipo, Principles of Design, Choice of Electric Loading, Introduction to AC Machine Design, 2004, pp. 328-329.
Lipo, "Principles of Design, Practical Considerations Concerning Stator Construction", Introduction to AC Machine Design, Wisconsin Power Electronics Research Center, 2004, pp. 330-331.
Lipo, "Principles of Design, Practical Considerations Concerning Stator Construction", 6.11.4 Selection of Stator Slot Number, 2004, pp. 334-335.
Mahmoudi et al., "A Comparison between the TORUS and AFIR Axial-Flux Permanent-Magnet Machine Using Finite Element Analysis," IEEE International Electric Machines & Drives Conference (IEMDC), 2011, pp. 242-247.
Marignetti et al., "Design of Axial Flux PM Synchronous Machines Through 3-D Coupled Electromagnetic Thermal and Fluid-Dynamical Finite-Element Analysis", IEEE Transactions on Industrial Electronics, vol. 55, Issue 10, 2008, pp. 3591-3601.
Maxon Academy, "Maxon DC motor Permanent magnet DC motor with careless winding", Maxon Motor AG, 2012, 34 pages.
Maxon Academy, "Maxon EC motor, An introduction to brushless DC motors", Maxon Motor AG, 2012, 25 pages.
Maxon Academy, "Maxon Motor Data and Operating Ranges, How to interpret the data of Maxon Motors?", Maxon Motor AG, 2010, 29 pages.
Maxon Motor, "EC-i 40 040 mm, brushless, 70 Watt High Torque", Apr. 2015 edition, 1 page.
Maxon Motor, "High speed DC motor—Tips and tricks", Sep. 3, 2015, 1 page.
Maxon Motor, "Trend toward multipole brushless DC motors increases", Media Release, Jun. 12, 2015, 2 pages.
Meier, "Theoretical design of surface-mounted permanent magnet motors with field-weakening capability", Master thesis, submitted to the Royal Institute of Technology Department of Electrical Engineering Electrical Machines and Power Electronics, 2001, 79 pages.
Moog Components Group, "Miniature, High-Torque, DC Servomotors and DC Gearmotors", Series C13 Samarium Cobalt, Retrieved from the Internet URL: <www.moog.com/components>, 2017, pp. 188-192.
Morris, "Elon Musk: Cooling, not power-to-weight ratio, is the challenge with AC induction motors", Retrieved from the Internet URL: <https://chargedevs.com/newswire/elon-musk-cooling-not-power-toweight-ratio-is-the-challenge-with-ac-induction-motors/>, on Nov. 4, 2014, 9 pages.
Myser, "A New Type of Motor Made from Gadget Guts", Retrieved from the Internet URL:< http://www.popsci.com/gadgets/article/2013-06/gardening-circuit>, Jun. 27, 2013, 3 pages.
Oleksandr, "Study on Permanent Magnet Transverse Flux Machine", Dissertation submitted to the Graduate Faculty of the Louisiana State University and Agricultural and Mechanical College, 2012, 149 pages.
Orlik, "Transverse Flux Generators—Principle and Operation Behaviour," 70 Conference at HUSUM Wind Energy, 2008, 20 pages.
Parviainen, "Design of Axial-Flux Permanent-Magnet Low-Speed Machines and Performance Comparison Between Radial-Flux and Axial-Flux Machines," Doctoral thesis, 2005, 155 pages.
Paulides et al., "Eddy-Current Losses in Laminated and Solid Steel Stator Back Iron in a Small Rotary Brushless Permanent-Magnet Actuator", IEEE Transactions on Magnetics, vol. 44, No. 11, 2008, pp. 4373-4376.
Pippuri et al., "Torque Density of Radial, Axial and Transverse Flux Permanent Magnet Machine Topologies", IEEE Transactions on Magnetics, vol. 49, No. 5, 2013, pp. 2339-2342.
Printed Motor Works, "Brushed Pancake Motors", Retrieved from the Internet URL:< http://www.printedmotorworks.com/brushed-pancake-motors/>, Feb. 2, 2016, 13 pages.

(56) References Cited

OTHER PUBLICATIONS

Qu et al., "Performance Comparison of Dual-Rotor Radial-Flux and Axial-Flux Permanent-Magnet BLDC Machines", IEEE International Electric Machines and Drives Conference (IEMDC '03), 2003, 7 pages.

Ricky, "Bright Hub Engineering, What Is Cogging in Electrical Motors?", Retrieved from the Internet URL:< http://www.brighthubengineering.com/commercial-electrical-applications/67622-what-is-coggingin-electrical-motors/>, Feb. 27, 2016, 5 pages.

Seo et al., "A Study on Brushless DC Motor for High Torque Density", World Academy of Science, Engineering and Technology International Journal of Mechanical, Aerospace, Industrial, Mechatronic and Manufacturing Engineering, vol. 5, No. 10, 2011, pp. 2084-2088.

Staton et al., "Solving the More Difficult Aspects of Electric Motor Thermal Analysis", IEEE International Electric Machines and Drives Conference, (IEMDC'03), 2003, 9 pages.

YASA Motors, "YASA-750 Axial Flux Electric Motor", YASA Motors Limited, 2015, 2 pages.

International Preliminary Report on Patentability received for PCT Application No. PCT/CA2017/050857, dated Jan. 24, 2019, 11 pages.

Yang, "FEA Estimation and Experimental Validation of Solid Rotor and Magnet Eddy Current Loss in Single-Sided Axial Flux Permanent Magnet Machines", Doctoral dissertation, presented to The Graduate College at the University of Nebraska, 2013, 98 pages.

Yang, "FEA Estimation and Experimental Validation of Solid Rotor and Magnet Eddy Current Loss in Single-Sided Axial Machines", Doctoral dissertation, presented to The Graduate College at the University of Nebraska, 2013, excerpt from pp. 49-50, 1 page.

Valavi et al., "Effects of Loading and Slot Harmonic on Radial Magnetic Forces in Low-Speed Permanent Magnet Machine With Concentrated Windings", IEEE Transactions on Magnetics, vol. 51, No. 6, Jun. 2015, 10 pages.

Wrobel et al., "Design Considerations of a Direct Drive Brushless Machine With Concentrated Windings", IEEE Transactions on Energy Conversion, vol. 23, No. 1, 2008, 8 pages.

Wu et al., "A Low-Speed, High-Torque, Direct-Drive Permanent Magnet Generator for Wind Turbines", Conference Record of the IEEE Industry Applications Conference, 2000, 8 pages.

Yahaya, "Single Layer Winding of Three Phase Induction Motor", The International Journal of Engineering and Sciences, vol. 2, No. 4, 2013, pp. 8-13.

Yang et al., "FEA Estimation and Experimental Validation of Solid Rotor and Magnet Eddy Current Loss in Single-sided Axial Flux Permanent Magnet Machines", IEEE Energy Conversion and Exposition (ECCE), 2013, 9 pages.

International Preliminary Report on Patentability received for PCT Application No. PCT/CA2017/050858, dated Jan. 24, 2019, 7 pages.

* cited by examiner

Fig. 56
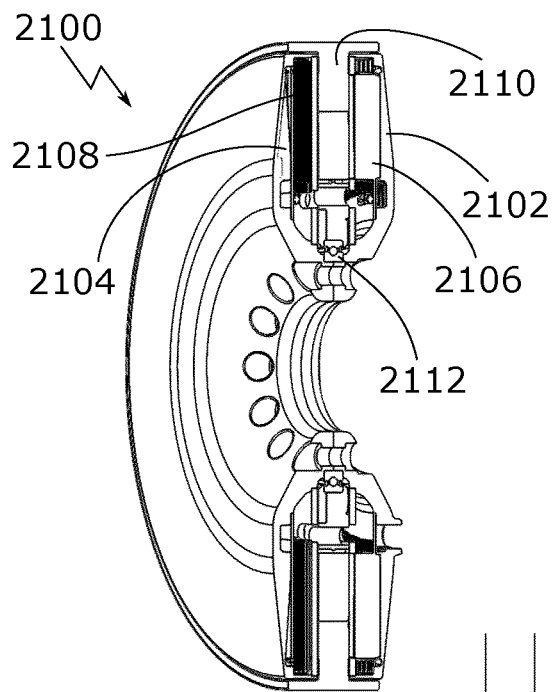
Fig. 57
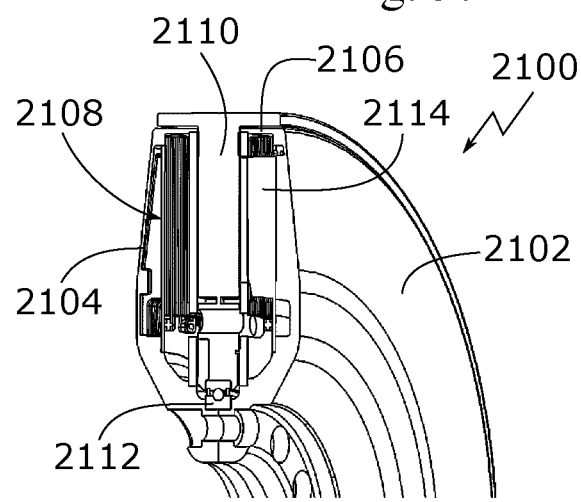
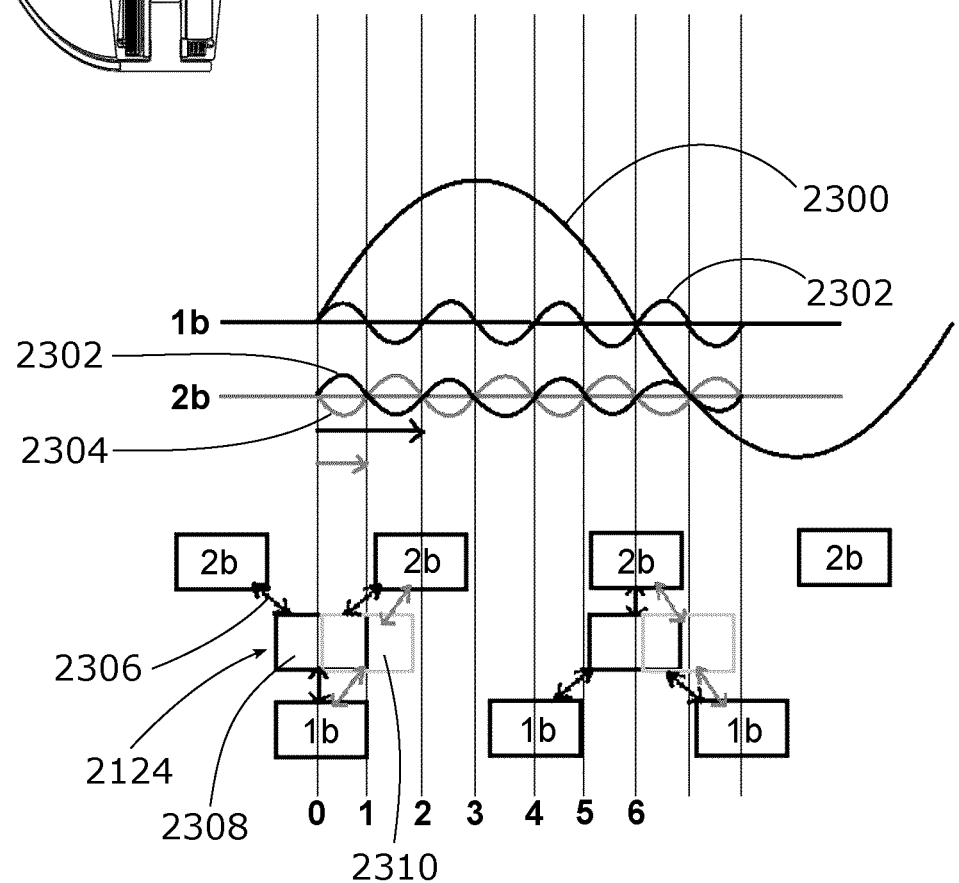
Fig. 58

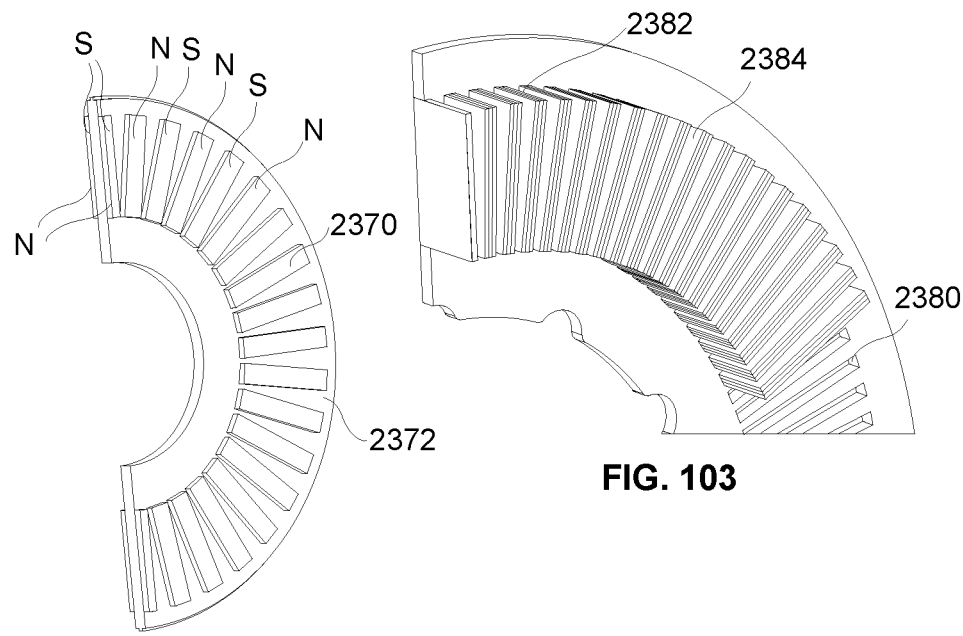
FIG. 102
FIG. 103
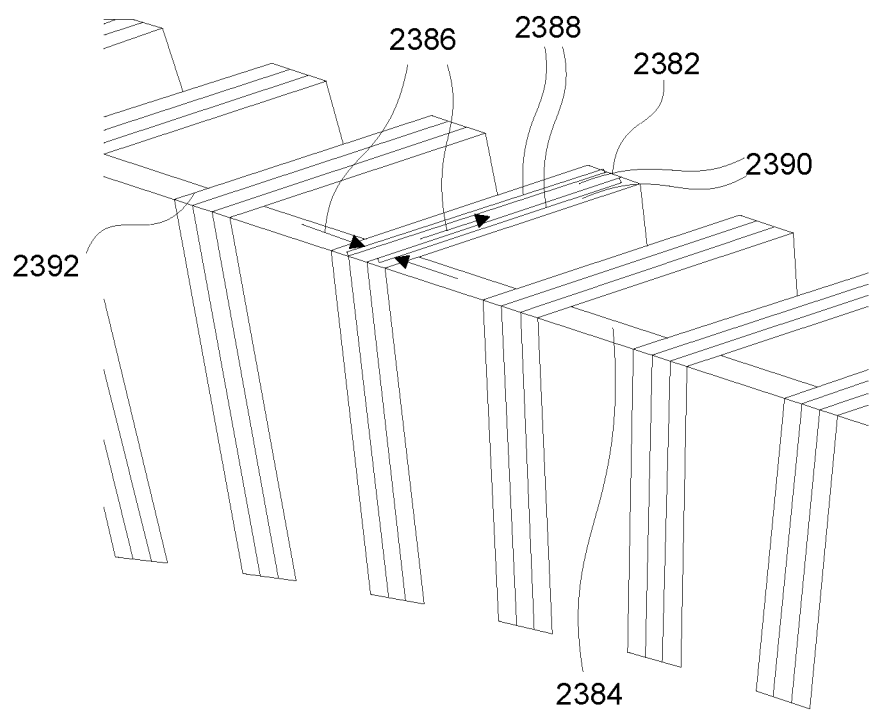
FIG. 104

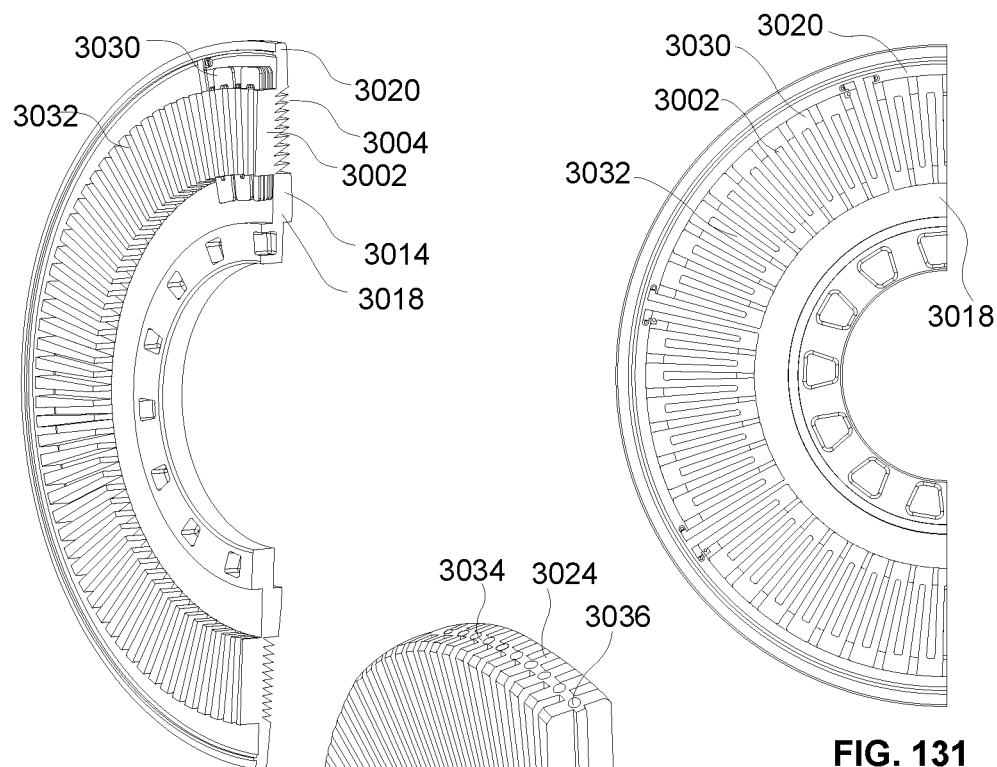
FIG. 130
FIG. 131
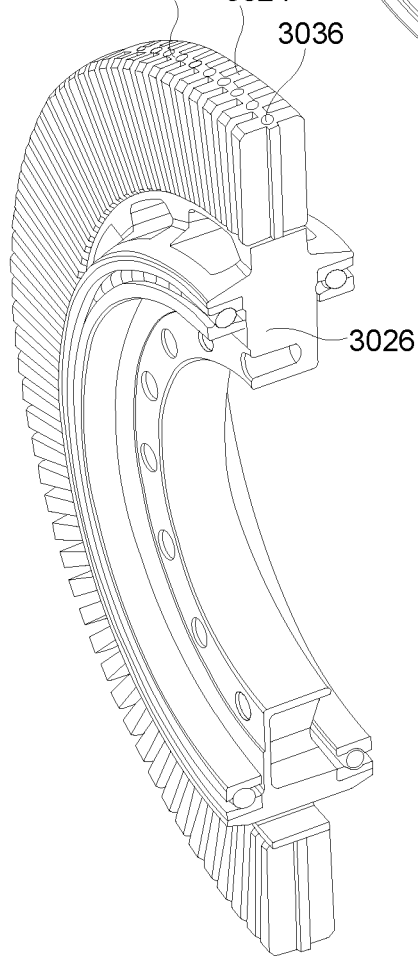
FIG. 132

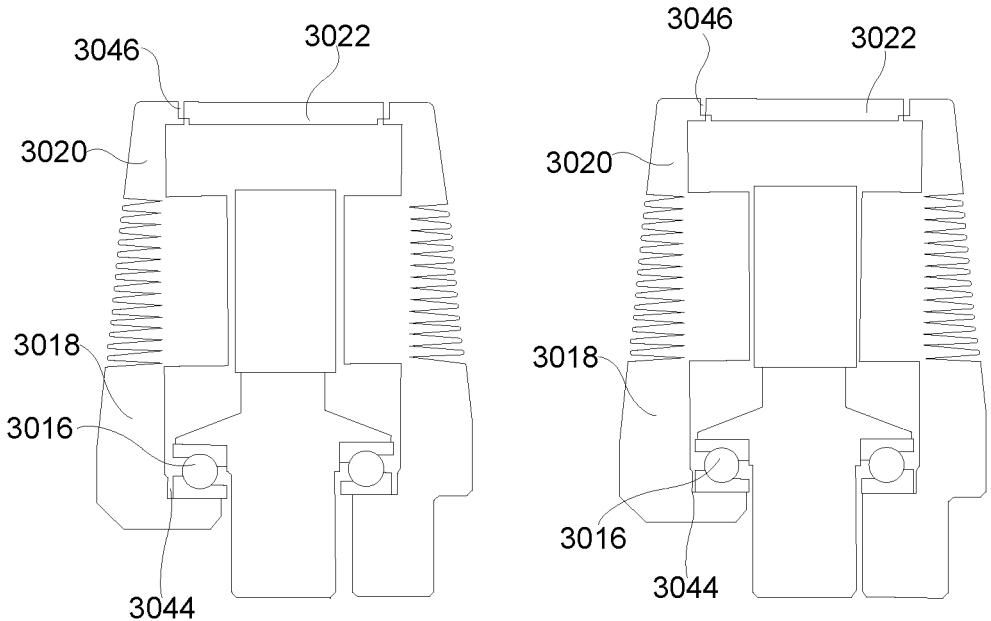
FIG.138　　　　　FIG.139
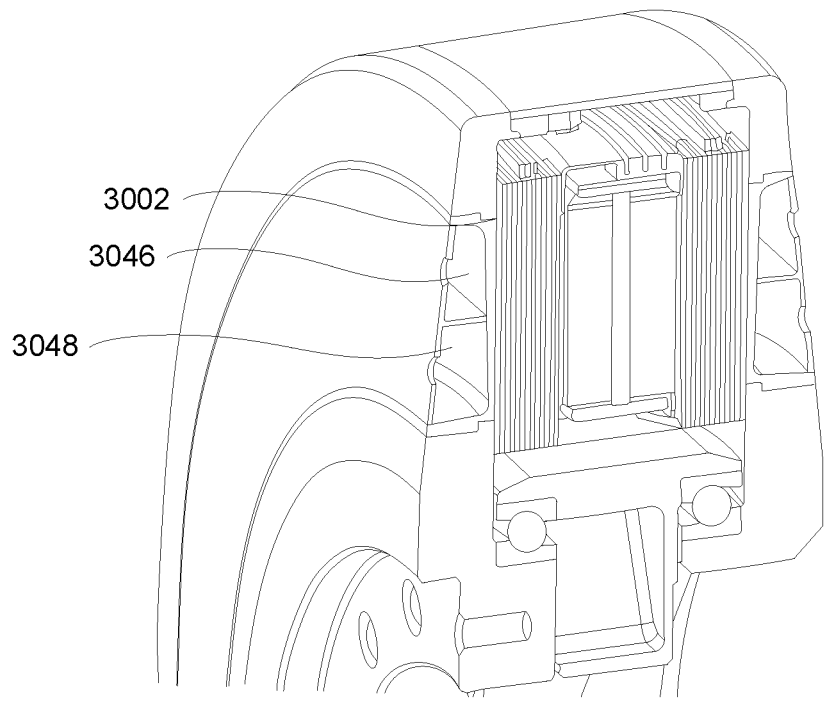
FIG. 140

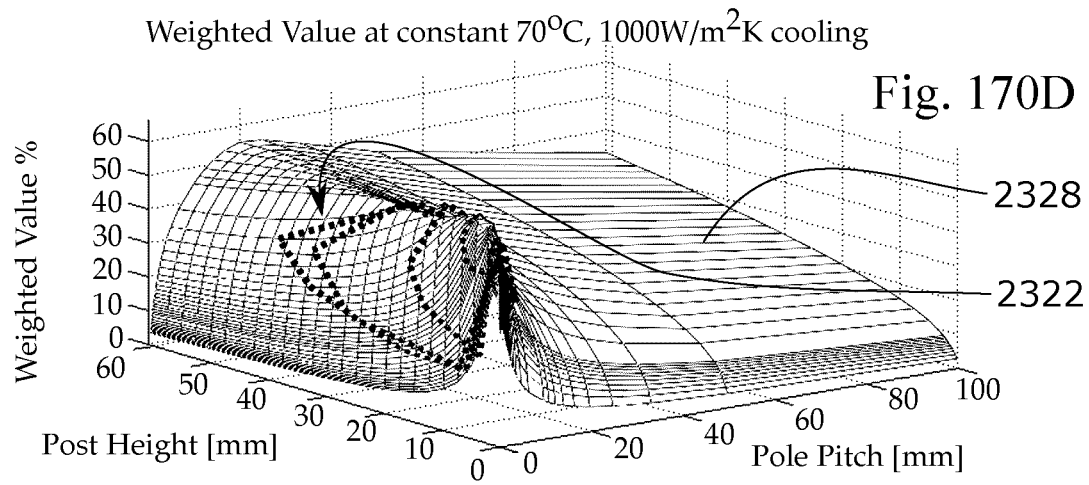
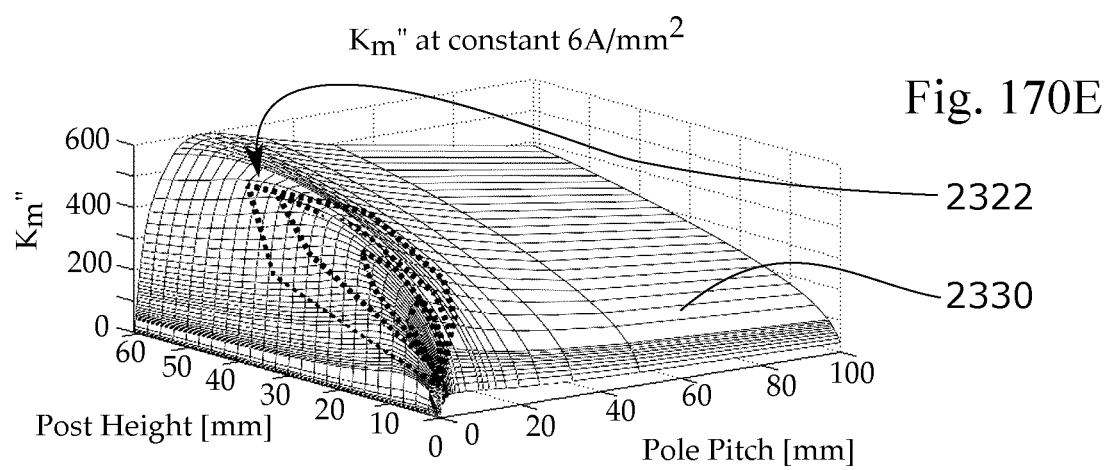
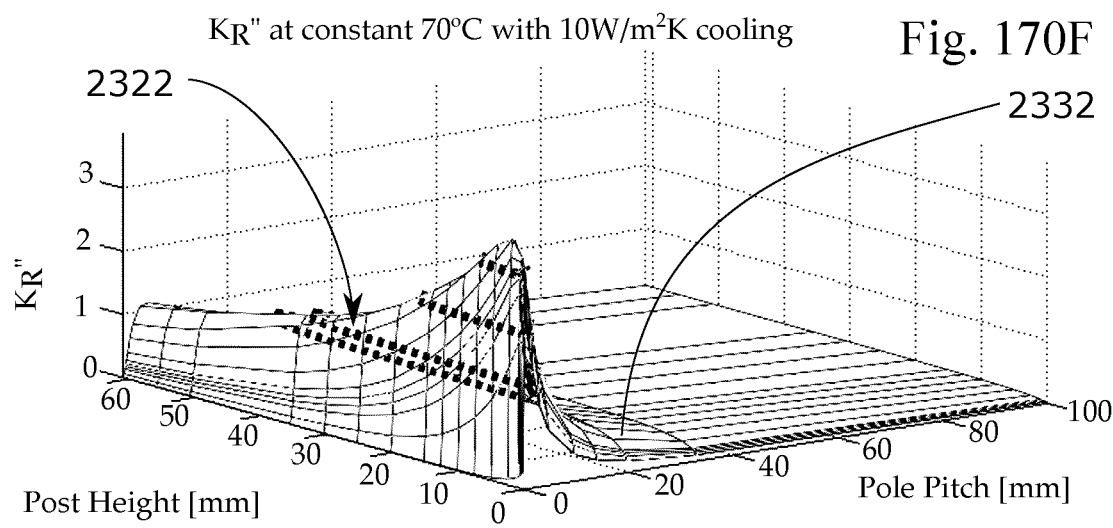

Fig. 185
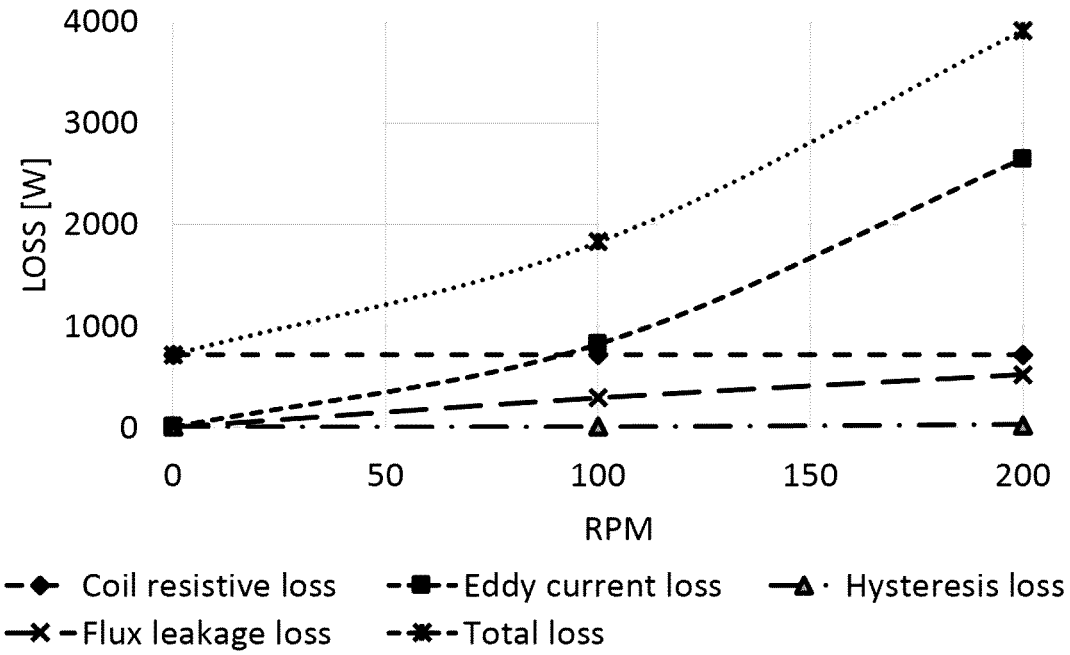
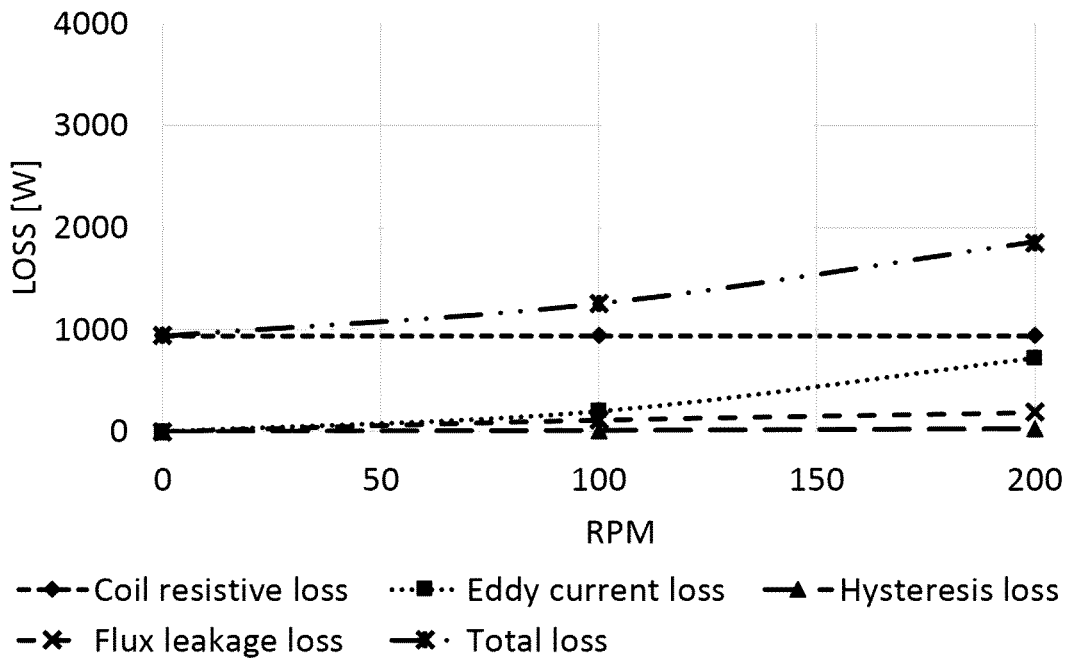
Fig. 186

Fig. 187
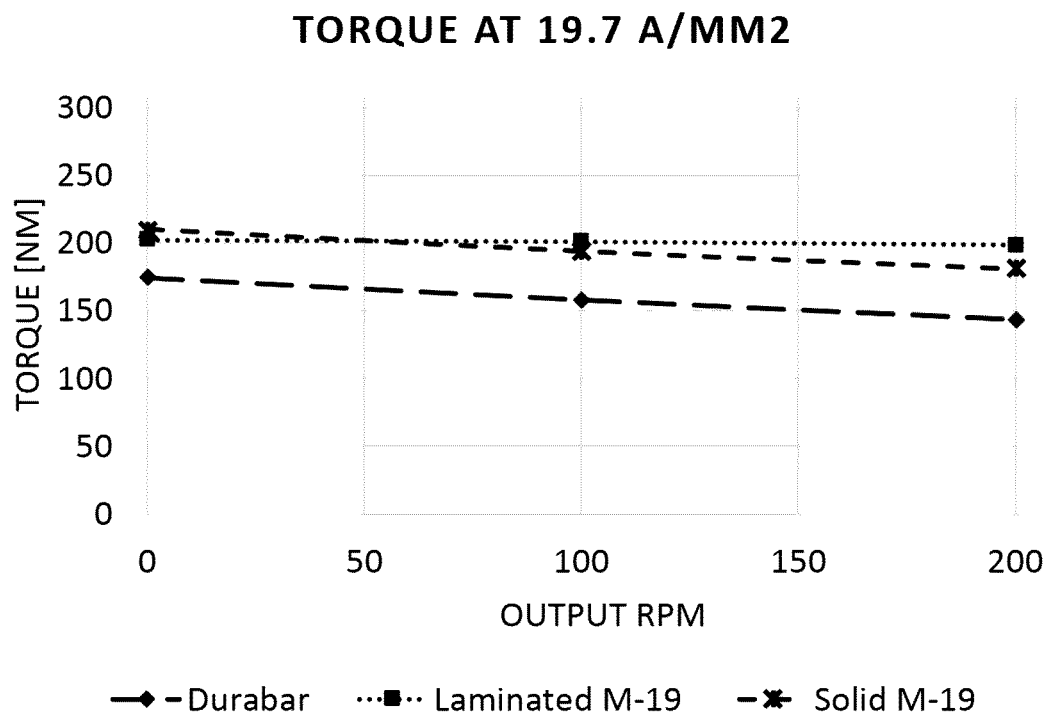
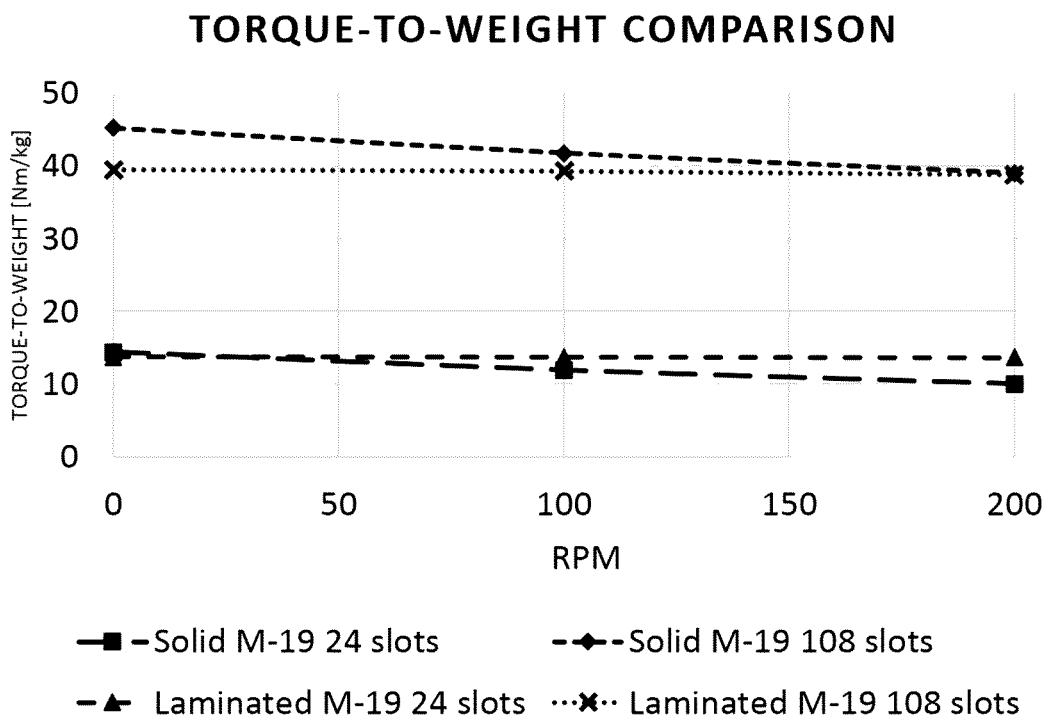
Fig. 188

Fig. 189
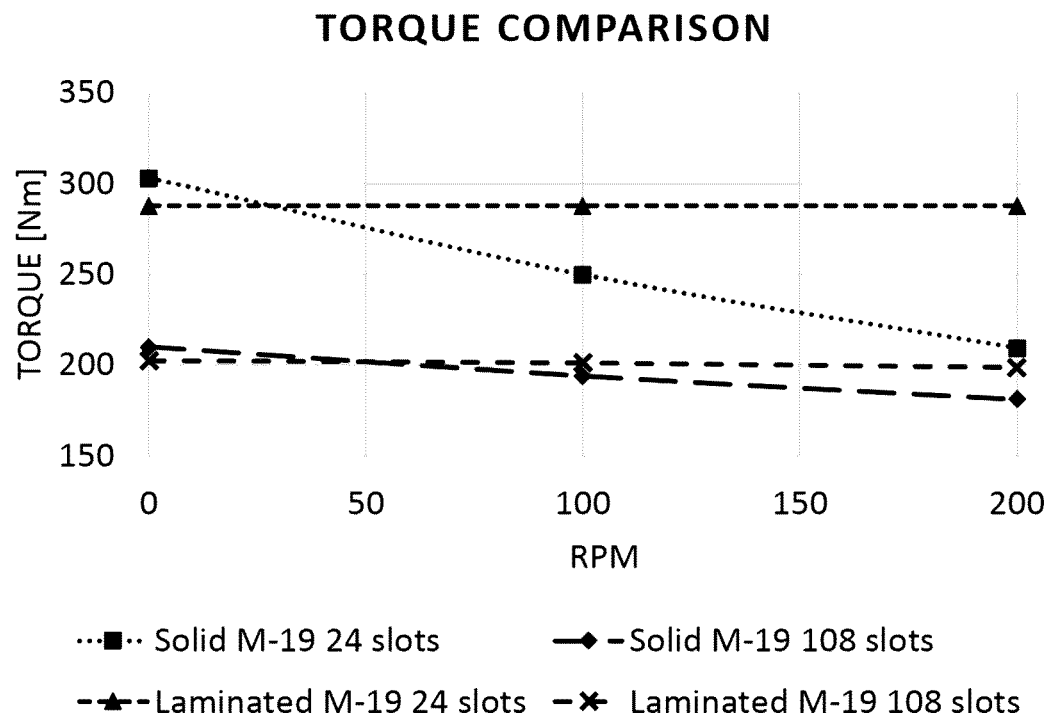
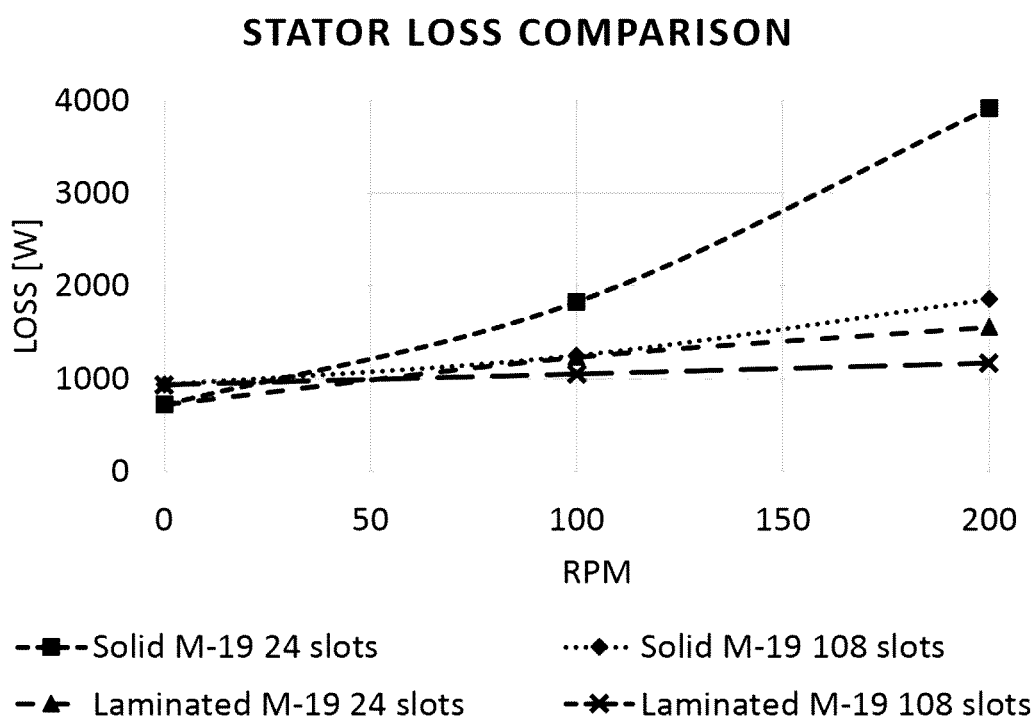
Fig. 190

Fig. 193A
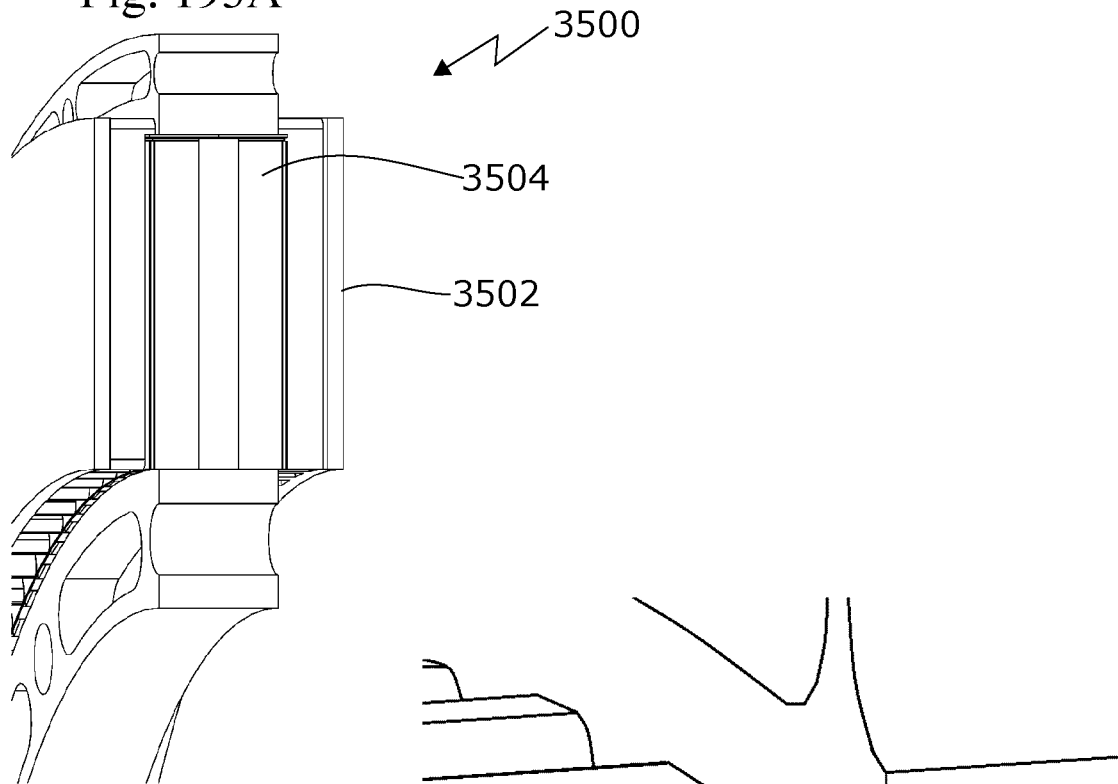
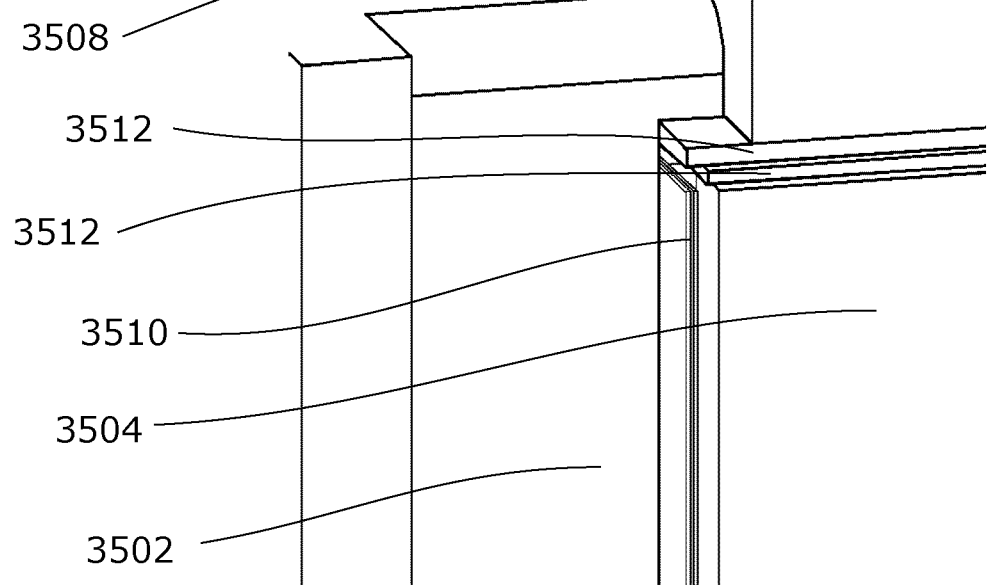
Fig. 193B

200000# ELECTRIC MACHINE

CROSS REFERENCE TO RELATED APPLICATIONS

This application is a National Phase application of PCT Publication No. WO2018/027330, which claims priority to U.S. application Ser. No. 15/235,088 filed on Aug. 11, 2016, which is hereby incorporated by reference in its entirety.

TECHNICAL FIELD

Electric machines.

BACKGROUND

Concentrated flux rotors use tangentially polarized magnets of alternating polarity, and are known, to someone skilled in the art, as providing the potential for higher flux density in the rotor posts at the airgap than is possible if the same magnets were used in an aligned PM configuration.

A known challenge with concentrated flux rotors is that it is generally detrimental to torque to have any soft magnetic connection between the rotor posts because of the flux leakage from a N face of one magnet to an S face of the same or an adjacent magnet that will result through this connection. In other words, while the use of a soft magnetic material such as steel or iron, connecting the N and S poles of magnets is helpful to torque production with an aligned PM rotor, any soft magnetic material connection between the rotor posts of a concentrated flux rotor is detrimental to torque production. A known option to deal with this problem is to adhere an assembly of PM's and soft magnetic rotor posts together using glue with no soft magnetic material connections between adjacent posts so that there is no flux linkage between them. This can make efficient use of a high percentage of the PM flux, but the assembly is very difficult because the magnets are repelling each other and must also rely on the strength of the bond to maintain its shape. At higher temperatures and small airgaps, the creep rate of polymer adhesives will make it very difficult to maintain the required shape of the rotor for a long service life.

SUMMARY

The inventor has proposed an electric machine using a concentrated flux arrangement of permanent magnets and posts, the posts connected to end irons. The electric machine is arranged to provide a total flux at the airgap exceeding the saturation flux of flux paths through the end irons.

In an embodiment, there is provided a permanent magnet carrier for an electric motor, the permanent magnet carrier having a first end iron, a second end iron, an array of posts each extending from at least one of the first end iron and the second end iron towards the other of the first end iron and the second end iron, the first end iron and the posts extending from the end iron being formed of a first single piece of magnetic material, and the second end iron and the posts extending from the second end iron being formed of the first single piece of magnetic material or of a second single piece of magnetic material, an array of permanent magnets arranged between the posts of the array of posts, each permanent magnet being magnetized in a direction oriented between a respective pair of posts of the array of posts adjacent to the magnet, and the supporting structure defining a first respective flux path between each respective pair of posts through the first end iron, and a second respective flux path between each respective pair of posts through the second end iron, the first respective flux path having a first gap or first saturation portion and the second respective flux path having a second gap or second saturation flux portion, the respective magnet generating a total magnetic flux in conjunction with the respective pair of posts that exceeds a sum of a saturation flux of the first gap or saturation portion and a saturation flux of the second gap or second saturation portion.

In various embodiments, there may be included any one or more of the following features: successive posts of the array of posts may extend alternately from the first and second end irons to interdigitate, the first gap or saturation portion of each respective pair of posts being a gap between the first end iron and a post of the pair extending from the second end iron and the second gap or saturation portion of each respective pair of posts being a gap between the second end iron and a port of the pair extending from the first end iron. There may be a support element supporting the first end iron relative to the second end iron. The support element may include a support ring defining grooves for receiving the posts. Successive posts of the array of posts may extend alternately from the first and second end irons to interdigitate, each post being connected to the end iron it does not extend from with a connection portion smaller in cross section than the post, the first saturation portion and the second saturation portion of each respective pair of posts being the connection portions connecting to the posts of the respective pair of posts. The posts may connect the first end iron and the second end iron, the end irons defining holes, portions of the end irons around the holes being the saturation portions. The posts may connect the first end iron and the second end iron, the permanent magnets having a length in a direction aligned with the posts sufficient to generate a flux exceeding a saturation flux of the end irons so that portions of the end irons connecting between the posts act as the saturation portions. The posts may connect the first end iron and the second end iron, the permanent magnets having a length in a direction aligned with the posts sufficient to generate a flux exceeding a saturation flux of the posts so that the posts act as the saturation portions. The magnets have a ratio of magnet length in the direction aligned with the posts to magnet width in the direction oriented between the respective pair of posts greater than 4/1, 5/1, 6/1, 7/1, 8/1, 9/1, 10/1, 11/1, 12/1, 13/1, 14/1, 15/1, or 16/1. The posts may have a ratio of post length to post width greater than 4/1, 5/1, 6/1, 7/1, 8/1, 9/1, 10/1, 11/1, 12/1, 13/1, 14/1, 15/1, or 16/1. Each post of the array of posts may have a respective cross section and the first end iron may have a first end iron cross section and each post may connect to the first end iron with no part of the connection having substantially lower cross section than a lowest of the respective cross section and the first end iron cross section. The first end iron cross section may be equal to or greater than each respective cross section of the posts of the array of posts. The second end iron may have a second end iron cross section and each post of the array of posts may connect to the second end iron with no part of the connection having substantially lower cross section than a lowest of the respective cross section and the second end iron cross section. The second end iron cross section may be greater than or equal to each respective cross section of the posts of the array of posts. Each magnet may extend substantially the full length of a space between successive posts. There may be tabs on the first end iron and second end iron for retaining the permanent magnets.

There is also provided an axial flux motor comprising a permanent magnet carrier as described above in which the posts extend in a radial direction and the direction oriented between the respective pair of posts is a circumferential direction. There is further provided a radial flux motor comprising a permanent magnet carrier as described above in which the posts extend in an axial direction and the direction oriented between the respective pair of posts is a circumferential direction. There is also further provided a linear motor comprising a permanent magnet carrier as described above in which the posts extend in a direction substantially perpendicular to a direction of motion of the motor and to a direction perpendicular to an airgap between the permanent magnet carrier and an electromagnet carrier, and the direction oriented between the respective pair of posts is the direction of motion of the motor.

There is also provided a permanent magnet carrier for an electric motor, the permanent magnet carrier having a first end iron, a second end iron, an array of posts each extending from one of the first and second end irons towards the other of the first and second end irons, successive posts of the array of posts extend alternately from the first and second end irons to interdigitate, the first end iron and the posts extending from the end iron being formed of a first single piece of magnetic material, and the second end iron and the posts extending from the second end iron being formed of a second single piece of magnetic material, an array of permanent magnets arranged between the posts of the array of posts, each permanent magnet being magnetized in a direction oriented between a respective pair of posts of the array of posts adjacent to the magnet, and each post being connected to the end iron it does not extend from with a connection portion.

These and other aspects of the device and method are set out in the claims.

BRIEF DESCRIPTION OF THE FIGURES

Embodiments will now be described with reference to the figures, in which like reference characters denote like elements, by way of example, and in which:

FIG. 56 shows a cross-section of an exemplary actuator assembly with a two-part stator, three phases and a 3:2 stator post:permanent magnet ratio.

FIG. 57 shows a detailed cross-section view of the embodiment from FIG. 56.

FIG. 58 shows the torque plotted as a function of rotor position for a 3:2 ratio or stator posts:permanent magnets, demonstrating the effect of rotating one stator relative to the other.

FIG. 102 shows an embodiment of a rotor configuration.

FIG. 103 shows an exemplary configuration of a laminated post stator.

FIG. 104 shows a section view of an exemplary embodiment of a stator with radially aligned post laminations.

FIG. 122 shows a further detail of a method of making anodized conductors;

FIG. 123 shows a cross-section of an embodiment of a conical rotor;

FIG. 124 shows a close-up cross-sectional view of the embodiment in FIG. 123;

FIG. 125 shows a close-up cross-sectional view of the embodiment in FIG. 123;

FIG. 126 shows a close-up cross-sectional view of the embodiment in FIG. 123;

FIG. 127 shows a close-up cross-sectional view of the embodiment in FIG. 123;

FIG. 128 is an axial view of an embodiment of an assembled actuator including power and encoder connectors.

FIG. 129 is a section view of the actuator of FIG. 128 showing an internal rotor along a centre plane between two stators.

FIG. 130 is an isometric section view of a stator and housing assembly of the actuator of FIG. 128 with a partial section of layered conductors.

FIG. 131 is an axial view of a stator, inner housing, outer housing, and layered conductors of the actuator or FIG. 128.

FIG. 132 is an isometric view of rotor components of the embodiment of FIG. 128.

FIG. 133 is a side view of a rotor and stators with an example magnet arrangement in which adjacent magnets are oppositely tangentially polarized.

Figure 134:
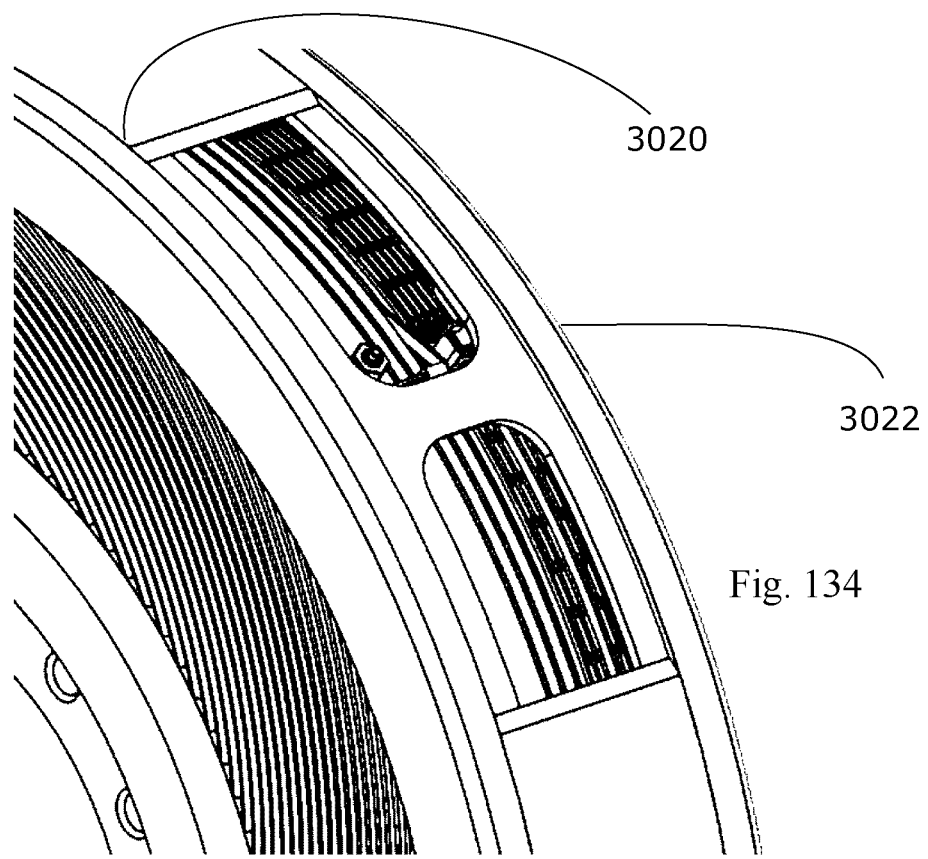

FIG. 134 is a perspective view of an actuator including a separation member to separate two stators.

Figure 128:
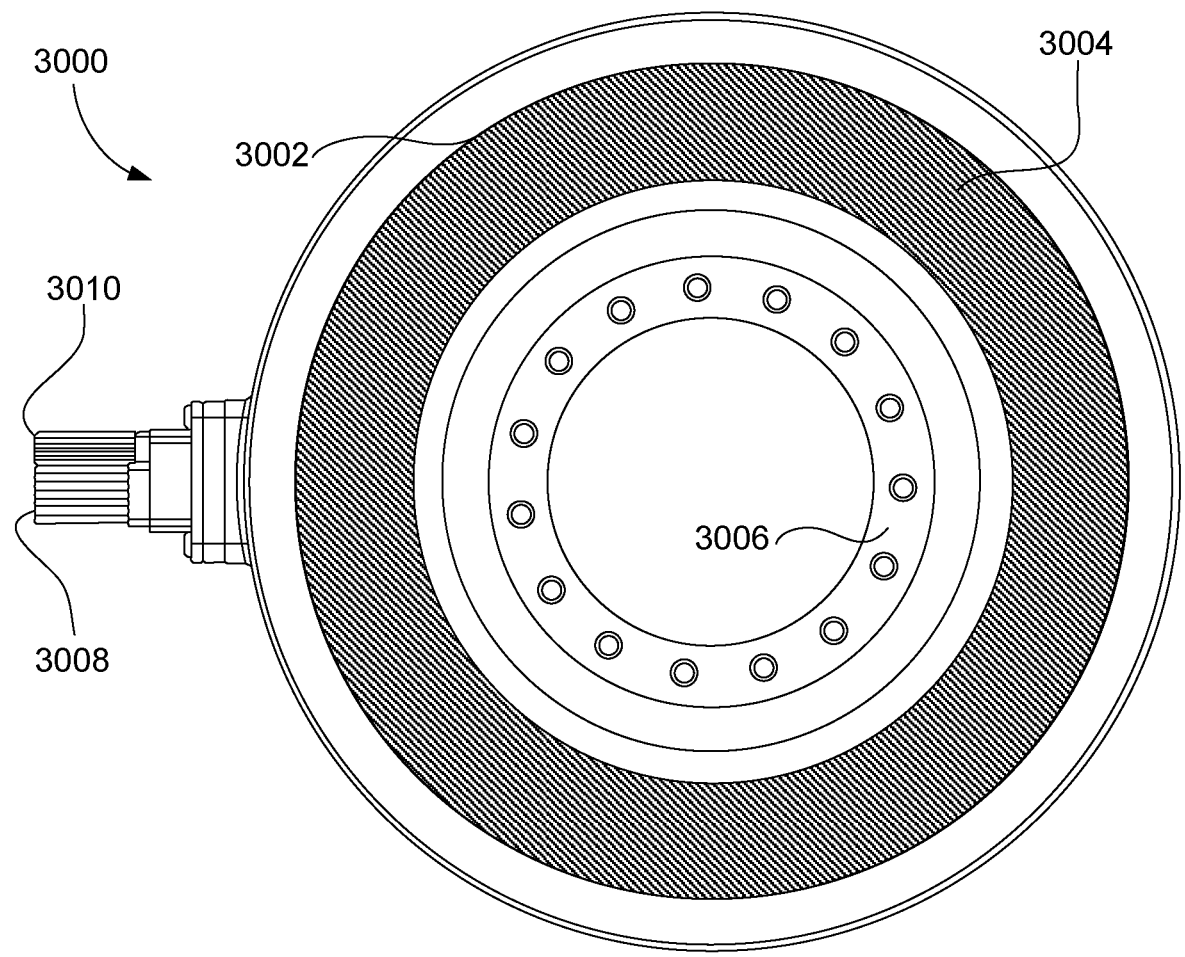
Figure 135:
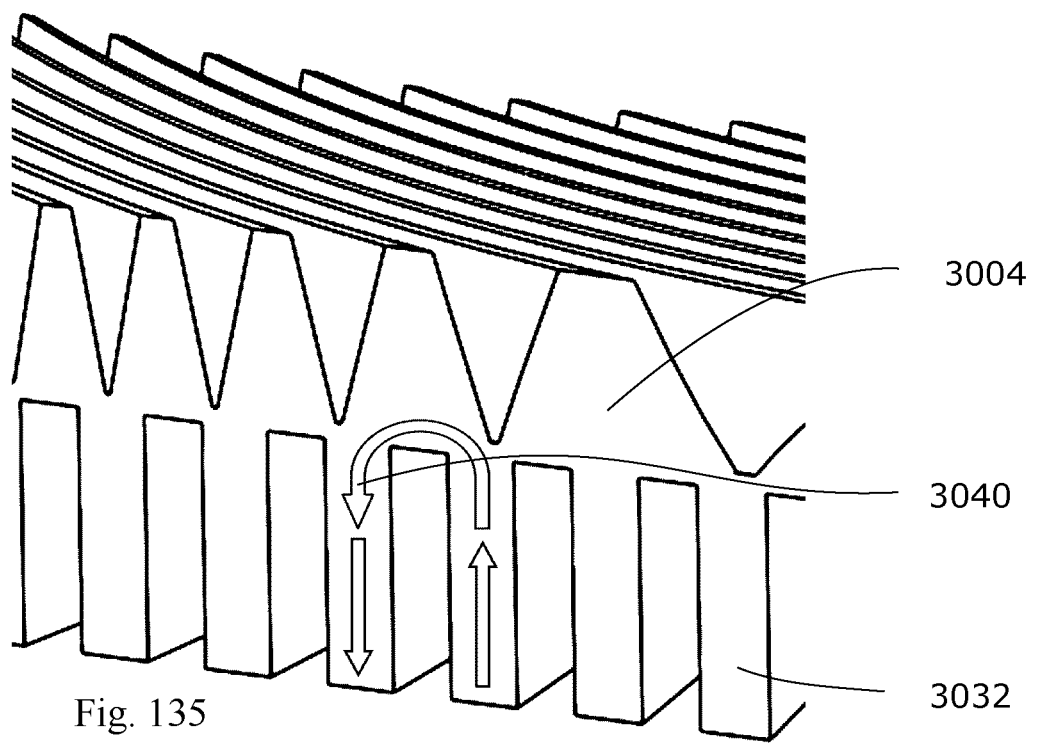

FIG. 135 is another section view of the stator for the actuator of FIG. 128, showing a magnetic flux path through cooling fins.

Figure 136:
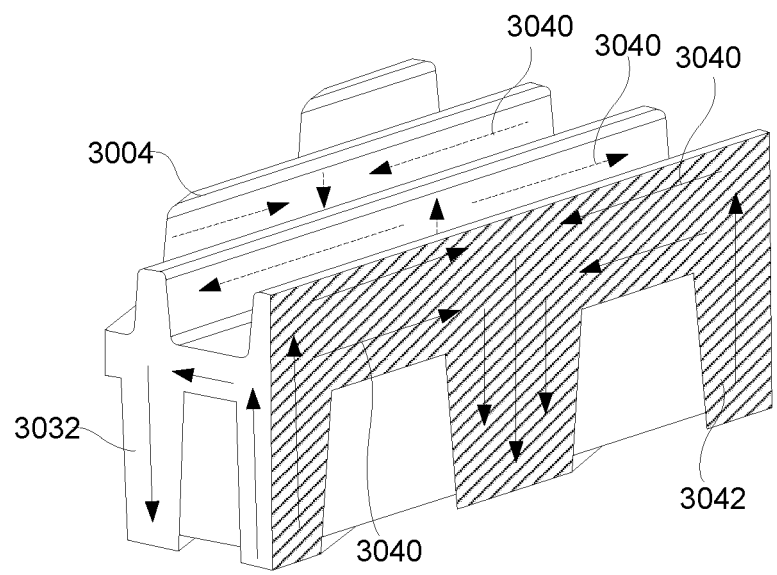

FIG. 136 is a section view of a stator with cooling fins showing a cross sectional area for flux linkage at a diagonal between posts.

Figure 137:
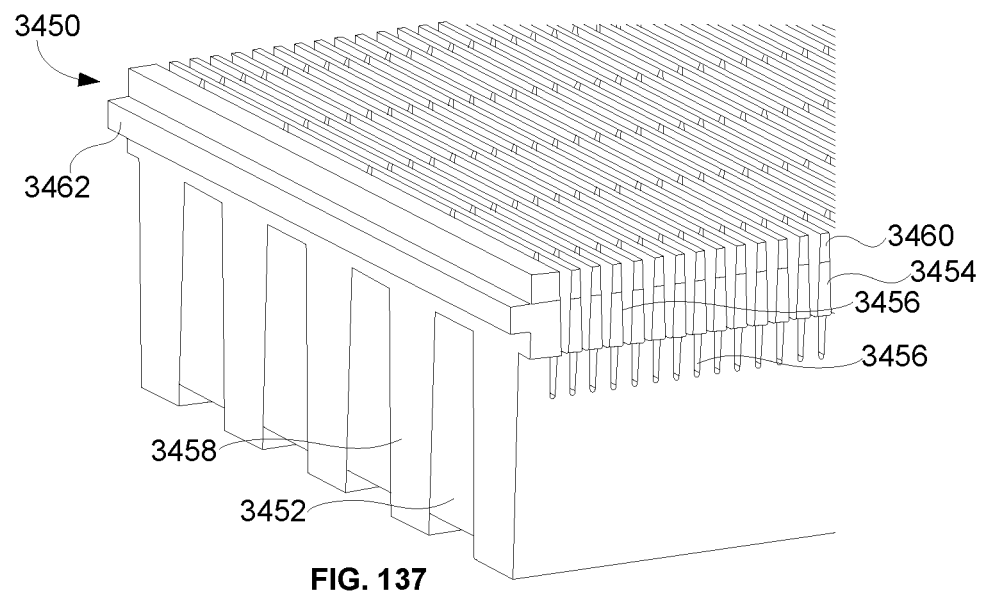

FIG. 137 is a simplified section view of a stator with circumferential cooling fins.

FIG. 138 is a section view of an actuator including a separation member configured to reduce preload on inner bearings.

FIG. 139 is a section view of an actuator including a separation member configured to enhance preload on inner bearings.

FIG. 140 is a cross sectional view of an actuator having sealed cooling channels.

Figure 140A:
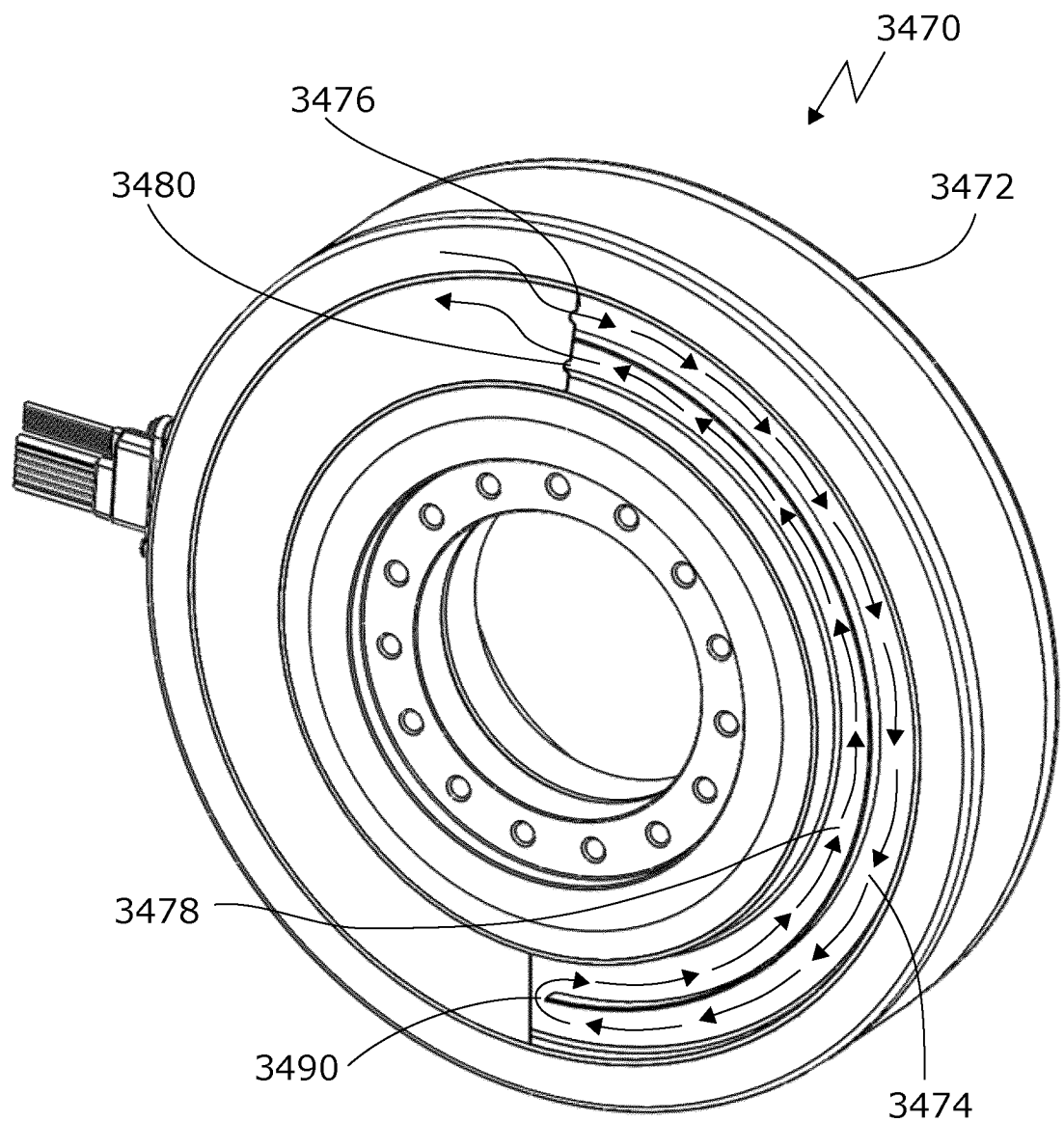

FIG. 140A is a perspective view of an embodiment having semi-circular cooling channels.

Figure 140B:
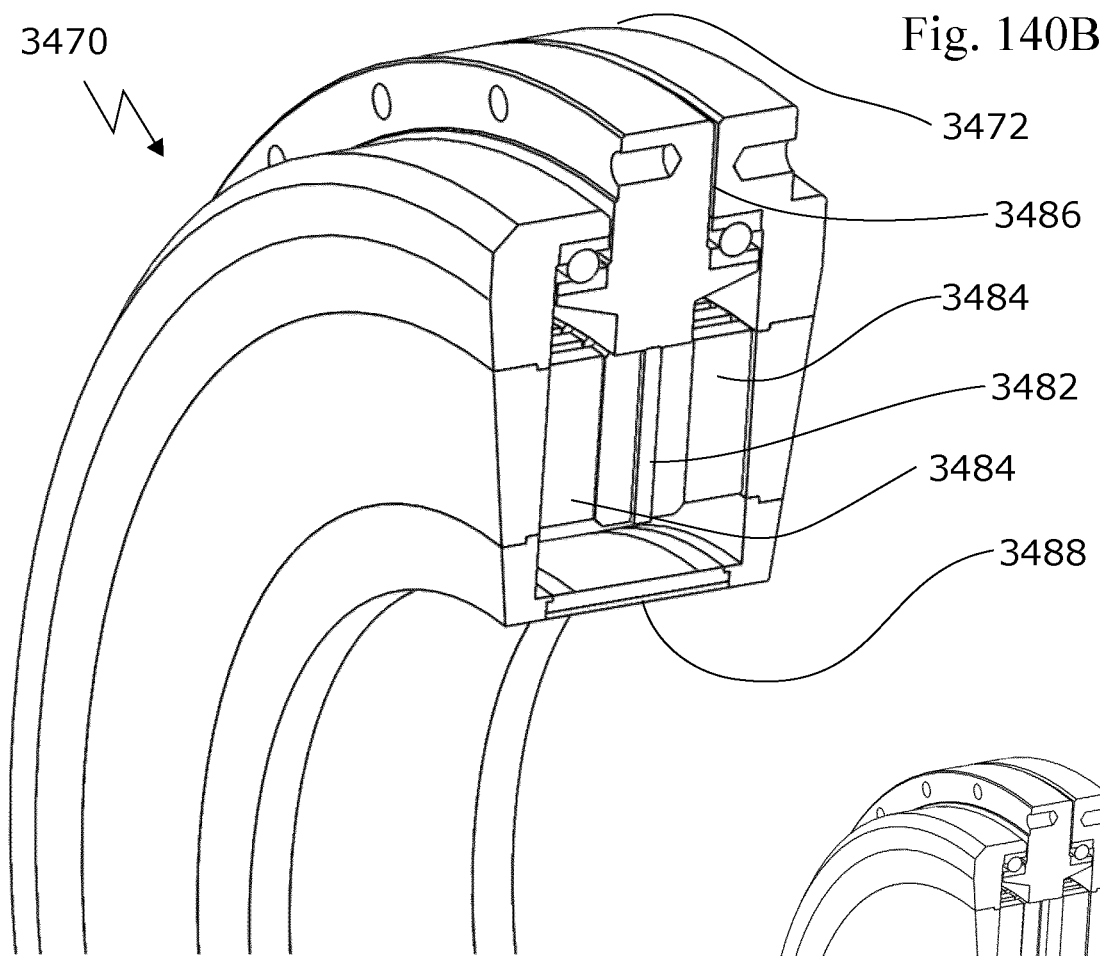

FIG. 140B is a cross-section view of an embodiment with two stators and a rotor, with a housing connected by an inner diameter rigid connection.

Figure 140C:
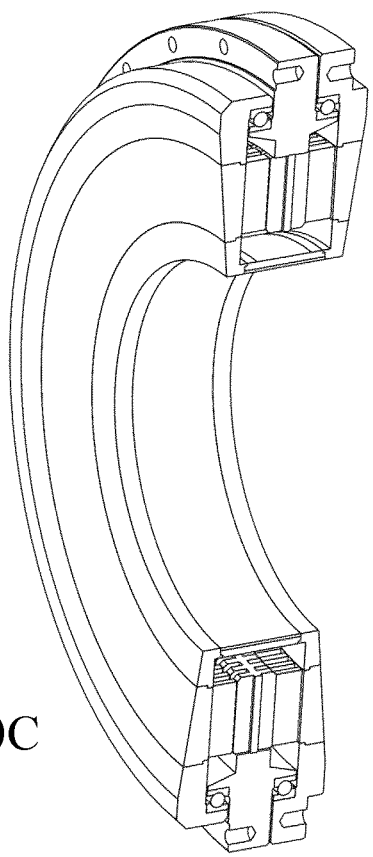

FIG. 140C is an expanded cross-section view of the embodiment shown in FIG. 140B.

Figure 141:
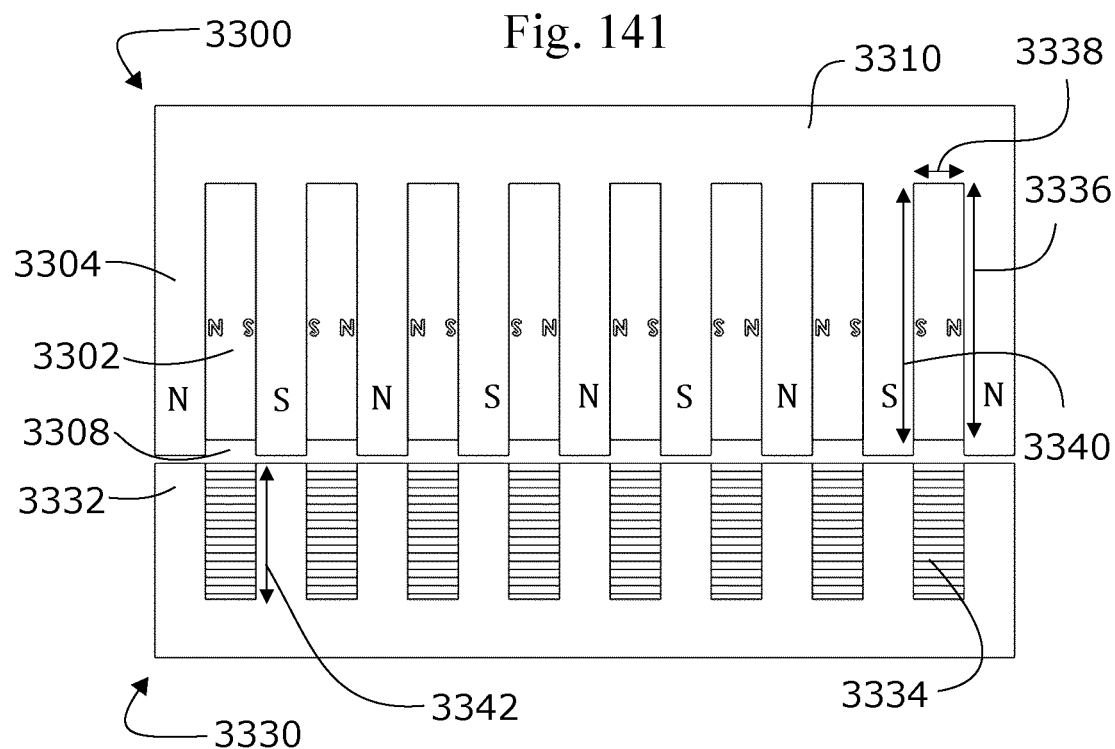

FIG. 141 is a simplified section view of a linear embodiment of a concentrated flux rotor.

Figure 142:
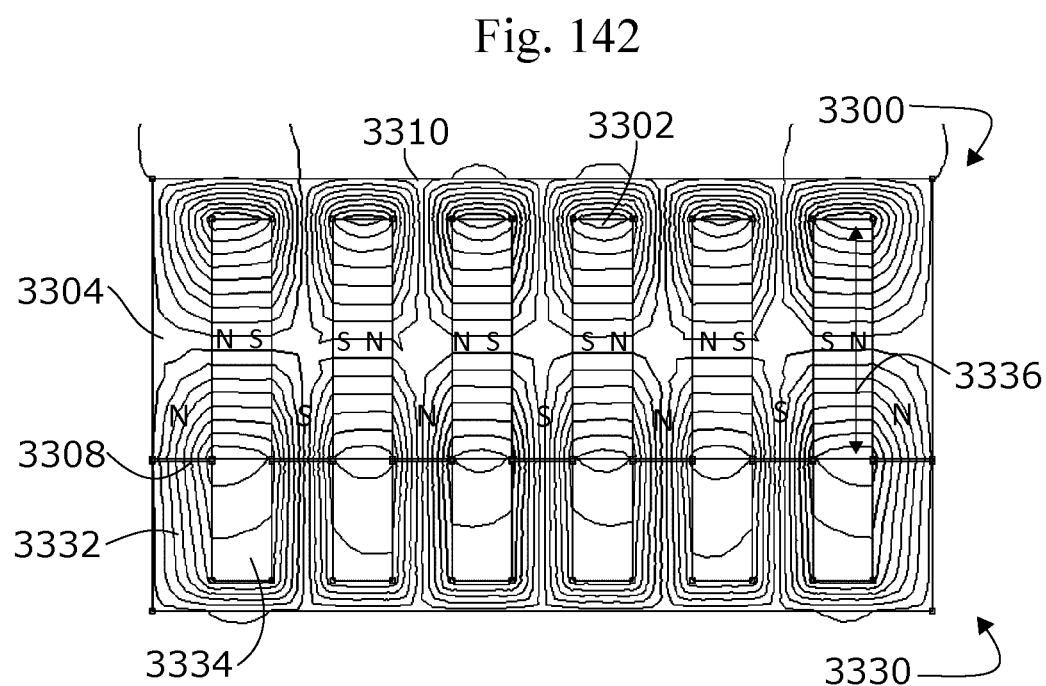

FIG. 142 is a model of a concentrated flux rotor with back iron showing magnetic flux lines.

Figure 143:
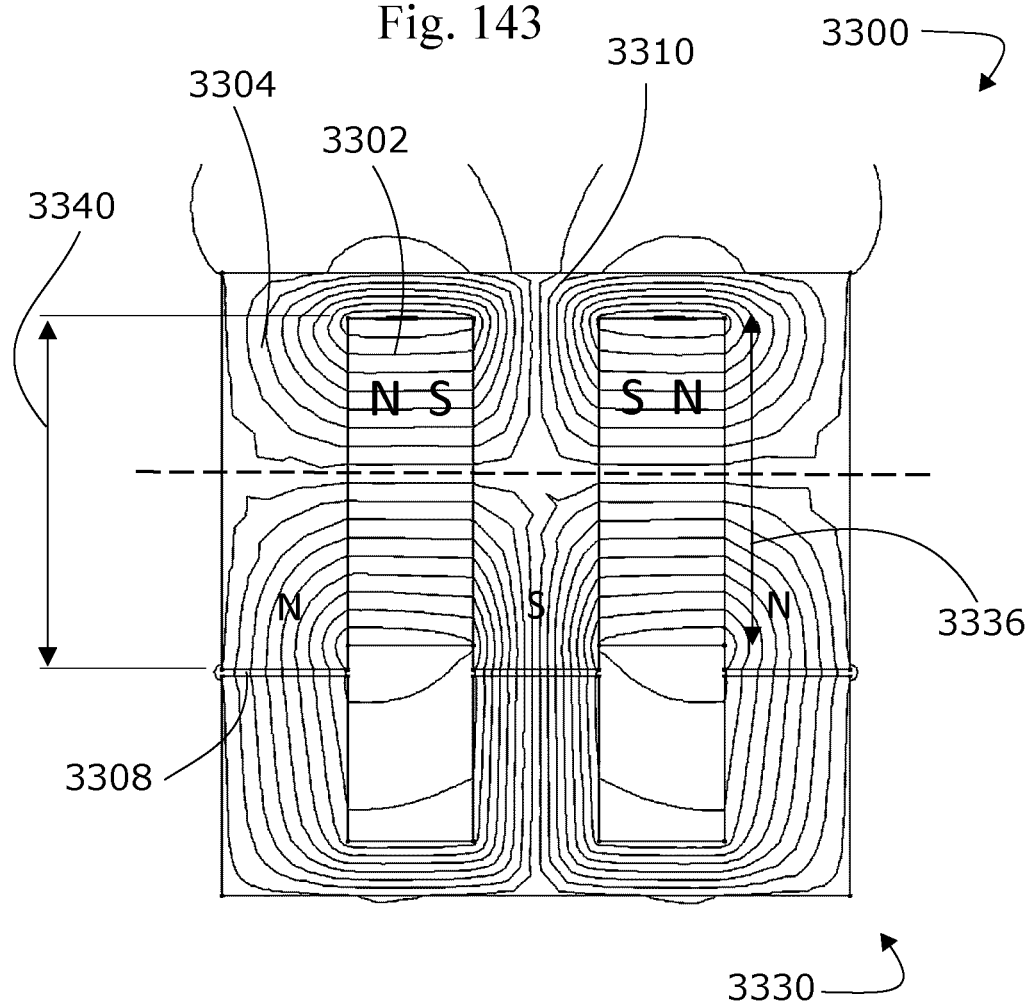

FIG. 143 is a model of a concentrated flux rotor with back iron showing magnetic flux lines, further showing component lengths.

Figure 144:
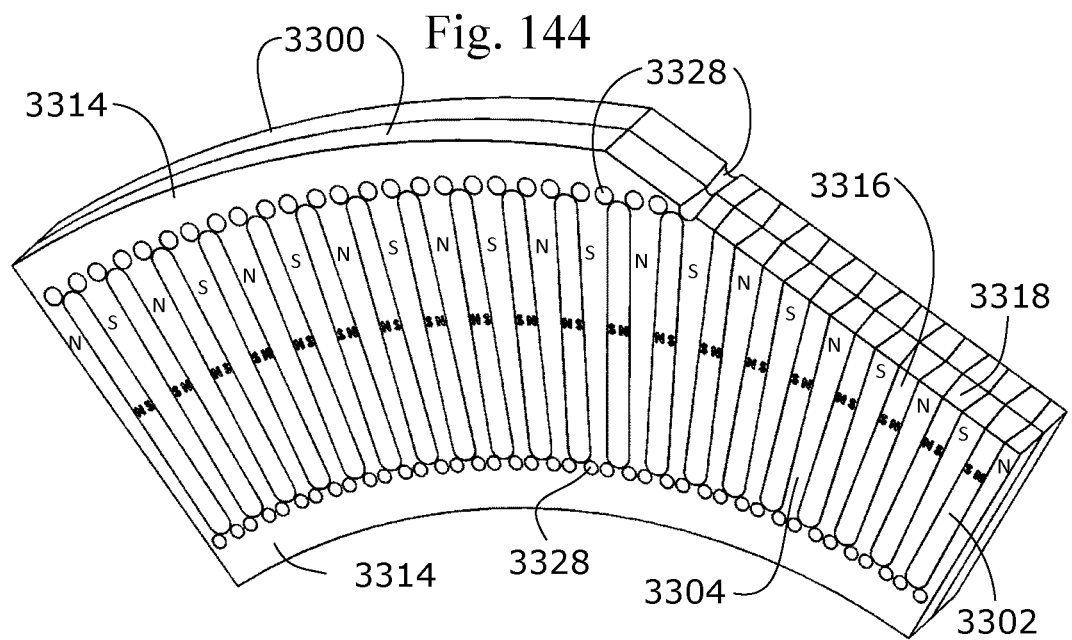

FIG. 144 is a cross-section through a segment of an axial flux concentrated flux rotor with tapered magnets and flux path restrictions.

Figure 145:
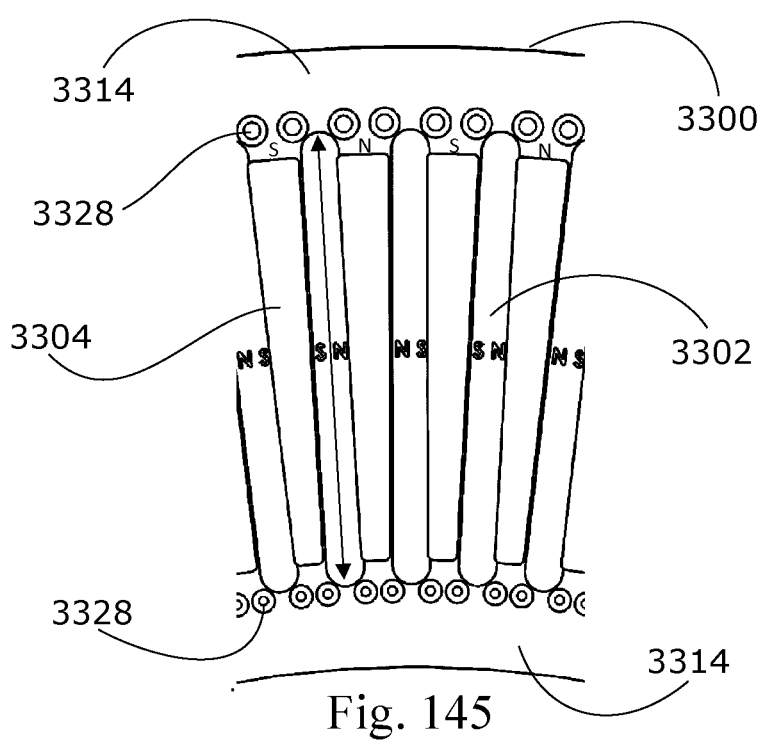

FIG. 145 is a close-up section view of a portion of an axial flux concentrated flux rotor with extended length magnets.

Figure 146:
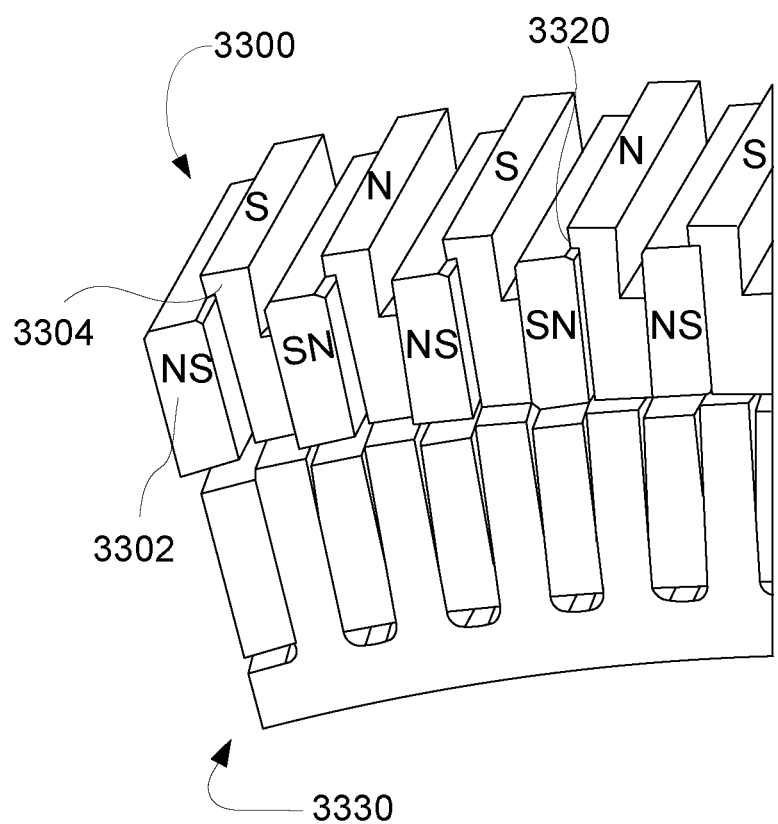

FIG. 146 is a simplified angled cross-section of an embodiment of a radial flux concentrated flux rotor with stator.

Figure 147:
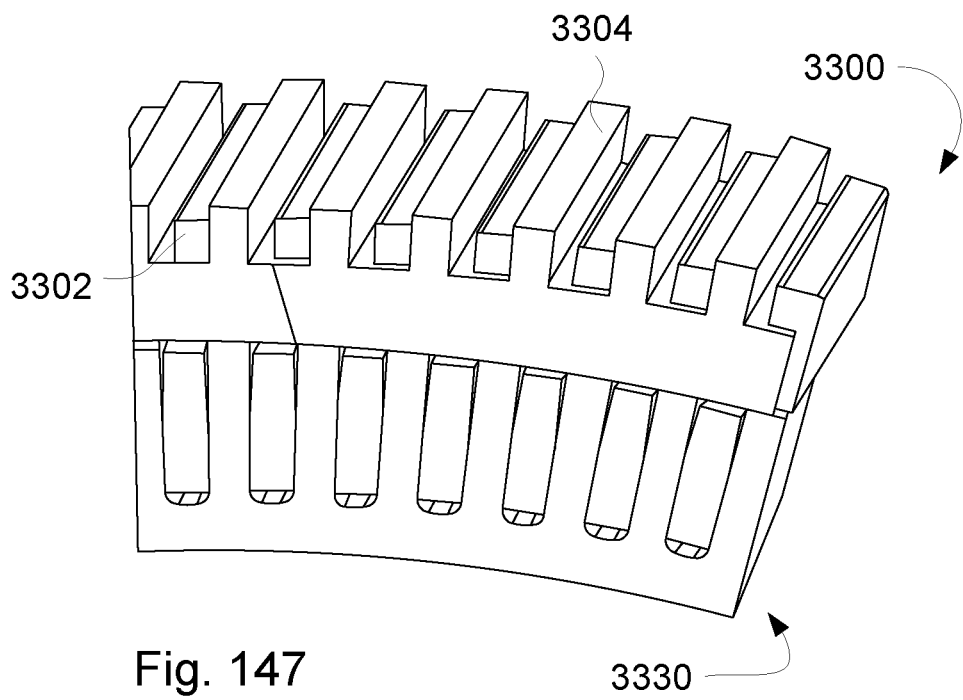

FIG. 147 is a simplified section view of the radial flux concentrated flux rotor and stator shown in FIG. 146.

Figure 148:
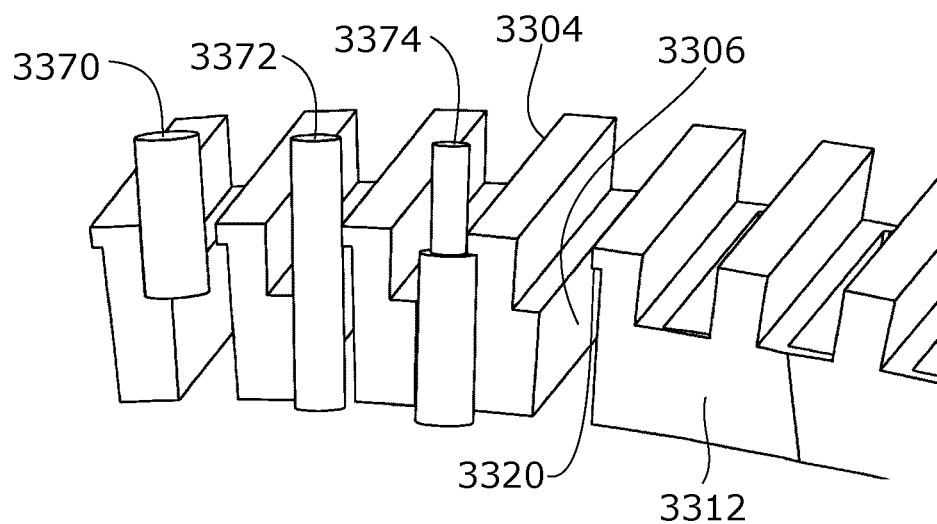

FIG. 148 is a simplified angled cross-section of the concentrated flux rotor shown in FIG. 146, further showing mills.

Figure 149:
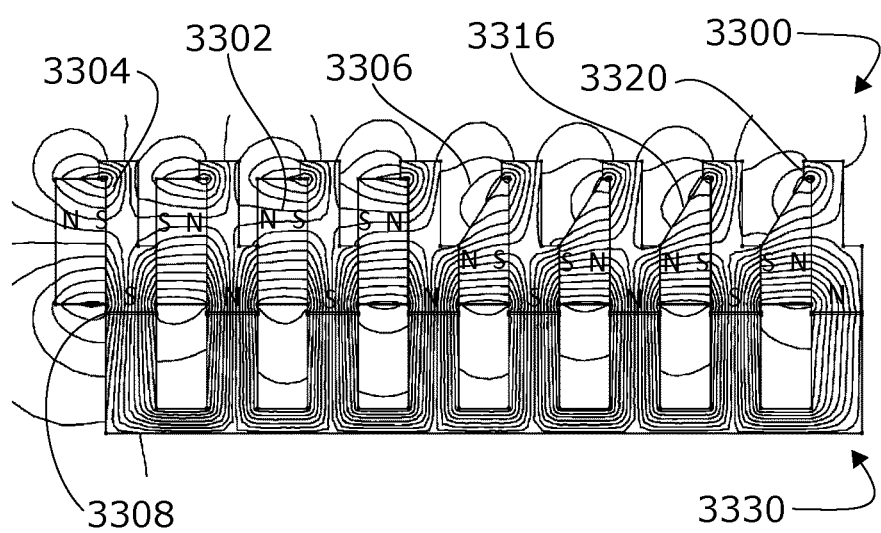

FIG. 149 is a model of a concentrated flux rotor with back iron with variant geometries and showing magnetic flux lines.

Figure 150:
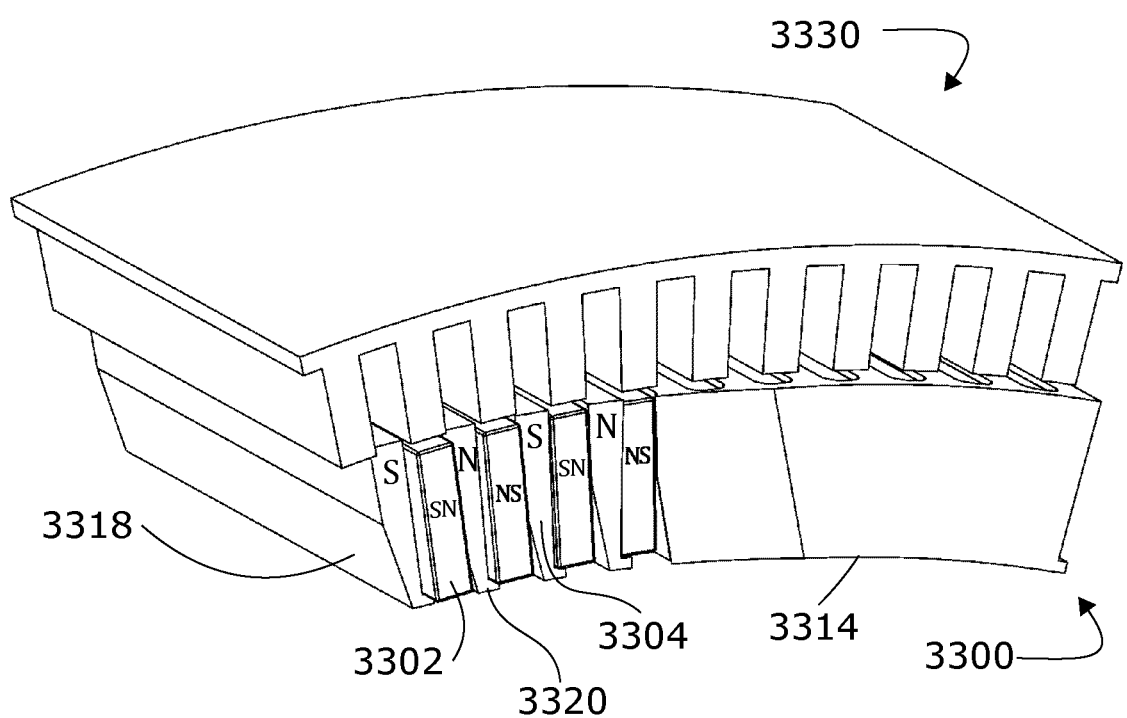

FIG. 150 is a simplified angled cross-section of an embodiment of a radial flux concentrated flux rotor with rotor reliefs and tapered rotor ends.

Figure 151:
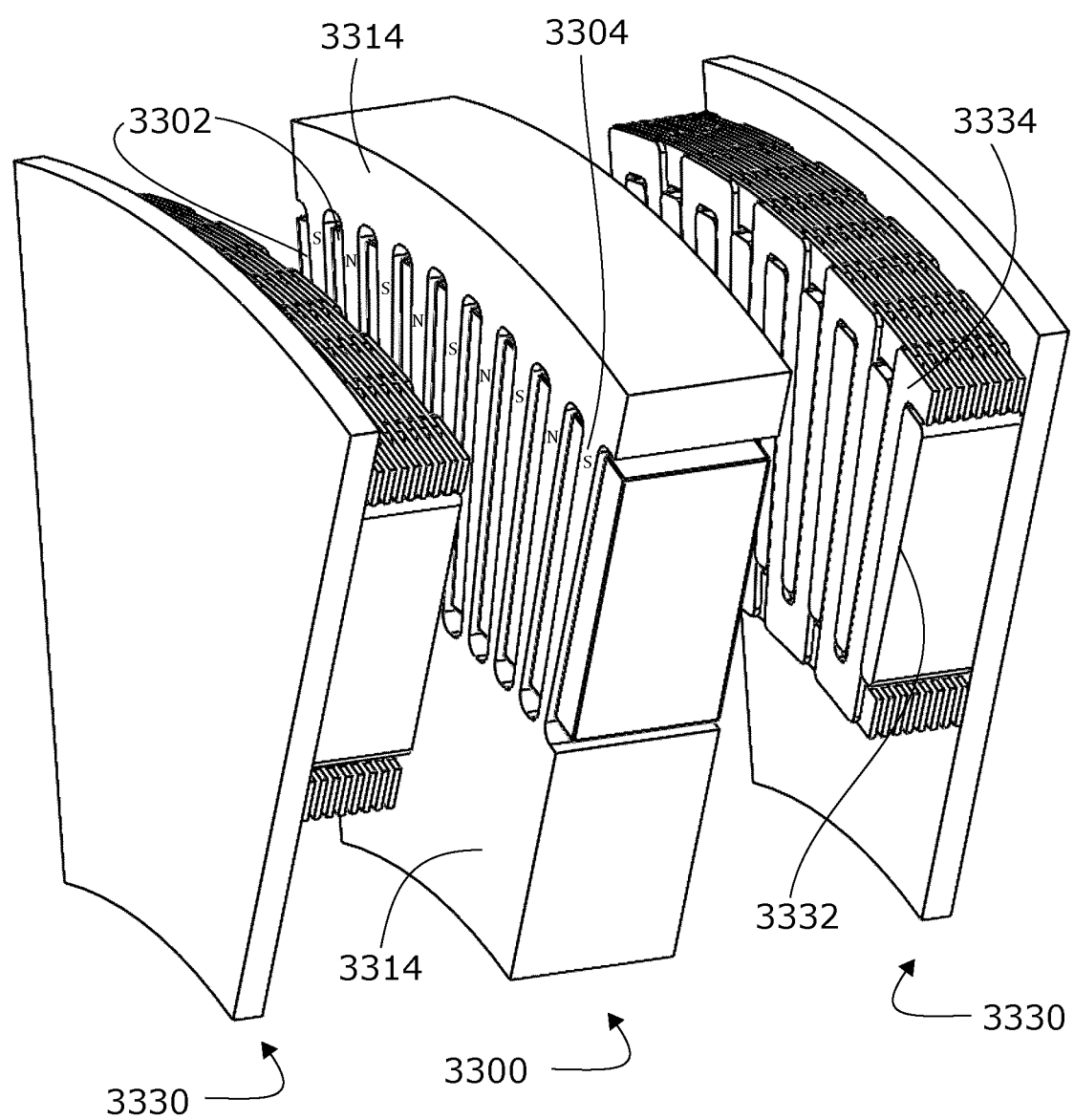

FIG. 151 is a simplified exploded section view of an embodiment of an axial flux stator-rotor-stator configuration of a concentrated flux rotor with end iron.

Figure 152:
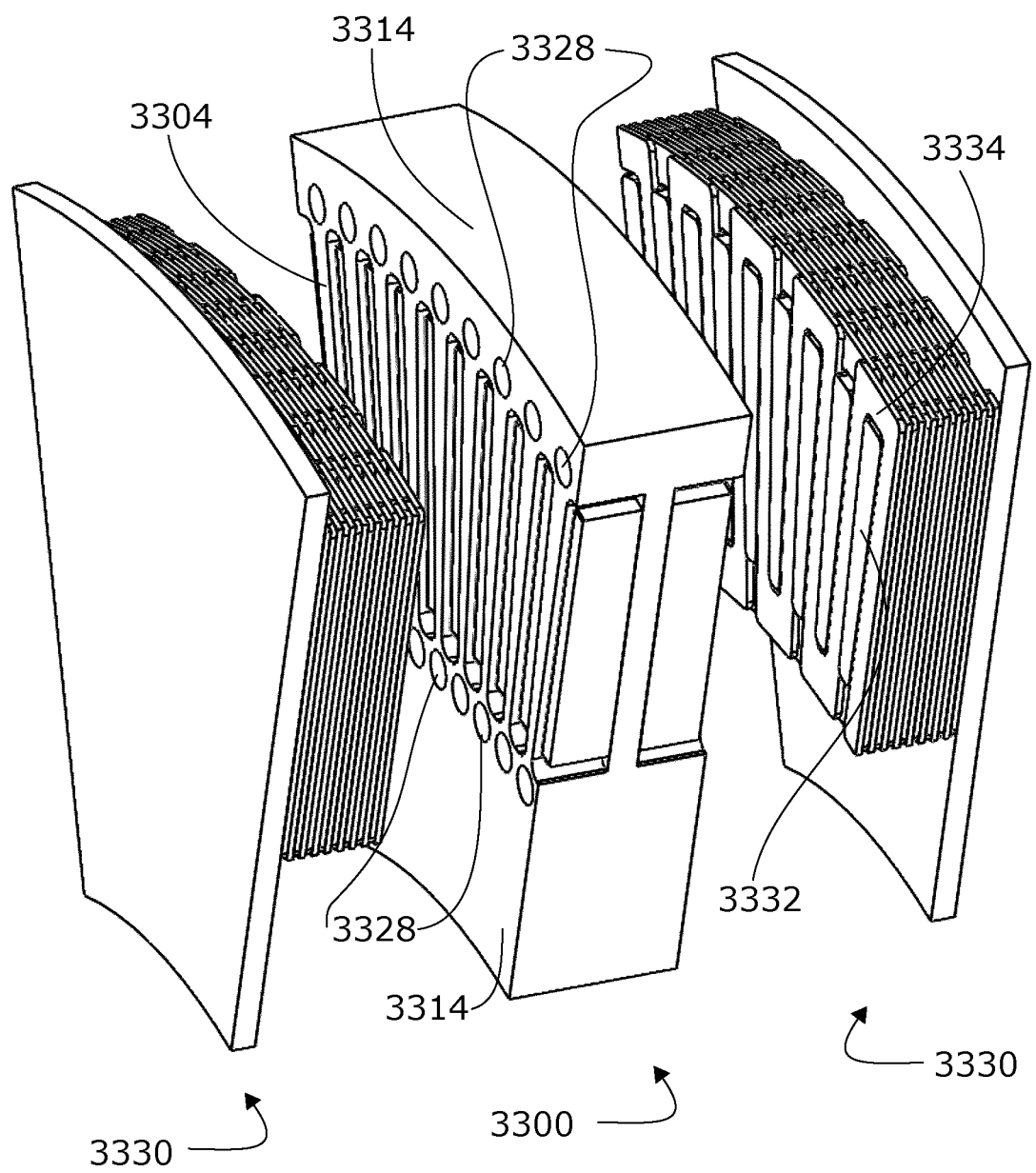

FIG. 152 is a simplified exploded section view of an embodiment of an axial flux stator-rotor-stator configuration of a concentrated flux rotor with back iron, end iron and flux path restrictions.

Figure 153:
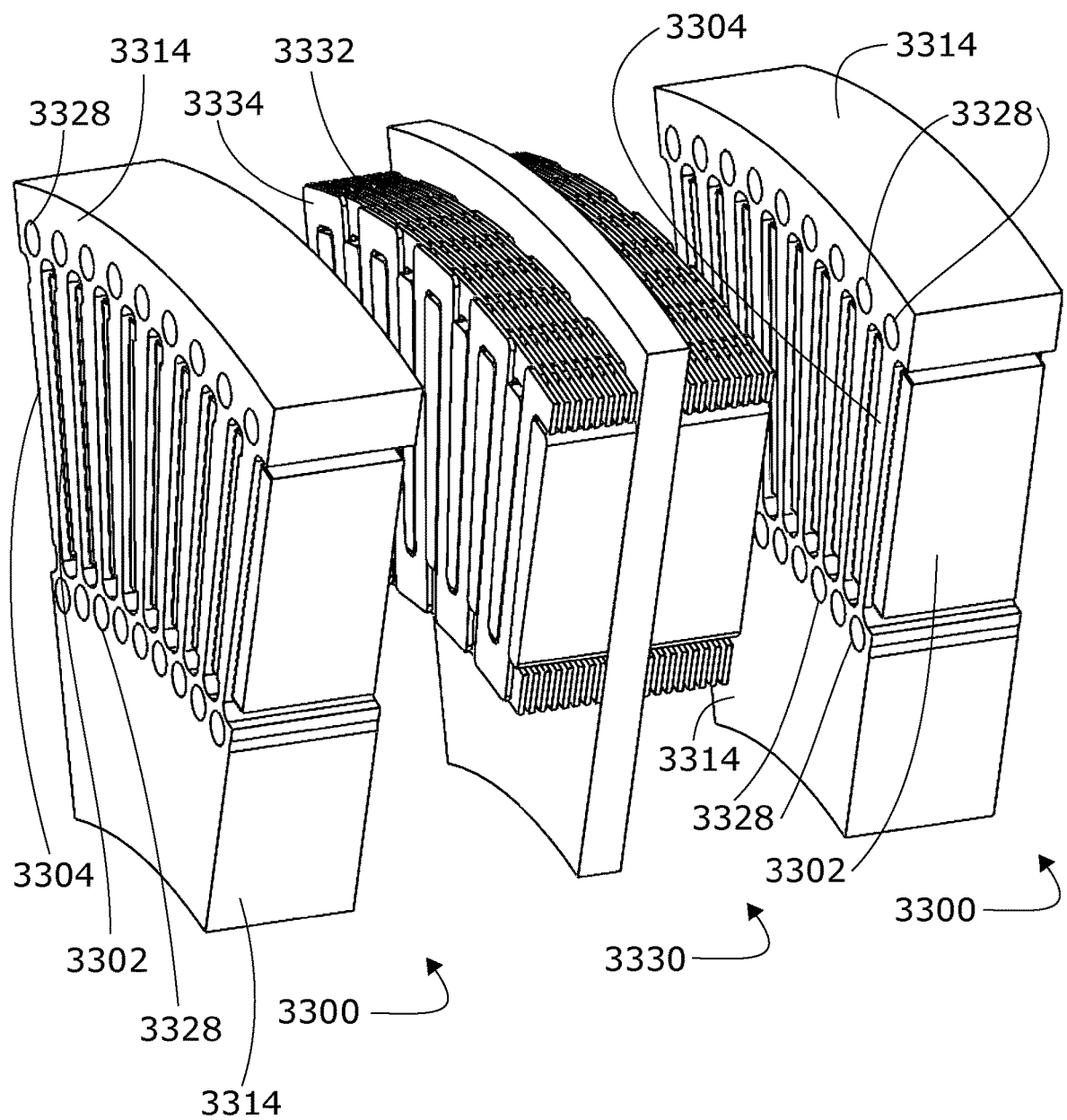

FIG. 153 is a simplified exploded section view of an embodiment of an axial flux rotor-stator-rotor configuration of a concentrated flux rotor with end irons and flux path restrictions.

Figure 154:
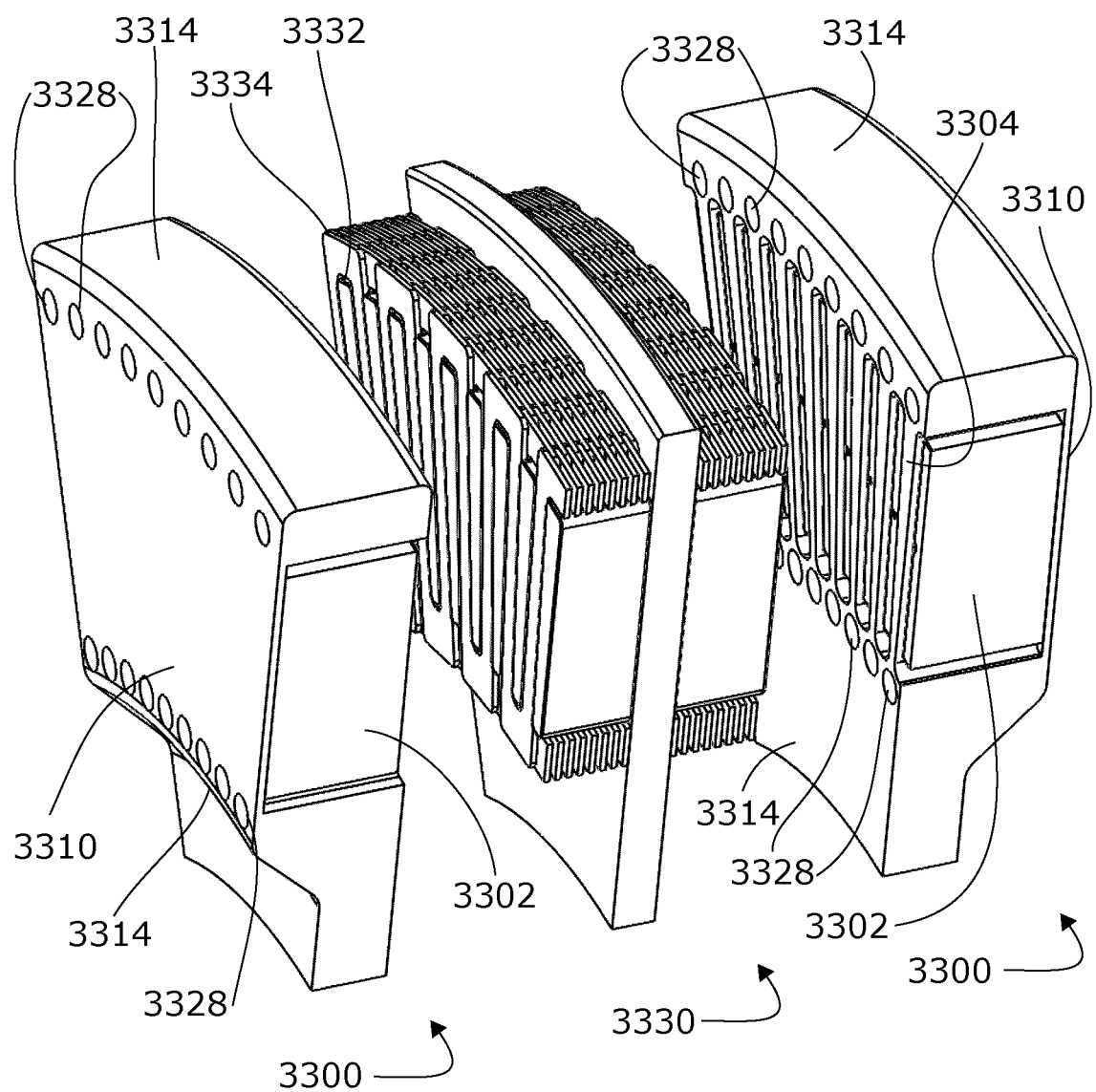

FIG. 154 is a simplified exploded section view of an embodiment of an axial flux rotor-stator-rotor configuration of a concentrated flux rotor with end irons, flux path restrictions and back irons.

Figure 155:
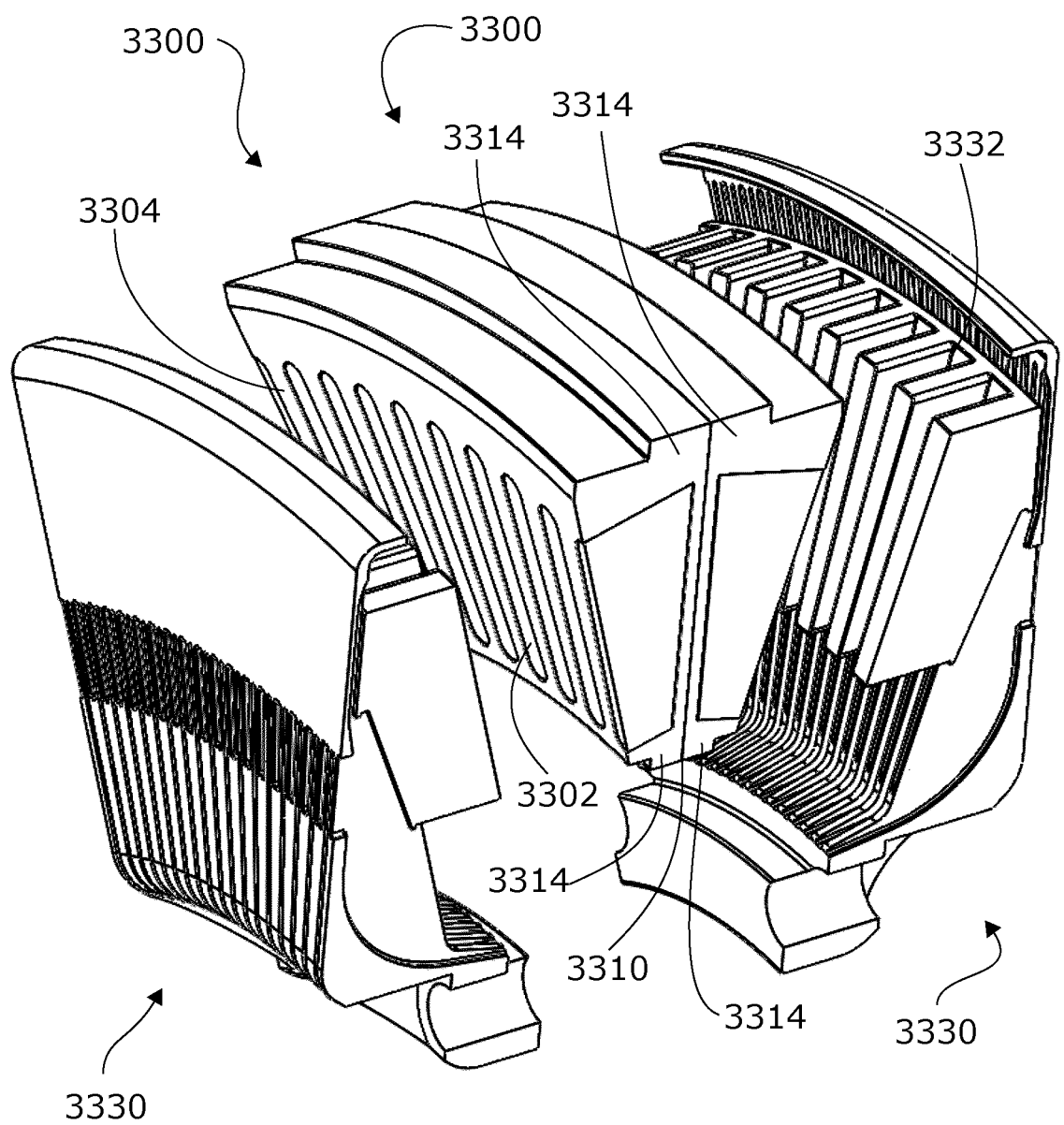

FIG. 155 is a simplified exploded section view of an embodiment of a trapezoidal stator-rotor-stator configuration of a concentrated flux rotor with back irons and end irons.

Figure 156:
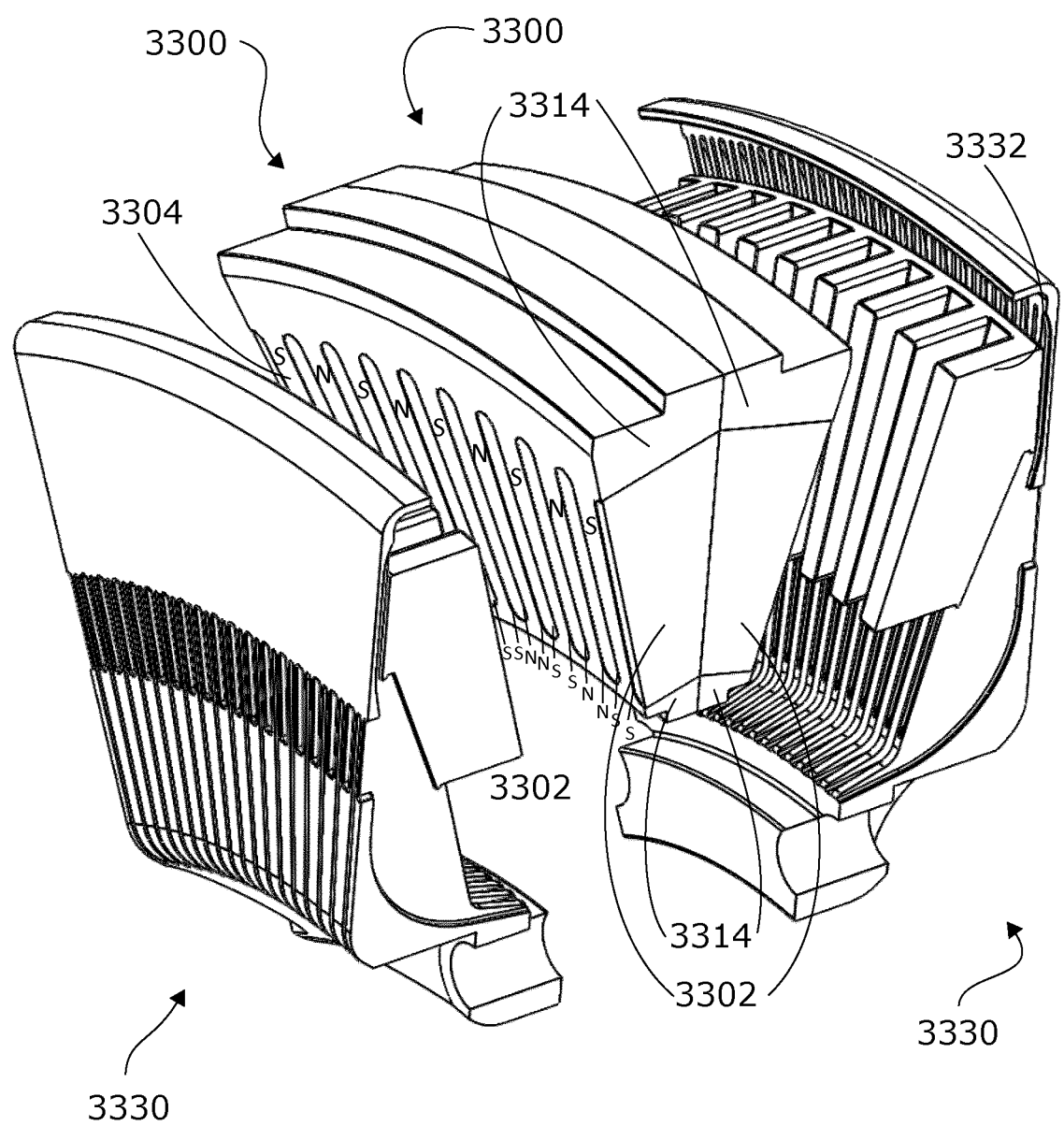

FIG. 156 is simplified exploded section view of the embodiment shown in FIG. 155 without back irons.

Figure 157:
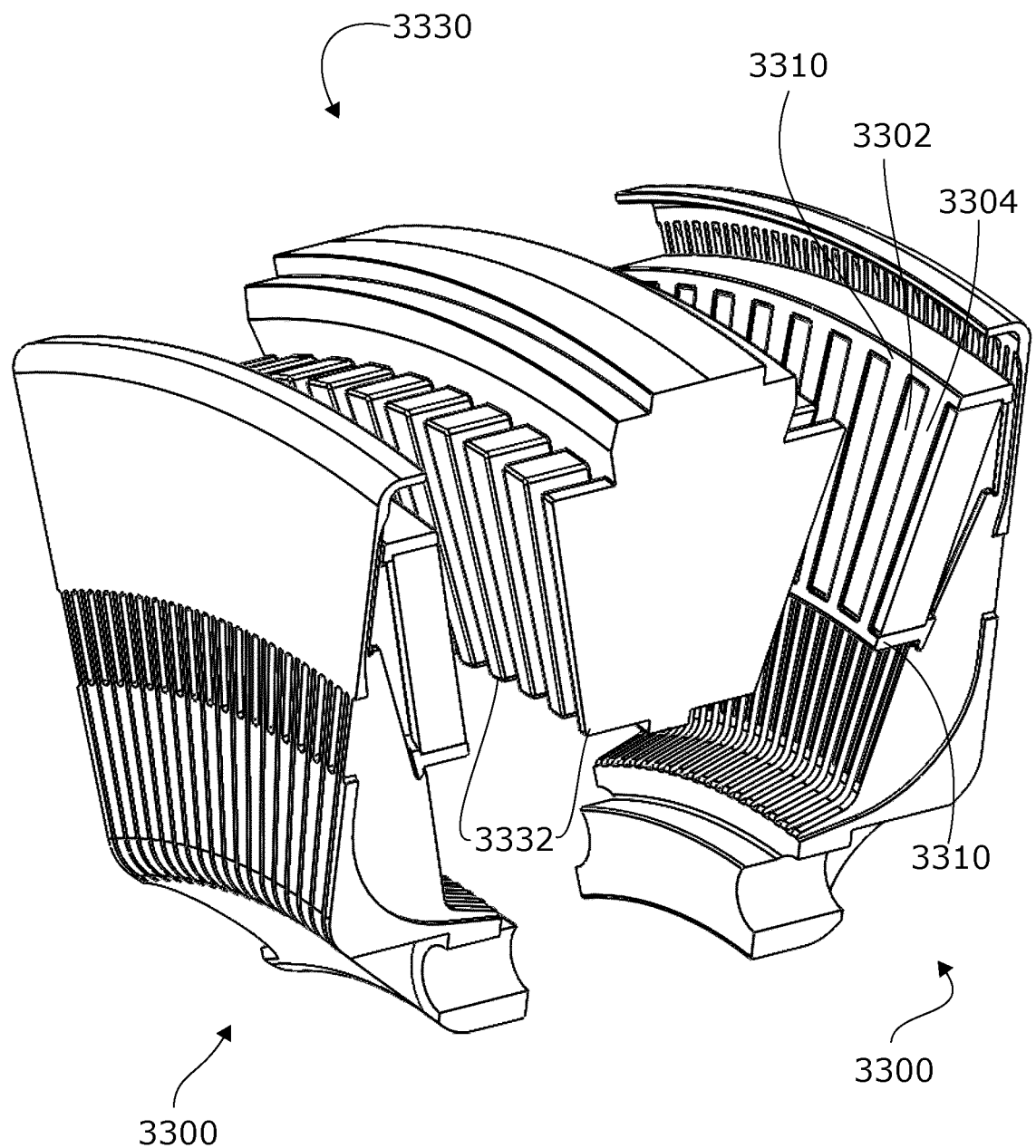

FIG. 157 is a simplified exploded section view of an embodiment of a trapezoidal rotor-stator-rotor configuration of a concentrated flux rotor with end irons.

Figure 158:
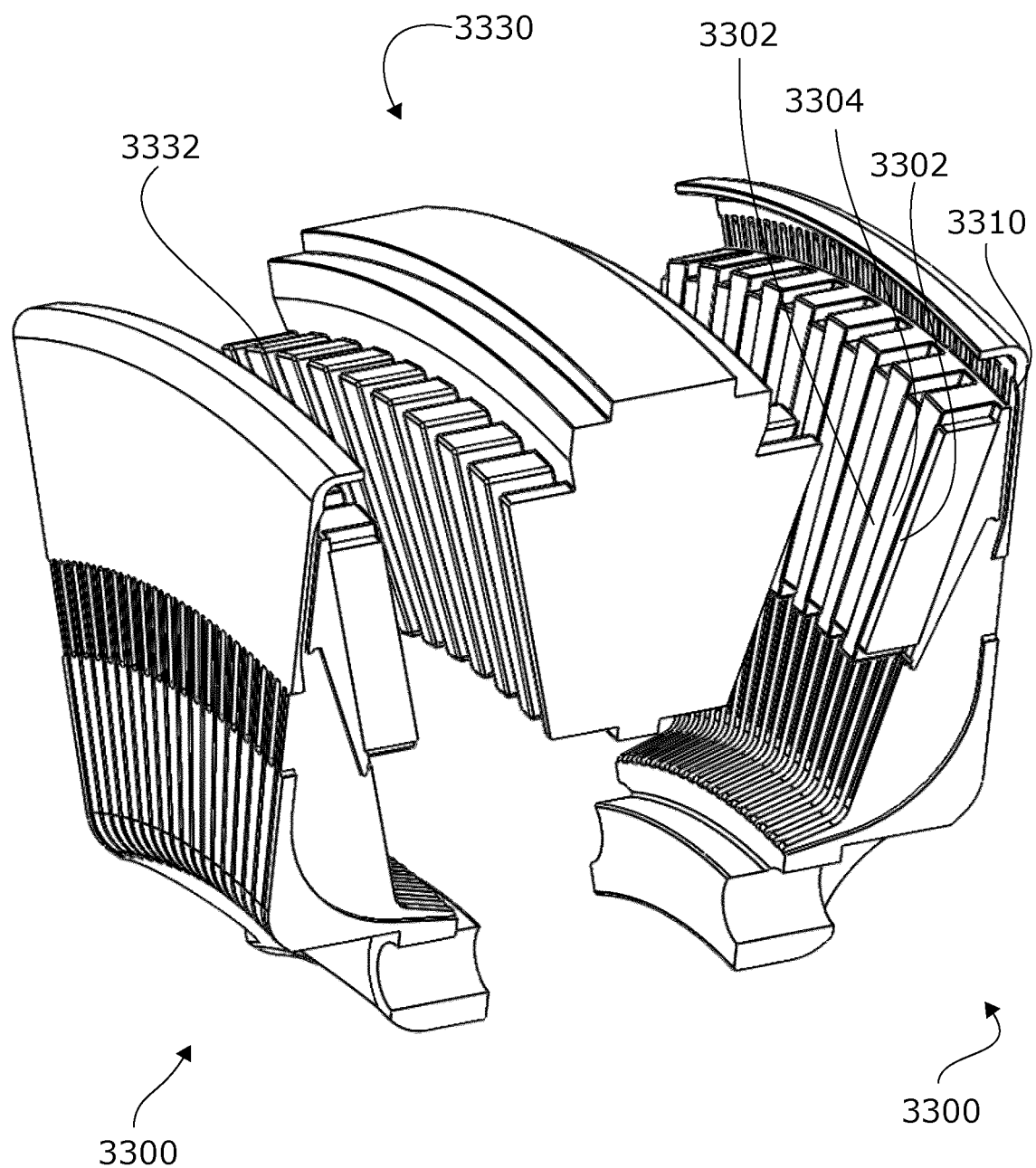

FIG. 158 is a simplified exploded section view of the embodiment shown in FIG. 157 with back irons and without end irons.

Figure 159:
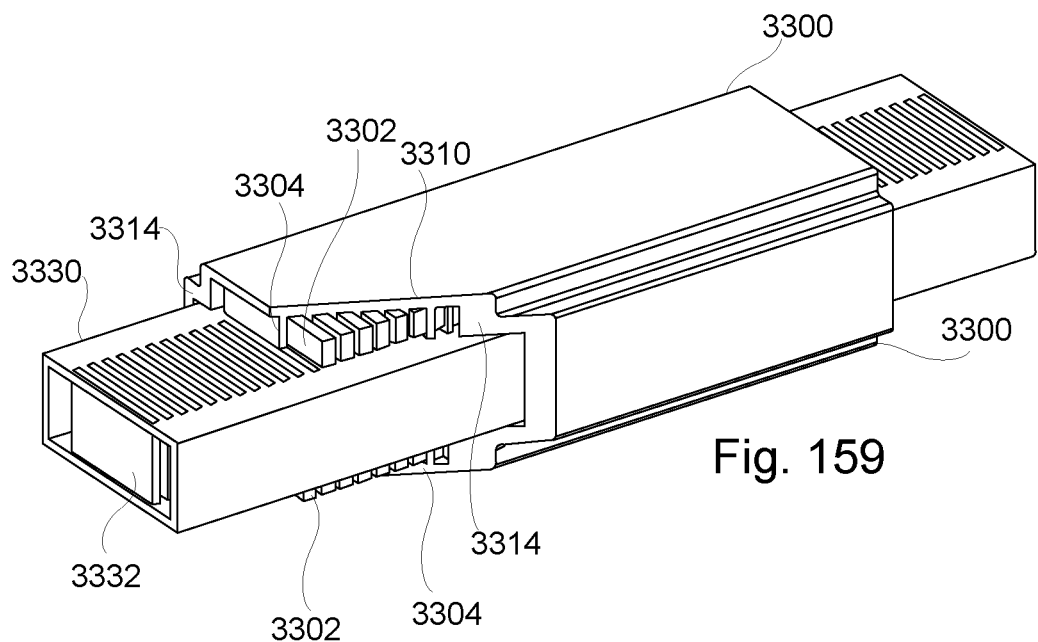

FIG. 159 is a simplified perspective view of an embodiment of a rotor-stator-rotor configuration linear flux machine with back irons and end irons.

Figure 160:
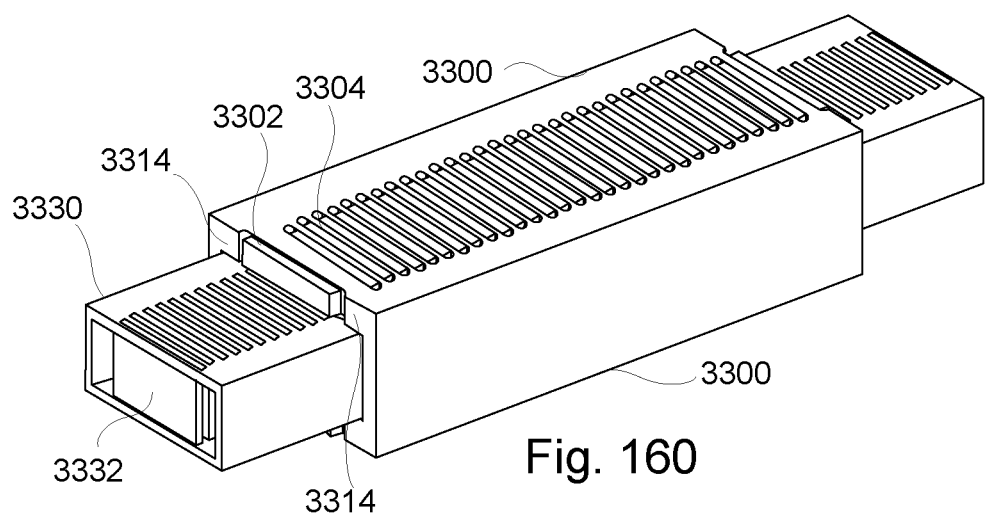

FIG. 160 is a simplified perspective view of the embodiment shown in FIG. 159 without back irons.

Figure 161:
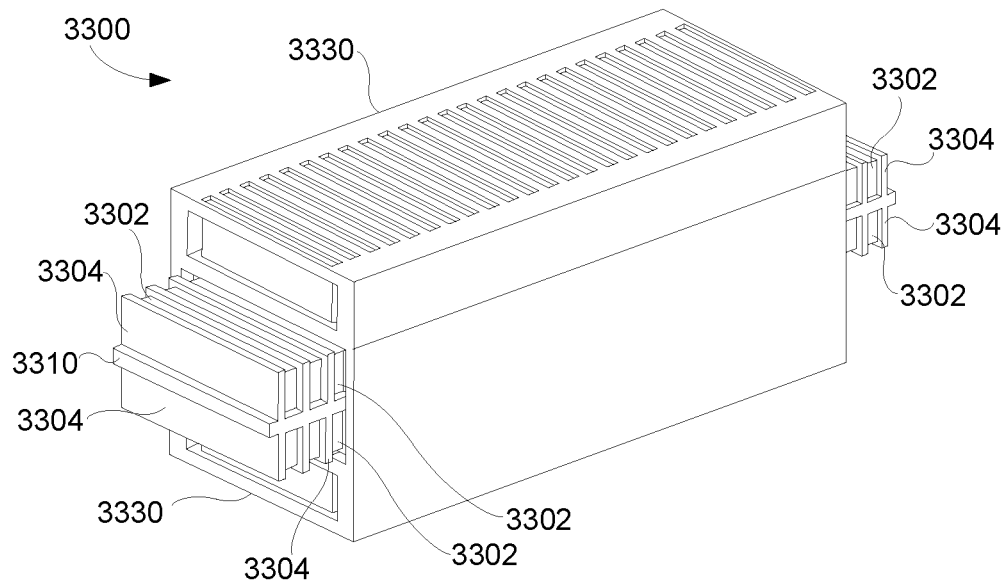

FIG. 161 is a simplified perspective view of an embodiment of a stator-rotor-stator configuration of a linear flux machine with back iron.

Figure 162:
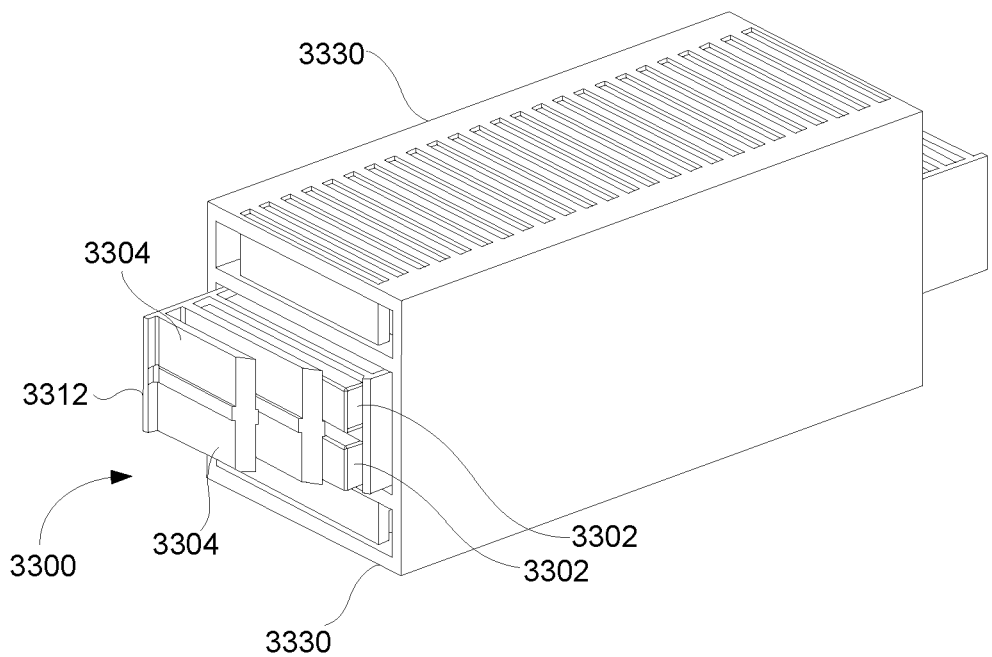

FIG. 162 is a simplified perspective view of an embodiment of a stator-rotor-stator configuration of a linear flux machine with end irons, showing an angled cross-section of the rotor.

Figure 163:
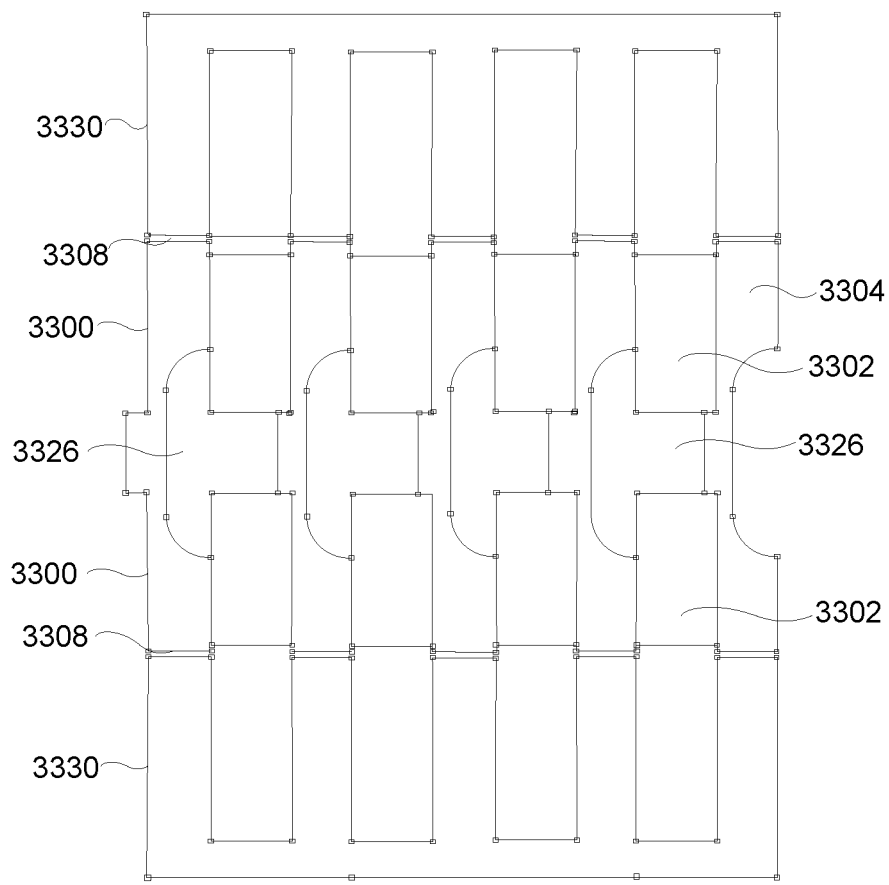

FIG. 163 is a model of an axial motor concentrated flux rotor with interrupted rotor posts.

Figure 164:
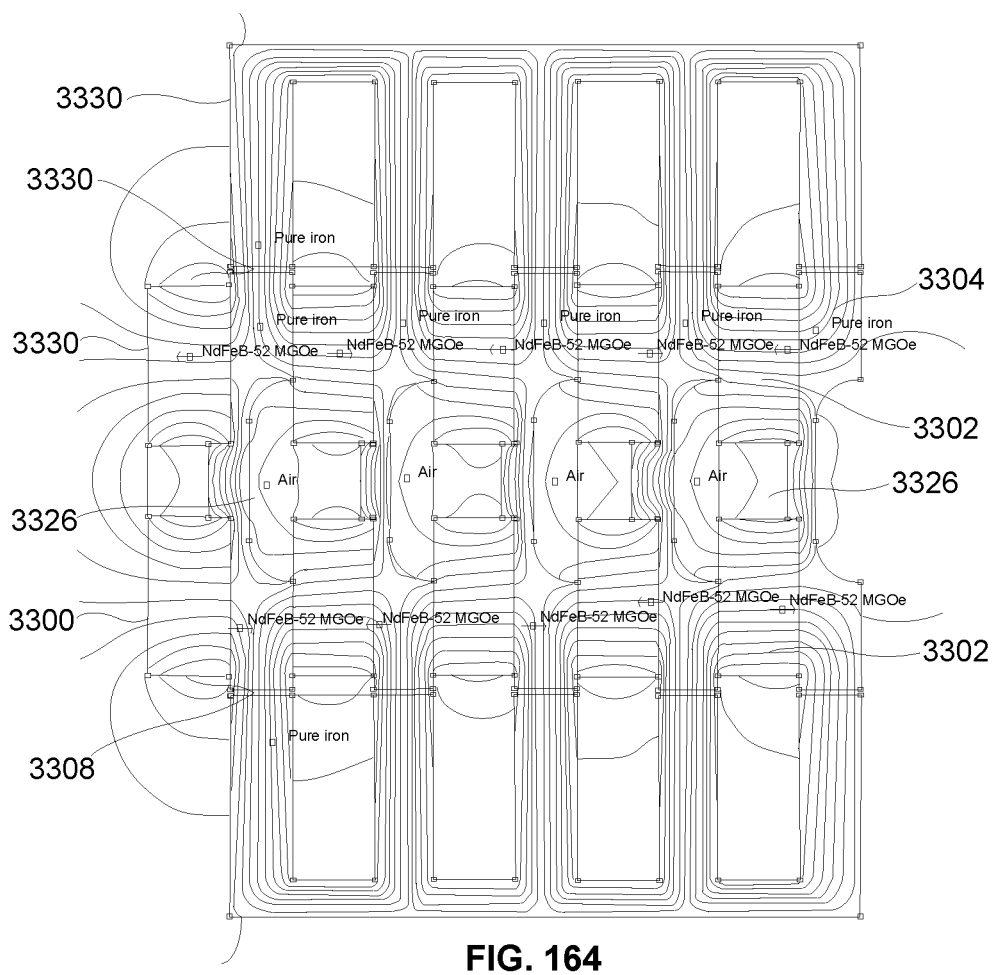

FIG. 164 is the model of an axial motor concentrated flux rotor shown in FIG. 164 with magnetic flux lines shown.

Figure 165:
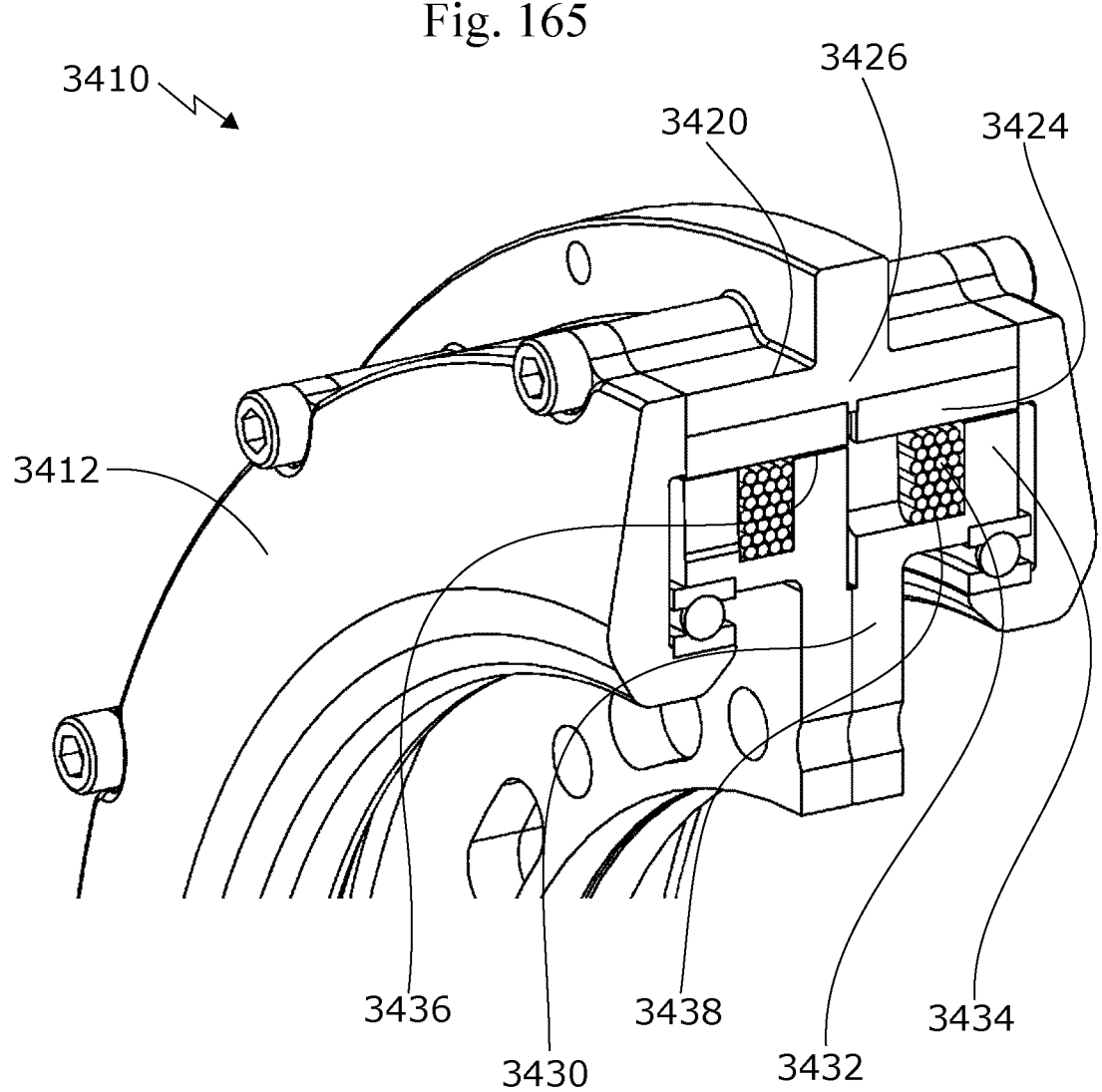

FIG. 165 is a cross-section of an embodiment of a transverse flux machine in which flux links across the air gap in the radial direction.

Figure 166A:
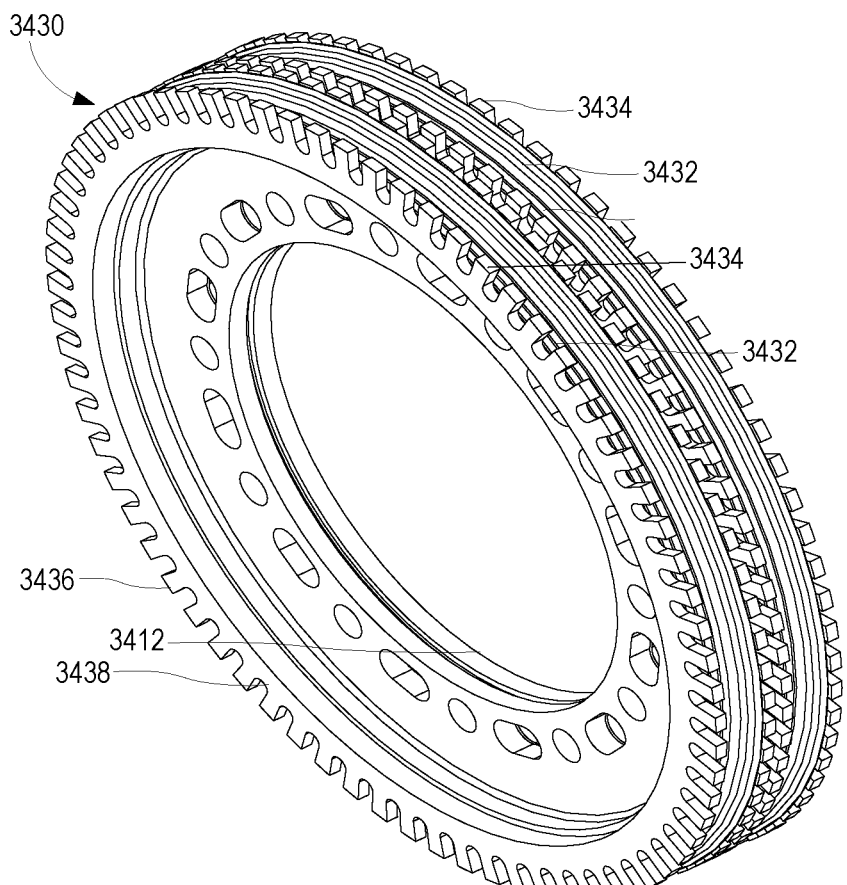

FIG. 166A is a perspective view of the stator of the embodiment of a transverse flux machine shown in FIG. 165.

Figure 166B:
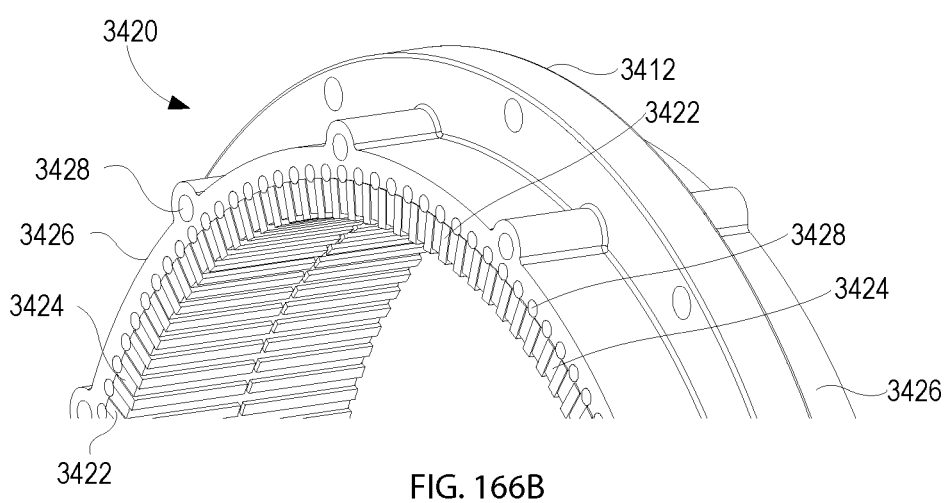

FIG. 166B is a perspective view of an upper portion of the rotor of the embodiment of a transverse flux machine shown in FIG. 165.

Figure 167:
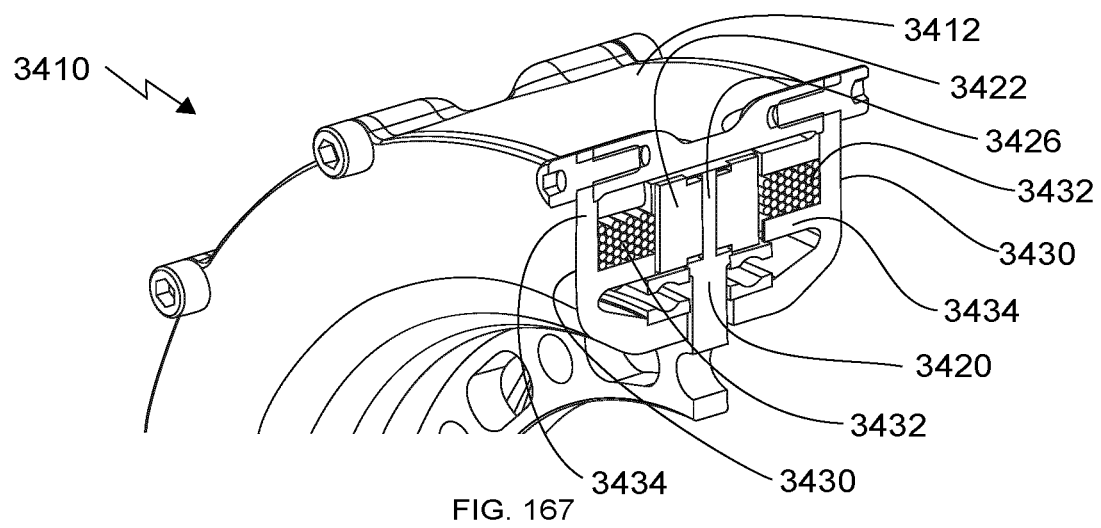

FIG. 167 is a cross-section of an embodiment of a transverse flux machine in which flux links across air gaps in the axial direction.

Figure 168:
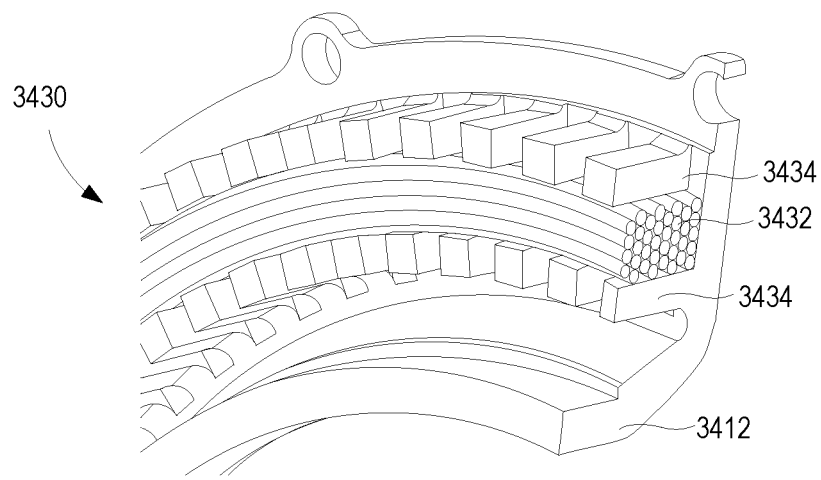

FIG. 168 is a perspective view of a stator section of the embodiment of a transverse flux machine shown in FIG. 167

Figure 169:
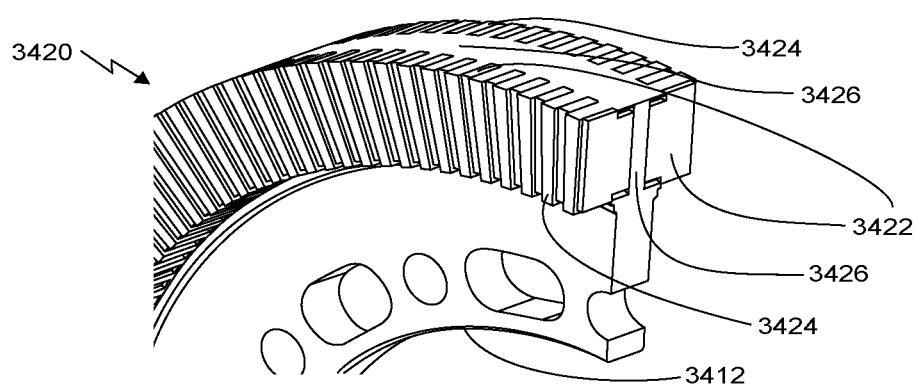

FIG. 169 is a cross-section of an upper portion of the rotor of the embodiment of a transverse flux machine shown in FIG. 168.

Figure 170A:
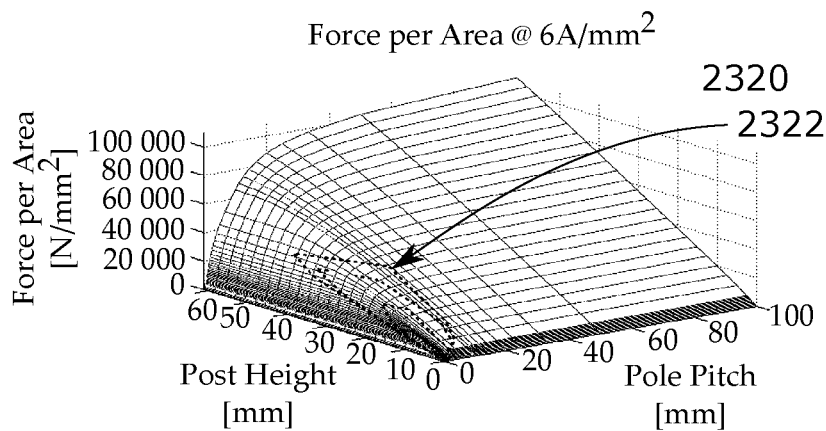

FIG. 170A shows a graph of torque at constant current density for a simulated series of motors differing in slot pitch and post height.

Figure 170B:
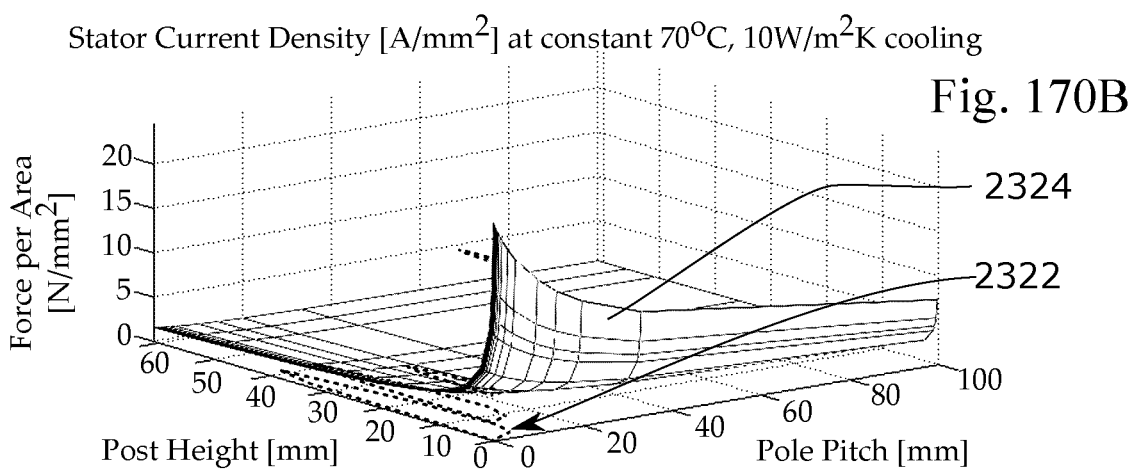

FIG. 170B shows the highest stator current density possible at a given temperature for a simulated series of motors differing in slot pitch and post height.

Figure 170C:
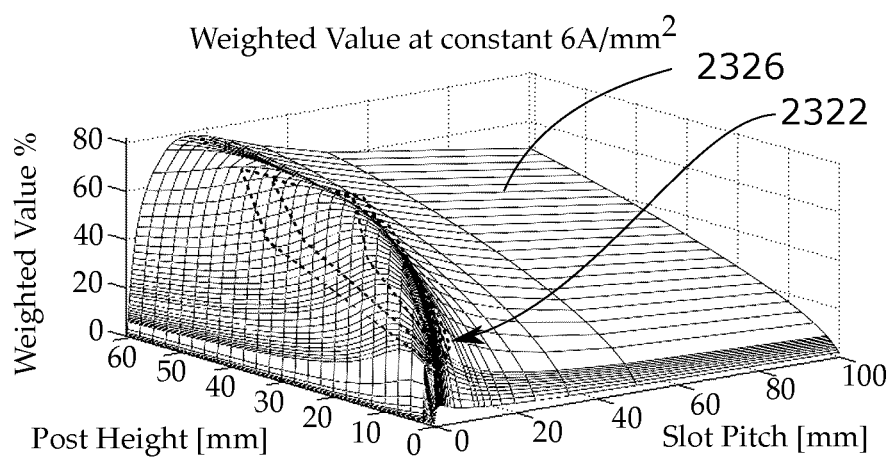

FIG. 170C shows constant temperature torque as a function of slot pitch and post height for a series of electric machines.

FIG. 170D shows the value of a weighting function for at the highest stator current density possible at a given temperature for a simulated series of motors differing in slot pitch and post height.

FIG. 170E shows $K_m"$ for a simulated series of motors differing in slot pitch and post height, for a fixed current density.

FIG. 170F shows $K_R"$ for a simulated series of motors differing in slot pitch and post height, for a fixed current density.

Figure 171:
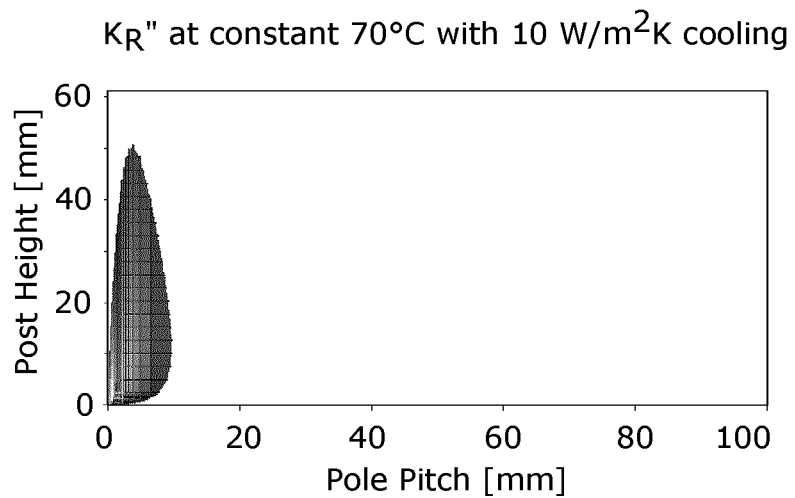
Figure 172:
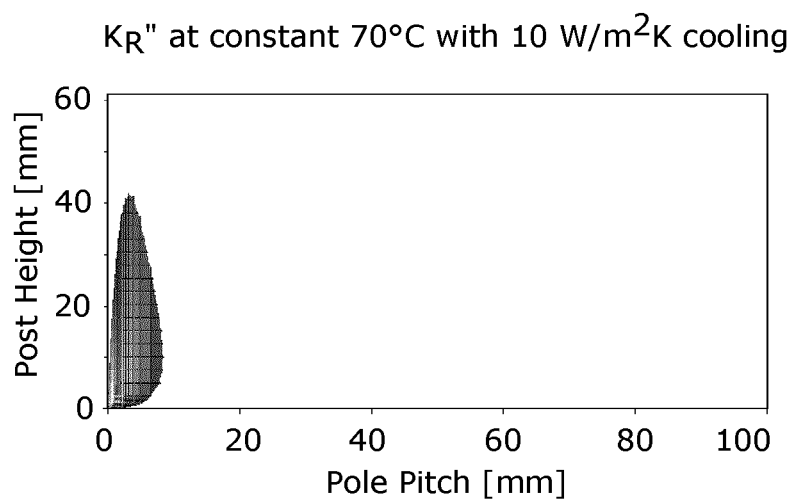
Figure 173:
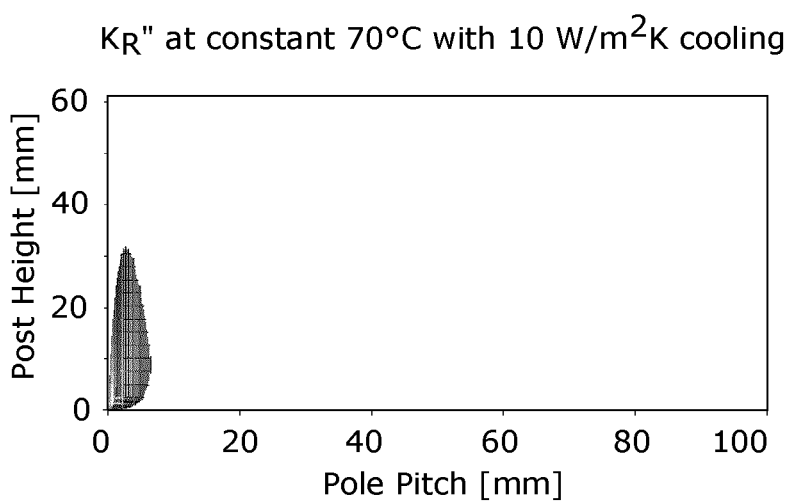
Figure 174:
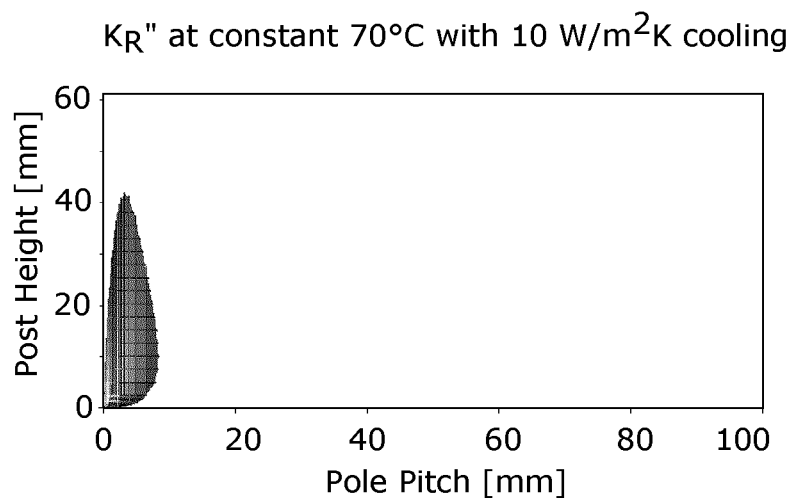
Figure 175:
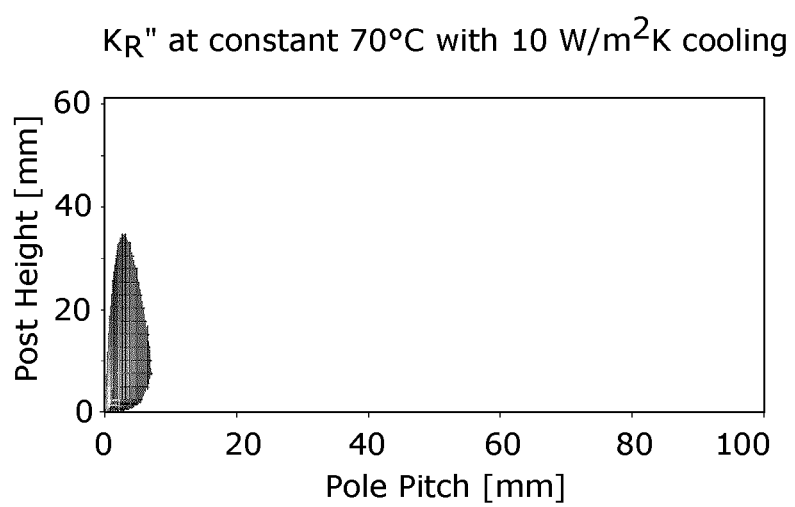
Figure 176:
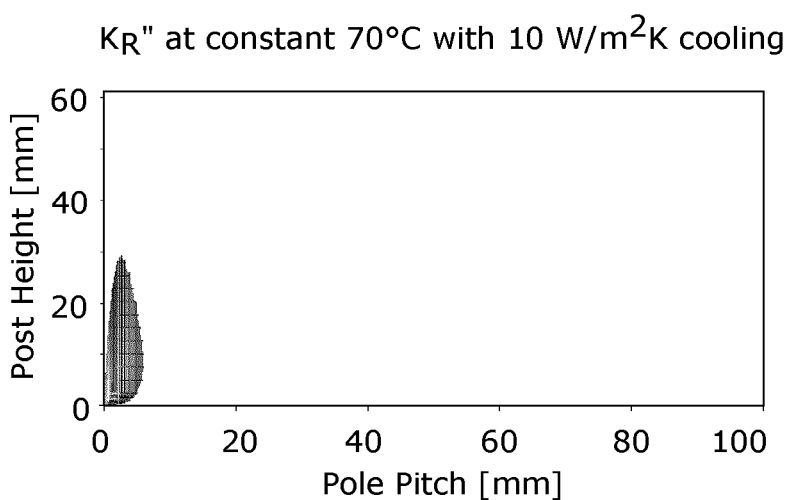
Figure 177:
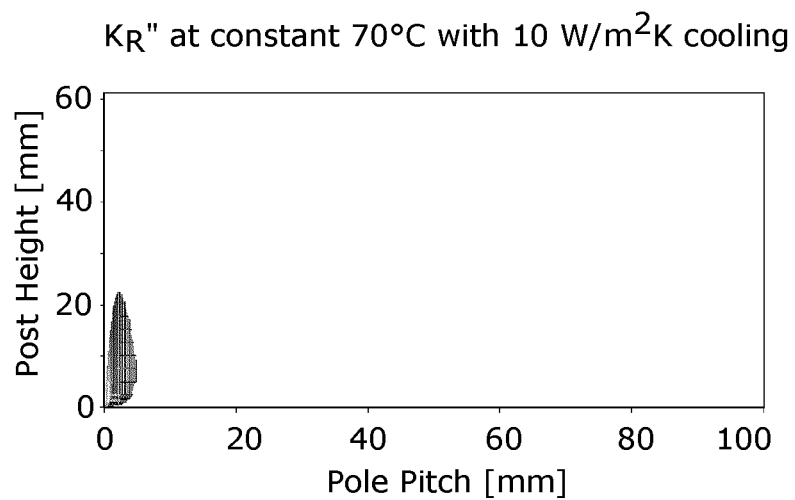
Figure 178:
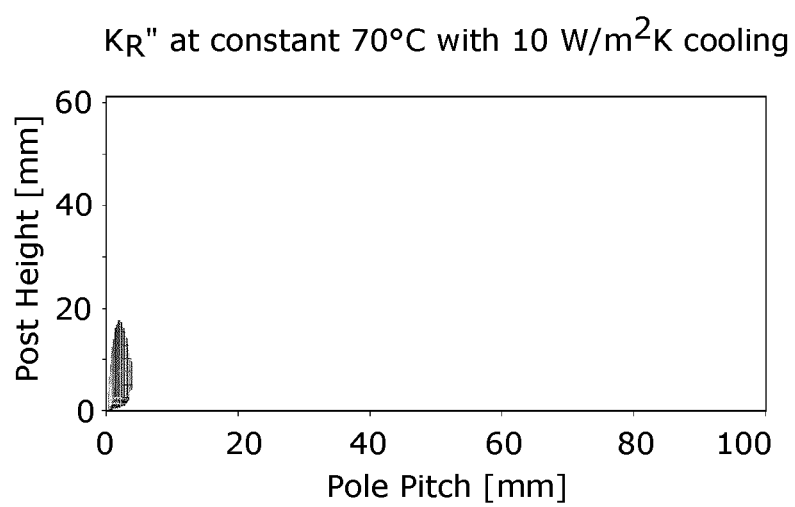
Figure 179:
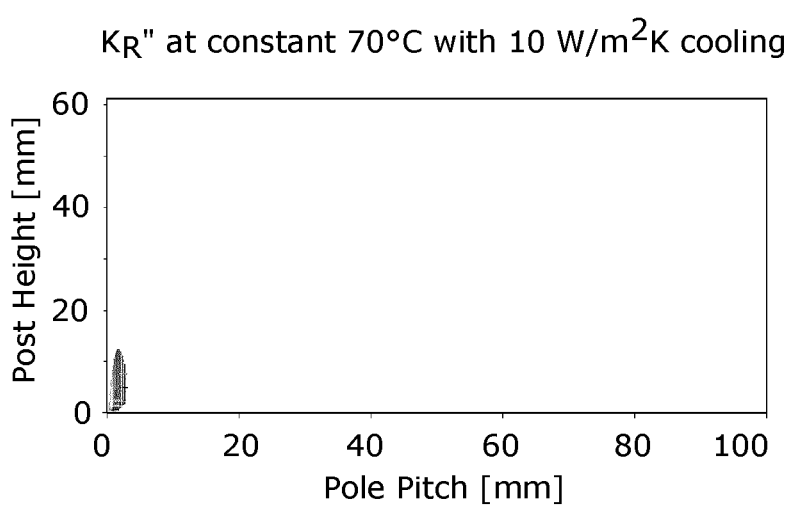
Figure 180:
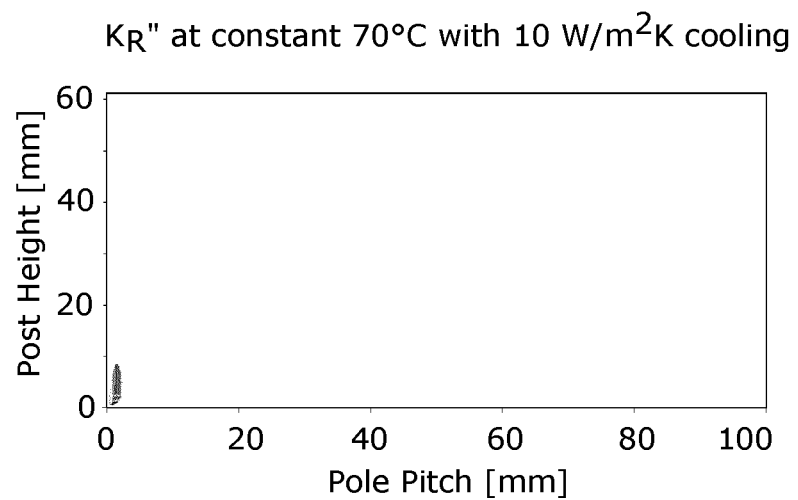
Figure 181:
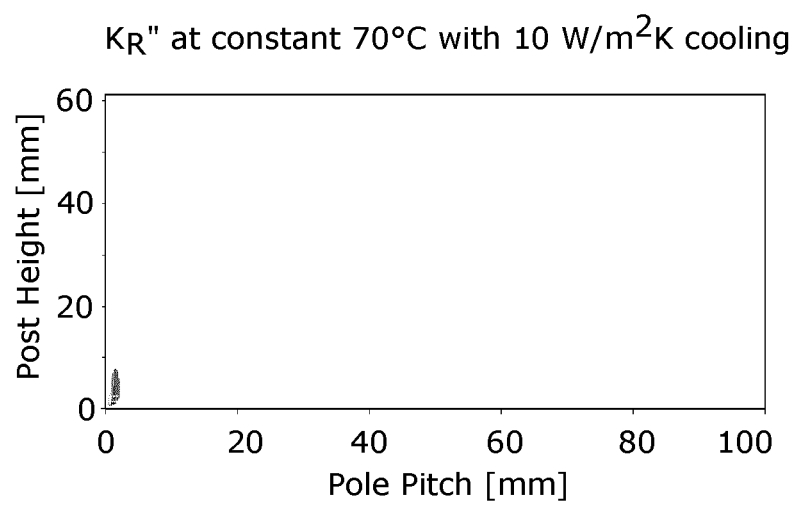
Figure 182:
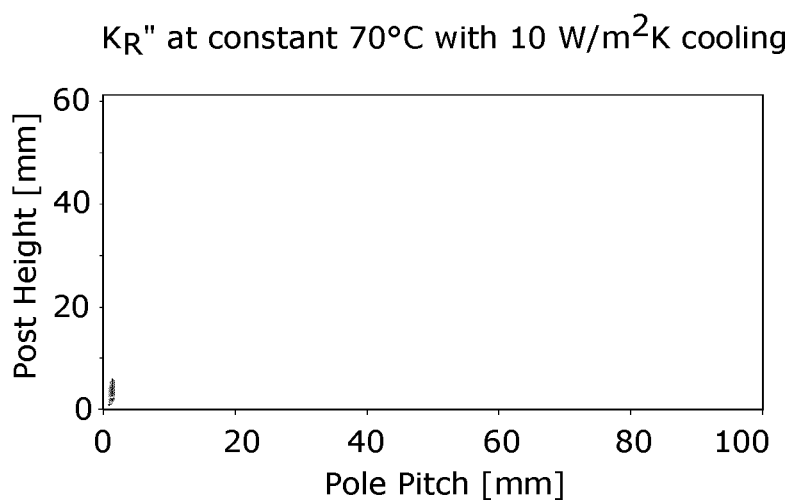
Figure 183:
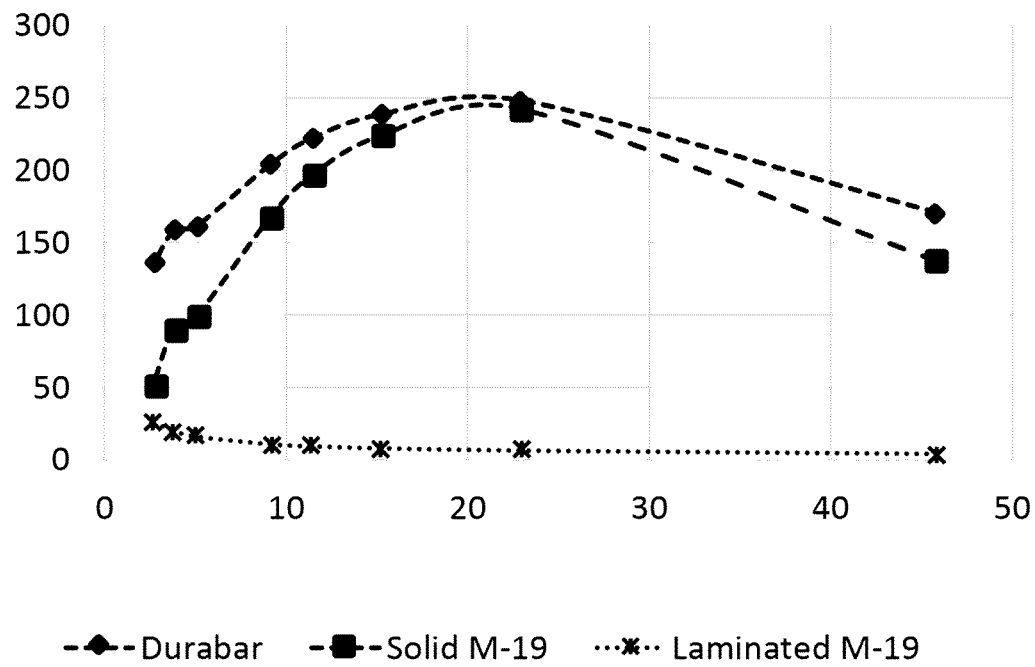

FIG. 171 shows the region of benefit for $K_R"$, with respect to the rest of the geometries in the domain, for a machine with 200 mm size and a boundary line for $K_R">1.3$ FIG. 172 shows the region of benefit for $K_R"$, with respect to the rest of the geometries in the domain, for a machine with 200 mm size and a boundary line for $K_R">1.5$ FIG. 173 shows the region of benefit for $K_R"$, with respect to the rest of the geometries in the domain, for a machine with 200 mm size and a boundary line for $K_R">1.8$ FIG. 174 shows the region of benefit for $K_R"$, with respect to the rest of the geometries in the domain, for a machine with 100 mm size and a boundary line for $K_R">1.5$ FIG. 175 shows the region of benefit for $K_R"$, with respect to the rest of the geometries in the domain, for a machine with 100 mm size and a boundary line for $K_R">1.7$ FIG. 176 shows the region of benefit for $K_R"$, with respect to the rest of the geometries in the domain, for a machine with 100 mm size and a boundary line for $K_R">1.9$ FIG. 177 shows the region of benefit for $K_R"$, with respect to the rest of the geometries in the domain, for a machine with 50 mm size and a boundary line for $K_R">2.2$ FIG. 178 shows the region of benefit for $K_R"$, with respect to the rest of the geometries in the domain, for a machine with 50 mm size and a boundary line for $K_R">2.5$ FIG. 179 shows the region of benefit for $K_R"$, with respect to the rest of the geometries in the domain, for a machine with 50 mm size and a boundary line for $K_R">2.9$ FIG. 180 shows the region of benefit for $K_R"$, with respect to the rest of the geometries in the domain, for a machine with 25 mm size and a boundary line for $K_R">3.3$ FIG. 181 shows the region of benefit for $K_R"$, with respect to the rest of the geometries in the domain, for a machine with 25 mm size and a boundary line for $K_R">3.4$ FIG. 182 shows the region of benefit for $K_R"$, with respect to the rest of the geometries in the domain, for a machine with 25 mm size and a boundary line for $K_R">3.6$ FIG. 183 is a graph showing the sum of the eddy current and hysteresis losses for a motor series across a range of slot pitches at a rotor speed of 200 rpm with no current applied.

Figure 184:
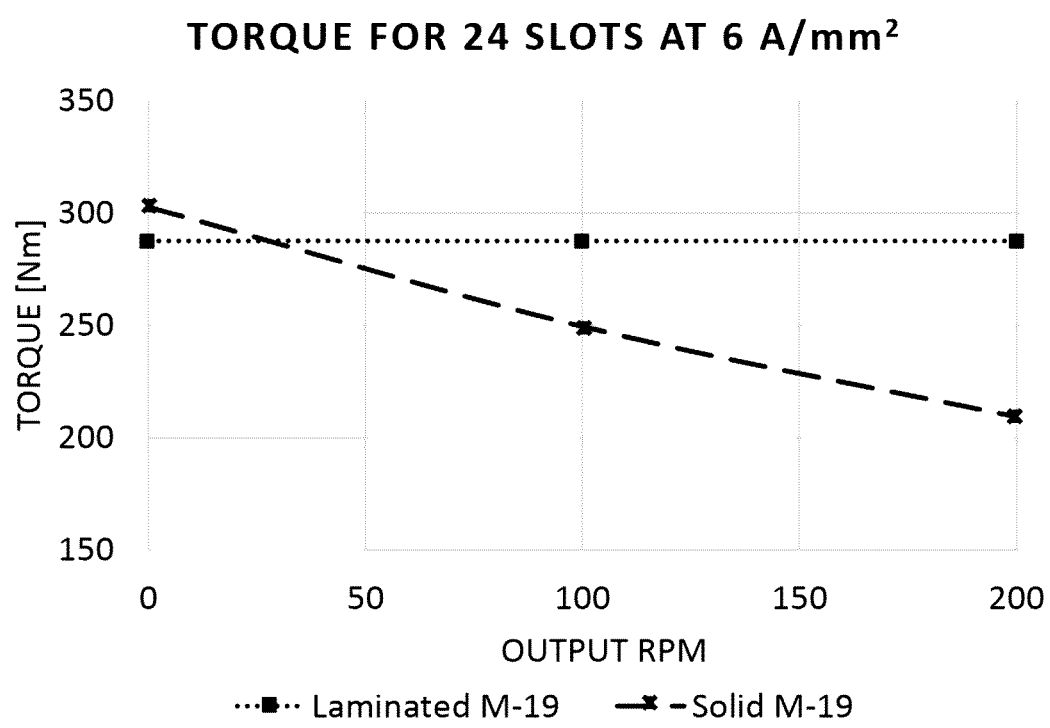

FIG. 184 is a graph showing torque for 24 slot laminated M-19 and solid M-19 stators with an applied current density of 6 A/mm2.

FIG. 185 is a graph showing individual and total stator losses for a 24 slot solid M-19 stator;

FIG. 186 is a graph showing individual and total stator losses for a 108 slot solid M-19 stator.

FIG. 187 is a graph showing torque for a 108-slot durabar, laminated M-19 and solid M-19 stators with an applied current density of 19.7 A/mm2.

FIG. 188 is a graph showing a torque-to-weight comparison for various motors in a simulation in which very strong NdFeB N52 permanent magnets were used in the rotor.

FIG. 189 is a graph showing a torque comparison for various motors.

FIG. 190 is a graph showing a stator loss comparison for various motors.

Figure 191:
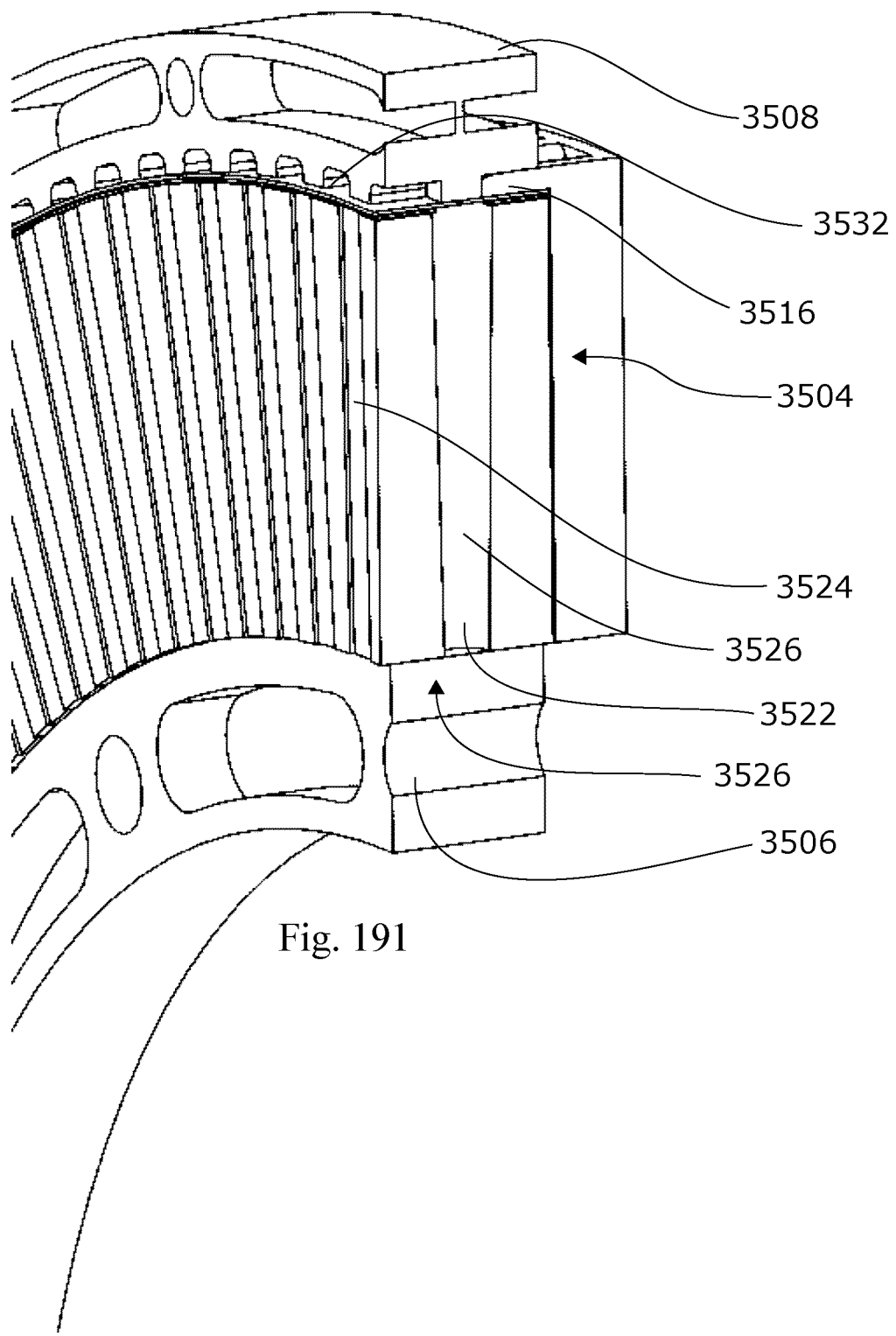

FIG. 191 shows a method of cooling an actuator via a flow channel.

Figure 192:
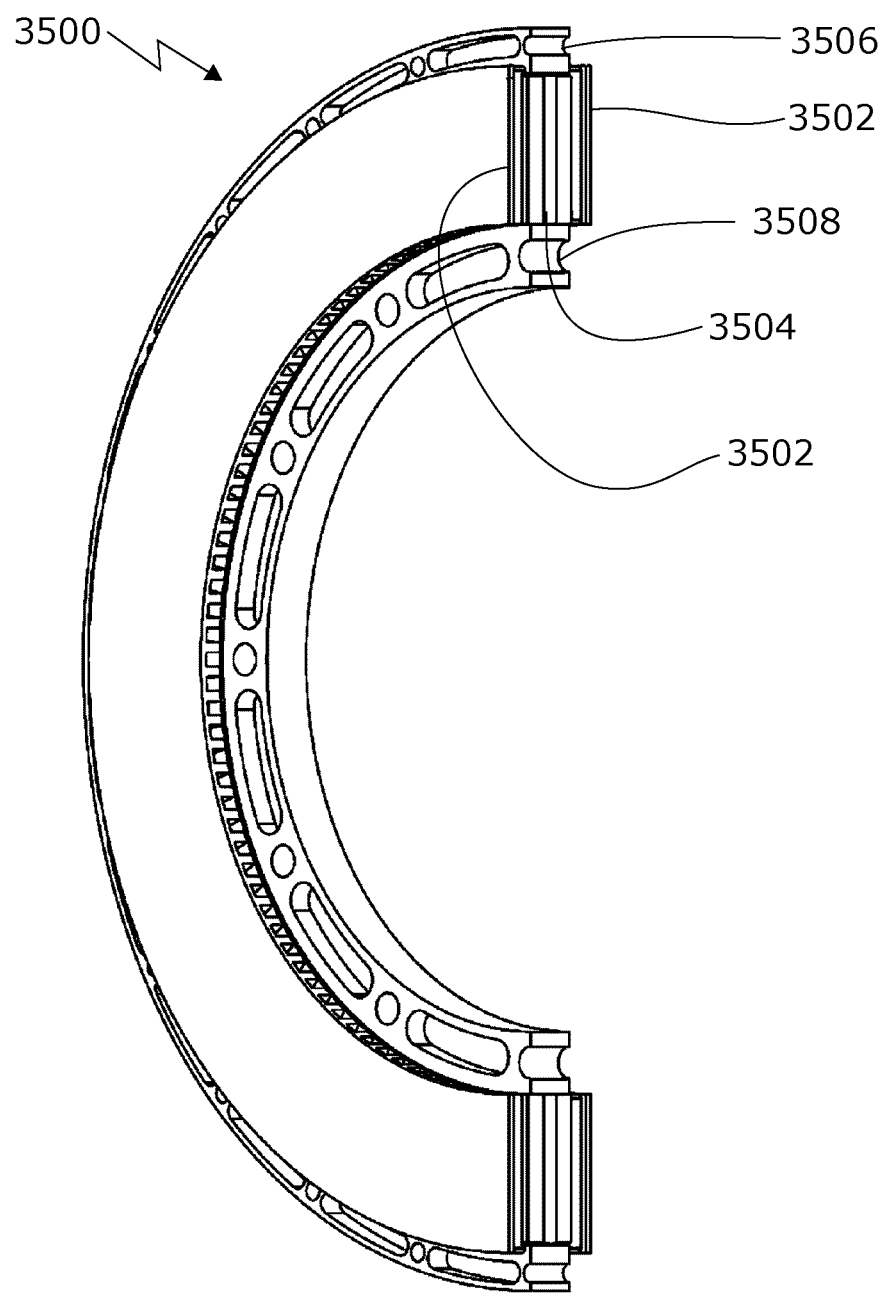

FIG. 192 is a section view of an embodiment of an actuator assembly.

FIG. 193A is a close-up section view of the actuator assembly of FIG. 192.

FIG. 193B is a further close-up of bushings or low friction coating in the section view of the actuator assembly of FIG. 193A.

Figure 194:
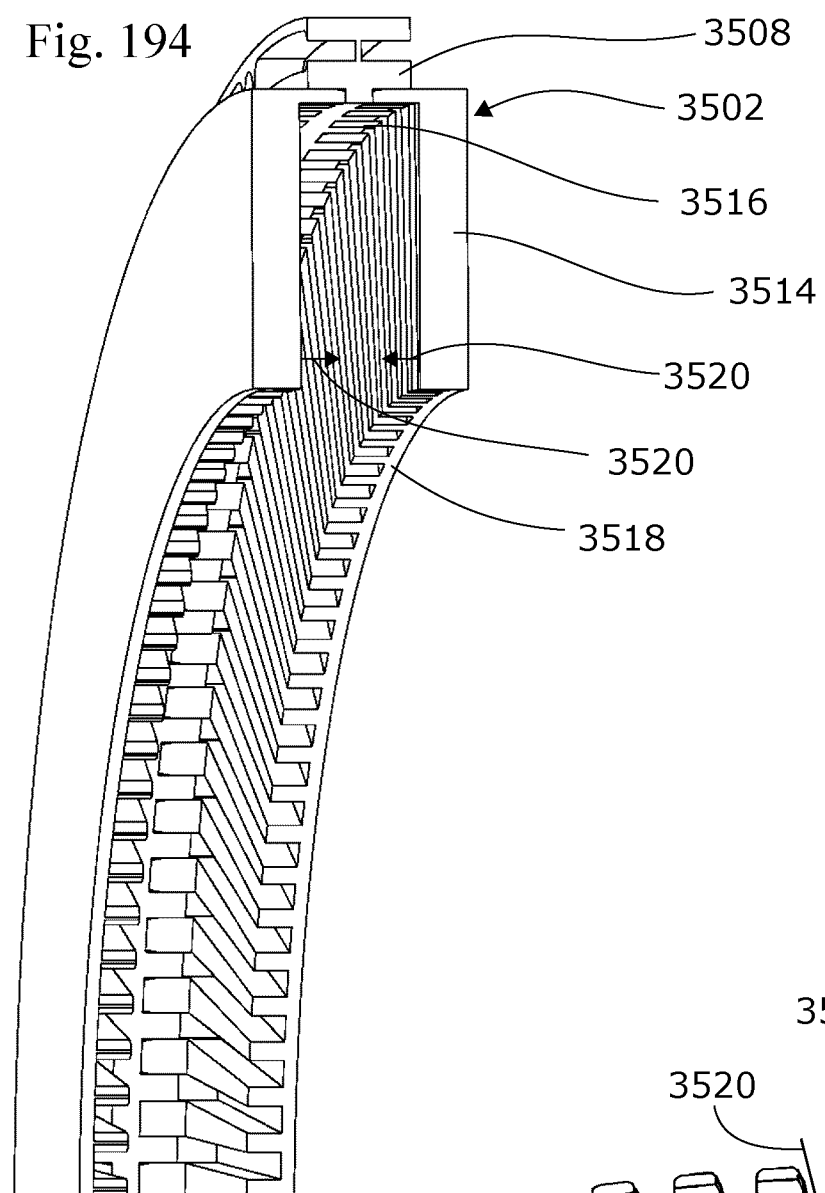

FIG. 194 is a section view of a stator and fixed ring of the actuator assembly of FIG. 192.

Figure 195:
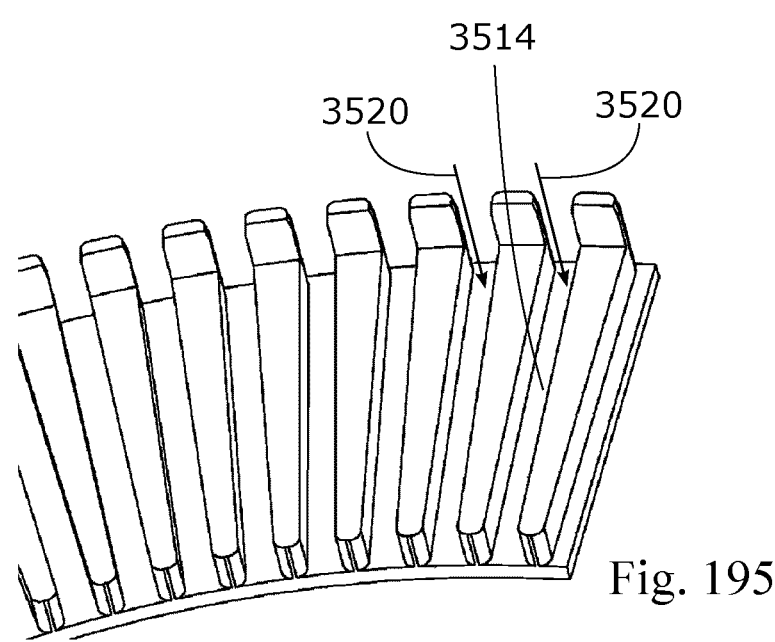

FIG. 195 is a close-up view of an embodiment of a stator for the actuator assembly of FIG. 192, the arrows indicate how the conductors can be place onto the posts over top of the extensions.

Figure 196:
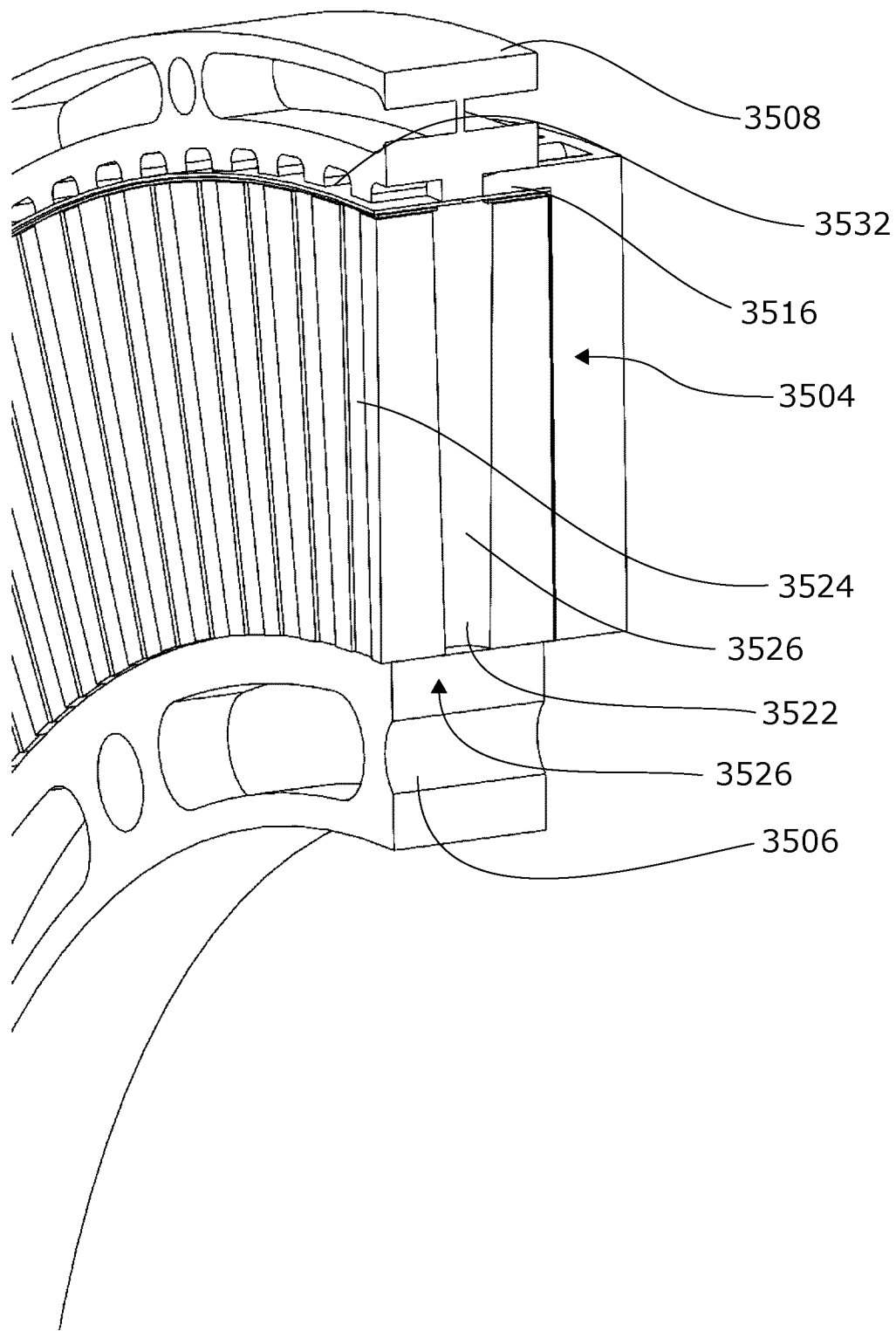

FIG. 196 is a close-up section view of the actuator assembly of FIG. 192 with one stator and the corresponding bushings or low friction coating removed.

Figure 197:
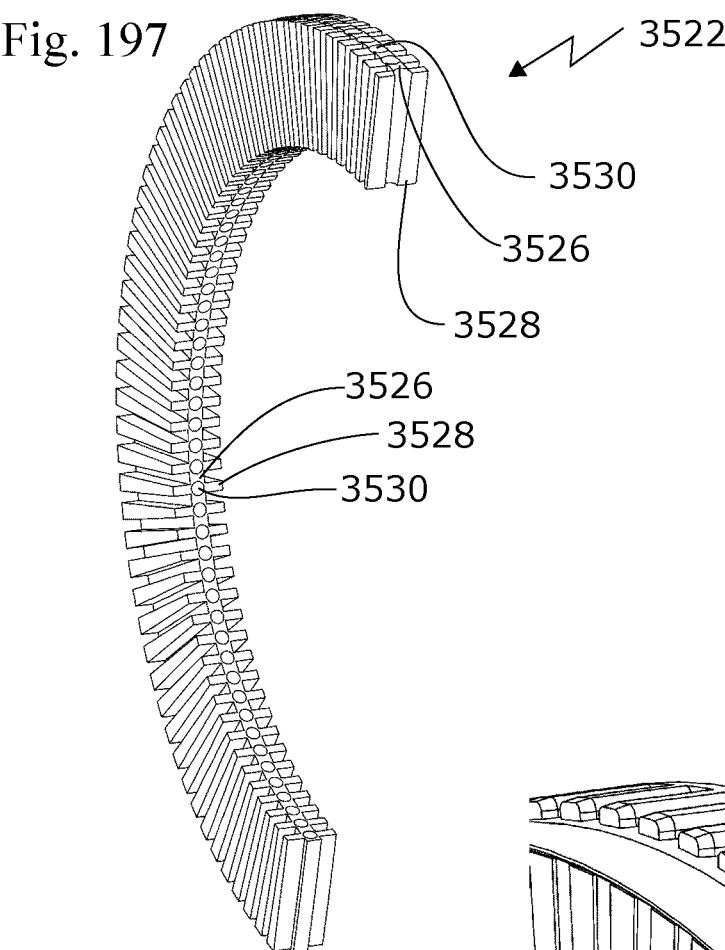

FIG. 197 is a section view of a permanent magnet carrier for the actuator assembly of FIG. 192.

Figure 198:
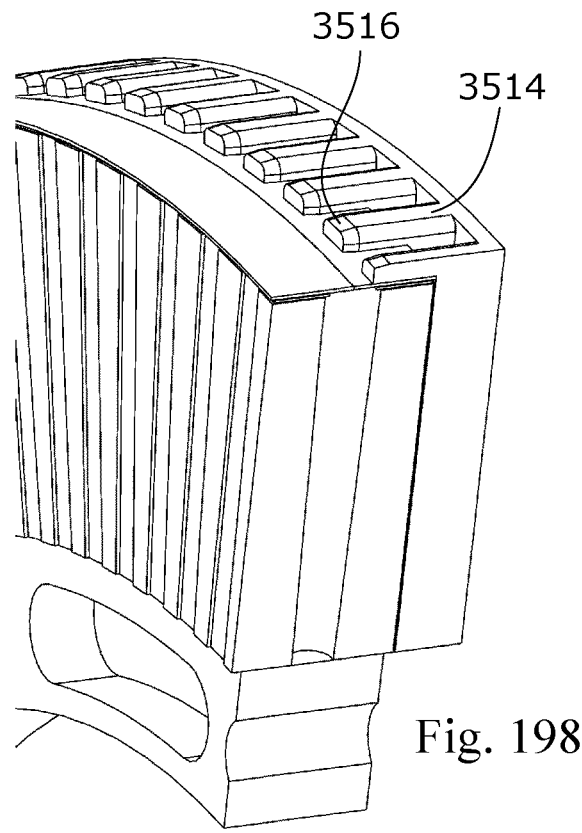

FIG. 198 is a close-up section view of a rotor and stator of the actuator assembly of FIG. 192.

Figure 199B:
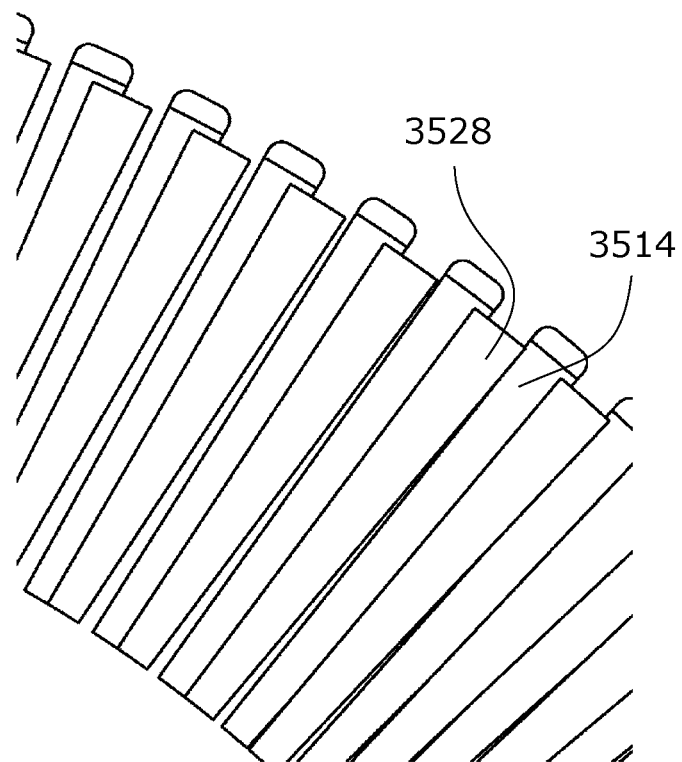
Figure 199A:
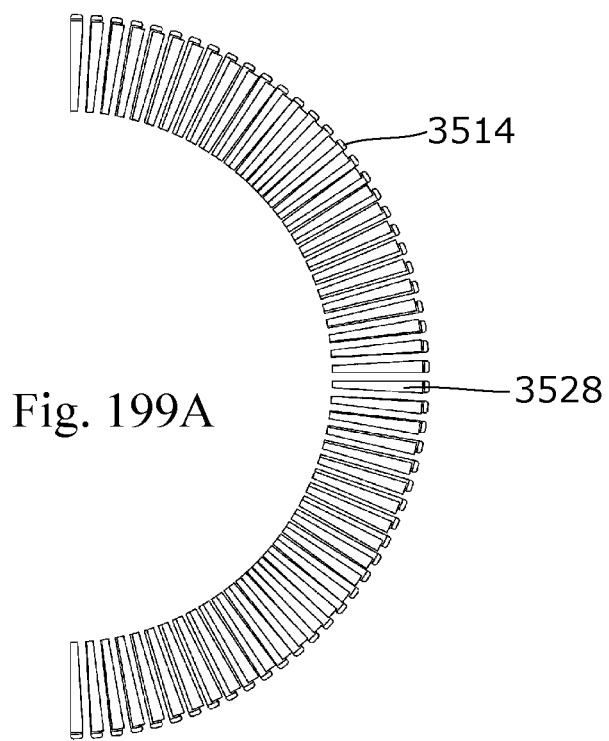

FIG. 199A is an axial isometric view of stator and rotor posts of the actuator assembly of FIG. 192.

FIG. 199B is a further close-up of stator and rotor posts of the actuator assembly of FIG. 199A.

Figure 200:
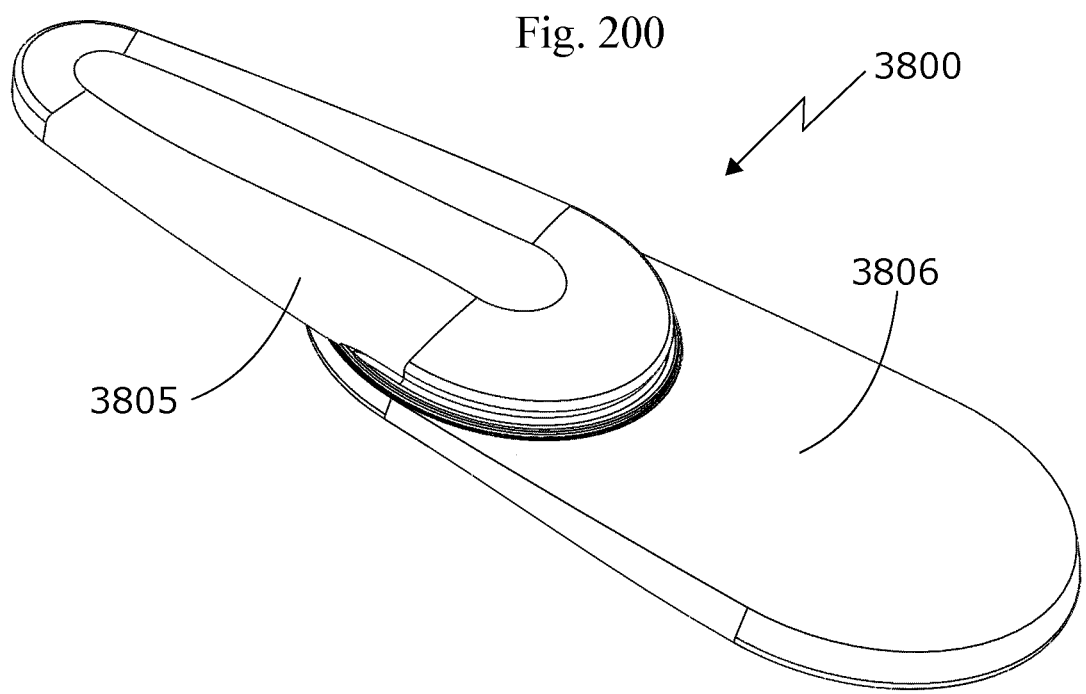

FIG. 200 shows the joint of a robot arm using a frameless motor/actuator

Figure 201:
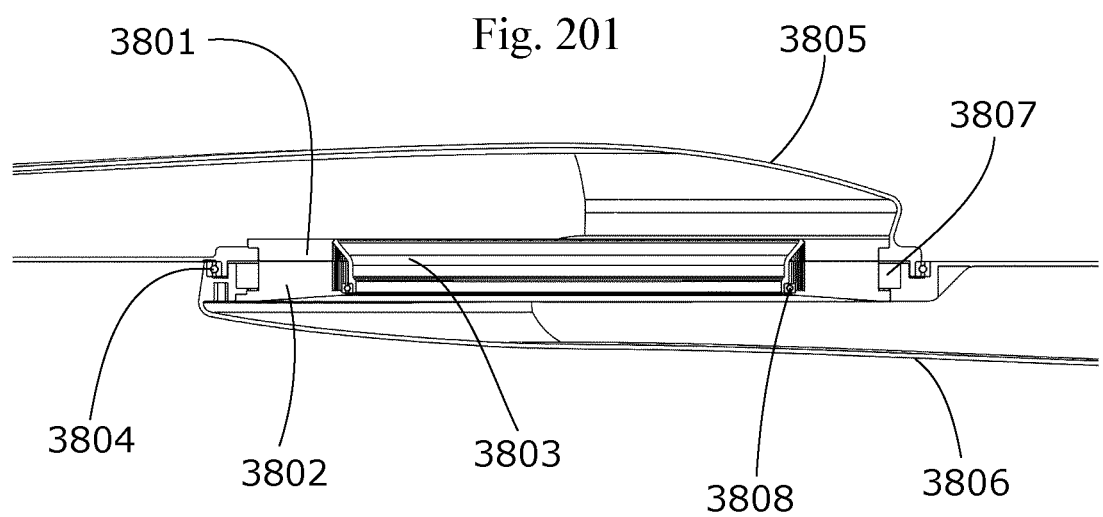
Figure 202:
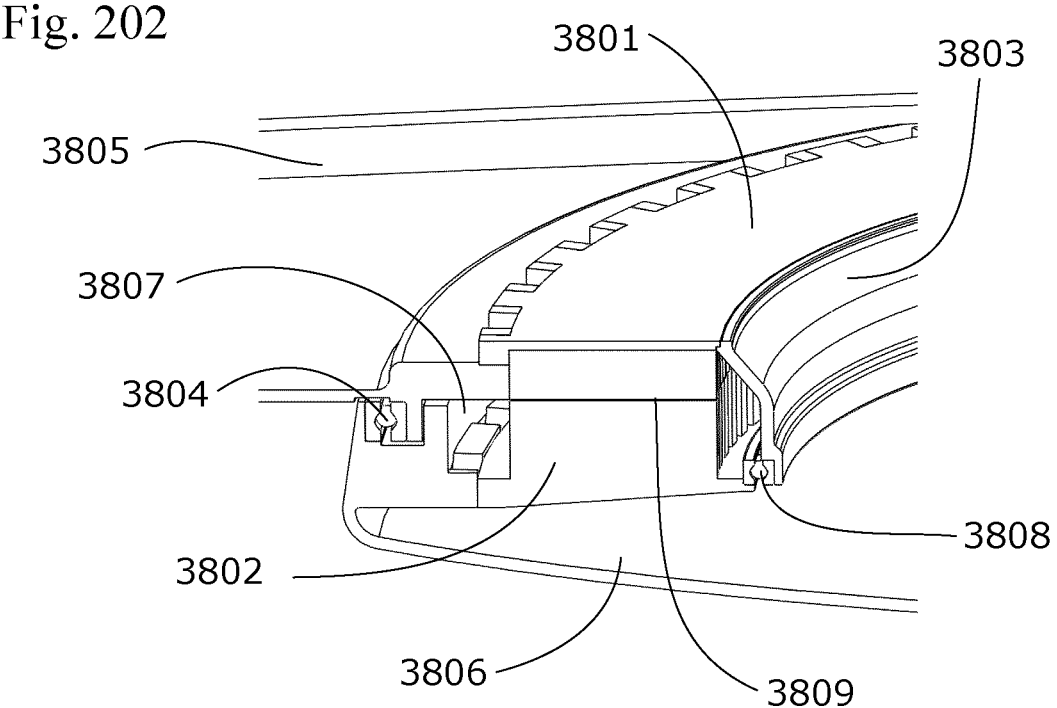
Figure 203:
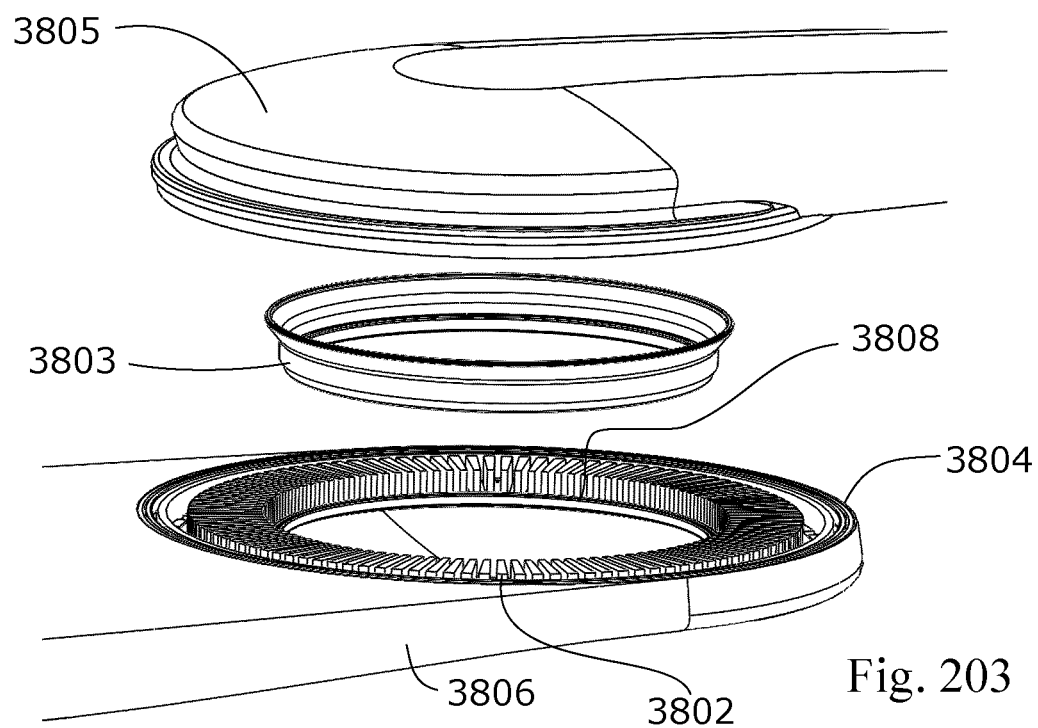
Figure 204:
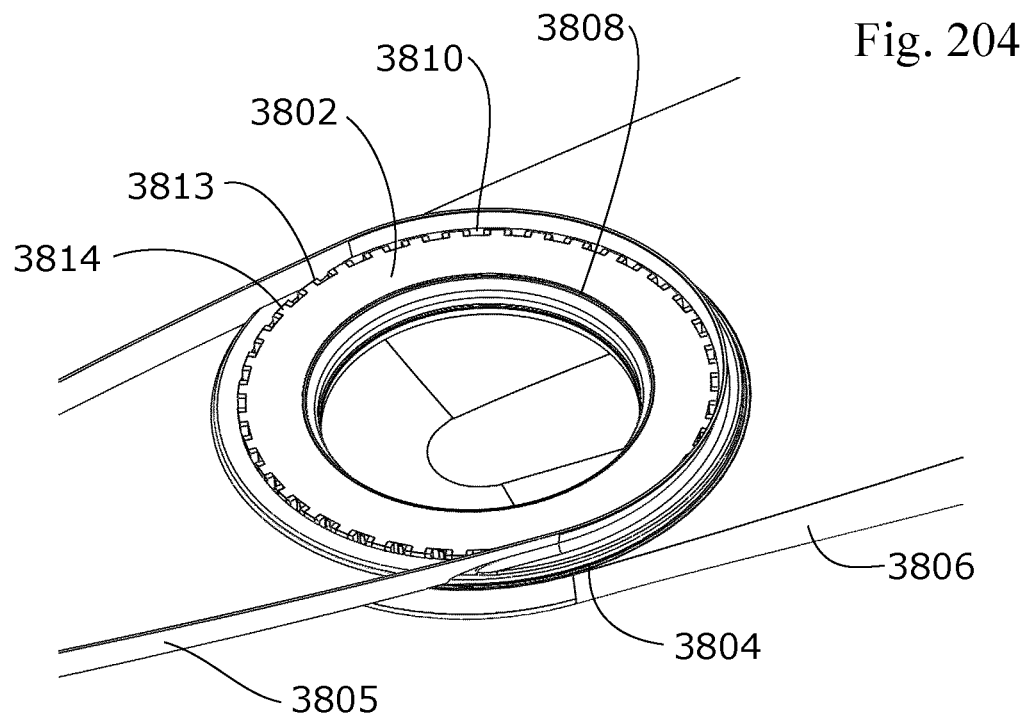
Figure 205:
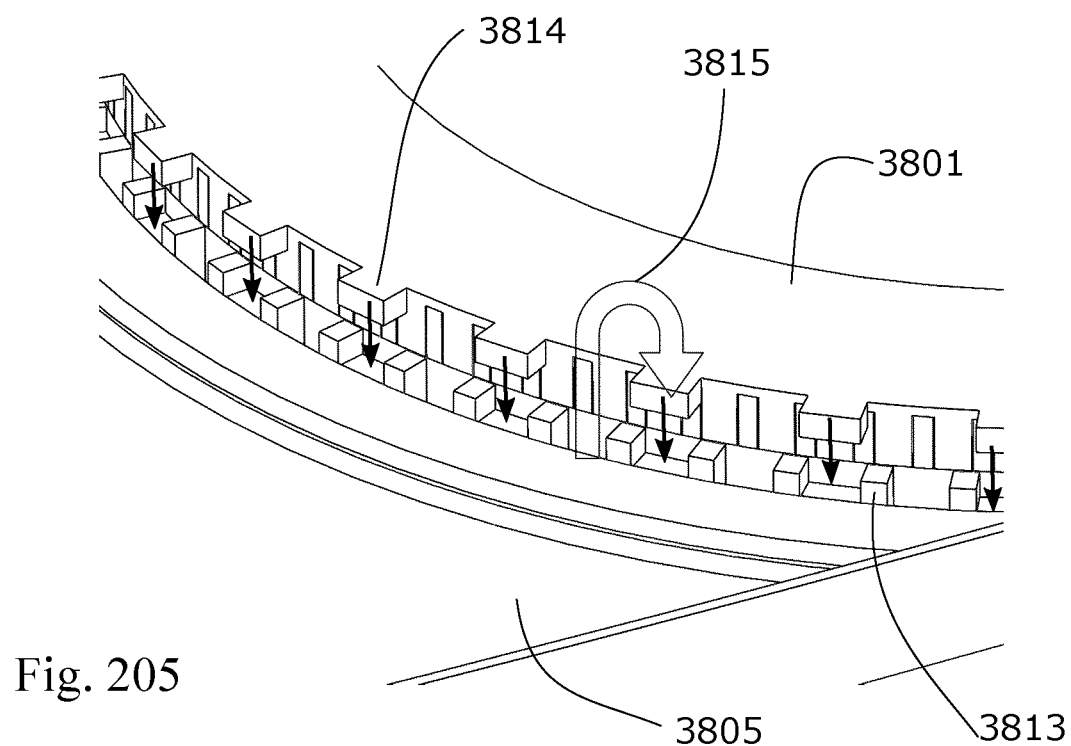
Figure 206:
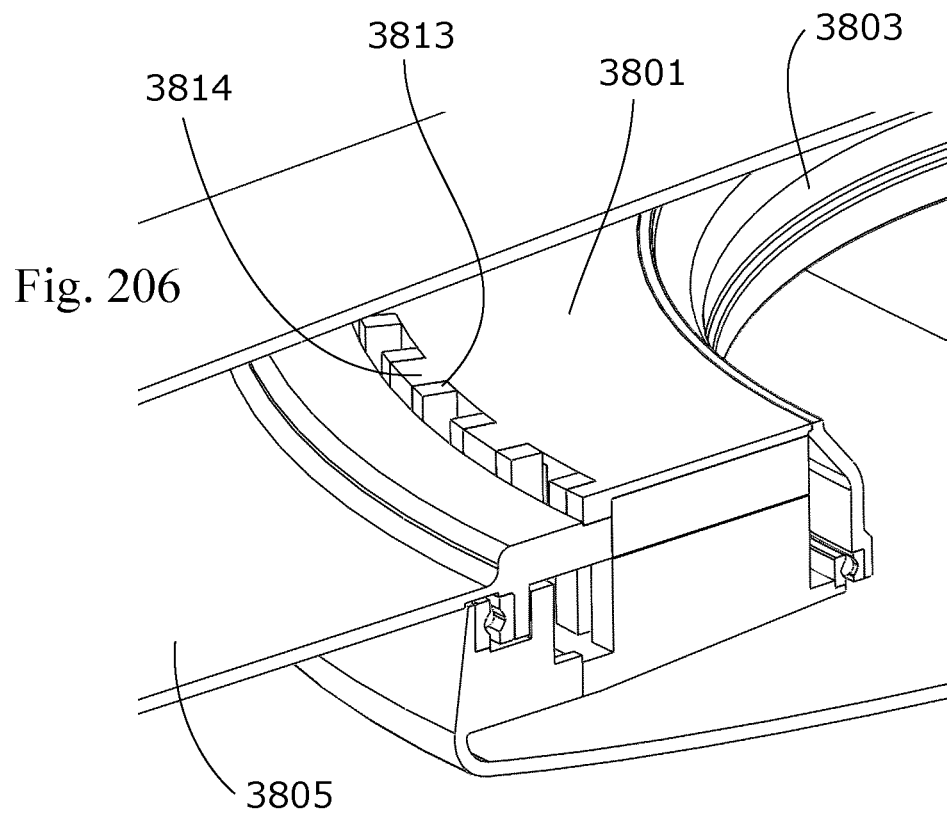
Figure 207:
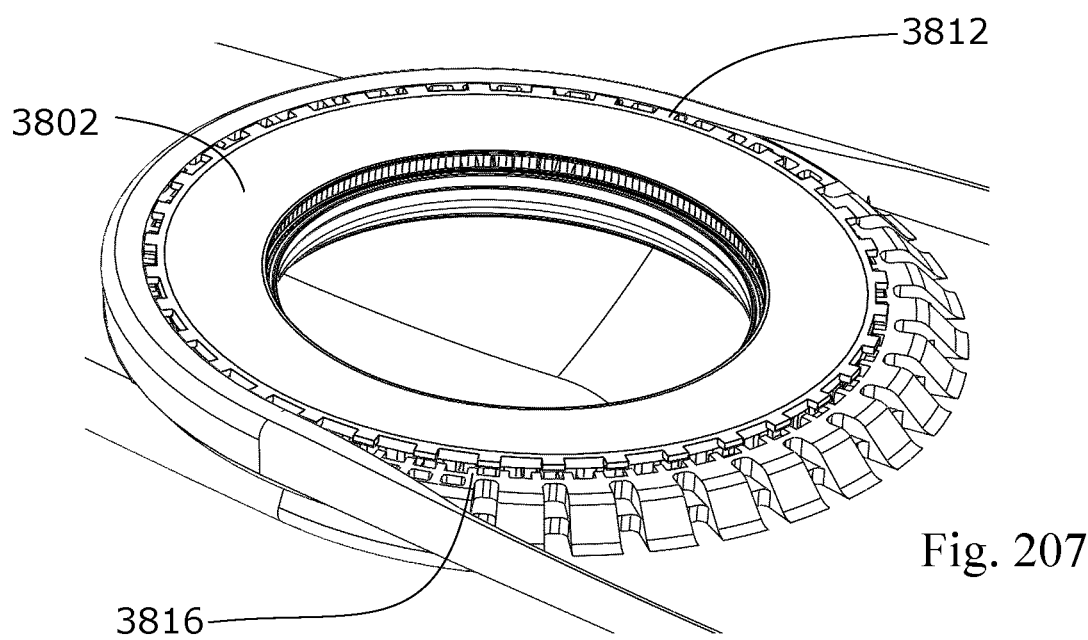
Figure 208:
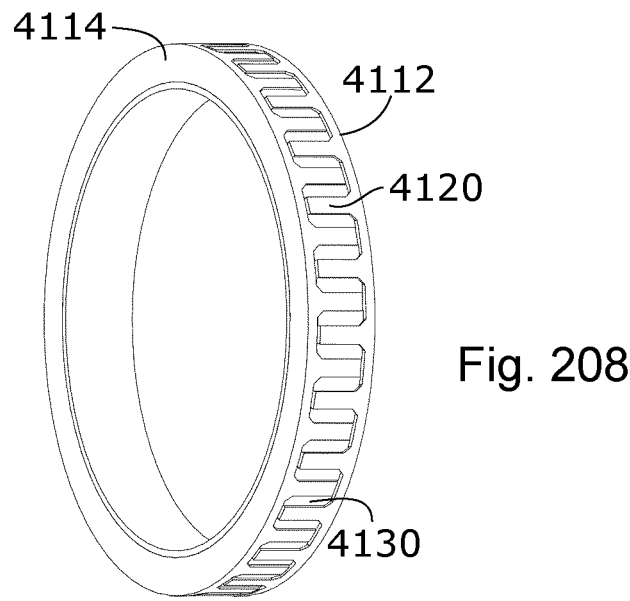

FIG. 201 displays a cross-sectional view of the frameless motor/actuator and robot arm FIG. 202 shows a close up of the section view of the frameless motor/actuator stator, rotor and housing assembly FIG. 203 shows an exploded view of the frameless motor/actuator robot arm assembly FIG. 204 displays a section view through the housing to view the stator and tab features on the rotor FIG. 205 outlines the up, over and down assembly motion used with the tab features to secure the rotor FIG. 206 shows a close up of the section view displaying the tab feature used to secure the rotor FIG. 207 shows a section view through the housing to display the tab features used on the stator to secure the stator FIG. 208 is an isometric view of an example concentrated flux motor using poles separated into two separate bodies and interdigitated.

Figure 209:
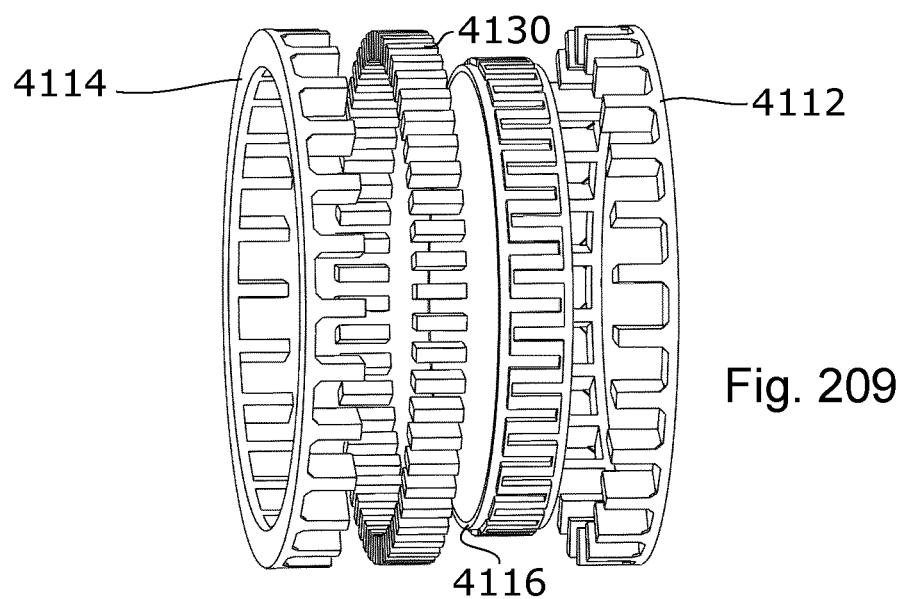

FIG. 209 shows an exploded view of the concentrated flux motor of FIG. 208.

Figure 210:
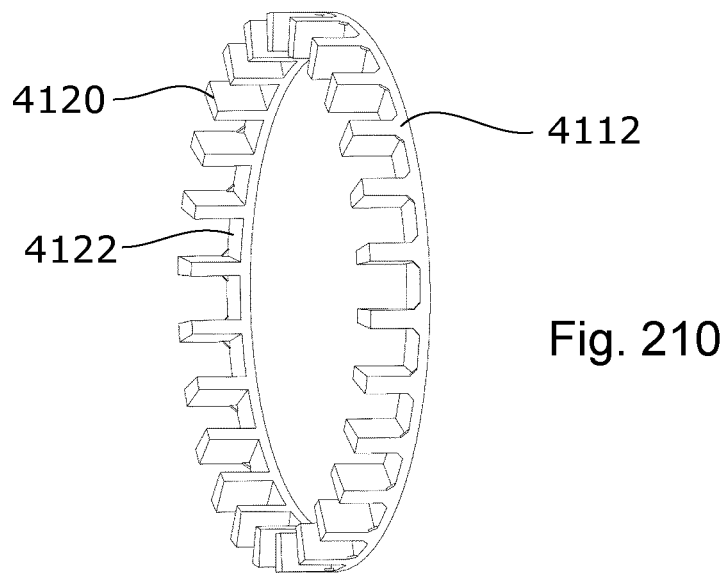

FIG. 210 is an isometric view of one of the separate bodies of the embodiment of FIG. 208.

Figure 211:
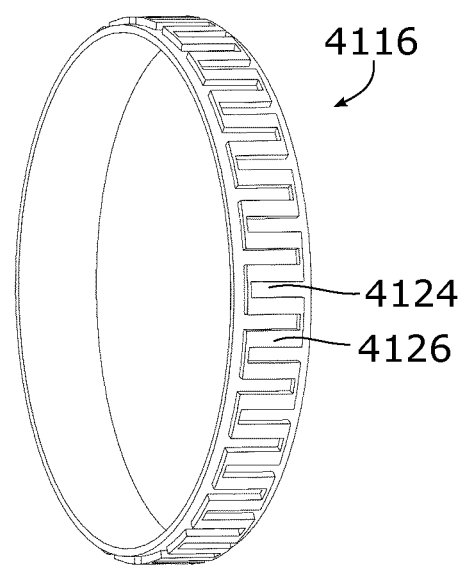

FIG. 211 if an isometric view of a spacer element for supporting the separate bodies of the embodiment of FIG. 208.

Figure 212:
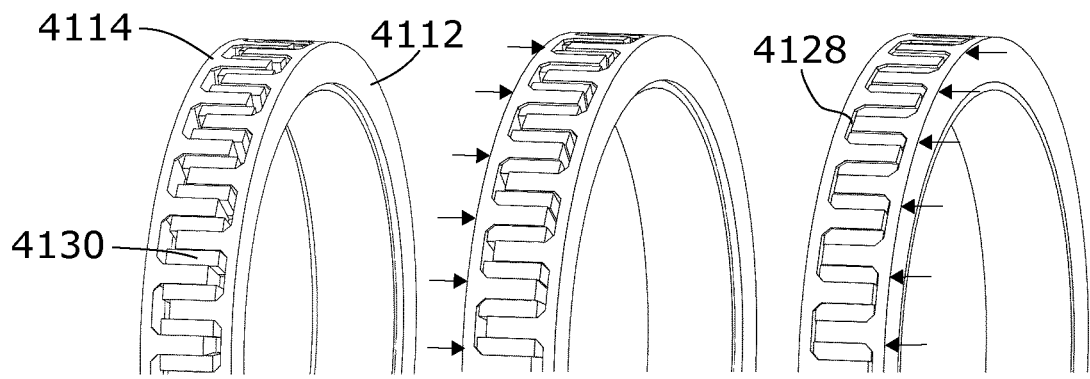

FIG. 212 is an isometric view showing the separate bodies of the embodiment of FIG. 208 being assembled with magnets between them.

Figure 213:
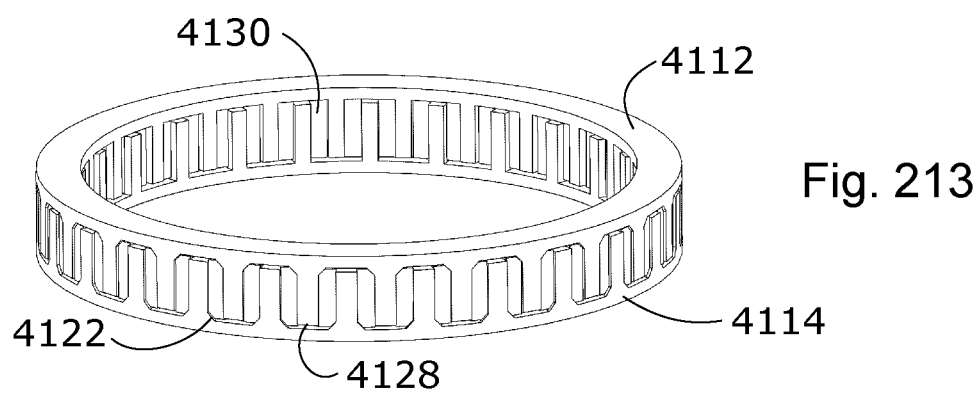

FIG. 213 is an isometric view of a rotor with interdigitated rings, and no spacer ring.

Figure 214:
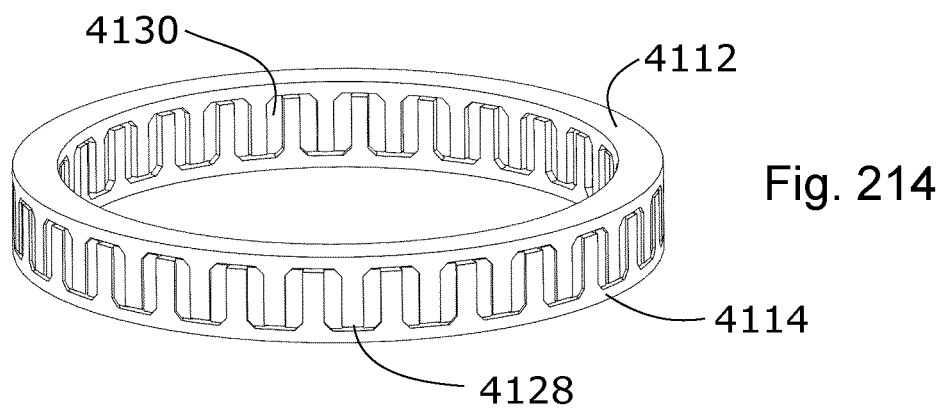

FIG. 214 shows a different version of the rotor of FIG. 213 with no retaining tabs.

Figure 215:
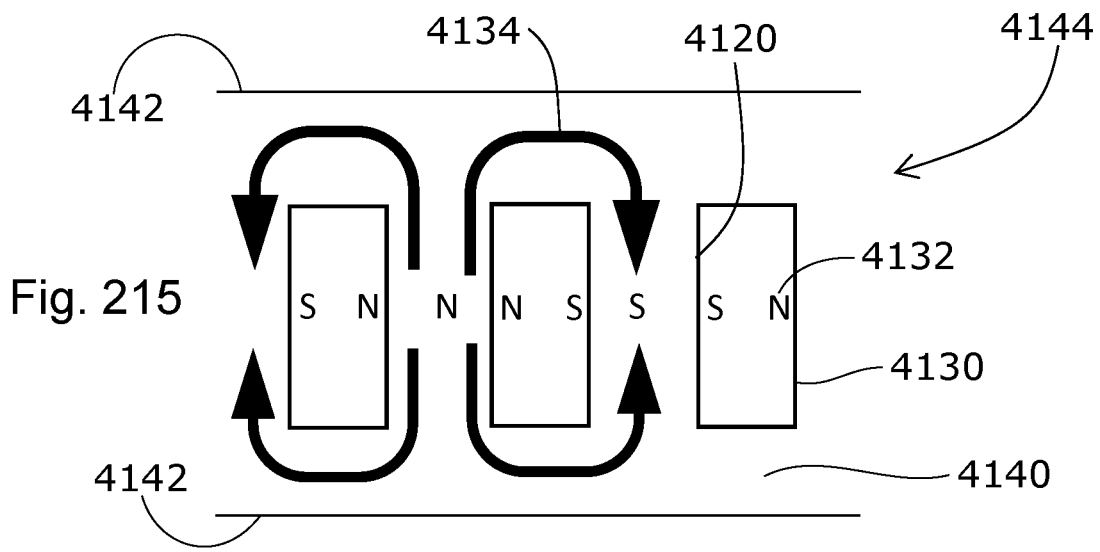

FIG. 215 is a schematic diagram showing a view from an airgap direction of a portion of a concentrated flux rotor having low aspect ratio magnets mounted in a magnetically susceptible supporting structure.

Figure 216:
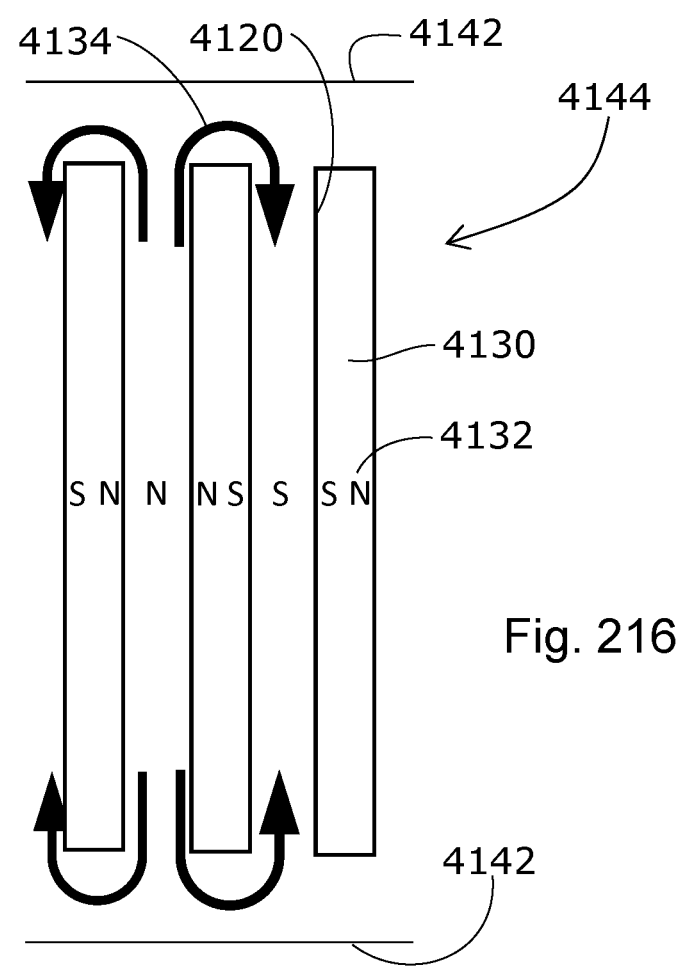

FIG. 216 is a schematic diagram showing a view from an airgap direction of a portion of a concentrated flux rotor having high aspect ratio magnets mounted in a magnetically susceptible supporting structure.

Figure 217:
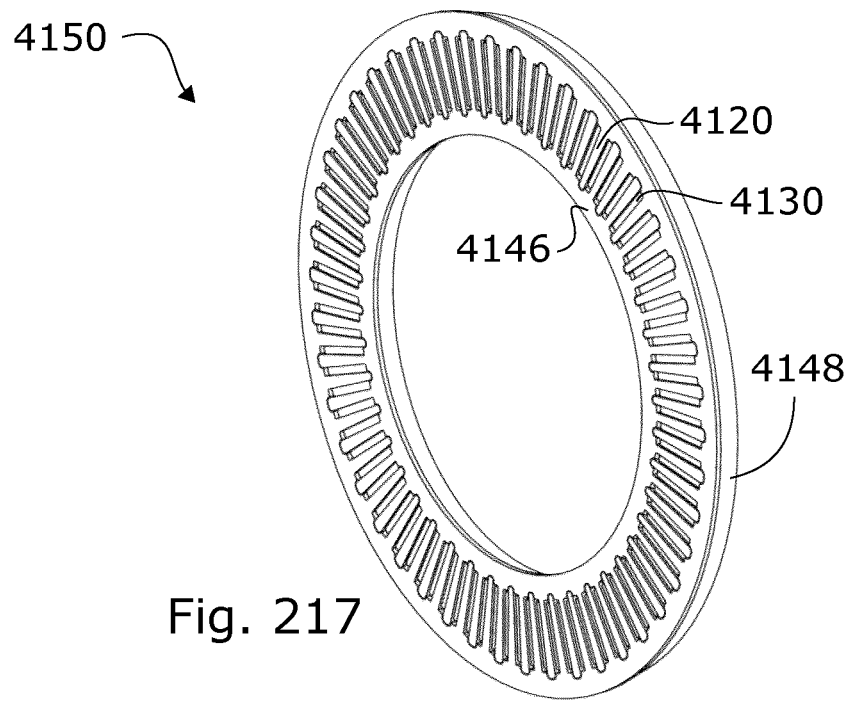

FIG. 217 is an isometric view of an assembled two piece rotor.

Figure 218:
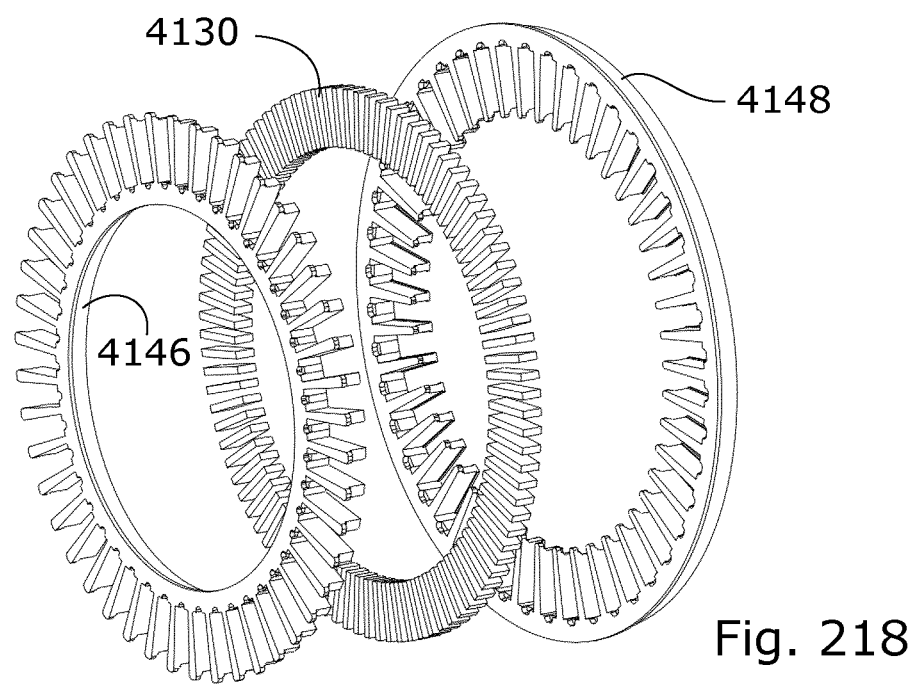

FIG. 218 is an isometric exploded view of the rotor of FIG. 217, with magnets and both rotor components separated.

Figure 219:
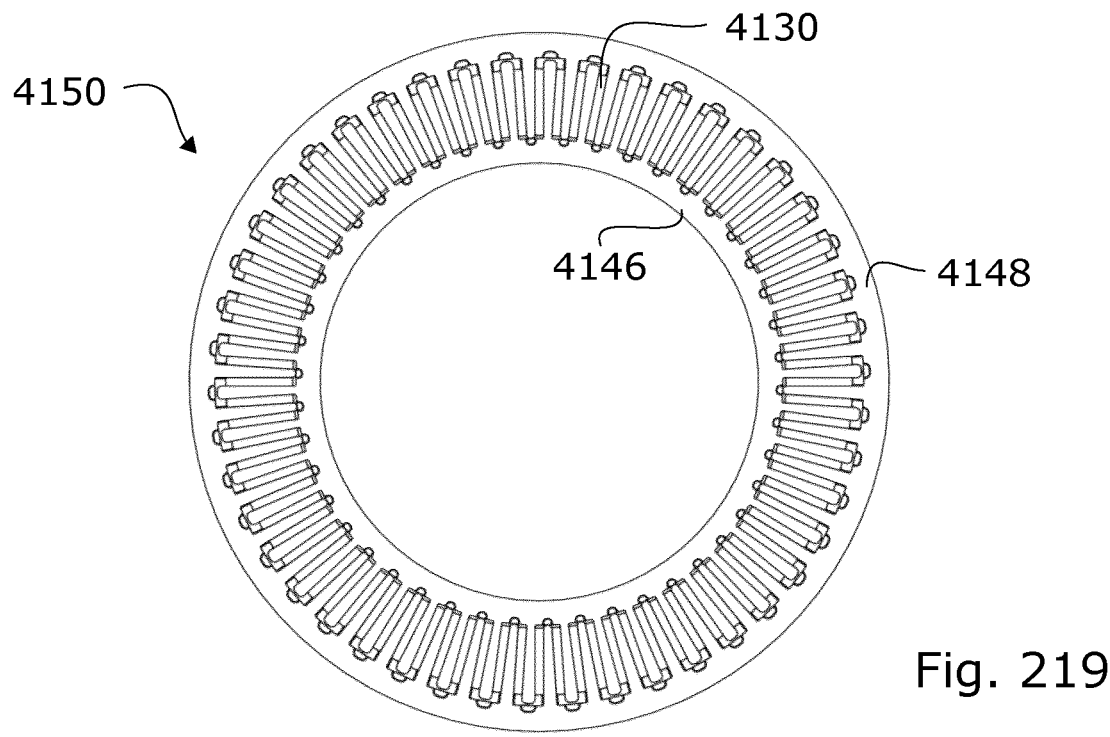

FIG. 219 is a straight on view of the rotor of FIG. 217 in a state in which outer ring is heated and inner ring is cooled to create a thermal expansion/contraction to allow assembly.

Figure 220:
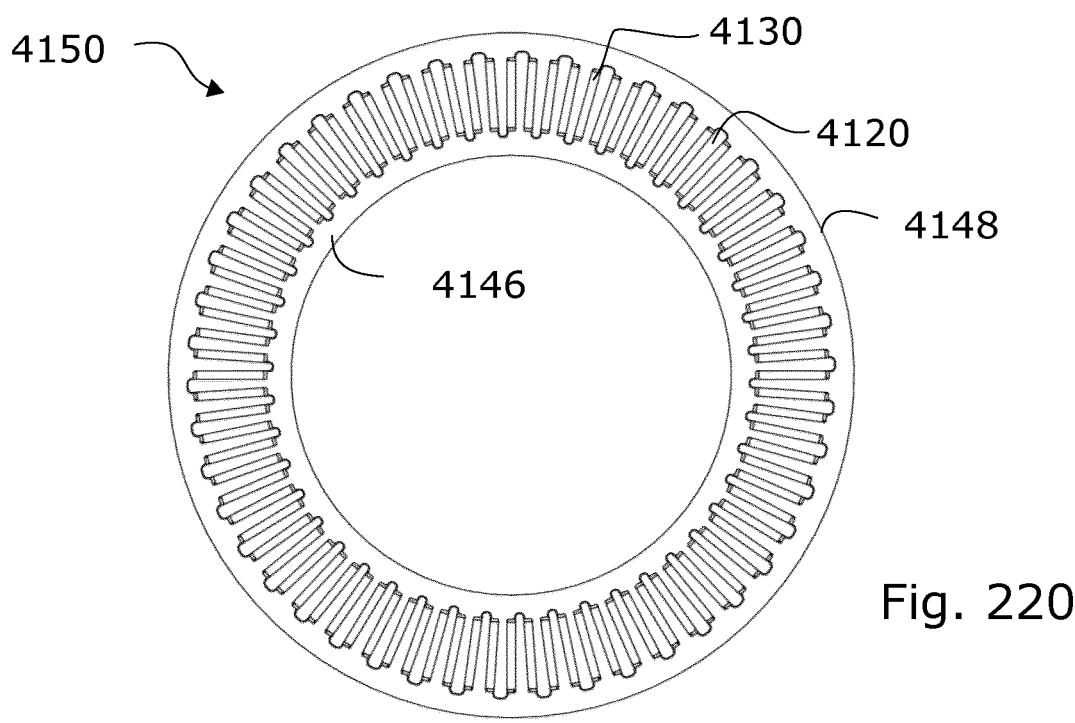

FIG. 220 is a straight on view of the rotor of FIG. 217 in a state of temperature equilibrium.

Figure 221:
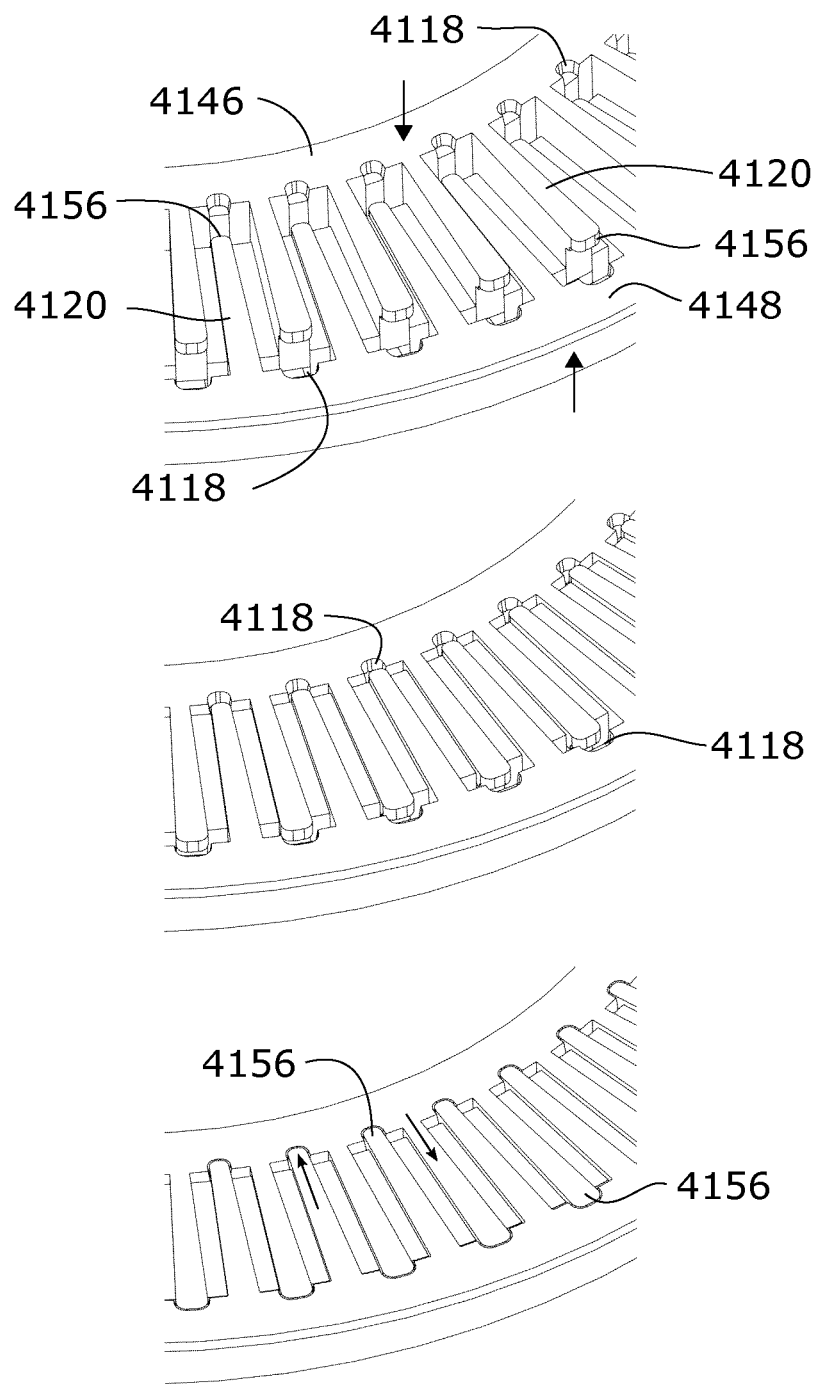

FIG. 221 is an isometric view of a portion of the rotor of FIG. 217 in states of a shrink fitting assembly process.

Figure 222:
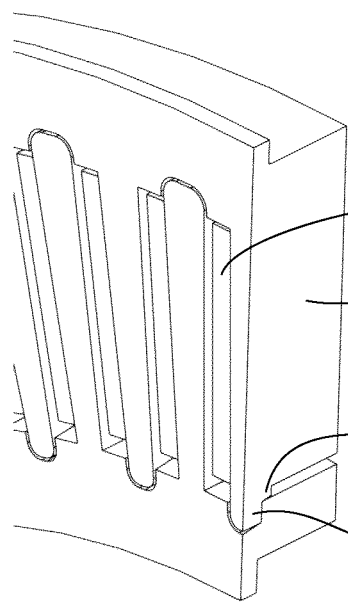

FIG. 222 is an isometric section view of a portion of the rotor of FIG. 217 showing inner tooth geometry.

Figure 223:
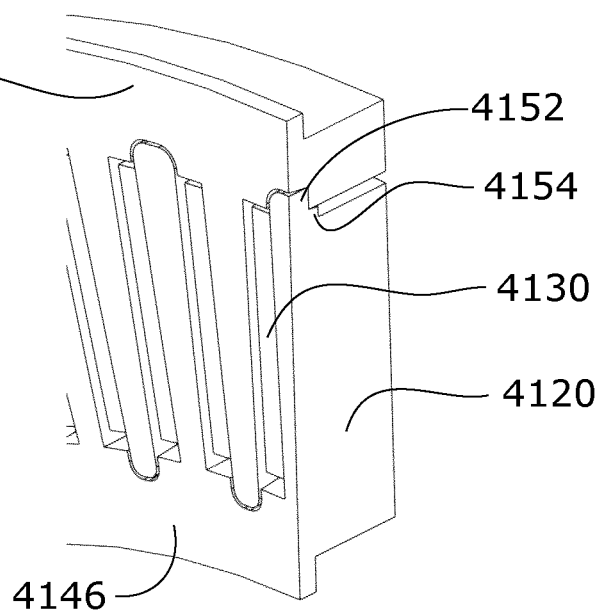
Figure 224:
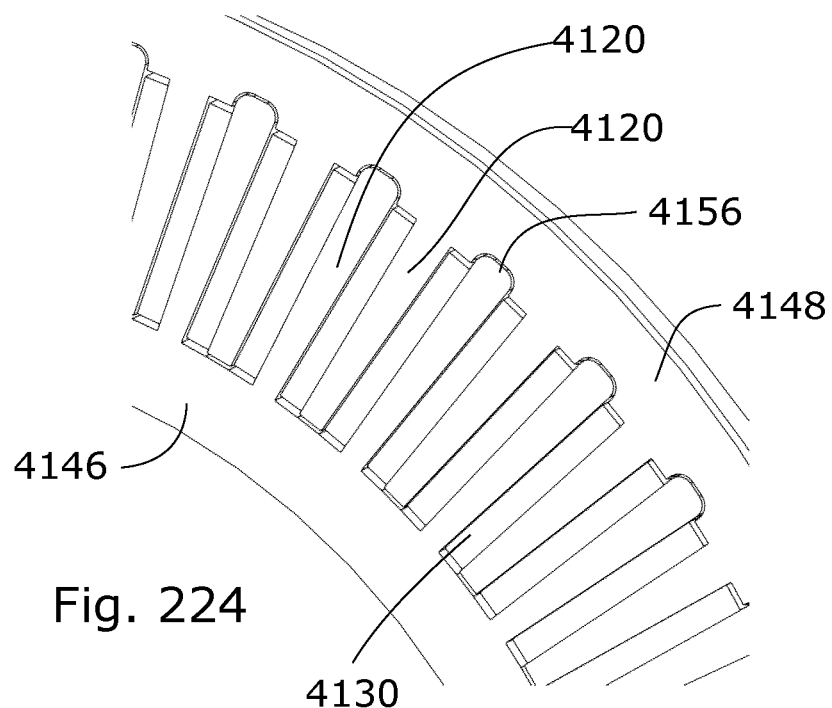

FIG. 223 is an isometric section view of a portion of the rotor of FIG. 217 showing outer tooth geometry FIG. 224 is an isometric view showing a portion of a two piece rotor with tabs only on posts extending from one ring.

Figure 225:
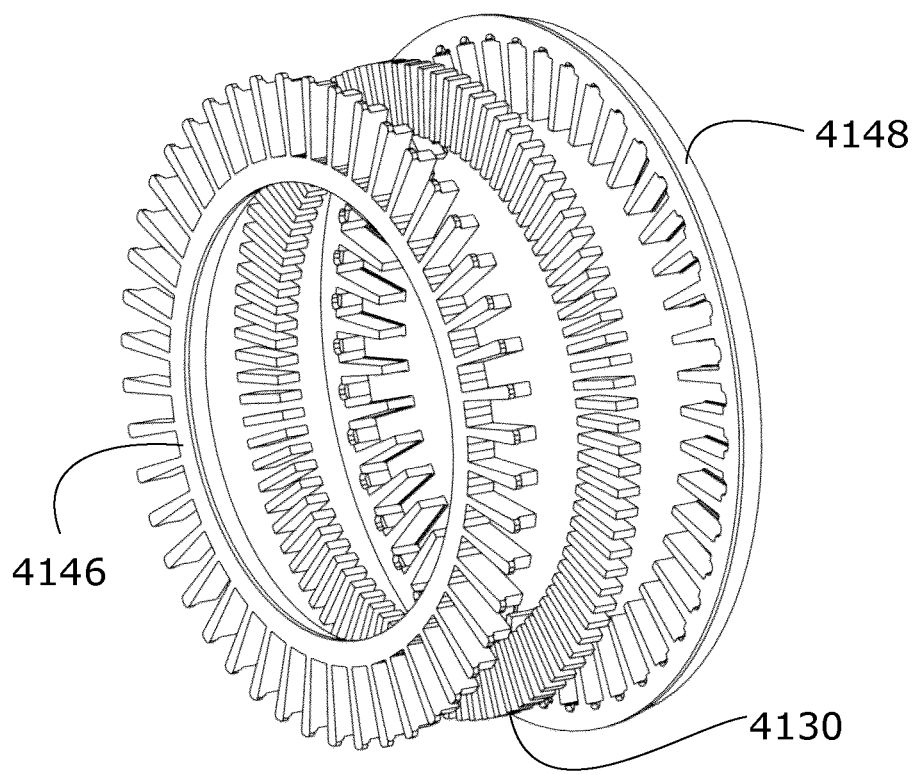

FIG. 225 is an isometric view of an exploded assembly of the embodiment of FIG. 224.

Figure 226:
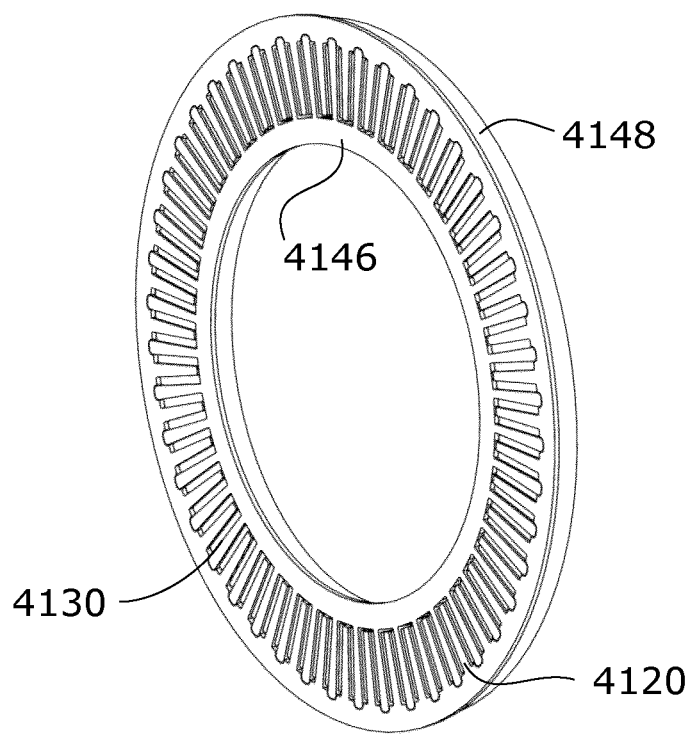

FIG. 226 is an isometric view of a complete rotor of the embodiment of FIG. 224.

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Definitions

Several terms to be used throughout the text will first be defined.

A carrier, as used here in the context of electric machines, may comprise a stator or a rotor when referring to rotary machines.

A rotor as used herein may be circular. A rotor may also refer the armature or reaction rail of a linear motor. A stator may be circular. It may also refer to the armature or reaction rail of a linear motor.

Teeth may be referred to as posts.

In an electric motor, either a stator or rotor may have a commutated electromagnet array defined by coils wrapped around posts, while the other of the stator or rotor may have magnetic poles defined by permanent magnets or coils or both coils and permanent magnets.

Permanent magnets may be used in combinations with electromagnets on the rotor and/or stator to add flux to the system. PM means permanent magnet. EM means electromagnet.

Electromagnetic elements may comprise permanent magnets, posts (teeth), slots defined by magnetic posts, which may be soft magnetic posts, and electrical conductors. In any embodiment where one carrier has slots and posts, the other may have permanent magnets for the electromagnetic elements, and for any such embodiment, the term electromagnetic element may be replaced by the term permanent magnet. Magnetic poles in some cases, for example in a concentrated flux rotor embodiment, may be defined by permanent magnets in conjunction with adjacent posts in which a magnetic field is established by the permanent magnets.

Unless otherwise specified, "flux" refers to magnetic flux.

In any particular magnetic material, as flux density rises it asymptotically approaches saturation, but below saturation it can be approximated as linear, and at high levels of flux density where it is essentially fully saturated it would also be approximately linear, having the same permeability as in free space. The saturation flux density is defined as the flux density at the intersection obtained by extrapolating those lines. The saturation flux of a portion of a flux path is the flux through the flux path sufficient to reach the saturation flux density at that portion of the flux path. In the case of a gap this is zero.

A fractional slot motor is a motor with a fractional number of slots per pole per phase. If the number of slots is divided by the number of magnets, and divided again by the number of phases and the result is not an integer, then the motor is a fractional slot motor.

A carrier may be supported for motion relative to another carrier by a frame or bearings, and the bearings may be sliding, roller, fluid, air or magnetic bearings. An axial electric machine is an electric machine in which magnetic flux linkage occurs across an axial airgap, and the carriers are in the form of discs mounted coaxially side by side. A first carrier can be arranged to move relative to another carrier by either carrier being supported by a frame, housing or other element, while the other carrier moves relative the first carrier.

A radial electric machine is an electric machine where the airgap is oriented such that magnetic flux is radially oriented, and the carriers are mounted concentrically, one outside the other. A linear actuator is comparable in construction to a section of an axial flux or radial flux rotary motor where the direction of motion is a straight line rather than a curved path.

A trapezoidal electric machine is an electric machine that is a combination of both an axial and radial flux machines, where the plane of the airgap lies at an angle partway between the planes formed by the airgaps in the axial and radial configurations.

The airgap diameter for a rotary machine is defined as the diameter perpendicular to the axis of rotation at the centre of the airgap surface. In radial flux motors, all of the airgap resides at the same diameter. If the airgap surface is a disc-shaped slice as in axial flux motors, the average airgap diameter is the average of the inner and outer diameter. For other airgap surfaces such as a diagonal or curved surfaces, the average airgap diameter can be found as the average airgap diameter of the cross-sectional airgap view.

For a radial flux motor, the airgap diameter refers to the average of the rotor inner diameter and stator outer diameter (for an outer rotor radial flux motor) or the average of the rotor airgap outer diameter and stator airgap inner diameter (for an inner rotor radial flux motor). Analogues of the airgap diameter of a radial flux motor may be used for other types of rotary motors. For an axial flux machine, the airgap diameter is defined as the average of the PM inner diameter and PM outer diameter and EM inner diameter and EM outer diameter.

Size of an electric machine means the airgap diameter of an axial flux machine or radial flux machine as defined herein or the length in the direction of translation of the carriers of a linear machine. For linear machines where one carrier is longer than another, then the length is the length of the shorter carrier. For use with reference to the boundary inequalities, the size of a rotary machine is given in terms of diameter, but for a linear machine it is the length that corresponds to a circumference of a rotary machine. Therefore, the size X of a linear motor that corresponds in the equations to a rotary motor of size Y is related to Y as X=pi*Y. This size of any rotary electric machine for the purpose of the disclosed range, as a general principle and including transverse flux machines, is defined as the average of the largest and smallest diameters defined by the magnetically active airgap when it is projected onto the plane that is perpendicular to the axis of rotation The back surface of the stator is defined as the surface on the opposite side of the stator to the surface which is at the magnetically active airgap. In a radial flux motor, this would correspond to either the inner surface of the stator for an outer rotor configuration, or the outer diameter surface of the stator for an inner rotor configuration. In an axial flux motor, the back surface of the stator is the axially outer surface of the stator.

$K_m$ is defined as the stall torque divided by the square root of the electrical resistive losses of a motor. In this patent document, it is proposed to assess motor performance using $K_m$ divided by the active magnetic mass of the motor, referred to in this disclosure as KR or $K_R$. The active magnetic mass consists of the rotor and stator mass including magnets, coils, teeth, and backiron as is commonly reported by the manufacturers of frameless motors. The $K_R$ metric may be useful in assessing motor performance for applications where a low motor mass is beneficial to overall power consumption, such as robotics. In some cases, size-independent analogues of $K_m$ and $K_R$, namely $K_m''$ and $K_R''$ are used throughout the text. The conversion between the size-dependent and size-independent metrics is:

$$K_m = \frac{K_m'' \sqrt{\pi L}\, D^{3/2}}{2}$$

and $$K_R = \frac{K_R'' \sqrt{D/\pi L}}{2},$$

where D is the average airgap diameter and L is the radial tooth length. For a given size of motor, D and L are taken to be fixed in the analysis, therefore $K_R$ or $K_m$ will be proportional to $K''_R$ or $K''_m$. Consequently, statements relating to trends in $K_R$ will, in general, implicitly be held to apply to $K''_R$ as well.

Slot density is the number of slots divided by the circumferential length of machine at the average airgap diameter. If the pitch of the slots varies, the average slot density of a device will be used. Slot density can also be represented by the inverse of the slot pitch. It is a measure of how many slots occur per mm of circumferential length along the airgap at the airgap diameter (or its analogue). For rotary motors, it has the following equation:

$$\text{Slot density} = \frac{N_s}{\pi D_{AG}}$$

where $N_S$ is the number of slots, and $D_{AG}$ is the diameter of the airgap. For the case of a linear motor, the denominator of this function would be replaced by the length of the carrier along the direction of translation.

Pole density is the number of poles divided by the circumferential length of machine at the average airgap diameter. If the pitch of the poles varies, the average pole density of a device will be used. Pole density can also be represented by the inverse of the pole pitch. The pole pitch is defined as the average distance at the average airgap between the center of a PM pole of one polarity to the center of the next PM pole on the same carrier having the opposite polarity, measured along the direction of motion. In rotary motors this distance is a circumferential pitch measured at the average airgap diameter, DAG. It is a measure of how many poles occur per mm of circumferential length along the airgap at the airgap diameter (or its analogue). For rotary motors, it has the following equation:

$$\text{Pole density} = \frac{N_P}{\pi D_{AG}}$$

where $N_P$ is the number of poles, and $D_{AG}$ is the diameter of the airgap. For the case of a linear motor, the denominator of this function would be replaced by the length of the carrier along the direction of translation.

For distributed windings, the number of slots will be N×the number of poles where N is a multiple of the number of phases. So for a 3 phase machine N could be 3, 6, 9, 12, etc. For concentrated windings, the number of slots can vary but must be a multiple of the number of phases. It does not depend on the number of poles, except that certain combinations of slots and poles will yield higher torque and better noise-reduction or cogging-reduction characteristics. The minimum number of slots for a given number of poles should not be below 50% to obtain adequate torque.

Conductor volume may be used to refer to the slot area per length of a single stator. The slot area is the area of a cross-section of a slot in the plane which is orthogonal to the teeth but not parallel to the plane of relative motion of the carriers. In an axial motor, this plane would be perpendicular to a radius passing through the slot. The slot area effectively defines the maximum conductor volume that can be incorporated into a stator design, and it is usually a goal of motor designers to have as high a fill factor as possible to utilize all the available space for conductors.

Since maximum conductor volume in a stator is defined in terms of slot area, any stator referred to as having a maximum conductor volume or slot area must have slots and teeth to define the slots. This parameter is defined for rotary motors as:

$$\text{Slot area per length} = \frac{N_s A_s}{\pi D_{AG}} = \text{slot density} \cdot A_s$$

where $A_S$ is the cross-sectional area of a single slot, or the average area of a single slot for stator designs that have varying slot areas.

As a relatively accurate approximation, $A_S$ may be calculated as the height of the tooth, $h_t$, multiplied by the average width of the slot, $w_s$, such that the equation above becomes:

$$\text{Slot area per length} = \frac{N_s h_t w_s}{\pi D_{AG}} = \text{slot density} \cdot h_t w_s$$

These definitions are size-independent. They can be used to characterize any motor.

Pole pitch and tooth height may be used to define a specific stator or rotor geometry. Since the parameters are size-independent, measures of benefit disclosed herein are likewise size-independent, being written in terms of force per area and force per mass, where mass refers to the mass of the stator and rotor including any magnets and coils, such that the torque and torque per mass for any size rotary motor can be found by an appropriate multiplication factor containing the radius at the airgap. For any two motors of the same airgap diameter, the graphs will have the same contours for torque as for force/area, and for torque density as for force/mass.

A cooling channel is any structure that defines a flow path for cooling fluid, including gas flow or liquid flow, such as passages defined by fins, or unoccupied spaces in slots, or conduits through or around a structure.

Slot depth or post height may also be used as a proxy for the conductor volume. The post height, also known as the tooth height or slot depth, is a proxy for the amount of cross-sectional area in a slot available for conductors to occupy. Although the slots may have a variety of shapes such as curved or tapered profiles, the slot height is based upon the closest rectangular approximation which best represents the total area of the slot which may be occupied by conductors. This dimension does not include features such as pole shoes which add to the height of the tooth without adding substantially to the slot area. For transverse flux motors, the post height is defined as the portion of the post which is directly adjacent to the conductor coil, perpendicular to the direction of the coil windings.

A motor series is a set of motor geometries represented by analysis that have the same construction and winding but with one or two differences such as, a range of pole pitches, or a range of post heights.

Number of rotor poles is equal to the number of regions of alternating polarity magnetic flux across the airgap. For example, in a surface permanent magnet rotor, the number of poles is determined by the number of alternating polarity permanent magnets. However, poles may also be created by groups of magnets such as in a Halbach array, by electromagnets, or by combinations of electromagnets and permanent magnets. A conductor layer is an electrical conductor formed as a unit that establishes a conductive path that does not intersect itself when the conductor is viewed in plan view. The conductor layer may thus be placed directly around posts with minimal or no plastic deformation of the layer. Each conductor layer occupies a different part of slots at different levels of the slots, for example corresponding to different axial positions in an axial flux machine or different radial positions in a radial flux machine. In some embodiments, a conductor layer may be made of a material with sufficient rigidity that it can be placed over posts and into slots as a unit, without being individually helically wound on to the posts.

A continuous stall torque of a direct drive motor is the continuous torque output at zero speed where the produced heat and dissipated heat reach equilibrium for a given cooling means that is at the maximum allowable electrical conductor temperature.

A concentrated winding comprises individually wound posts or any winding configuration that results in the alternating polarity of adjacent posts when energized. It is understood that not all posts will be the opposite polarity of both adjacent posts at all times. However, a concentrated winding configuration will result in the majority of the posts being the opposite polarity to one or both adjacent posts for the majority of the time when the motor is energized. A concentrated winding is a form of fractional slot winding where the ratio of slots per poles per phase is less than one.

The term 'solid stator' refers to a homogenous magnetically susceptible support structure functioning as a stator of an electric machine.

Exemplary Radial Flux Electric Machine

Figure 1:
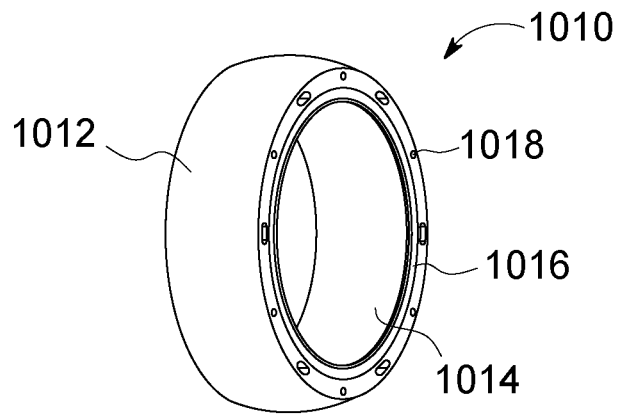
FIG. 1 is a CAD model of a complete exemplary actuator prototype.

FIG. 1 shows a CAD model of a complete exemplary actuator 1010 prototype with an outer housing 1012 and an inner housing 1014. The inner housing 1014 is the fixed (or reference) member, and the outer housing 1012 is the rotating member. Housings can be made of any rigid material such as, but not limited to aluminum, steel or plastic. The exemplary actuator 1010 comprises a bearing/seal 1016 and output mounting holes 1018. The prototype shown in FIG. 1 has produced a high torque to weight ratio. This is important for applications such as, but not limited to, robotics. The design shown in FIG. 1 has slot density and post height that comes within the definition of slot density and post height that is believed to provide a benefit in terms of KR, thus being especially suitable for use in robotics applications.

Figure 2:
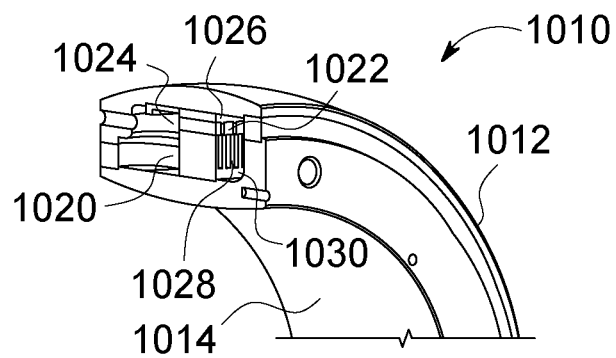
FIG. 2 is a section view of the exemplary actuator in FIG. 1.

FIG. 2 shows a section view of the same exemplary actuator 1010 with an internal stator 1020 attached to the inner housing 1014 and an external rotor 1022 attached to the outer housing 1012. The rotor 1022 comprises permanent magnets 1024 attached to a rotor yoke 1026. The stator 1020 comprises stator teeth 1028 attached to a stator yoke 1030. The stator 1020 is made of a soft magnetic material such as but not limited to laminated electrical steel. Solid material can be used for the stator 1020 such as but not limited to powdered soft magnetic materials that exhibit reduced eddy currents and/or reduced hysteresis. Due to the unusually thin flux path cross section of this device which will reduce eddy current losses, solid steel or iron may be used for the stator 1020 with acceptable performance in certain lower speed applications. The section view in FIG. 2 shows simplified bearings 1016 and no coils on the stator 1020.

Figure 3:
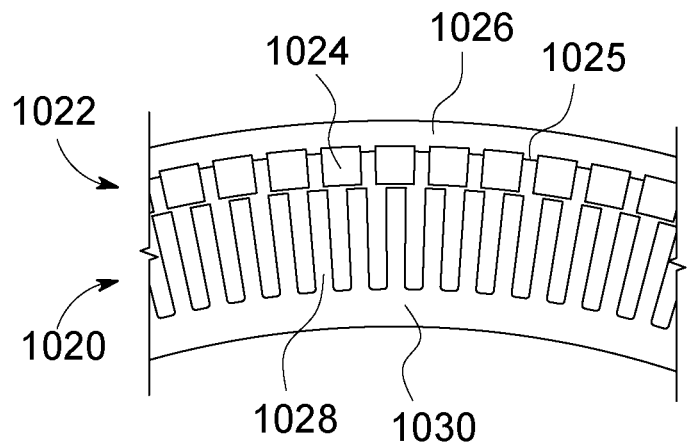
FIG. 3 shows a side view detail of the stator and rotor of the exemplary actuator in FIG. 1.
Figure 4:
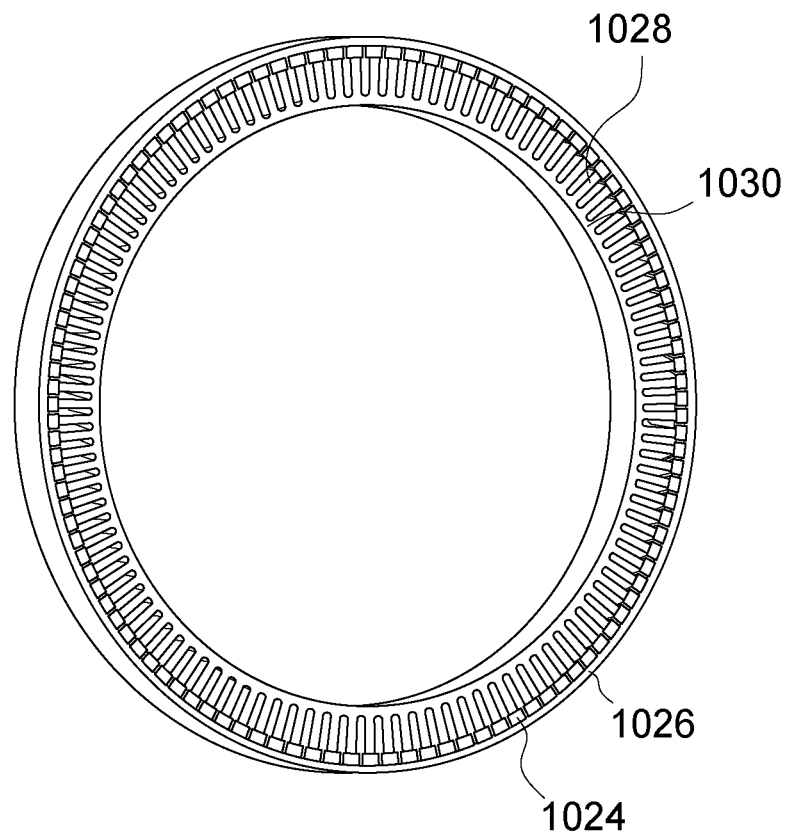
FIG. 4 shows a schematic of the entire stator and rotor of the exemplary actuator in FIG. 1.

FIG. 3 shows a side view detail of the stator 1020 and rotor 1022 (no coils shown in this figure for clarity of illustration). FIG. 4 shows a schematic of the entire stator 1020 and rotor 1022 with permanent magnets 1024 on the rotor 1022 but no coils on the stator 2010.

With a slot density in the range of 0.16 to 0.5 and higher, for example, and considering that it is not unusual for a slot to be about as wide as a tooth, tooth width can be in the order of 2 mm for a 200 mm wide machine. Wider or narrower teeth can be used. An advantage of thinner teeth is that solid materials may be used with minimal eddy currents due to the teeth being closer to the thickness of normal motor laminations. A common motor lamination can be in the range of 0.015" to 0.025". This prototype has performed satisfactorily with a hot rolled steel core. This has advantages for low cost manufacturing. Other advantages of using a solid core include the possibility of higher flux densities in materials like iron. Permanent magnets 1024 may be adhered to a soft magnetic material rotor 1022. Spacers 1025, shown in FIG. 3, in the rotor 1022 are not necessary but may be used to ensure the magnets 1024 are assembled at the correct spacing.

FIG. 1 to FIG. 5 show a non-limiting example of a 4:3 post 1028 to PM 1024 ratio according to the principles disclosed here for a four phase configuration. In general, for n phases, there may be a ratio of posts to poles of n:n−1, where the number of poles may be the number of permanent magnets. A 3:2 ratio may be used (with three phases), or possibly a 2:1 (with two phases) ratio or a 5:4 ratio (with five phases) or a 6:5 ratio (with six phases) or a 7:6 ratio (with seven phases) and so on. 4:3 has shown to be a ratio which produces high torque and is used as a non-limiting example here. Or there may be n phases, with a ratio of posts to poles of n:n+1. Many other post-to-PM ratios and combinations are possible and can be used according to the principles of this device.

Figure 5:
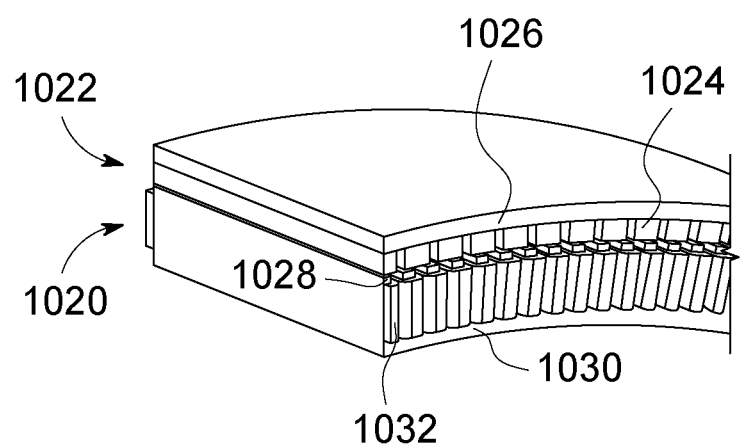
FIG. 5 shows a simplified schematic section view of the stator and rotor of the exemplary actuator in FIG. 1, with schematic CAD model coils on the posts.
Figure 6:
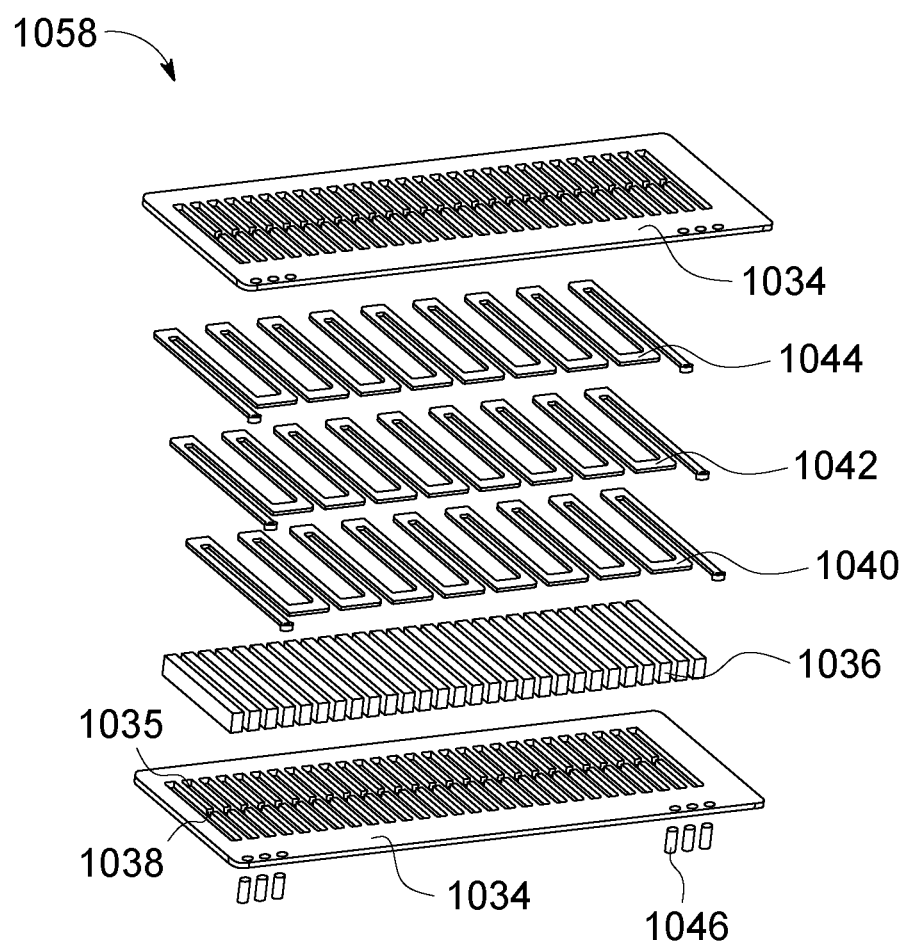
FIG. 6 shows a non-limiting simplified exemplary embodiment of a stator of a linear electric machine.
Figure 7:
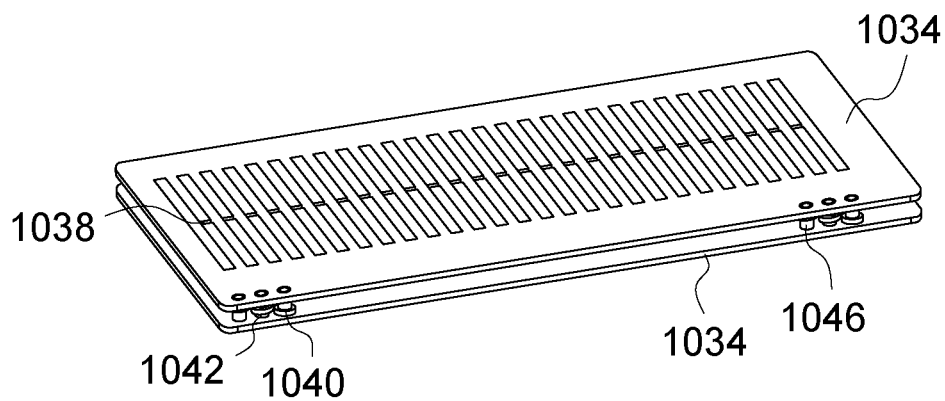
FIG. 7 shows an isometric view of the stator in FIG. 6.
Figure 8:
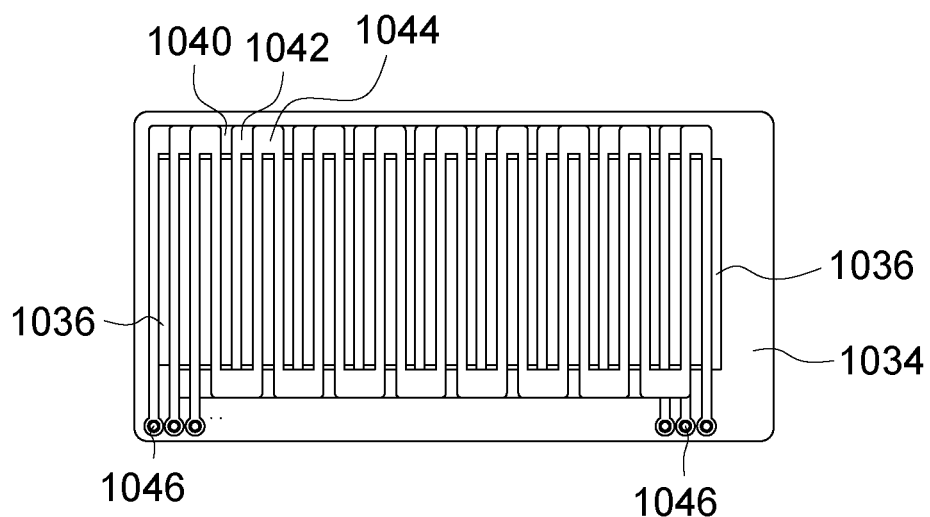
FIG. 8 shows a top view of the stator in FIG. 6 and FIG. 7 with the upper insulator layer removed.
Figure 9:
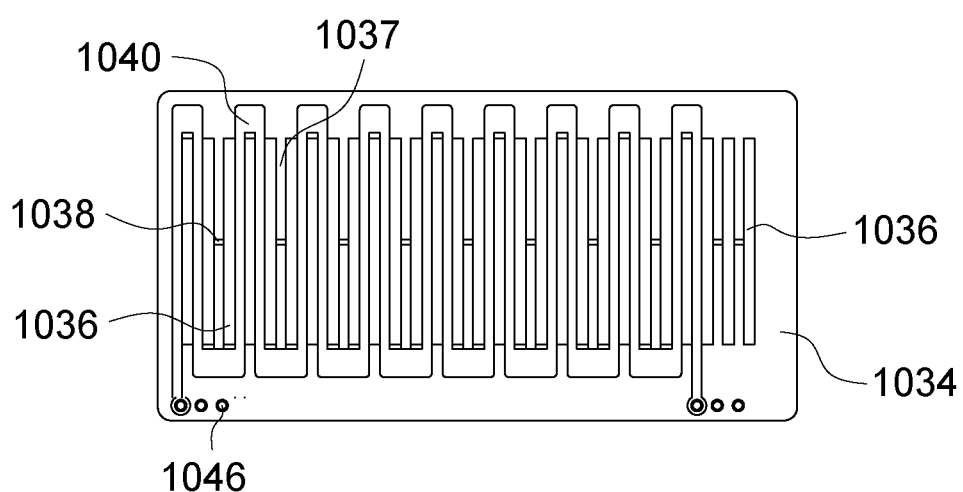
FIG. 9 shows top view of the stator in FIG. 8 with the two upper phase circuits removed.
Figure 10:
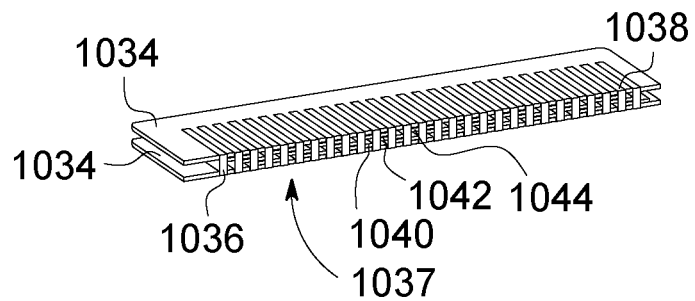
FIG. 10 is a sectional view of the stator of FIG. 6 to FIG. 9.
Figure 11:
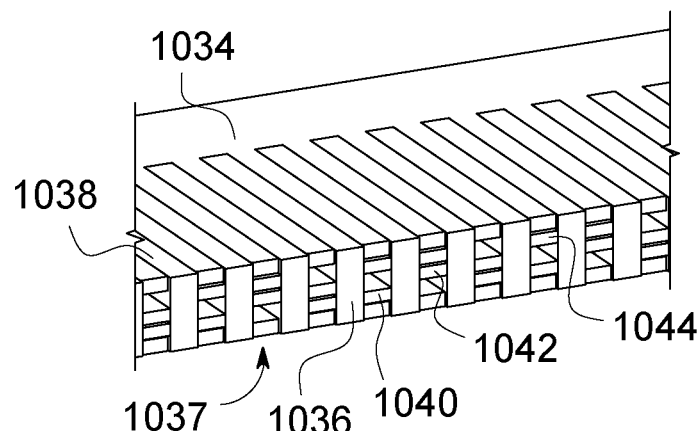
FIG. 11 is a detail view of the cross section shown in FIG. 10.
Figure 12:
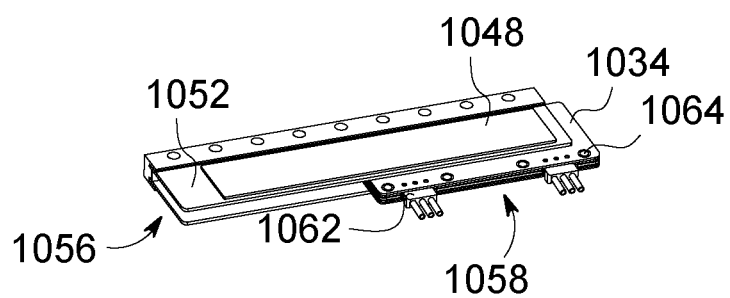
FIG. 12 shows an isometric view of a non-limiting exemplary linear electric machine.
Figure 13:
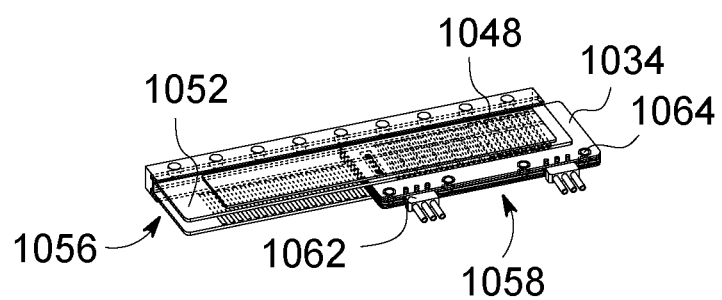
FIG. 13 shows the electric machine of FIG. 12 with internal lines.
Figure 14:
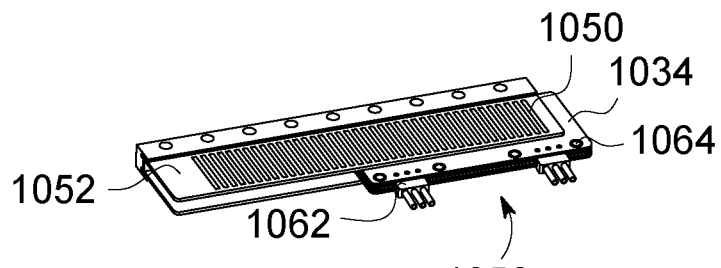
FIG. 14 shows the electric machine of FIG. 12 with the upper permanent magnet carrier backiron removed.
Figure 15:
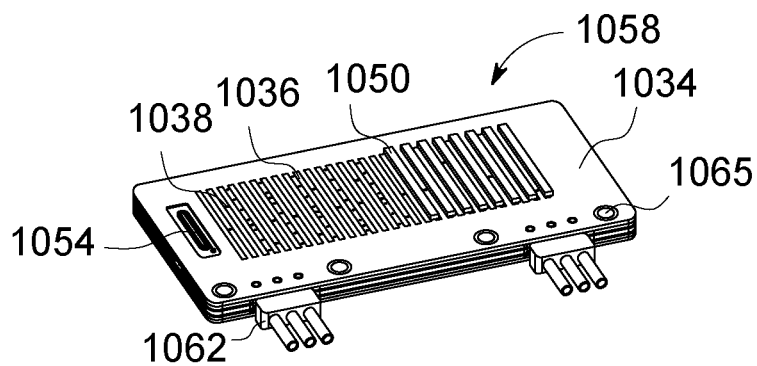
FIG. 15 shows the electric machine of FIG. 14 with upper permanent magnet carrier plate and most of the upper permanent magnets removed.
Figure 16:
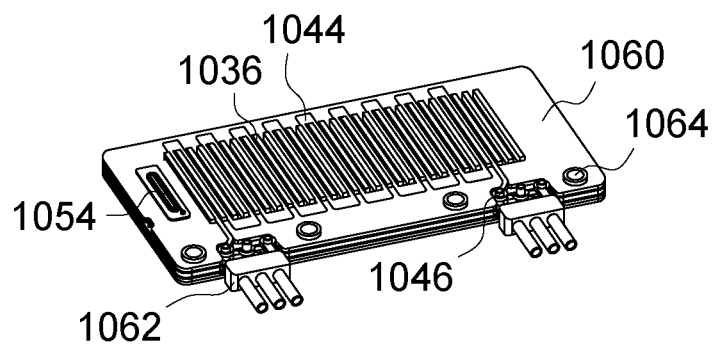
FIG. 16 shows the electric machine of FIG. 15 with all permanent magnets removed and the top insulator plate removed.
Figure 17:
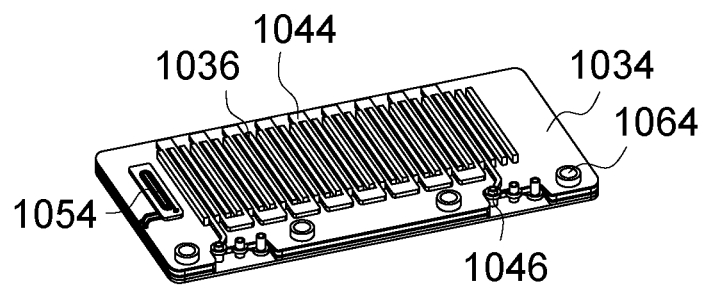
FIG. 17 shows the electric machine of FIG. 16 with the electrical connectors removed and the top spacer layer removed.
Figure 18:
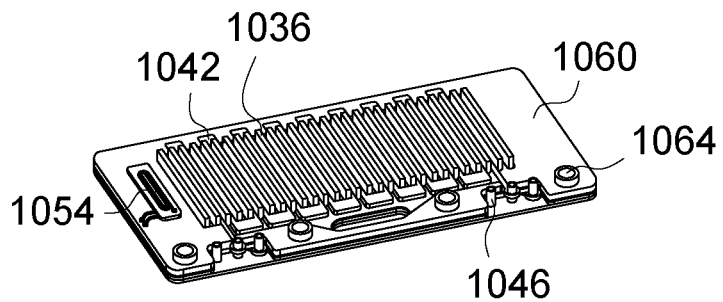
FIG. 18 shows the electric machine of FIG. 17 with the top phase circuit conductor removed and the second insulator layer removed.
Figure 19:
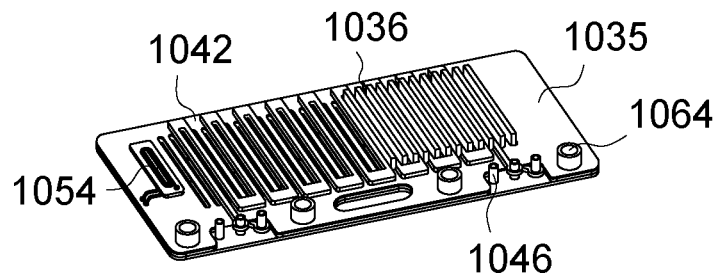
FIG. 19 shows the electric machine of FIG. 18 with the second spacer layer removed and most of the posts removed.
Figure 20:
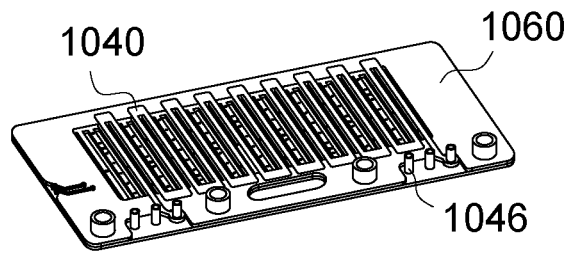
FIG. 20 shows the electric machine of FIG. 19 with the upper air core sensor, the second phase circuit, the structural cylindrical spacers, and the rest of the posts removed.
Figure 21:
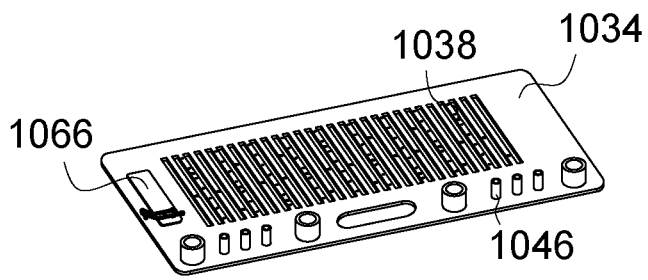
FIG. 21 shows the electric machine of FIG. 20 with the third phase circuit and the bottom spacer layer removed.
Figure 22:
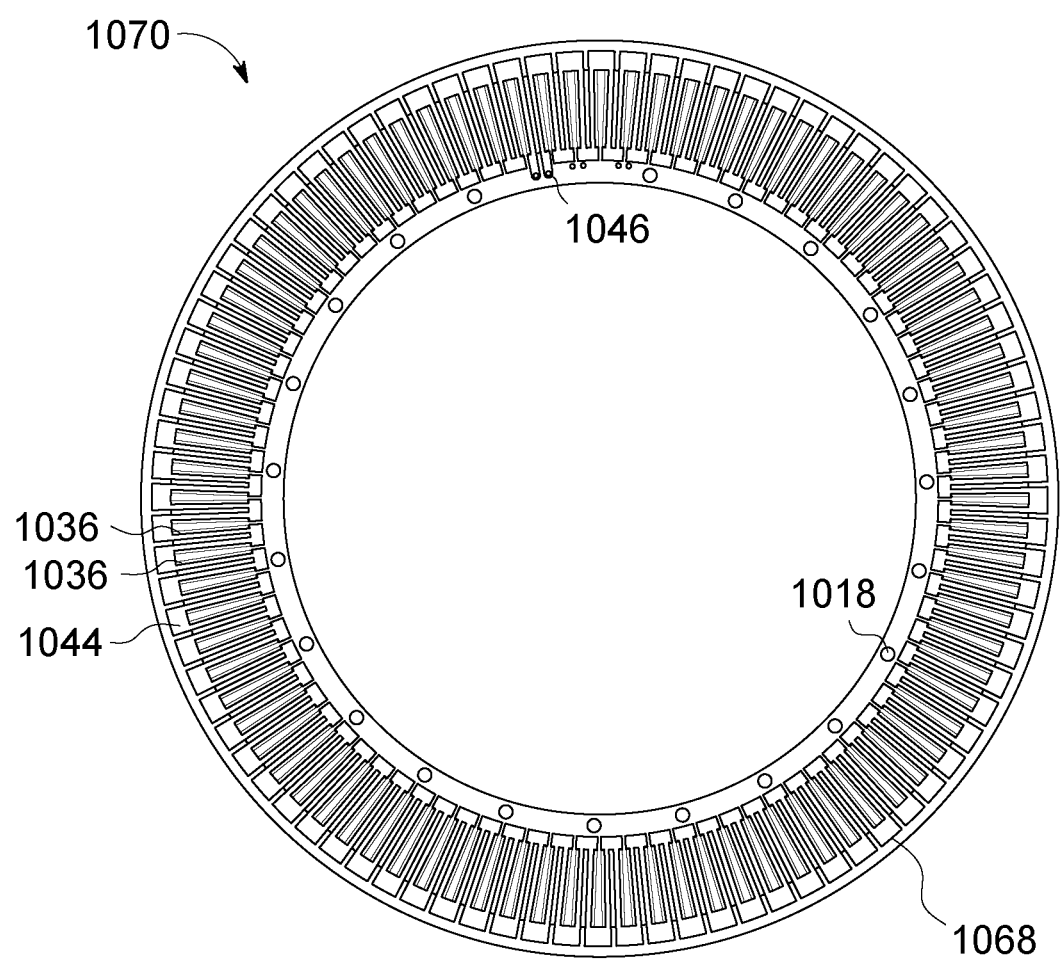
FIG. 22 shows the conductor circuits, posts, and potting compound ring for a non-limiting exemplary embodiment of an axial flux, rotary stator electric machine.
Figure 23:
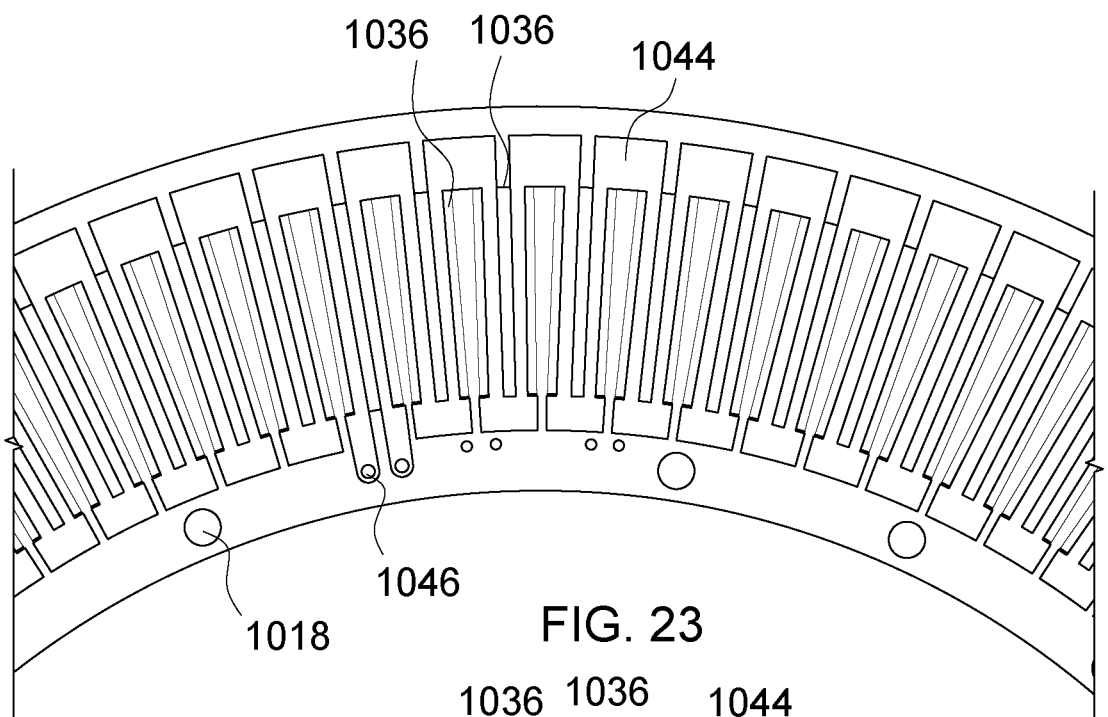
FIG. 23 shows a detail view of the stator in FIG. 22.
Figure 24:
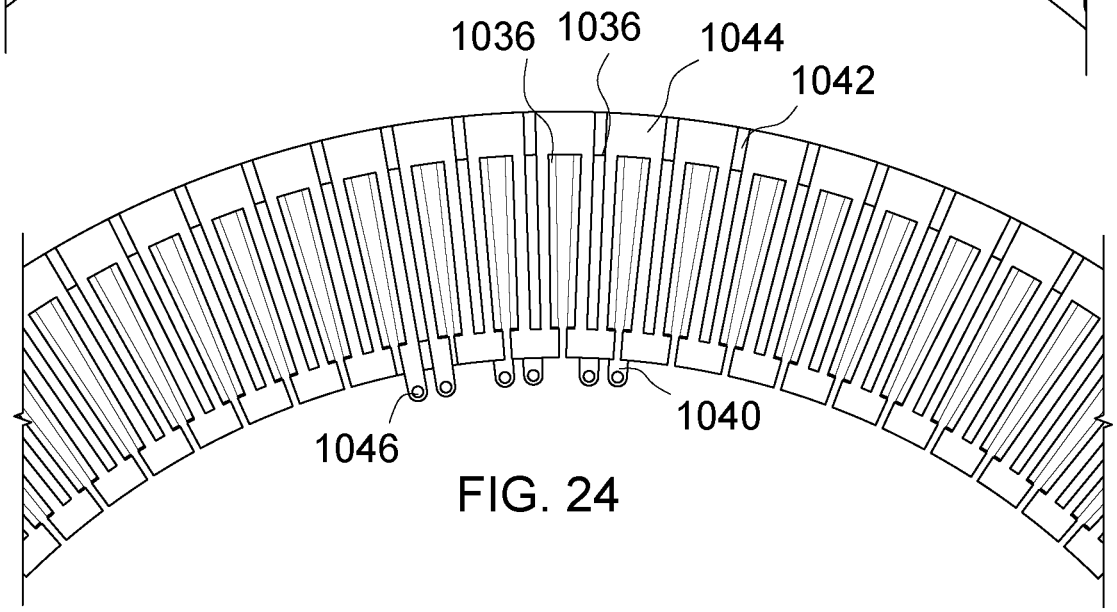
FIG. 24 an axial flux, rotary stator with three phases and one conductor circuit per phase, with the potting compound ring removed.
Figure 25:
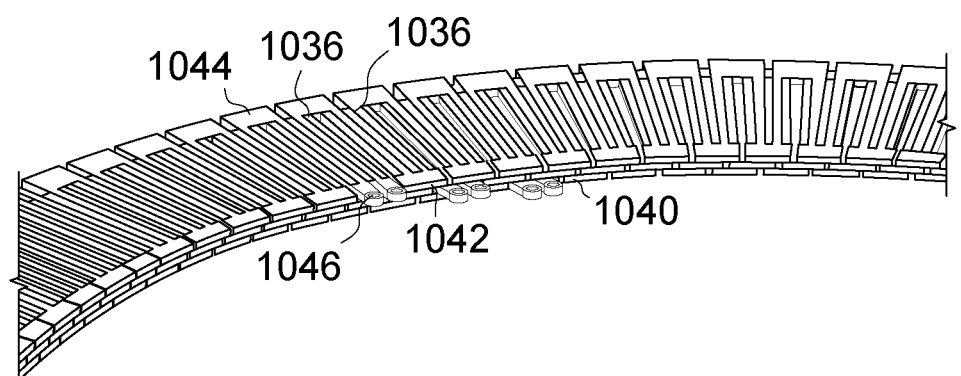
FIG. 25 is an isometric view of three phase circuits with soft magnetic material posts positioned by the aluminum circuits during assembly.
Figure 26:
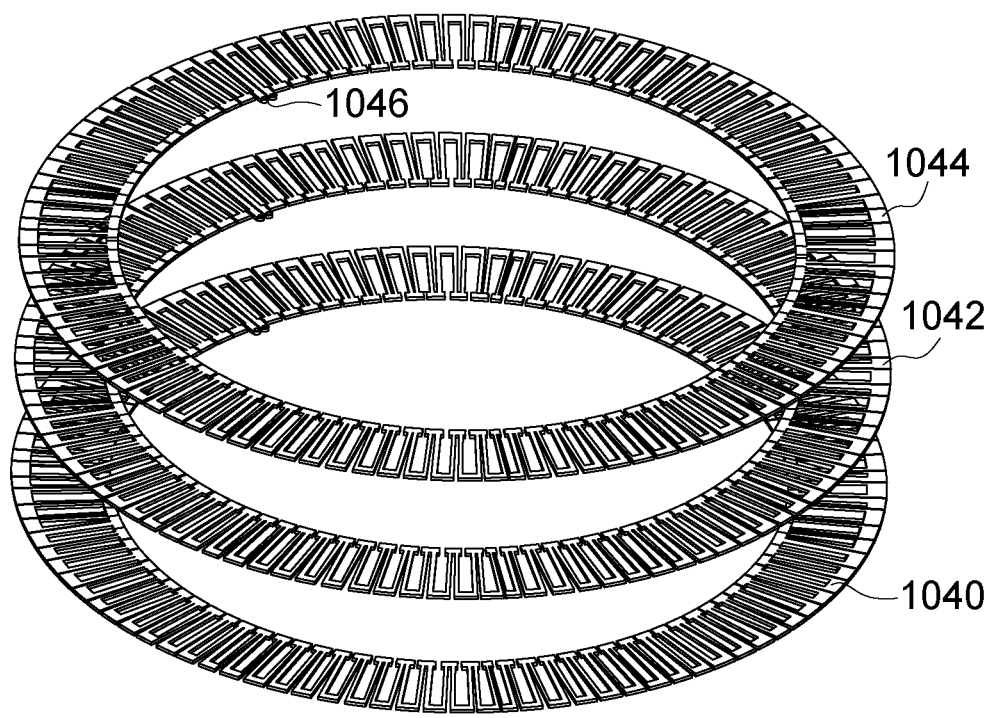
FIG. 26 is an exploded view of FIG. 25.
Figure 27:
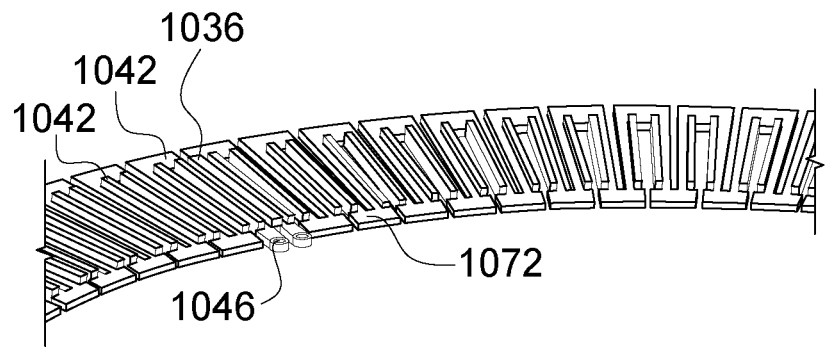
FIG. 27 is a close-up of an individual layer of the embodiment of FIG. 25 and FIG. 26.
Figure 28:
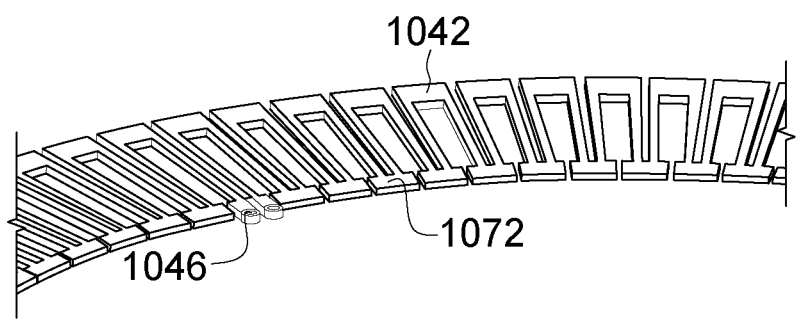
FIG. 28 is a close-up of an individual layer of the embodiment of FIG. 25 and FIG. 26.
Figure 29:
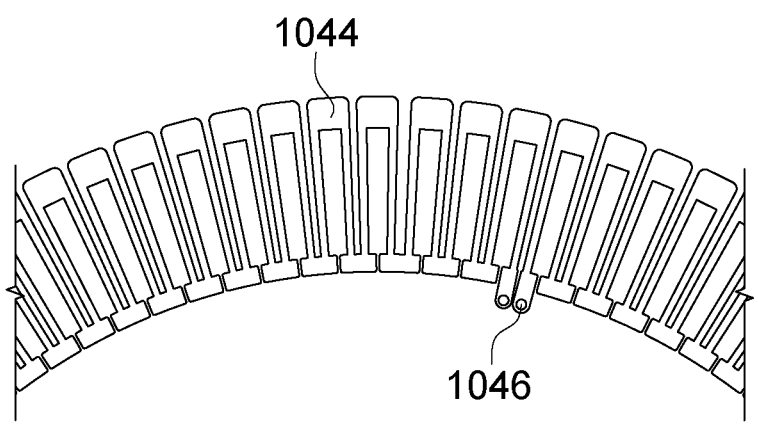
FIG. 29 is a top view detail of a single stator circuit.

The embodiment of FIG. 1 to FIG. 5 has 172 posts, but an electric machine with the proposed slot density may have greater or smaller number of posts. A minimum number of posts may be 100 posts to obtain sufficient torque density for some robotic applications. FIG. 5 shows a simplified schematic section view of the stator 1020 and rotor 1022 with schematic CAD model coils 1032 on the posts.

For a 4 phase configuration of an electric machine as disclosed, the number of posts may be divisible by 8, with a ratio of 4 posts to 3 permanent magnets. The permanent magnets may be arranged with an alternating radial polarity.

Exemplary Axial Flux Electric Machine

Figure 30:
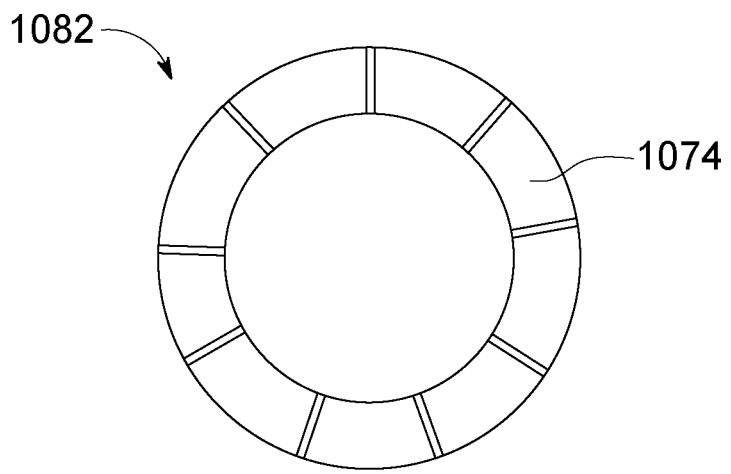
FIG. 30 shows sections of an axial flux electric machine.
Figure 31:
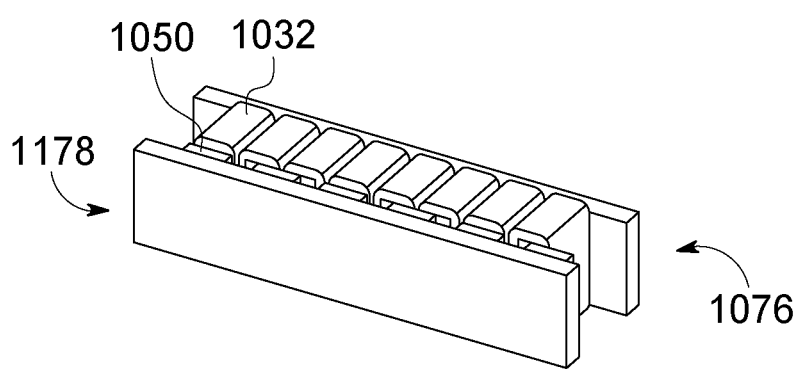
FIG. 31 shows an array of electromagnetic elements (here, coils) in a linear electric machine facing electromagnetic elements (here, permanent magnets) across an airgap.

An embodiment may comprise individually controlled stator sectors, where apart from producing torque a secondary purpose of the controllers for the said stator sectors will be to keep the rotor alignment with the said sectors, and to possibly eliminate the need for rolling and/or sliding contact bearings altogether. Each section may comprise an individual multiphase BLDC motor driver. Considering an embodiment with a hollow disk shape like the multi-sectional actuator 1082 shown in FIG. 30 one can argue that to some degree every arc sector 1074 must act more or less like a linear actuator (illustrated in FIG. 31), and so long as every linear actuator is maintaining its linear (in this case circumferential) motion or position, each corresponding section of the rotor at a given moment will be positioned circumferentially, such that the stator and rotor will be held coaxially. It is clear from the drawing that every stator sector 1076 is only responsible for a primarily tangential force that can make the corresponding sector 78 of the rotor move back and forth tangentially. Even if the stator and the rotor are not mechanically coupled with a bearing, the possibility of maintaining axial alignment by properly commutating individual sectors 1074 is real. One could say that the proposed idea is in a way a combination of torque producing device, and a self-aligned dynamic magnetic bearing.

Figure 32:
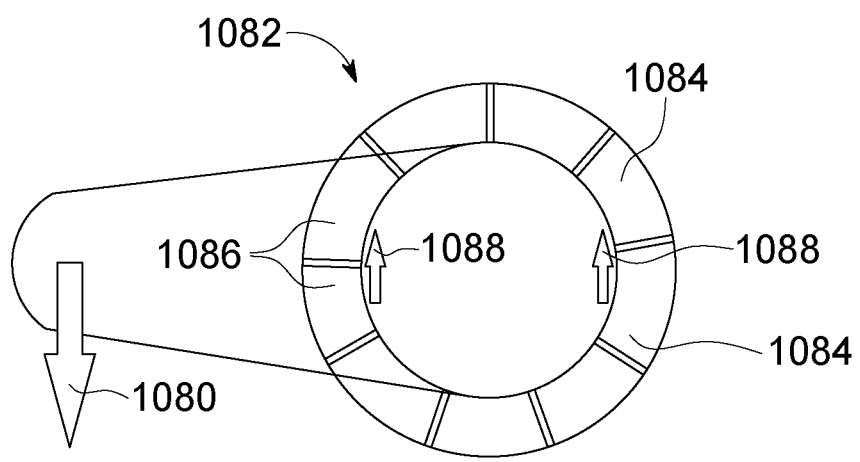
FIG. 32 illustrates a sectioned axial flux electric machine with a load arm.
Figure 33:
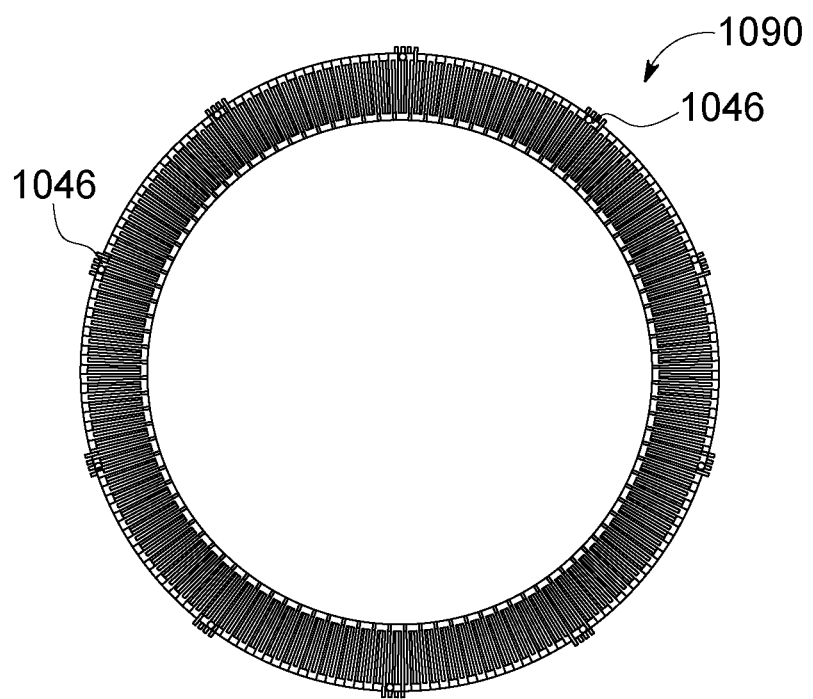
FIG. 33 shows a stator of an axial flux electric machine.
Figure 34:
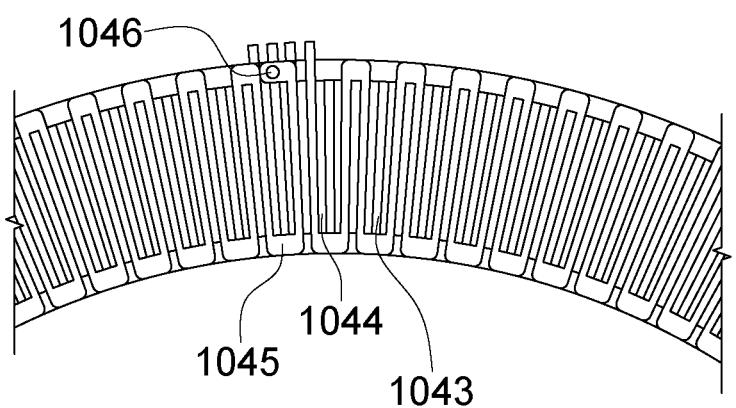
FIG. 34 is detail of the stator of FIG. 33.
Figure 35:
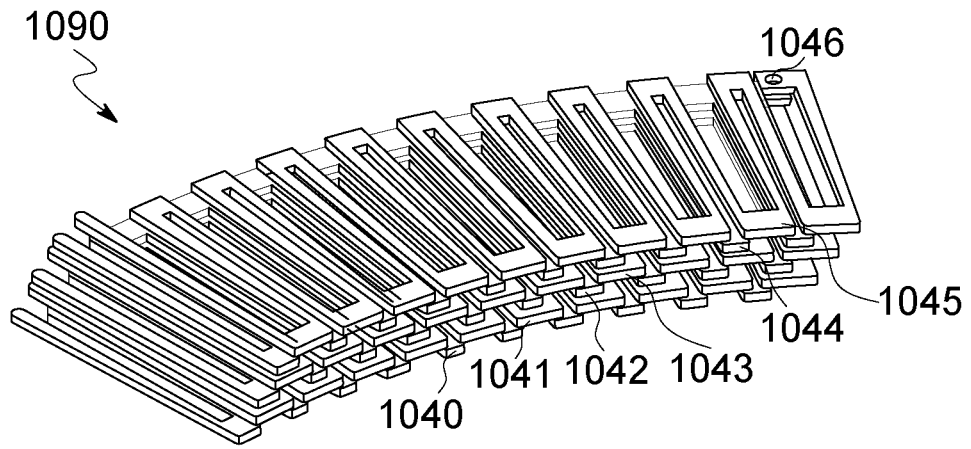
FIG. 35 is detail of electric conductor layers for use in the stator of FIG. 33.
Figure 36:
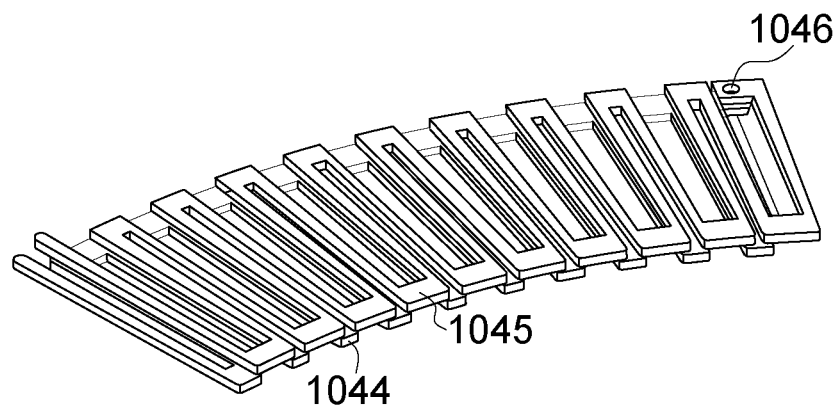
FIG. 36 is further detail of electric conductor layers for use in the stator of FIG. 33.
Figure 37:
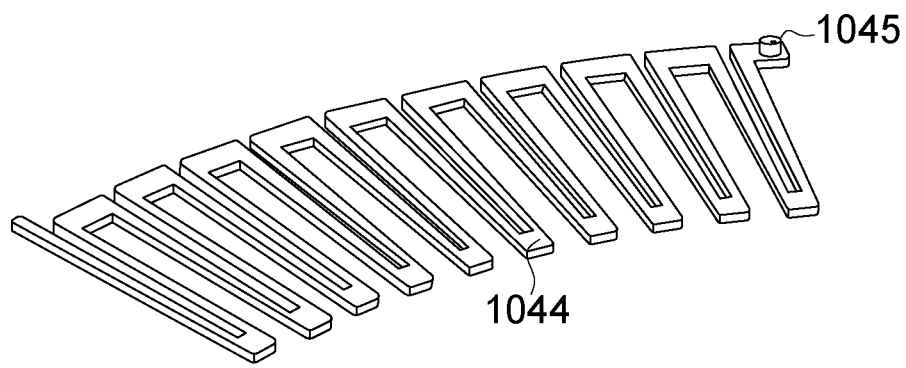
FIG. 37 is further detail of an electric conductor layer for use in the stator of FIG. 33.
Figure 38:
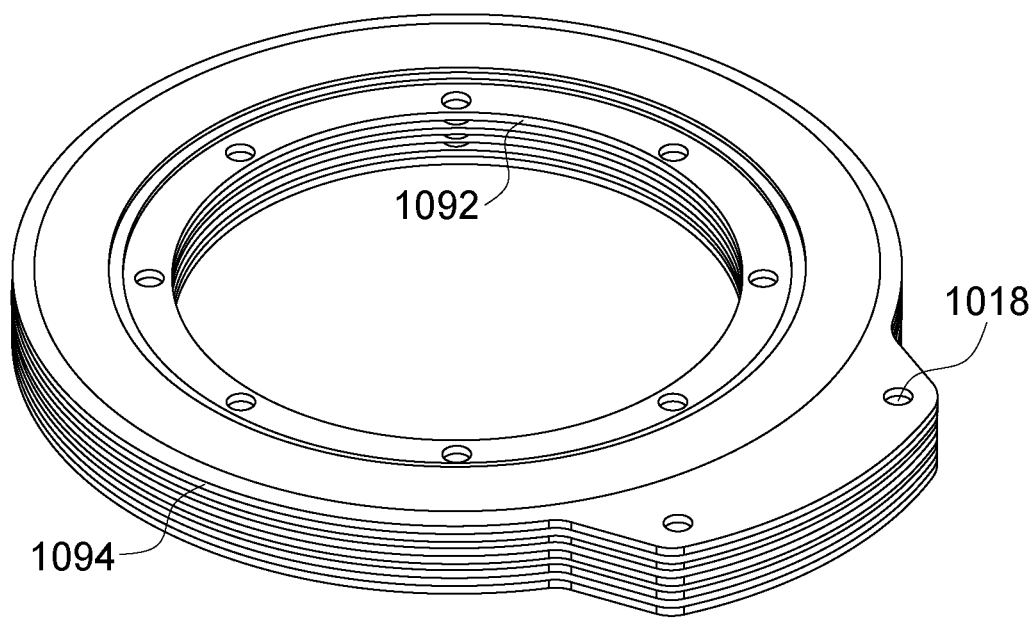
FIG. 38 shows electric conductor layers of the stator of FIG. 33.
Figure 39:
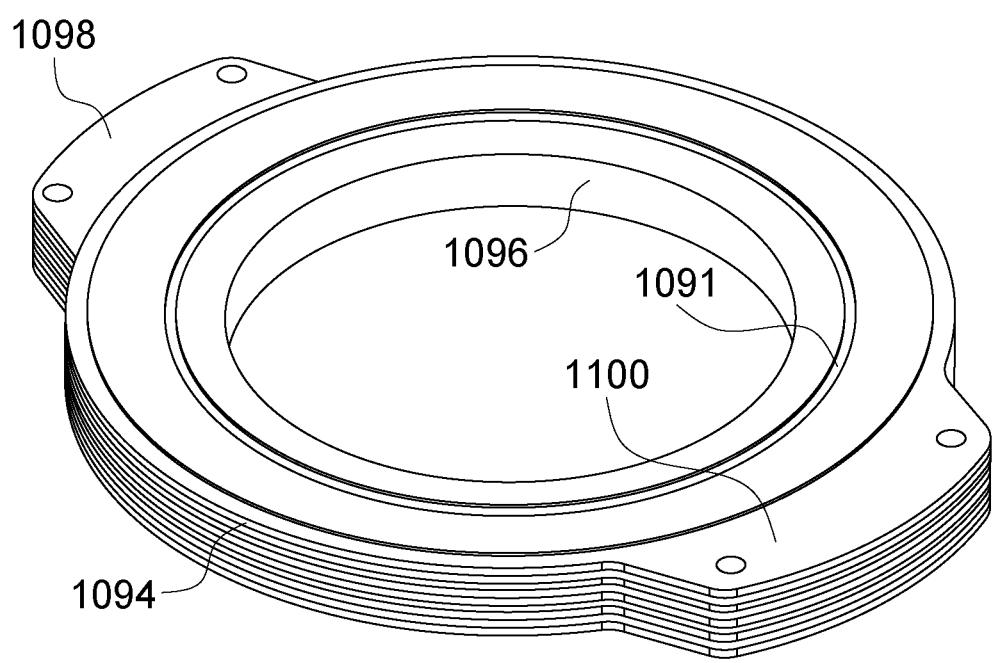
FIG. 39 shows electric conductor layers of the stator of FIG. 33.
Figure 40:
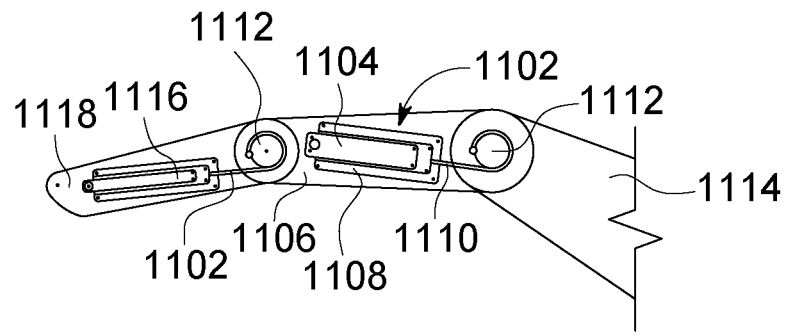
FIG. 40 shows an embodiment of robotic arms that may be equipped at the joints with an embodiment of the disclosed electric machine.
Figure 41:
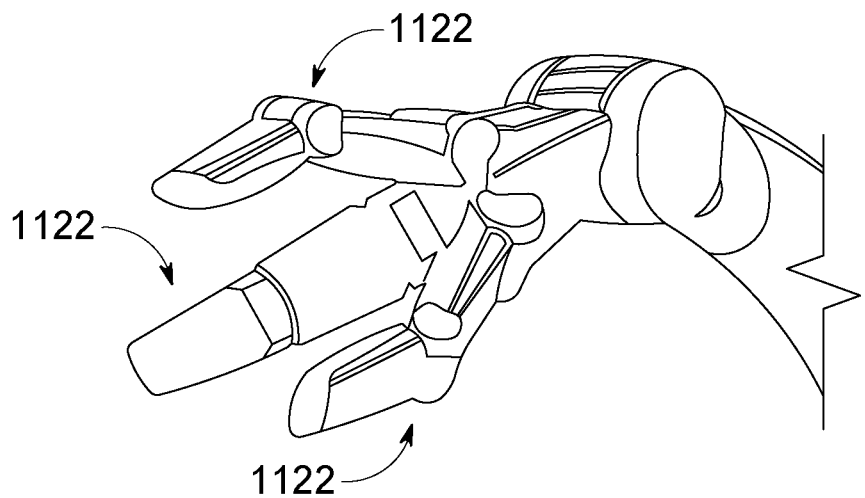
FIG. 41 shows an embodiment of robotic arms that may be equipped at the joints with an embodiment of the disclosed electric machine.

An embodiment of an electric machine may be used with a long lever, such as a robotic arm, with a weight at the end, mounted horizontally on the rotational part of the actuator 1082 as shown in FIG. 32. If the actuator is mounted vertically, that is with a horizontal axis, the rotor assembly will experience a downward force 1080 and the individual sectors 1084 and 1086 that are diametrically opposed on the horizontal axes will experience a slight vertically downward displacement. An encoder at each of the stator sectors will register this displacement and the motor driver and controller will shift the power input to those sectors to maintain the correct stator-to-rotor tangential alignment of those sectors. This will create a vertical lifting force 1088 to counter the vertically downward force on the arm, and the rotor will, therefore, be maintained coaxially within a predetermined tolerance by the active control of the individual sectors. This is demonstrated in FIG. 32. All other sections are creating torque as they would normally do. To the controller that is simply an increase in force (torque) in one of two possible directions, and because it is only one of two it won't be a complicated addition to the driving algorithm to any existing motor drive.

Exemplary Magnet Configuration for Electric Machine

Figure 42:
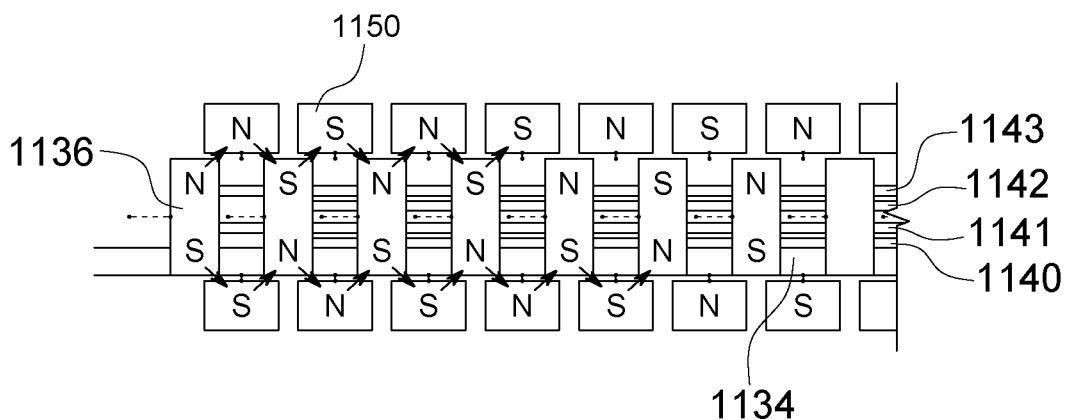
FIG. 42 shows a magnet configuration for an embodiment of the disclosed electric machine.
Figure 43:
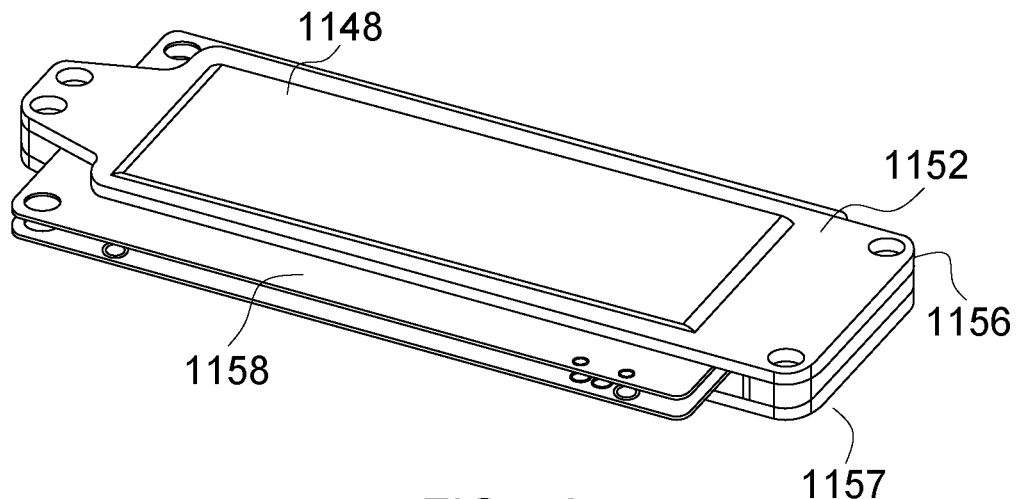
FIG. 43 is a first figure of detail showing successive layers of a linear electric machine.
Figure 44:
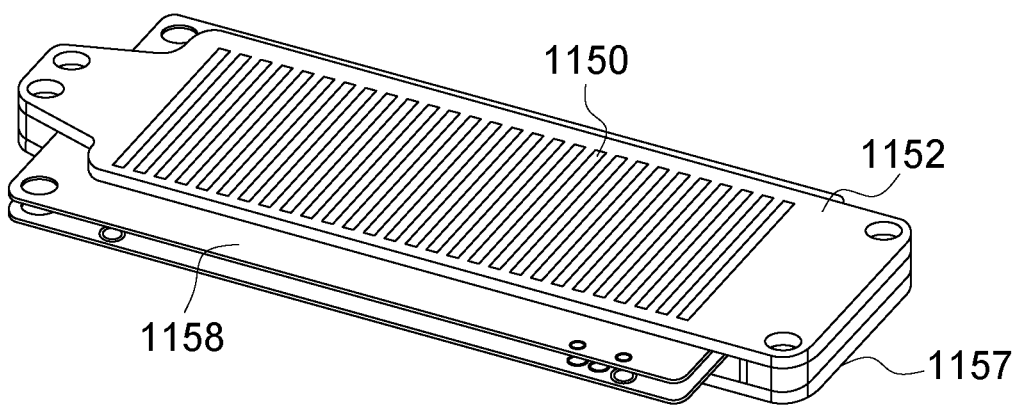
FIG. 44 is a second figure of detail showing successive layers of a linear electric machine.
Figure 45:
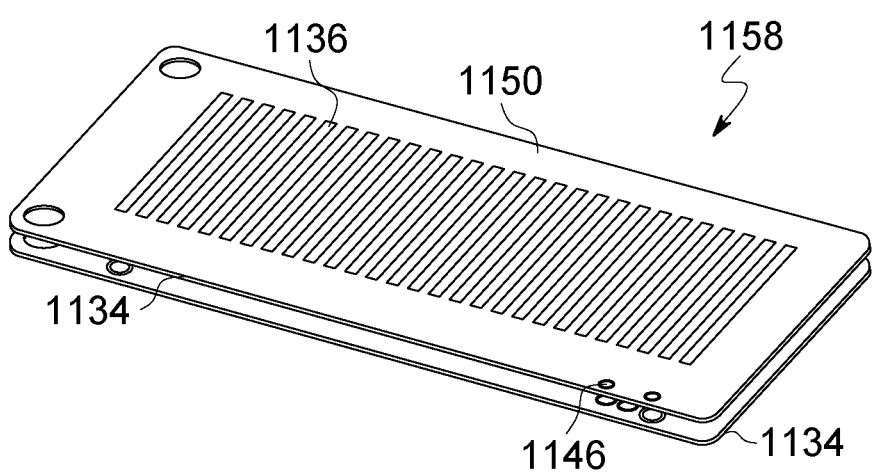
FIG. 45 is a third figure of detail showing successive layers of a linear electric machine.
Figure 46:
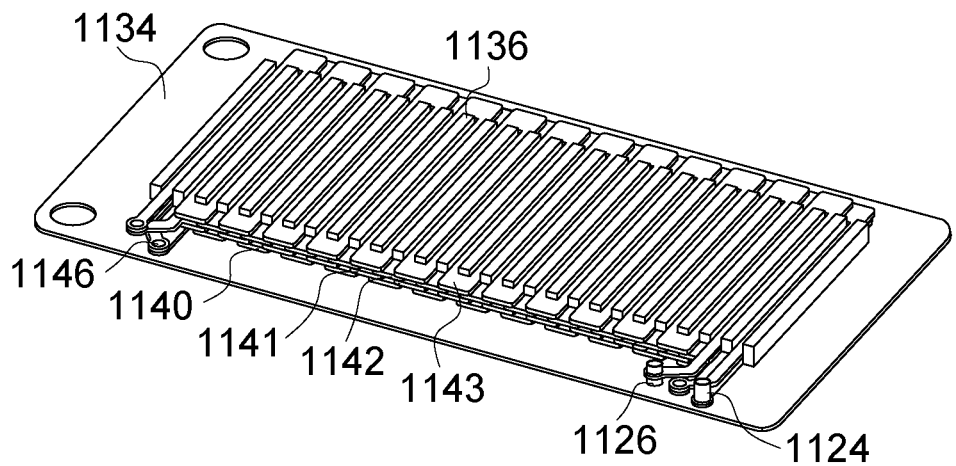
FIG. 46 is a fourth figure of detail showing successive layers of a linear electric machine.
Figure 47:
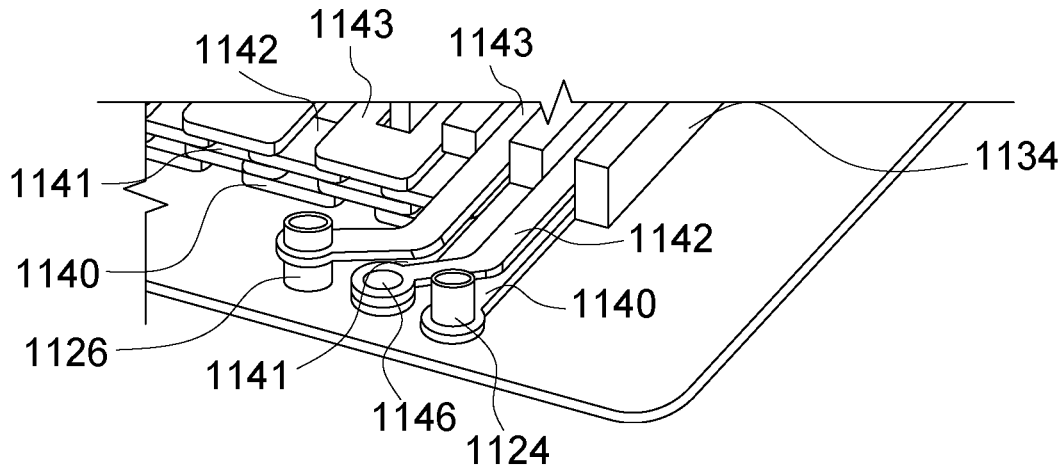
FIG. 47 shows details of connections for connecting layers of a linear electric machine to a multiphase source of electric excitation
Figure 48:
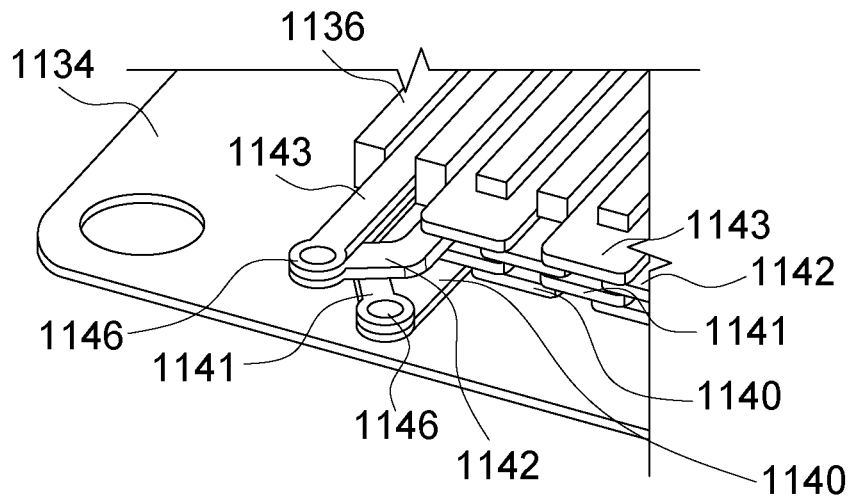
FIG. 48 shows details of connections for connecting layers of a linear electric machine to a multiphase source of electric excitation
Figure 49:
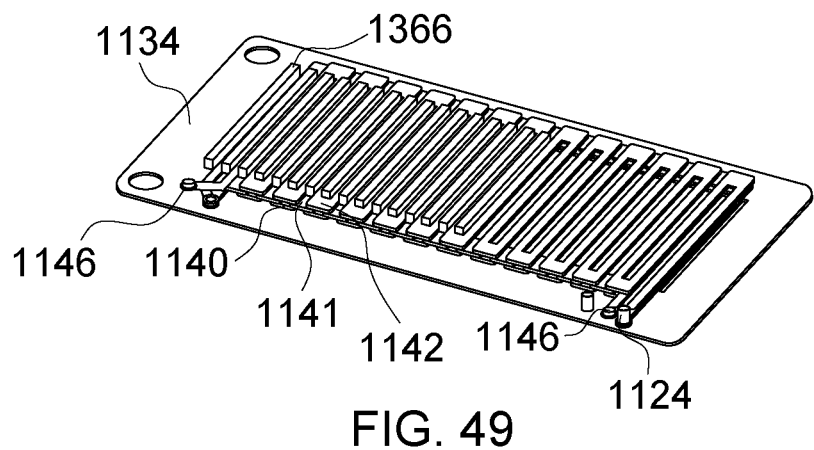
FIG. 49 is a first figure showing successive layers of an embodiment of a liner electric machine.
Figure 50:
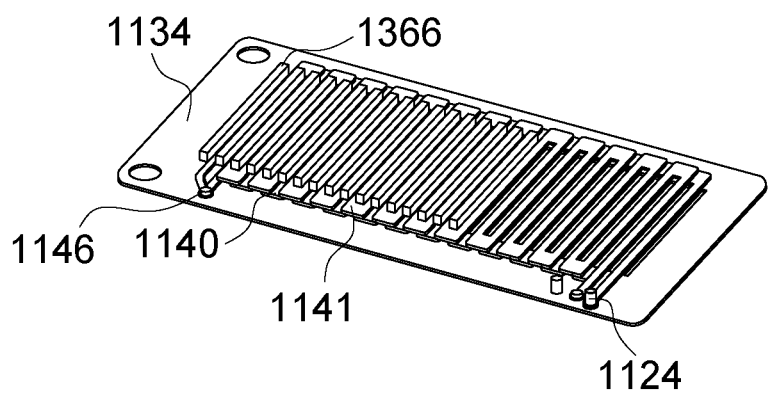
FIG. 50 is a second figure showing successive layers of an embodiment of a liner electric machine.
Figure 51:
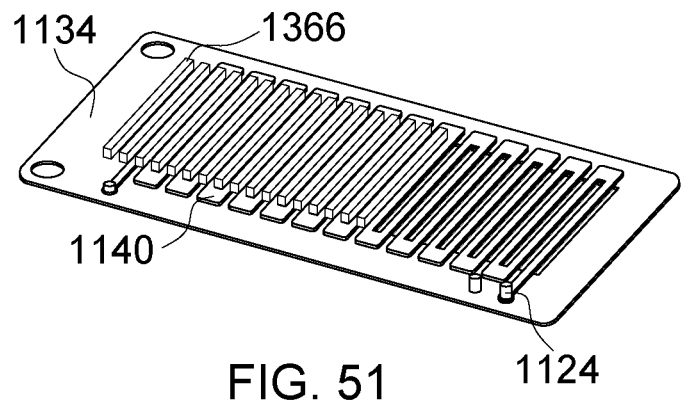
FIG. 51 is a third figure showing successive layers of an embodiment of a liner electric machine.
Figure 52:
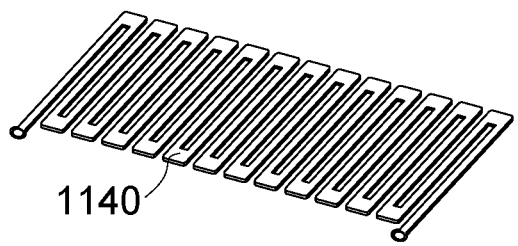
FIG. 52 is a fourth figure showing successive layers of an embodiment of a liner electric machine.
Figure 53:
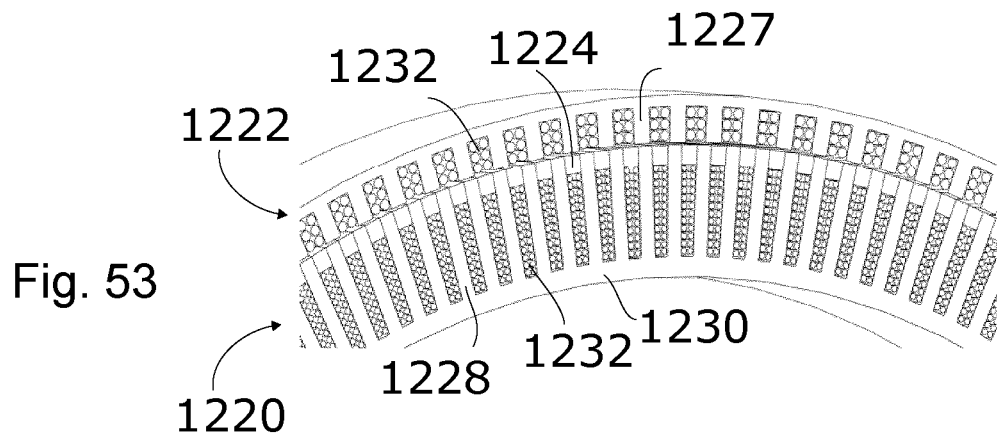
FIG. 53 shows an embodiment of an electric machine with coils in both rotor and stator.
Figure 54:
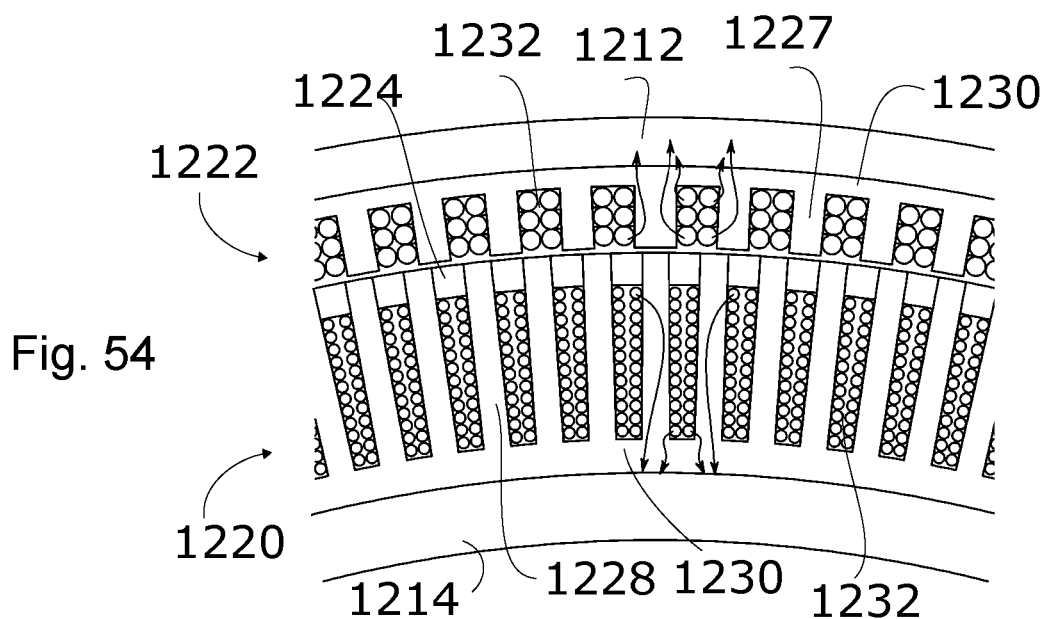
FIG. 54 shows an embodiment of an electric machine with coils in both rotor and stator.
Figure 55:
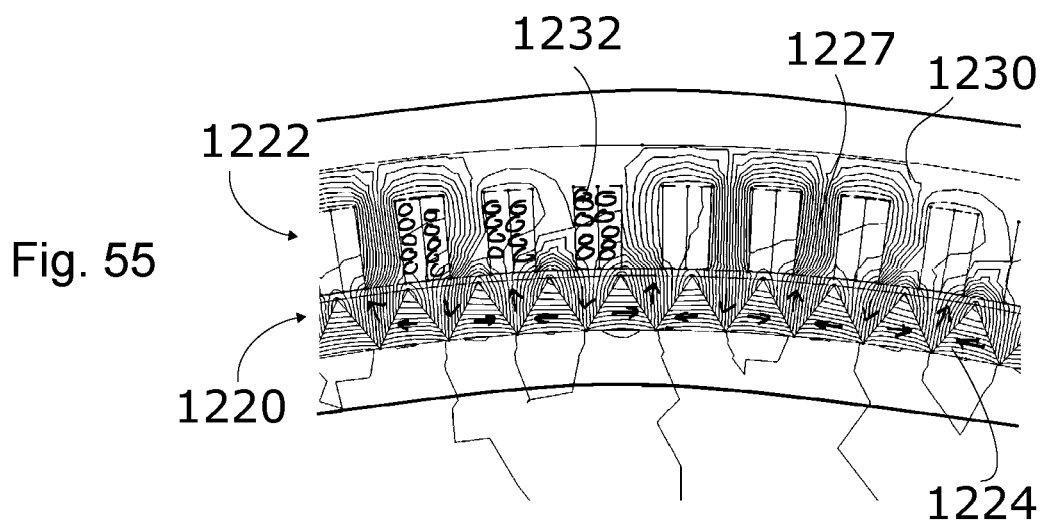
FIG. 55 shows an embodiment of an electric machine with a Hallbach array of magnets.

FIG. 42 illustrates an embodiment of alternating polarity magnets 1050 on either side of a layered arrangement of electrical conductor layers 1140 to 1143 with posts 1136 seated in insulating layers 1134. This illustration shows an axial flux embodiment, which may be either rotary or linear.

The layered actuator of FIG. 42 may be manufactured by any of the methods in this disclosure, such as, but not limited to using PCB manufacturing techniques, or an assembly of pre-fabricated components. To reduce the current required to produce a given linear force, more than a single layer of electrical conductors may be used. Each layer 1140 to 1143 may have a separate insulator layer between it and the next layer, or each conductor layer can be insulated individually (similar to conventional wire insulation) before or during the assembly process so a separate insulation layer is not needed between the conductor layers.

With a single phase device, for a non-limiting example, as shown in FIG. 42, the EM posts are not commutated. A positive or negative current is applied to the single phase to create a force and/or movement of the PM carrier in one direction or the other. The approximate total travel of the output will therefore be the post pitch. An advantage of this device is the reduced complexity of the motor controller which only needs to provide a variable positive and/or negative current to produce movement or force of the PM carrier relative to the stator.

Exemplary Axial Flux Electric Machine with Layered Construction

Figure 59:
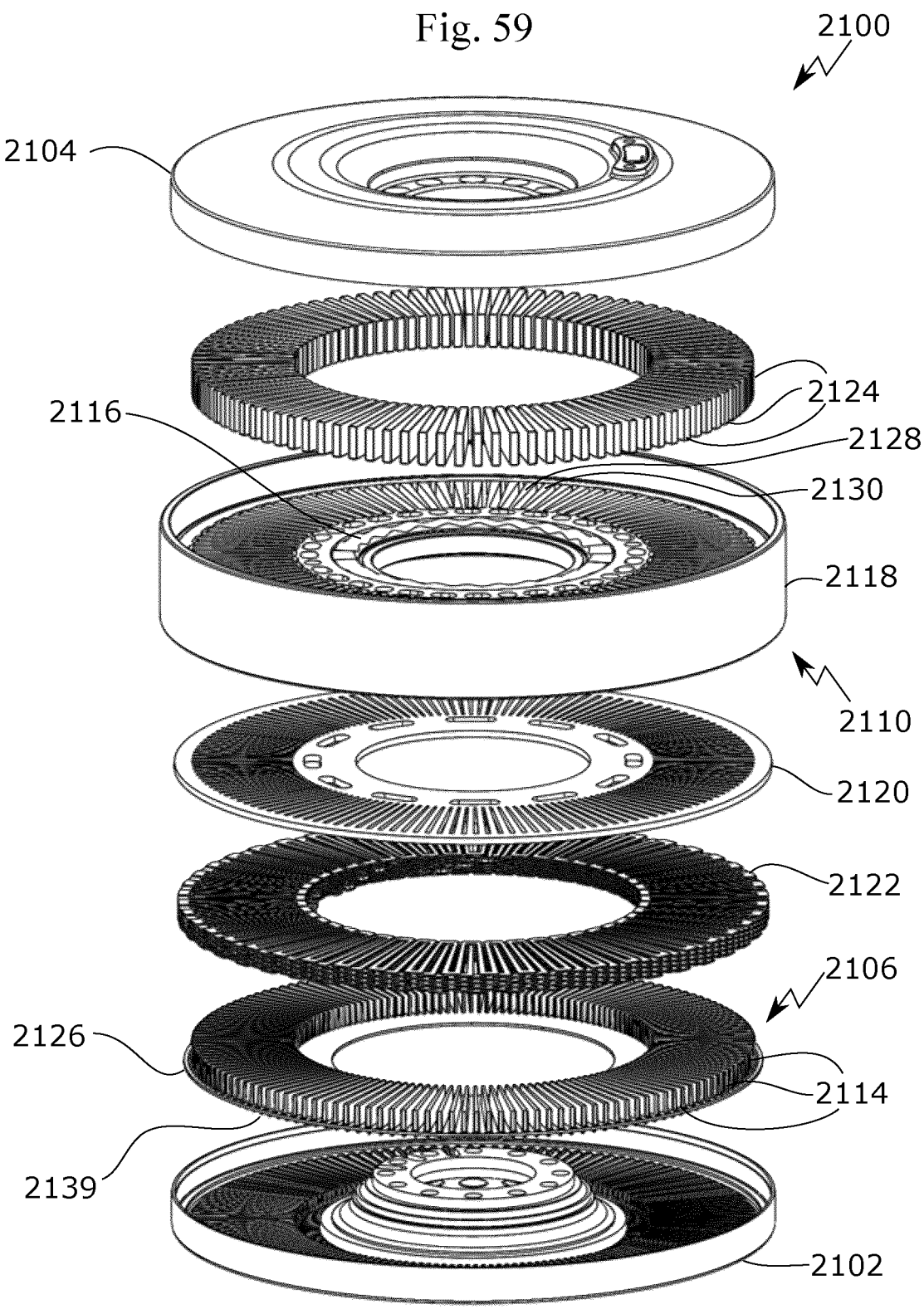
FIG. 59 shows an exploded view of the exemplary embodiment in FIG. 56.
Figure 60:
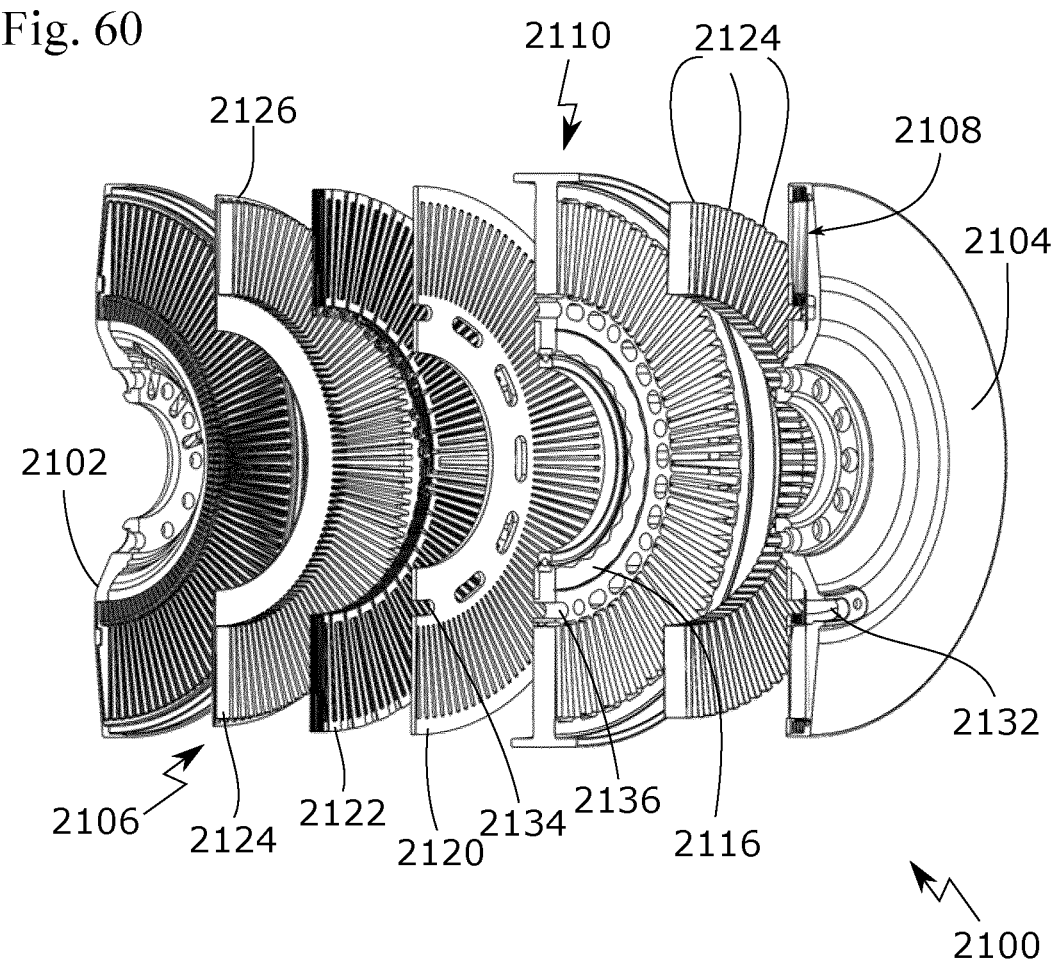
FIG. 60 shows a cross section of a partially exploded view of the exemplary embodiment in FIG. 56.

In an embodiment shown in FIG. 59 and FIG. 60, an array of tangentially magnetized permanent magnets 2124 are magnetized tangentially in the sequence NSSNNSSNNSSNNS . . . . Such that every first radial flux path member 2128 on the rotor 2110 is N polarity at both axial ends and every second flux path member 2130 is S polarity at both axial ends. The rotor 2110 includes a sinusoidal surface 2116 which can be used in conjunction with an encoder such as, but not limited to an eddy current sensor, an optical sensor, or other sensor to provide radial position of the rotor 2110 for the motor controller. Many other types of encoders can be used with embodiments of this device. The cylindrical section 2118 of the rotor 2110, serves to provide an attachment surface from the rotor 2110 to an output, such as a robotic arm, and to provide stiffness to the rotor 2110. This cylindrical member 2118 can be one piece with the rotor 2110, or it can be a separate component such as, but not limited to an aluminum ring which is assembled to the disk by thermal expansion and/or otherwise attached to the disc section of the rotor 2110. Separator discs 2120 may be used to seal and contain the conductors 2122 in the slots between the stator posts 2114. If separator discs 2120 are used, they may be of a non-electrically conductive material such as Torlon™ (a polyamide-imide) or other non-metallic material to prevent eddy currents. The conductors 2122 may be of any construction, including wires, but may be a layered construction, as shown here. Conductors may be of any material including copper or aluminum.

FIG. 60 shows a section view of the device from FIG. 56 with the housing 2102 and stator 2106 assembly exploded, the rotor 2110 and magnets 2124 exploded, and the housing 2104 and stator 2108 are assembled. An airflow inlet 2132 is shown on the housing 2104 with cross-flow openings 2134, 2136 in the separator disk 2120 and the rotor 2110 to allow cooling fluid flow from one side of the actuator 2100 to the opposite stator.

Figure 61:
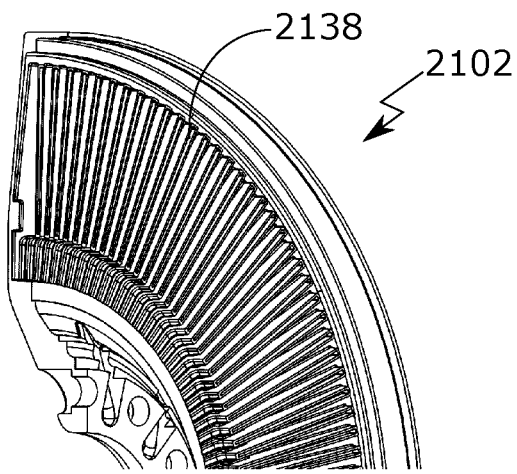
FIG. 61 show a section detail view of a housing of the exemplary embodiment in FIG. 56.

FIG. 61 is a section detail view of housing 2102. The inside surface of the housing 2102 has an array of receiving slots 2138 for the array of fins 2139 on the back surface of the stator 2106. These receiving slots 2138 serve to secure the back surface of the stator 2106 to the housing 2102, and also to transmit heat conductively from the back surface of the stator 2106 to the housing 2102. The volume between the stator 2106 and the housing 2102, and between the receiving slots 2138 may be used as a fluid flow chamber to draw heat away from the back surface of the stator 2106 and the internal surfaces of the housing. Gas or liquid can be circulated through this chamber by means of a pump or compressor (not shown). The cooling effectiveness of the disclosed slot geometry allows for high performance to be achieved with air as a cooling fluid in many applications. The use of air instead of liquid has many potential advantages including lower cost and weight and the elimination of concerns about leakage in many applications.

Figure 62:
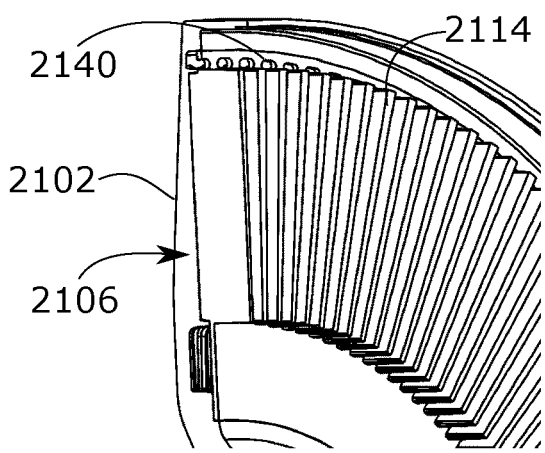
FIG. 62 shows a section of an assembled housing and stator of the exemplary embodiment in FIG. 56.

FIG. 62 shows the stator 2106 assembled to the housing 2102. In this exemplary embodiment the stator 2106 comprises an array of axially extending radially aligned posts 2114 with a slot density and conductor volume within the disclosed ranges. An array of fluid ports 2140 is shown on the stator 2106 to provide an inlet or outlet for fluid in the chambers between the stator 2106 and the housings 2102 and 2104.

Figure 63:
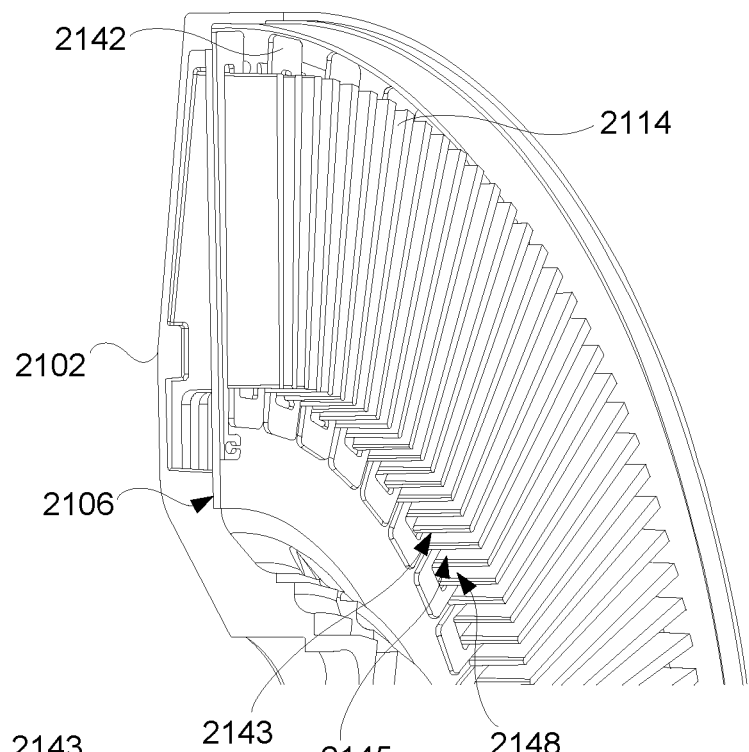
FIG. 63 shows a section of an assembled housing and stator of the exemplary embodiment in FIG. 56 with the first conductor layer on the stator.
Figure 64:
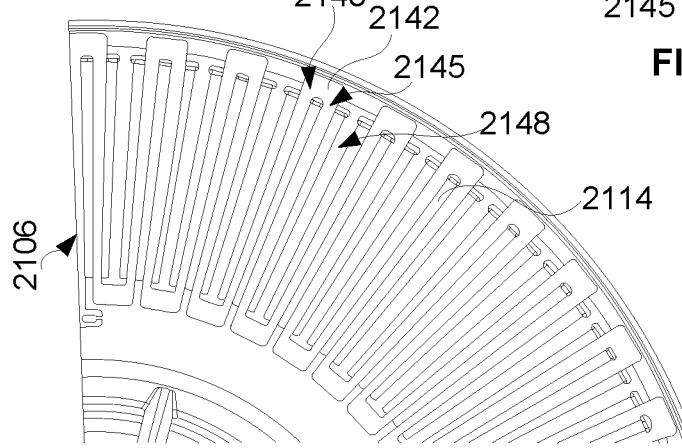
FIG. 64 shows a plan view of the section in FIG. 63.

FIG. 63 shows the stator 2106 assembled to the housing 2102 with the first conductor layer 2142 of phase A of the 3:2 stratified conductor configuration of an embodiment of an electric machine. Each layer of a phase of this embodiment of the conductors occupies a single axial layer on the stator 2106 with no other conductors from other phases on that same layer. A conductor 2142 on a layer occupies two slots 2143, 2145 in sequence and then skips a slot 2147 so that a first slot 2143 on a layer has a conductor 2142 from a phase providing current flow in one radial direction, a second slot 2145 on that layer has a conductor 2142 from that phase providing current flow in the opposite radial direction, and a third slot 2147 on that layer has no conductor. This conductor shape and sequence of one conductor layer 2142 in one phase is shown in FIG. 64.

Figure 65:
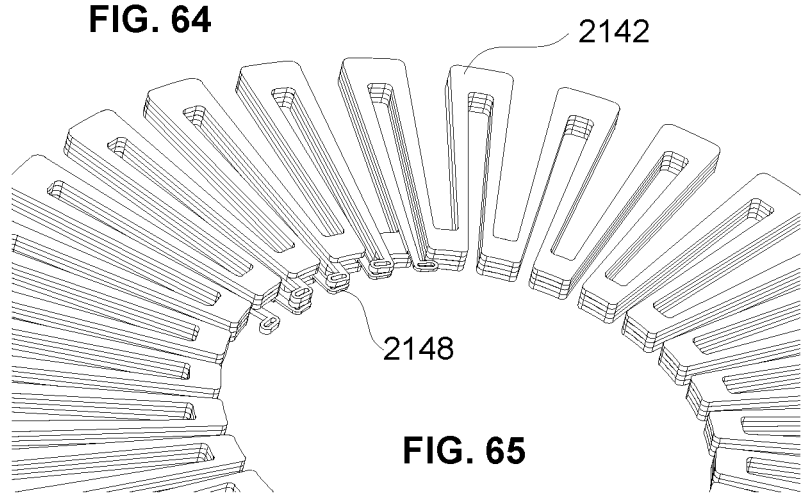
FIG. 65 shows four conductor layers of the same phase from the exemplary embodiment in FIG. 56.

FIG. 65 shows four layers of conductors 2142 of the same phase with the stator 2106 and conductors from other phases removed for clarity. Axial inserts 2148 connect the end of each conductor 2142 from a phase on a layer with the start of another conductor 2142 from the same phase on a different layer.

Figure 66:
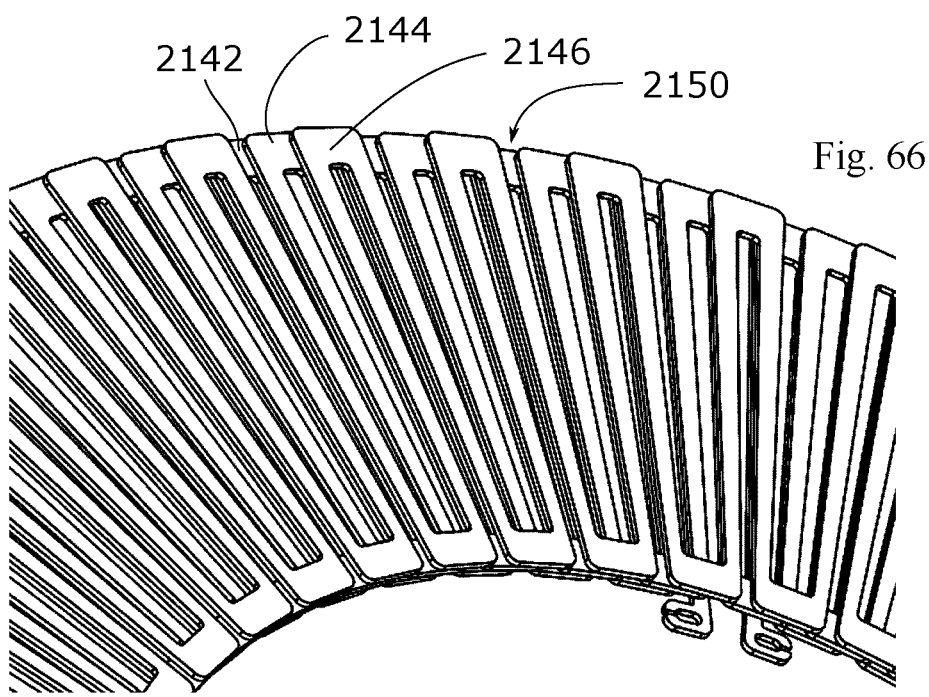
FIG. 66 shows the arrangement of three adjacent conductor layers from different phases from the exemplary embodiment in FIG. 56.
Figure 67:
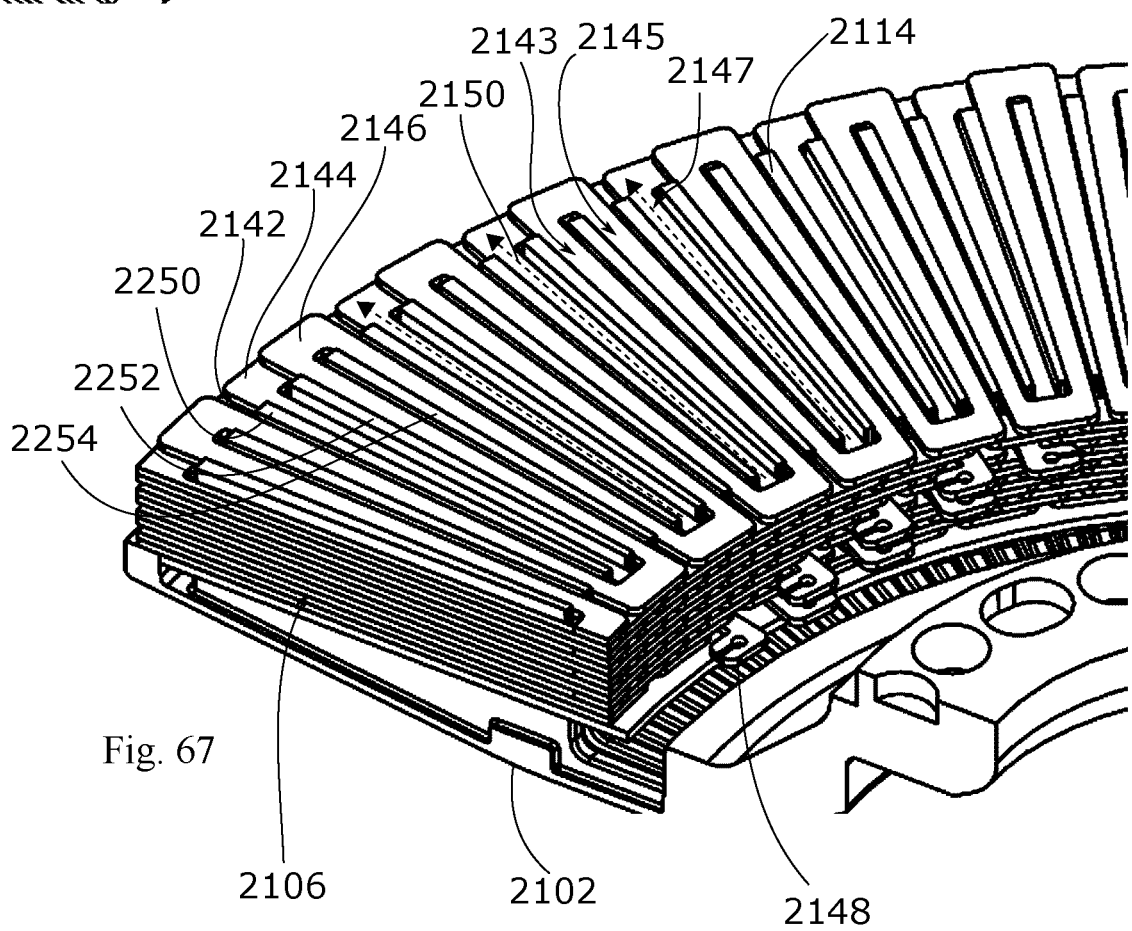
FIG. 67 shows a section of an assembled housing and stator from the exemplary embodiment in FIG. 56 with radial fluid flow channels between conductors indicated.

FIG. 66 shows the conductor arrangement in the exemplary embodiment 2100 with one conductor layer 2142 from each phase. The end-turns of one conductor layer 2142 overlap the end-turns of the next conductor layer 2144 in such a way as to provide a fluid flow passage 2150 radially (outward in this example but fluid can flow in either direction) between layers in a slot. Stator posts are not shown in this FIG. 66. In FIG. 67, the fluid flow channel in every third slot 2147 on the same layer is shown by the dashed arrow lines in three exemplary slots. Every first post 2250 on the stator 2106 has a conductor 2142 from phase A on either tangential side. Every second post 2252 on the stator 2106 has a conductor 2144 from phase B on either tangential side. And every third post 2254 on the stator 2106 has a conductor 2146 from phase C on either tangential side.

Figure 68:
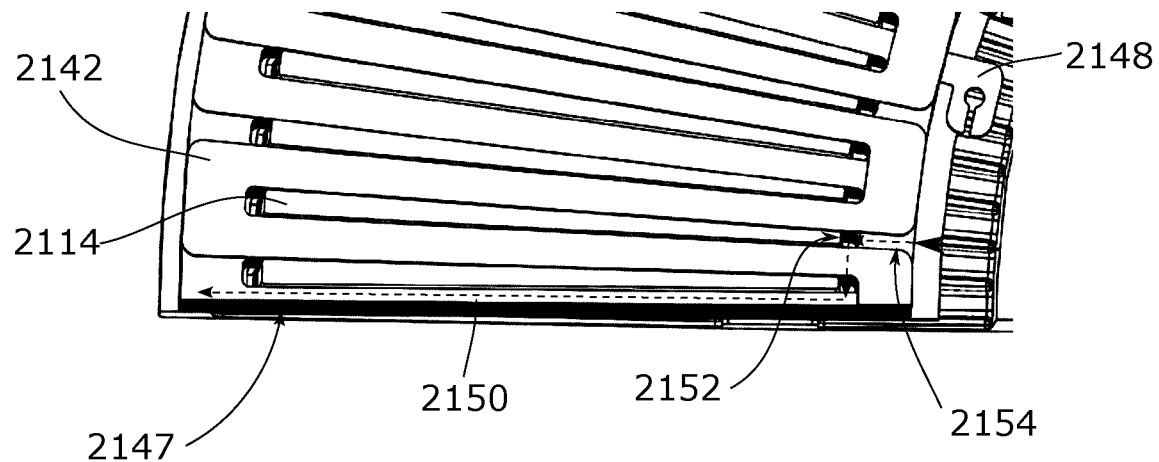
FIG. 68 shows a plan view of the radial, axial and circumferential fluid flow paths for cooling fluid between the conductors of the exemplary embodiment in FIG. 56.

This stratified winding configuration allows radial cooling fluid flow in the spaces between the conductors between the posts, but the end-turns seal the slots from radial access to the channels in the slots. To provide flow to the radial channels 2150, the conductors 2142 are pre-formed with an axial flow path 2152 at the end of each of the posts 2114 as shown in FIG. 68. This axial flow path 2152 allows for the radial fluid flow in a channel 2150 in a slot 2147 to flow circumferentially at the end of a post 2114 and then axially in the axial fluid path 2152, and then radially outward (or inward depending on coolant flow direction) in the radial flow channel 2150 on a different layer.

This flow path is shown in FIG. 68 where the thick arrow shows the airflow up to the inlet channel 2154 which is radially aligned with a post 2114. The thick dashed arrow shows the radial flow in the inlet channel 2154. The fine dashed line indicates the tangential flow across the end of the post 2114, and then axial flow in the space 2152 at the end of the post 2114. The long dashed line indicates the flow radially outward in the channel 2150 between the conductors 2142. By creating an axial flow path 2152 at the end of the posts 2114 in this way, the cooling fluid has multiple routes where it can flow tangentially and axially to connect inlet and discharge air to the radial flow channels 2150.

Figure 69:
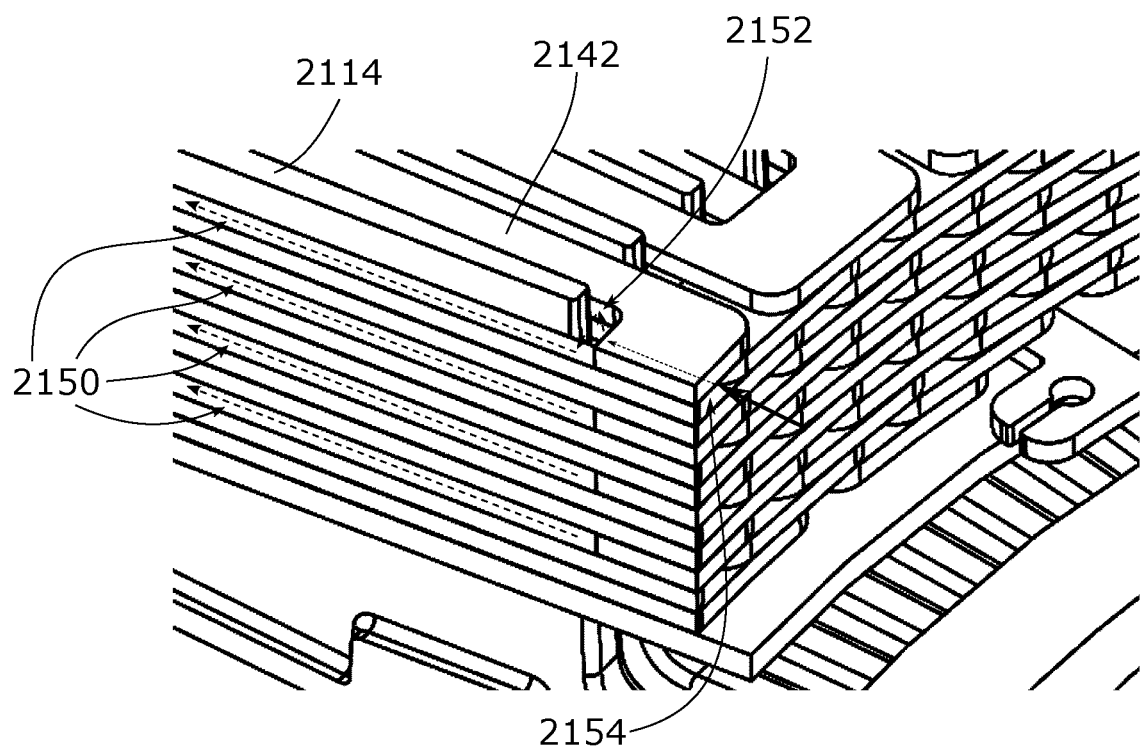
FIG. 69 shows a section view through the stator of FIG. 68 showing the cooling fluid flow path.
Figure 70:
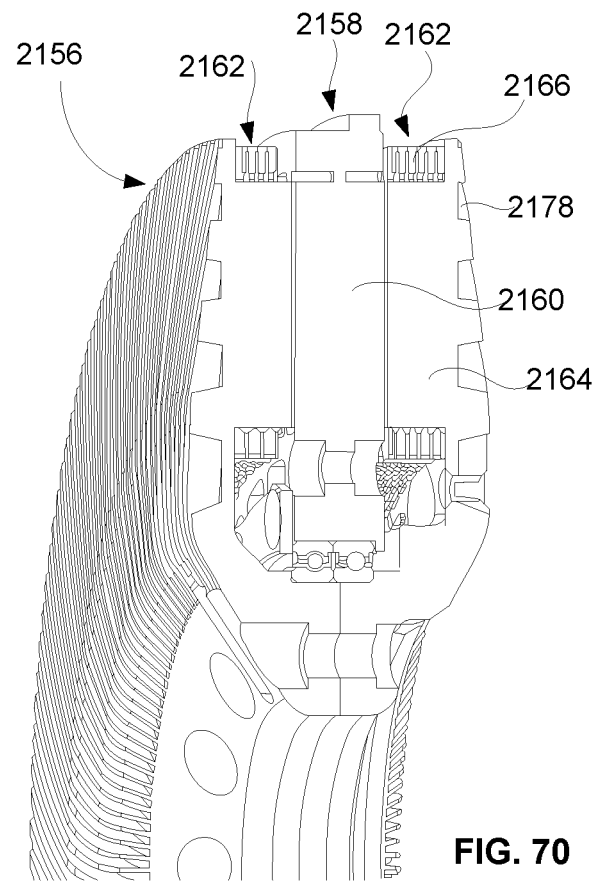
FIG. 70 shows a cross-sectional view of an exemplary embodiment with two stators and a rotor.
Figure 71:
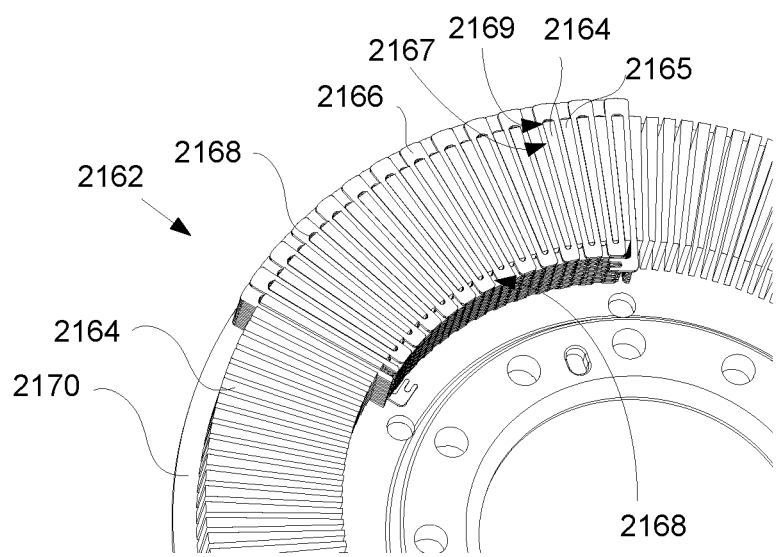
FIG. 71 shows a stator from the exemplary embodiment in FIG. 70 with conductors shown in one section.
Figure 72:
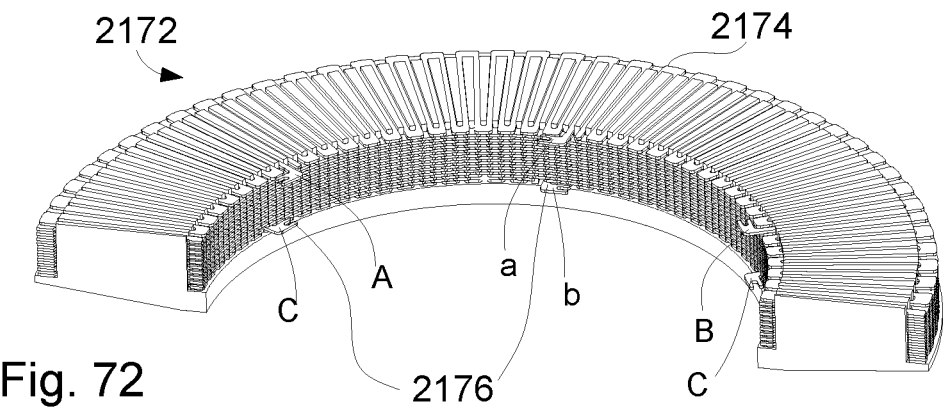
FIG. 72 shows a section view of a simplified stator with conductors.
Figure 73:
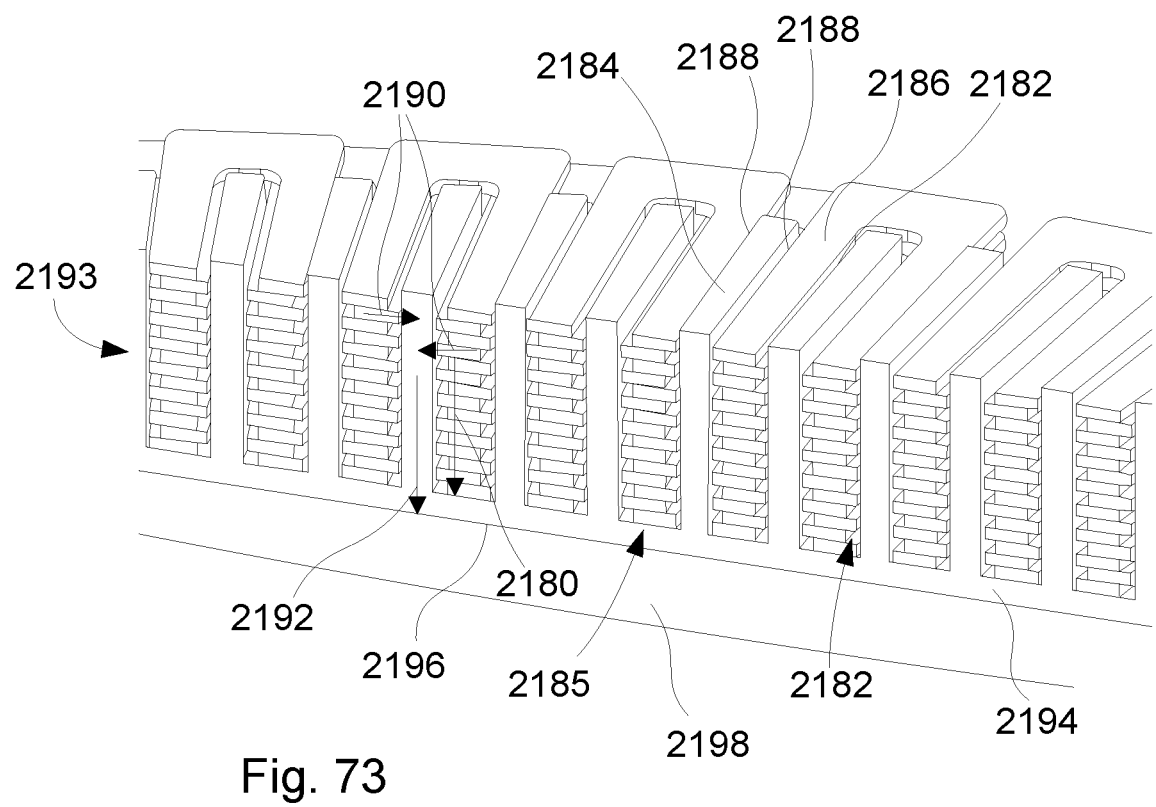
FIG. 73 shows an exemplary configuration of conductors on a stator in which the conductors do not skip slots.
Figure 74:
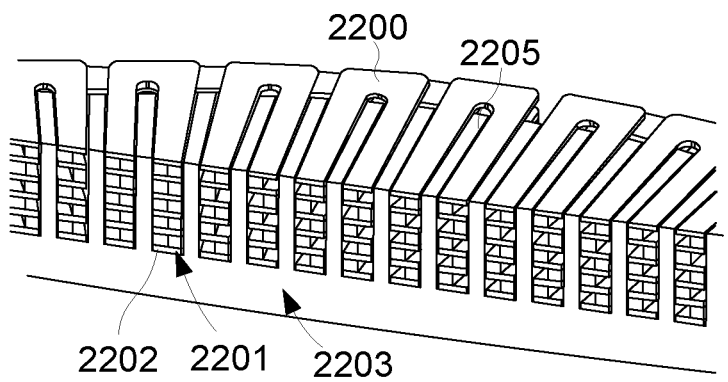
FIG. 74 shows an exemplary configuration of conductors on a stator in which some conductors with variable conductor widths.
Figure 75:
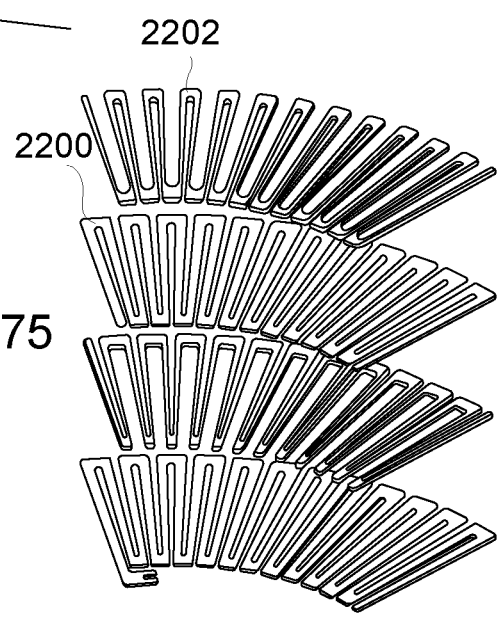
FIG. 75 shows an exploded view of four layers of conductors from FIG. 74.
Figure 76:
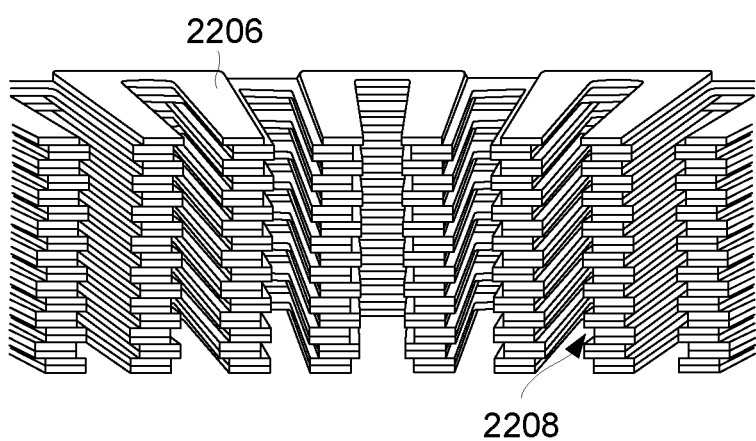
FIG. 76 shows an exemplary configuration of conductors with multi-layer thickness fluid flow gaps.
Figure 77:
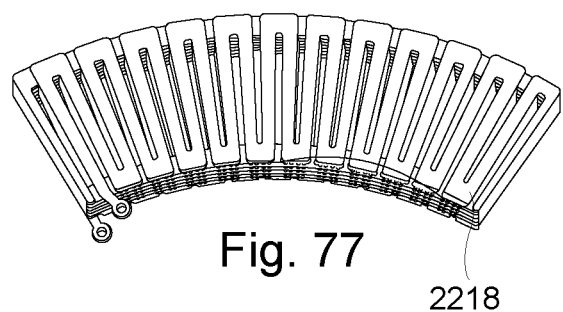
FIG. 77 shows a configuration of conductor layers in an exemplary method of assembly.
Figure 78:
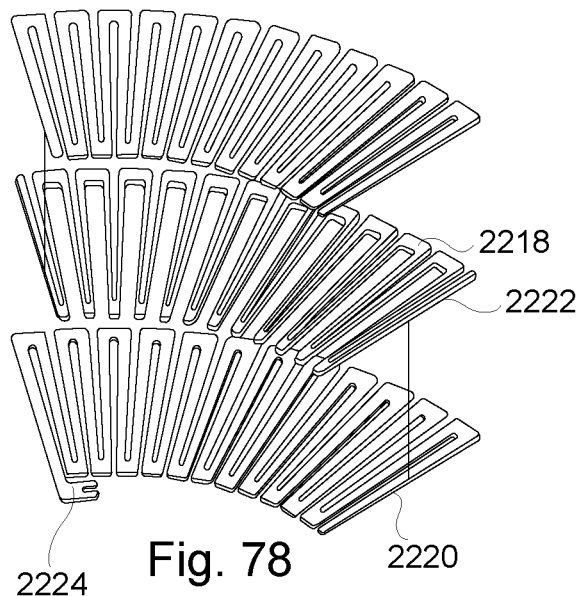
FIG. 78 shows an exemplary configuration of conductors without radial fluid flow gaps.

FIG. 69 shows the same flow path with similar arrows. It is important to note that the post end spaces 2152 allows cooling fluid to enter on one layer and to flows radially in a channel 2150 on a different layer.

Embodiments of a stratified conductor system may include, radially tapered conductor in a radially tapered slot to achieve a higher slot fill percentage, the ability to stamp conductors for ease of manufacturing, layered construction to simplify and increase the precision of assembly, the ability to achieve greater consistency of manufacturing, the ability to achieve consistent fluid flow channels for even cooling, and the ability to create a large surface area of coolant contact with conductors relative to the volume of the conductors for more effective cooling though active cooling means.

Embodiments of a stratified conductor system as shown in FIG. 63 and others, are characterized by the same thickness of conductor for the majority of a layer and with a variable width that includes a wider section at the end turns with greater cross section perpendicular to the direction of current flow. The wider cross section at the end turn is beneficial because it reduces the resistance and heat production of the end turns by a squared effect allowing the end turn to operate at a lower temperature than the narrower conductors in the slots. The very low heat flow resistance between the slot turns and the end turns, along with the larger cross sectional area of the end turns, provides a very effective heat sink for heat generated in the slots. The larger surface area of the end turn (as compared to if the end turns were the same width or smaller width as compared to the maximum width of a conductor in a slot) provides increased surface area for cooling fluid interaction if the end turns are actively cooled and/or for conductive heat transfer through successive layers of electrical conductor end turns axially to the housing.

Any number of layers may be used with this stratified conductor system. Any number of phases may be used with this conductor system. With all numbers of phases, the conductor may, for example, fill two adjacent slots with current flow in opposite directions in these slots, and then skip X−2 slots with "X" being the number of phases. With four phases, for example, each conductor on a layer would skip two slots rather than skipping one slot as with three phases. With five phases each conductor would skip three slots and so-on.

Exemplary Flux Control Structures in an Electric Machine

Figure 79:
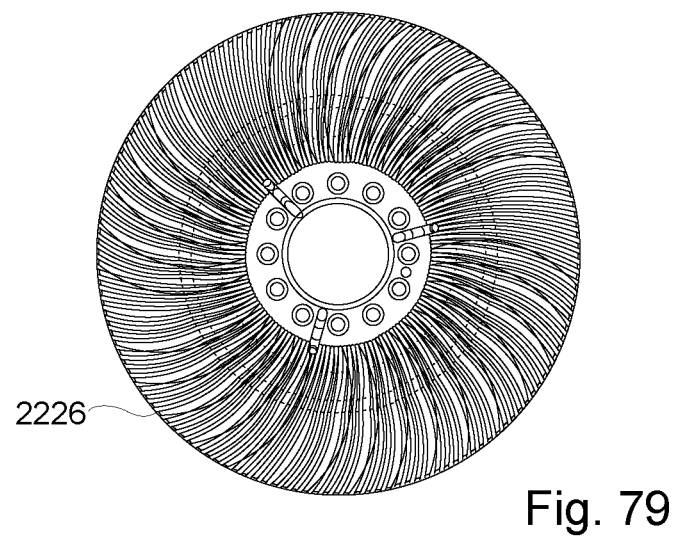
FIG. 79 shows an exemplary embodiment of a stator with curved, variable-width posts.
Figure 80:
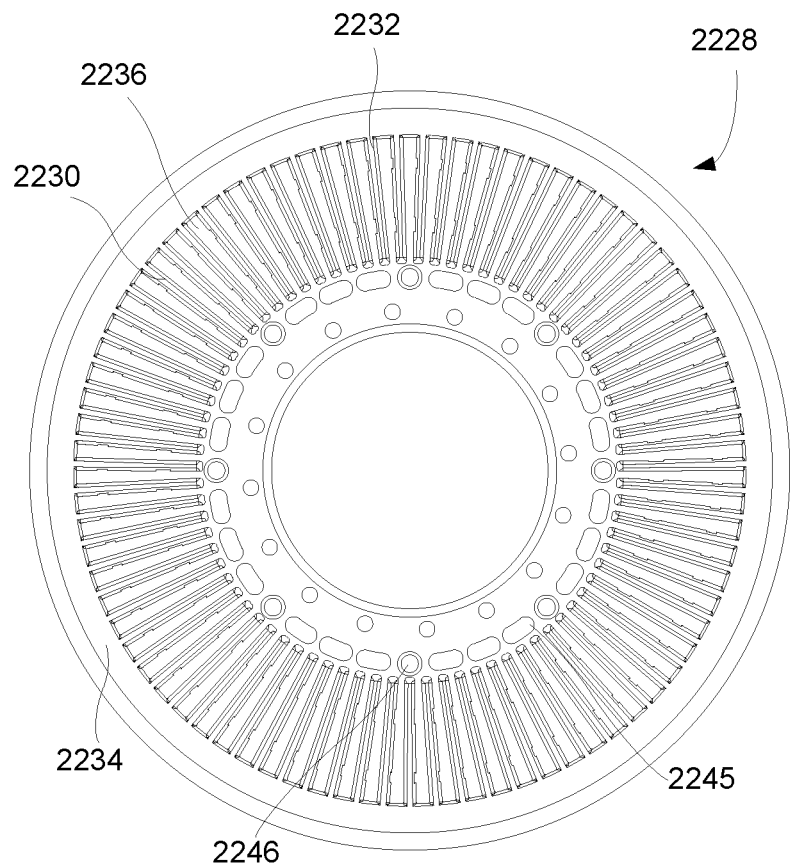
FIG. 80 shows an exemplary embodiment of a rotor with tangentially oriented permanent magnets and radially extending flux path members.
Figure 81:
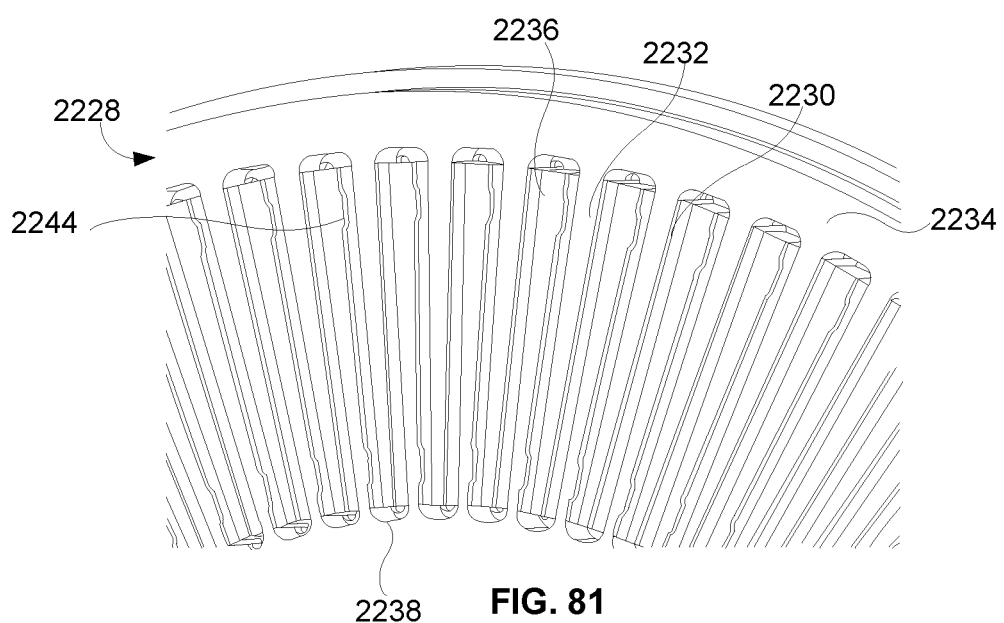
FIG. 81 shows a detail view of the rotor in FIG. 80.

A winding shown in FIG. 79 allows non-straight post shapes such as curved or variable width posts 2226.

To increase the flux from the permanent magnets across the airgap between the rotor and stator the flux linkage path from the N side of a permanent magnet to the S side of a permanent magnet may be reduced. In an axially aligned permanent magnet rotor, this can be done with a solid back-iron made of a soft magnetic material such as, but not limited to, steel, as shown in FIG. 102. In this case, the flux from a permanent magnet 2370 will link to an adjacent permanent magnet 2370 through the back-iron 2372 and/or to the opposite polarity face of an opposing permanent magnet 2370 on the opposite axial face of the backiron 2372.

The torque generated by an Axial Flux Permanent Magnet (AFPM) machine is affected by, amongst other things, the density of the flux interacting between the rotor and the stator. In order to maximize the flux density at the rotor/stator interface, and thereby maximize the torque that can be generated, a rotor may use soft magnetic material fitting closely between the tangentially orientated pole faces of the permanent magnets (PM's) to channel the flux to the stator interfaces on both ends of the rotor. Because the axial dimension of the PM's can be much greater than the available tangential space available for them, and the soft magnetic material has a higher saturation value than the PM's, the flux density interacting with the stator is increased. The PM's are arranged tangentially NSSNNSSNNS etc. such that two of the same polarity poles are facing each other tangentially. The alternating orientation of the PM's means that the soft magnetic material inward and outward extensions between them become polarized alternately SNSN etc. with each radially extending flux path member is the same polarity at both axial ends. The extent of the axial dimension of the PM's can be changed to suit their strength, so that relatively high torques can be generated using lower strength magnets. The axial dimensions are such that the PM's never protrude beyond the alternating polarity axial faces.

To accommodate relative angular movement and deflection due to external loading there will normally be an axial gap between the axial faces of the rotor and the stators, referred to as the airgap. The flux from the PMs generates alternating poles in the soft magnetic radial members material between them, and the poles of the electromagnets of the stator provide a flux path to connect these alternating poles, even with no power supplied to the EMs. This results in an attraction force between the rotor and the stators. The attraction force between the rotor and stator is higher if the airgap is smaller, so although with an identical airgap on both ends of the rotor the attraction forces toward the stators would be equal and opposite, any variation in the airgaps at any angular position will result in a net force that will augment the displacement. This tendency requires a bearing and adequate rotor stiffness to avoid contact between a stator and rotor during operation.

The design described below incorporates a one-piece rotor structure where a soft magnetic material such as steel or iron or a cobalt or other soft magnetic material or alloy, which is used to carry the flux, also provides structural stiffness. Bearings, such as, but not limited to a pre-loaded a pair of angular contact bearings, provides moment stiffness between the rotor and the static structure necessary to control deflection and avoid resonances.

In an embodiment, the rotor 2228 as shown in FIG. 80 to FIG. 86 has tangentially polarized permanent magnets 2230 that are arranged NSSNNSSNNS etc. such that two of the same polarity poles are facing each other tangentially. The outer region 2234 of the rotor 2228 comprises an array of inwardly projecting regularly or equally spaced radial flux path members 2232 which are interdigitated with an equal number of regularly or equally spaced outwardly projecting radial flux path members 2236 on the inner region 2238 of the rotor and provide a flux path for permanent magnets 2230. Interdigitation of the radial members 2232, 2236 helps make the rotor 2228 very rigid. Interdigitation overcomes the challenge of providing a one-piece (or two-piece) ferritic structure without creating a flux linkage path that would short-circuit the magnets 2230. The rotor 2228 should be sufficiently rigid that flexing during operation of the rotor 2228 is a fraction of the airgap length.

Figure 82:
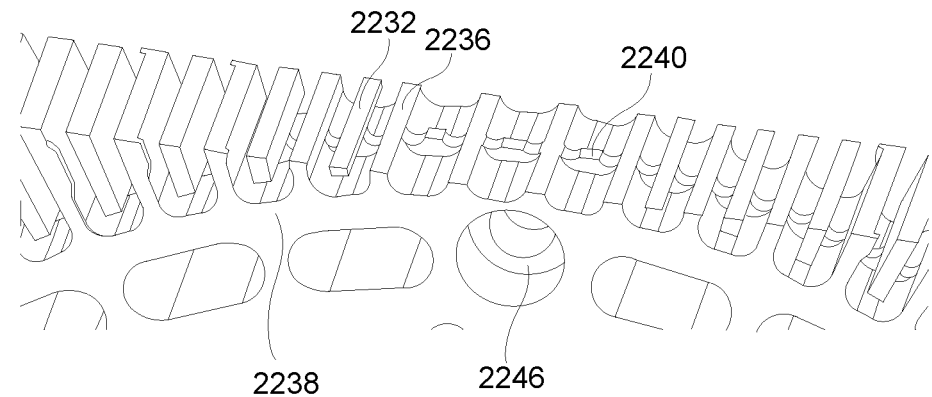
FIG. 82 shows the structural connection between the inward members and inner part of the rotor in FIG. 80.
Figure 83:
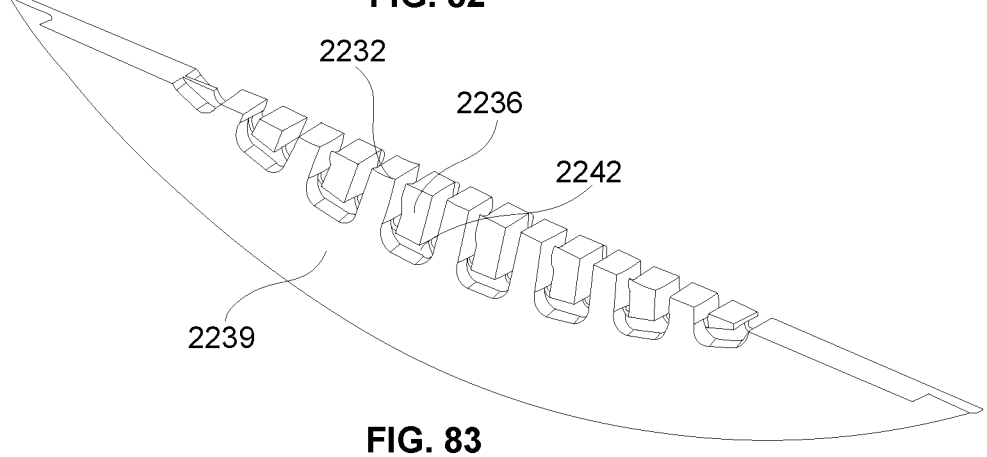
FIG. 83 shows the structural connection between the outward members and outer part of the rotor in FIG. 80.

As a result of the tangentially alternating orientation of the permanent magnets 2230, all of its inwardly projecting radial flux path members 2232 which are one piece with the outer region of the rotor 2234, will be of one polarity, and the outwardly projecting radial flux path members 2236 which are one piece with the inner region 2238 of the rotor, will be of the opposite polarity. In this exemplary embodiment, only the inner region 2238 of the rotor 2228 is supported, such as by bearings (not shown), to the stator housing (not shown), although additional bearings may be used. The use of bearings on the ID of the rotor, only, can reduce manufacturing cost, and motor/actuator weight, and is made possible by the high strength and stiffness of the rotor. In an embodiment, the inner and outer regions of the rotor 2228 are integrally connected by small tabs 2240, 2242 shown in FIG. 82 and FIG. 83. FIG. 82 shows that the structural connection between the inward members 2232 and the inner part of the rotor 2238 and the outward members can be through reduced axial width tabs 2240 and/or through the permanent magnets (not shown). FIG. 83 shows the structural connection between the outermost end of the outward members 2236 and the outer part 2234 of the rotor 2228 through reduced axial width tabs 2242. These tabs will create a flux return path from N magnet faces on one of the inner or outer rotor rings 2238, 2234, to S faces of magnets on the other of the inner or outer rotor rings 2238, 2234. This flux return path will reduce the airgap flux density in the airgap between the rotor 2228 and the stator (not shown), but it has been shown by FEA and FEMM analyses, as well as prototype testing, that the connection strength and stiffness between inner and outer rotor members 2238, 2234 is adequately achieved by an array of tabs 2240, 2242 with a small enough cross section to allow only a small percentage of permanent magnet PM flux to be lost.

Figure 84:
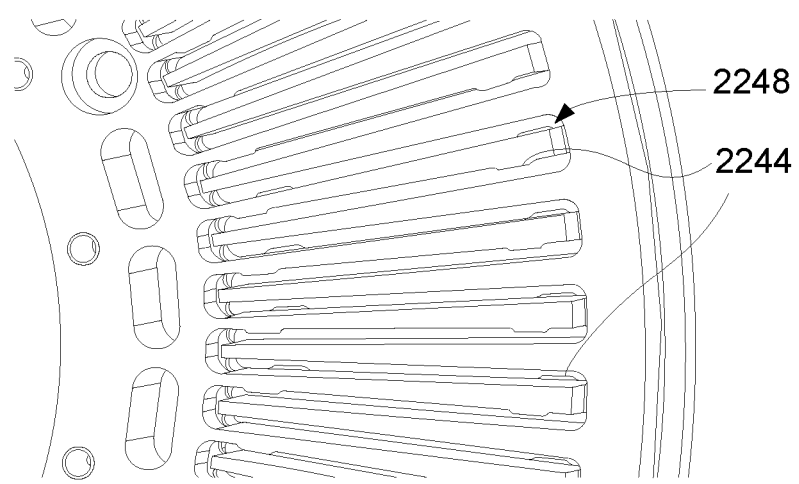
FIG. 84 shows a detail view of the rotor in FIG. 80 with the magnets removed.
Figure 85:
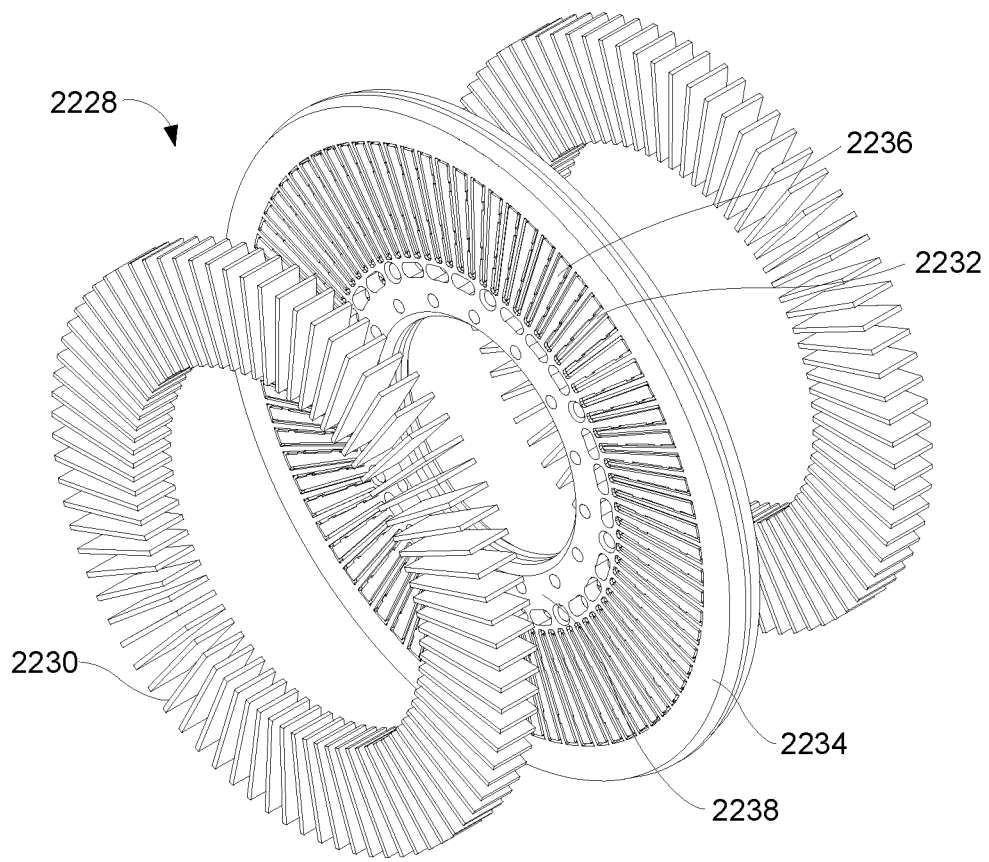
FIG. 85 shows an expanded view of the rotor in FIG. 80 reflecting an exemplary method of assembly.
Figure 86:
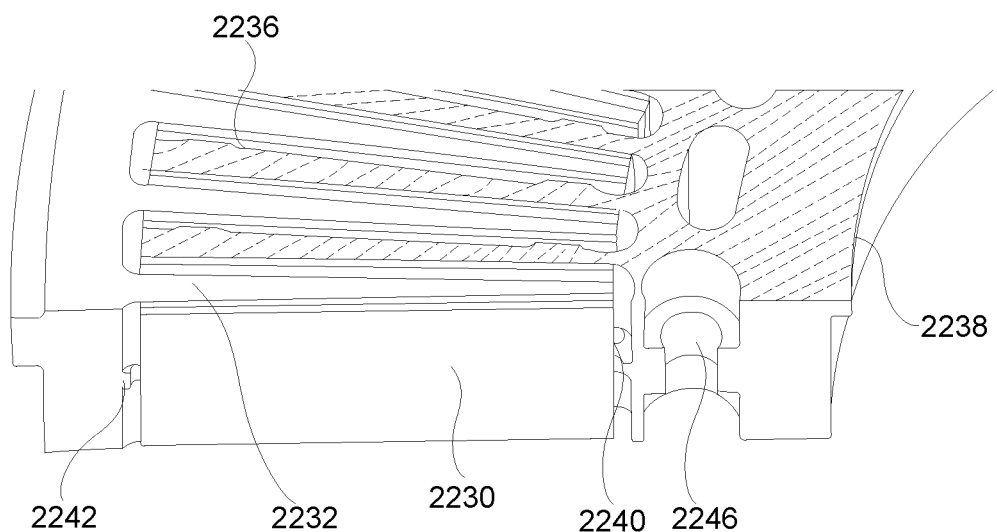
FIG. 86 shows a view of the rotor in FIG. 60 with the inner rotor ring and outwardly projecting flux members shown in black.
Figure 87:
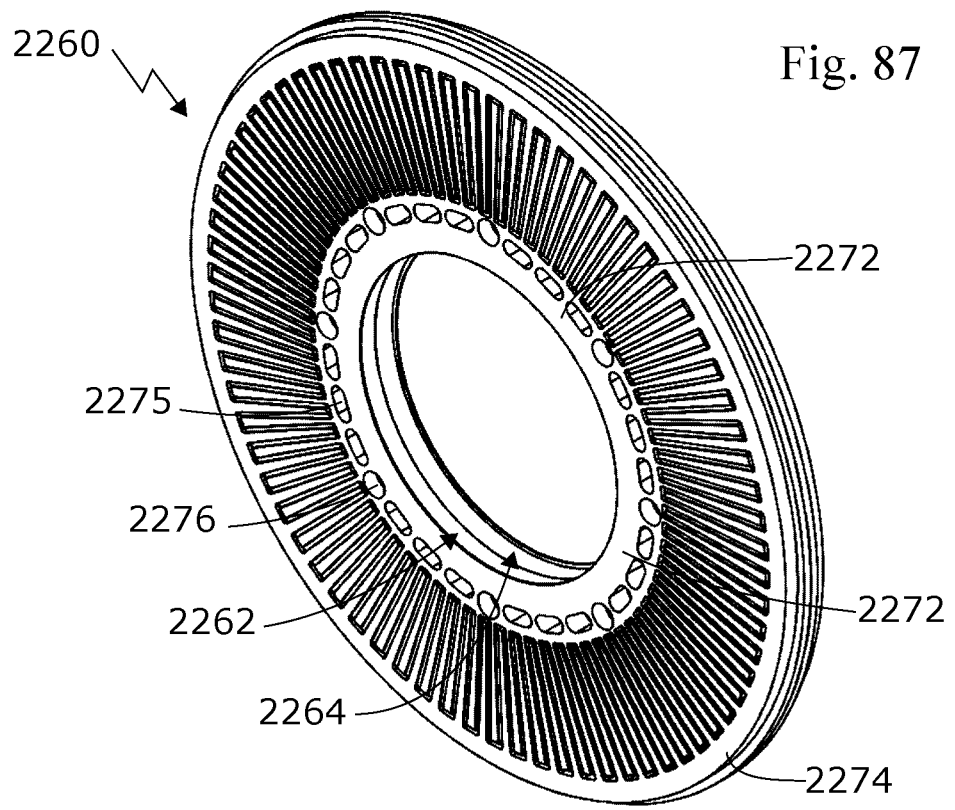
FIG. 87 shows an exemplary embodiment of a rotor comprising two axial halves and tapered magnets.
Figure 88:
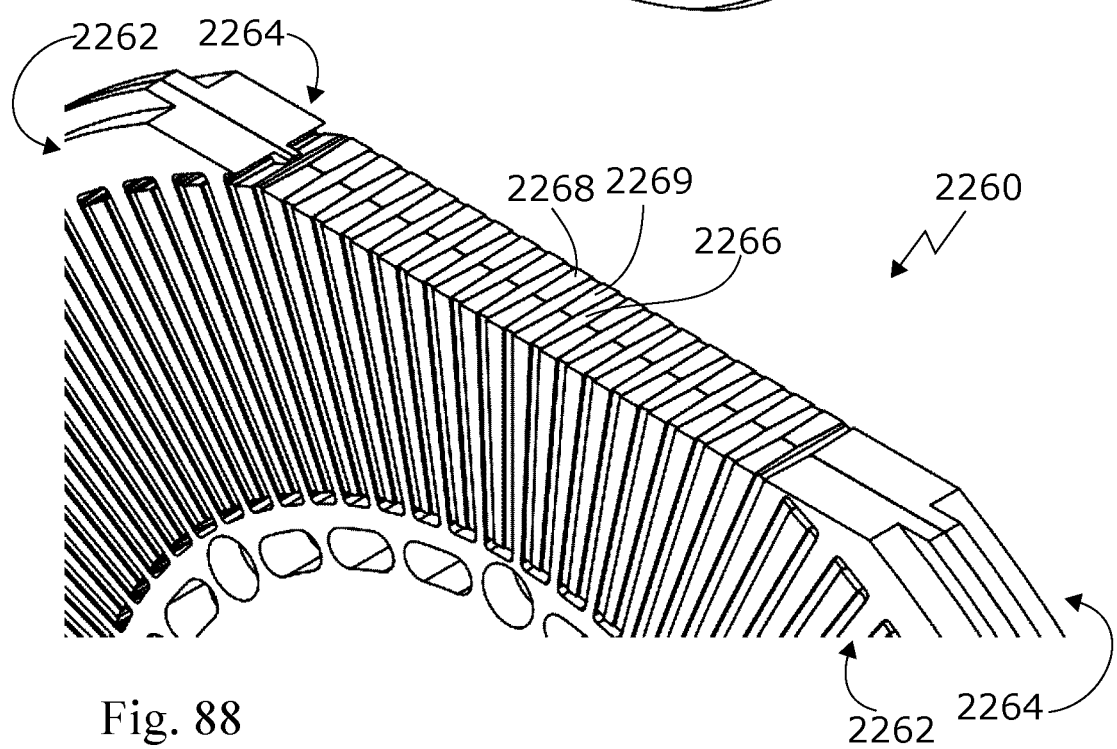
FIG. 88 shows a section view of the rotor in FIG. 87.
Figure 89:
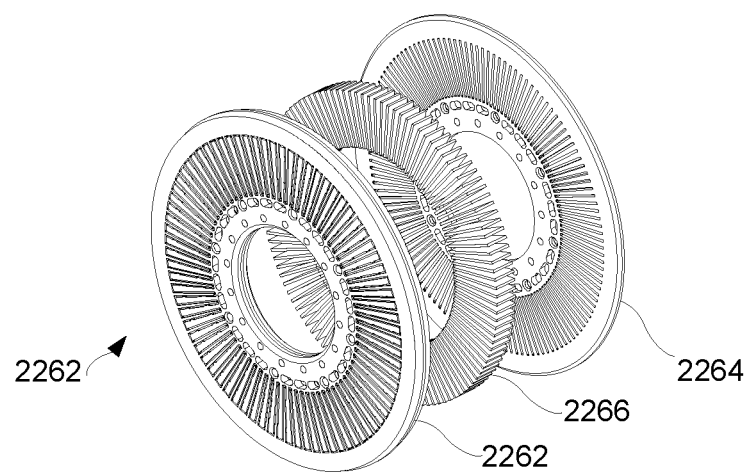
FIG. 89 shows an exploded view of the rotor in FIG. 87.

FIG. 84 shows an exemplary embodiment of the rotor 2228 without the magnets 2230 in order to show the magnet retainers 2244. These are used to axially position the magnets 2230 and are located at alternating ends of the slots 2248, requiring that half of the magnets 2230 are inserted from one side of the rotor 2228 and the other half of the magnets 2230 are inserted from the other side of the rotor 2228 during assembly, as shown in FIG. 85. Each half set of magnets 2230 will have their polarities in the same tangential orientation which improves stability for assembly. The magnets 2230 can be secured in position using an adhesive and can be further secured by peening of the open slot ends, such as at two positions of similar radial positions to the retaining tabs 2244 to reduce the local slot width to less than the thickness of the magnets 2230. Holes 2245 through the rotor 2228 may allow air to flow such that cooling of the stator electromagnets (not shown) on both sides of the rotor 2228 can be achieved by flowing air or other fluid through only one side of the housing structure (not shown). The counter-bored holes 2246 through the rotor 2228 are for clamping during manufacture. FIG. 86 has the axial surface of the inner rotor ring 2238 and of the outwardly projecting flux members 2236 shown in black to illustrate more clearly that the inward and outward extending flux path members 2232, 2236, may be all made of one piece construction, but that the inward and outward extending members 2232, 2236 are magnetically isolated from each other apart from connection portions connecting the members (posts) to the other ring (end iron), in this embodiment formed as tabs 2240, 2242 having smaller cross section than the posts or end irons. The tabs 2240, 2242 may be small enough in cross section compared to the radially extending flux path members 2232, 2236 that they will be saturated from the PM flux and will therefore not allow significant additional flux linkage beyond that flux level.

Other variations include inserts of other, non-magnetic material for the tabs, inner and outer members with radially extending flux path members as shown here with no connection tabs. In this case the body with the magnets will be the main structural connection between the inner and outer rotor rings.

The magnetic forces generated by rare earth magnets, for example, combined with the flux focusing effect of the flux path members can produce immense axial forces. In the example shown here at an outer diameter of approximately 9″ can generate an axial attraction force to the stator of as high as 1500 lbs. A suitably strong and rigid structure may be used to prevent damage and problematic vibration during use. A rotor with interdigitating members provides both structural rigidity and flux focusing functions into the same radially extending members. The interdigitation of these inward and outward members provides a high surface area contact between the member tangential surfaces and the magnets for effective flux usage and high strength and stiffness.

Exemplary Rotor for an Axial Flux Electric Machine

The rotor can be made of single piece construction as shown here, or in two or more pieces that sandwich together. Magnets can be of any shape including tapered in any direction for flux path effects and structural effects. Any type of magnets can be used. Any number of magnets can be used. Any width of magnets can be used. One or both axial faces of the rotor can be used in combination with a stator. Multiple rotors can be used. Multiple circular arrays of magnets can be used with different numbers of magnets in two or more arrays. This rotor can be used with actuators or motors or any magnetic machine or device with any number of phases or poles.

The design described below incorporates a two-piece rotor structure where a soft magnetic material such as steel or iron or a cobalt or other soft magnetic material or alloy, which is used to carry the flux, also provides structural stiffness to position the rotor against magnetic forces which can be very high with this device, and to support the output load on the actuator. Bearings, such as, but not limited to a pre-loaded pair of angular contact bearings, provide moment stiffness between the rotor and the static structure necessary to control deflection and avoid resonances.

Figure 90:
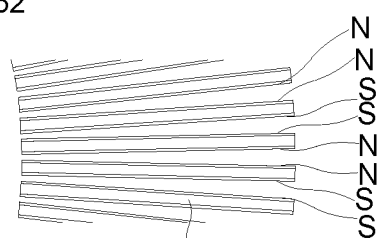
FIG. 90 shows the plane view of the magnets in the rotor in FIG. 87, showing the polarity of the magnets.

FIG. 87 to FIG. 92 show an embodiment of the rotor 2260 which is constructed in two somewhat mirror image halves 2262 and 2264 which are then bolted or otherwise fastened or connected together. In this embodiment, tapered magnets 2266 can be combined with tapered rotor members 2268, 2269 to provide mechanical security for the magnets 2266, and also to allow a wider tangential magnet section closer to the center plane of the rotor 2260 where the flux density of the flux path members 2268, 2269 is lower. This makes better use of the space available for the permanent magnets 2266 and for the space available for the soft magnetic material. FIG. 90 shows the permanent magnets 2266 in the same relative positions as when they are installed in the rotor 2260. This shows how the permanent magnets 2266 are arranged with alternating tangential polarity, NSSNNSSNNS etc, such that two of the same polarity poles are facing each other tangentially.

Both halves of the rotor 2262, 2264 comprise inwardly projecting and outwardly projecting radial flux path members 2268, 2269, analogously to the embodiment of the rotor 2228 discussed previously. In the exemplary embodiment 2260 shown in FIG. 87, only the inner region 2272 of the rotor 2260 is supported, such as by bearings (not shown), to the stator housing (not shown), although additional bearings may be used, for example on the ID or OD of the rotor. The use of bearings on the ID of the rotor only can reduce manufacturing cost, and motor/actuator weight, and is made possible by the high strength and stiffness of the rotor which makes additional bearings unnecessary for many applications.

In an embodiment, the inner and outer regions of the rotor 2260 are integrally connected by small tabs analogous to tabs 2240 and 2242 in FIG. 86.

Figure 91:
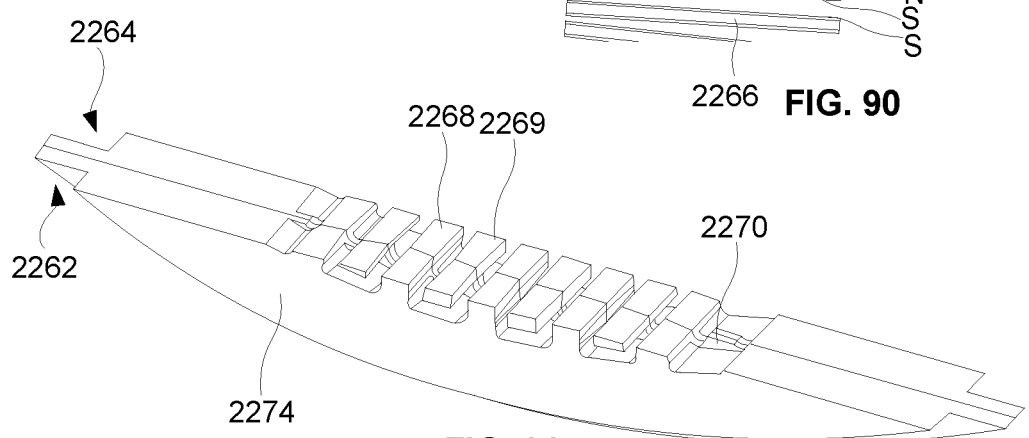
FIG. 91 shows the structural connection between the outward members and outer part of the rotor in FIG. 87.

FIG. 91 is a section taken tangentially through both rotor halves 2262, 2264 showing the axial extent of the connecting tabs 2270 between the outwardly projecting radial flux members 2269 and the outer part of the rotor 2274. These tabs 2270 will create a flux return path from magnet faces on inwardly projecting radial flux path members 2268 to the opposite pole outwardly projecting radial flux path members 2269. This flux return path will reduce the flux density in the airgap between the rotor 2260 and the stator (not shown), but it has been shown by FEA and FEMM analyses, as well as prototype testing, that the connection strength and stiffness between inner and outer rotor members 2272, 2274 is adequately achieved by an array of tabs 2270 with a small enough cross section to allow only a small percentage of permanent magnet flux to be lost. The magnets 2266 are positively retained by their tapered geometry and can be further secured in position using an adhesive. Holes 2275 through the rotor 2260 may allow air to flow such that cooling of the stator electromagnets (not shown) on both sides of the rotor 2260 can be achieved by flowing air or other fluid through only one side of the housing structure (not shown). The counter-bored holes 2276 through the rotor 2260 are for clamping during manufacture.

The inward and outward extending flux path members 2268, 2269 may be all made of one piece construction, but that the inward and outward extending members 2268, 2269 are magnetically isolated from each other apart from the reduced cross section tabs 2270 and analogous tabs on the inner part of rotor 2260; these tabs may be small enough cross section compared to the radially extending flux path members 2268, 2269 that they will be saturated from the PM flux and will therefore not allow significant additional flux linkage beyond that flux level.

Figure 92:
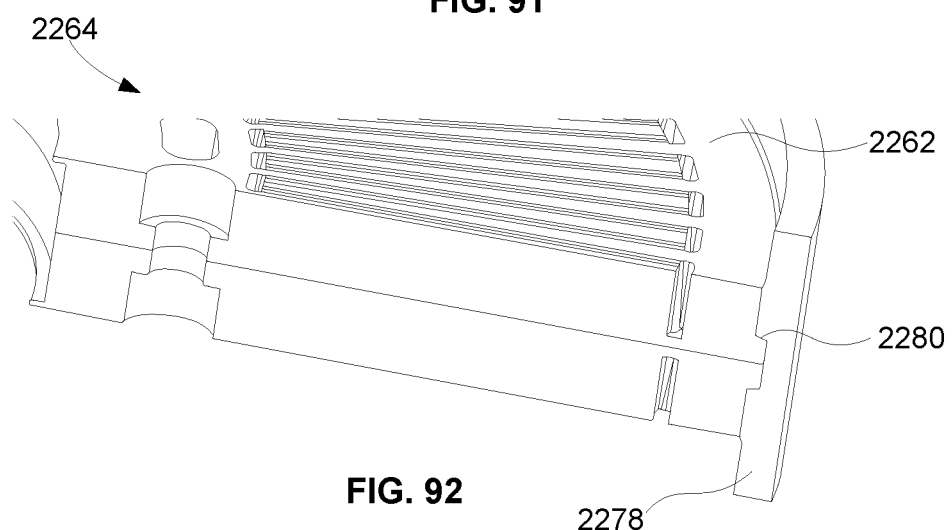
FIG. 92 shows the rotor in FIG. 87 with an external ring holding the rotor halves together.
Figure 93:
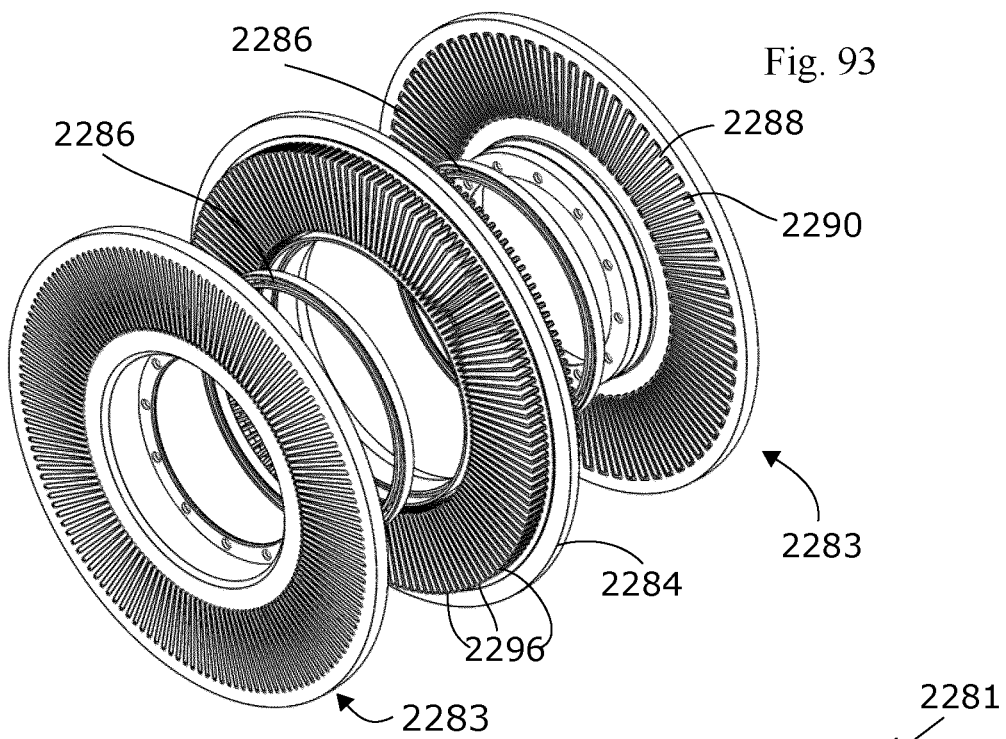
FIG. 93 shows an exploded view of an exemplary embodiment comprising two rotor halves and two stator halves.
Figure 94:
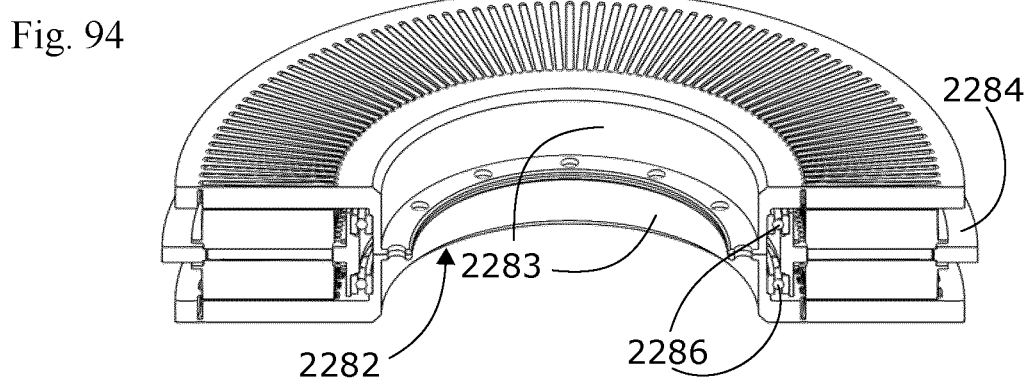
FIG. 94 shows a cross-section view of the embodiment in FIG. 93.
Figure 95:
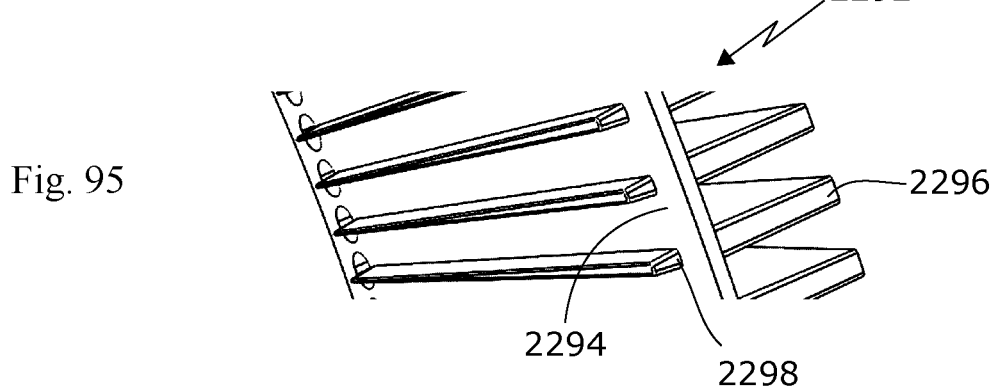
FIG. 95 shows a stator in the embodiment shown in FIG. 93.
Figure 96:
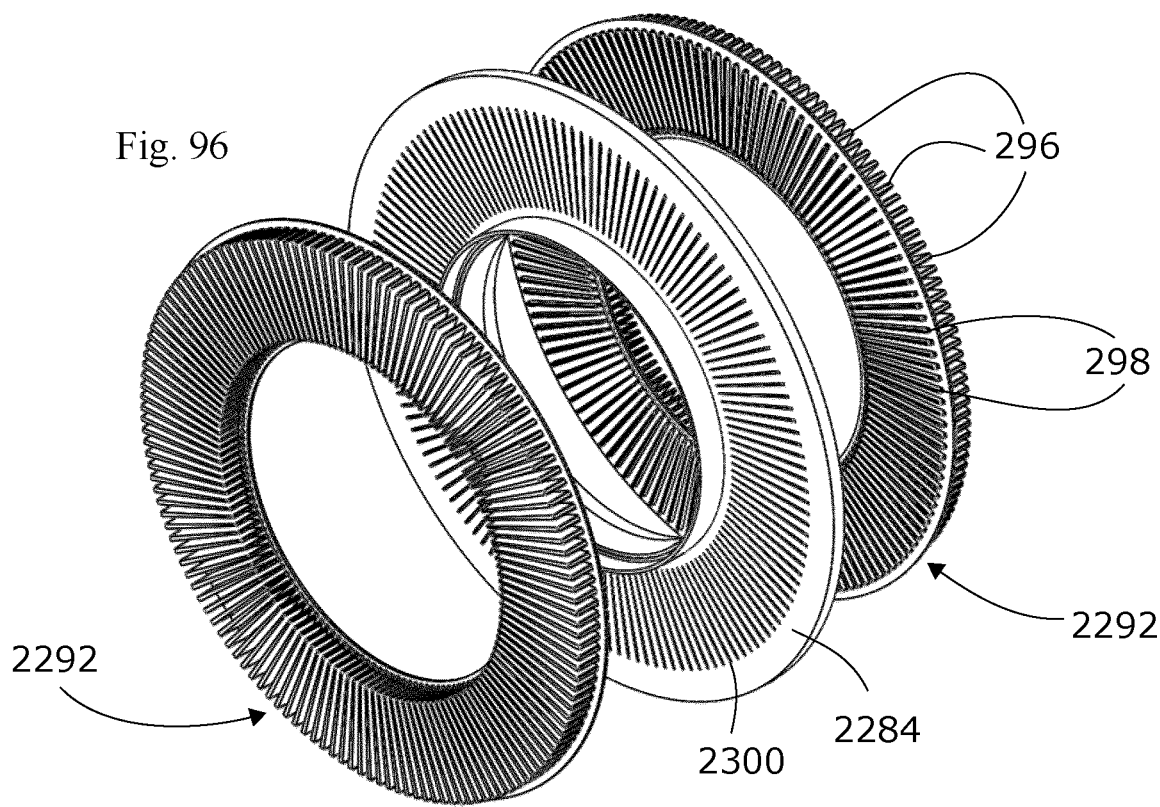
FIG. 96 shows an exploded view of the stators and baseplate of the embodiment FIG. 93.
Figure 97:
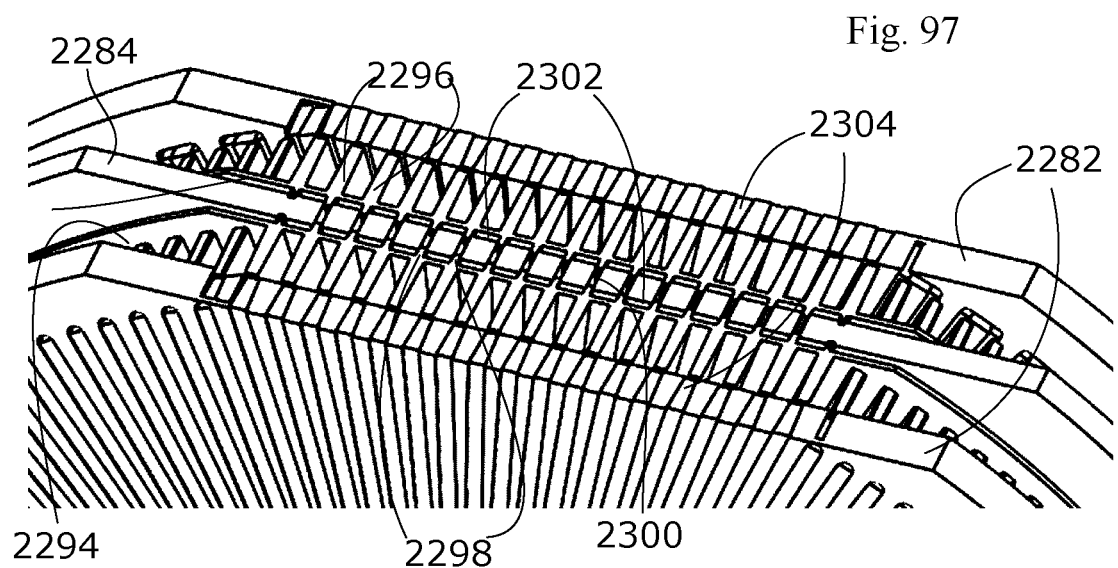
FIG. 97 shows a section view of the embodiment in FIG. 93.
Figure 98:
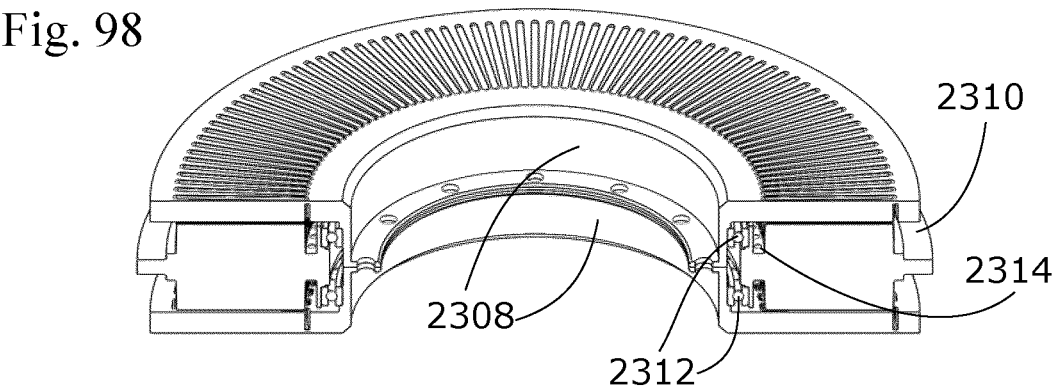
FIG. 98 shows a cross-section view of an exemplary embodiment with two rotor halves and one stator.
Figure 99:
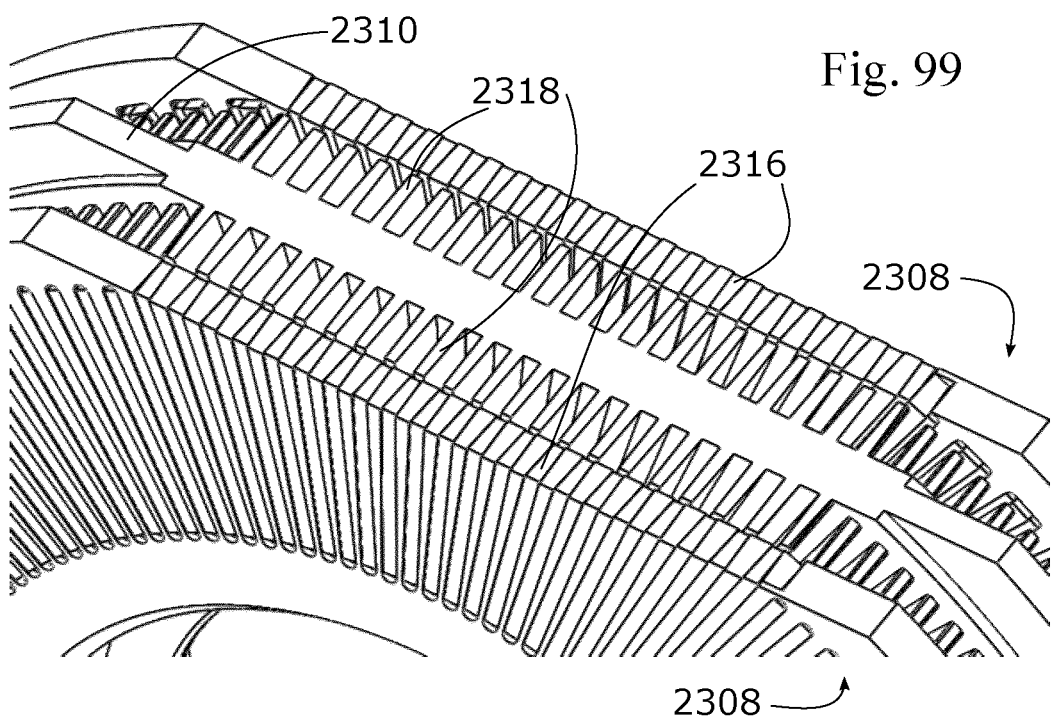
FIG. 99 shows a section view of the exemplary embodiment in FIG. 98.
Figure 100:
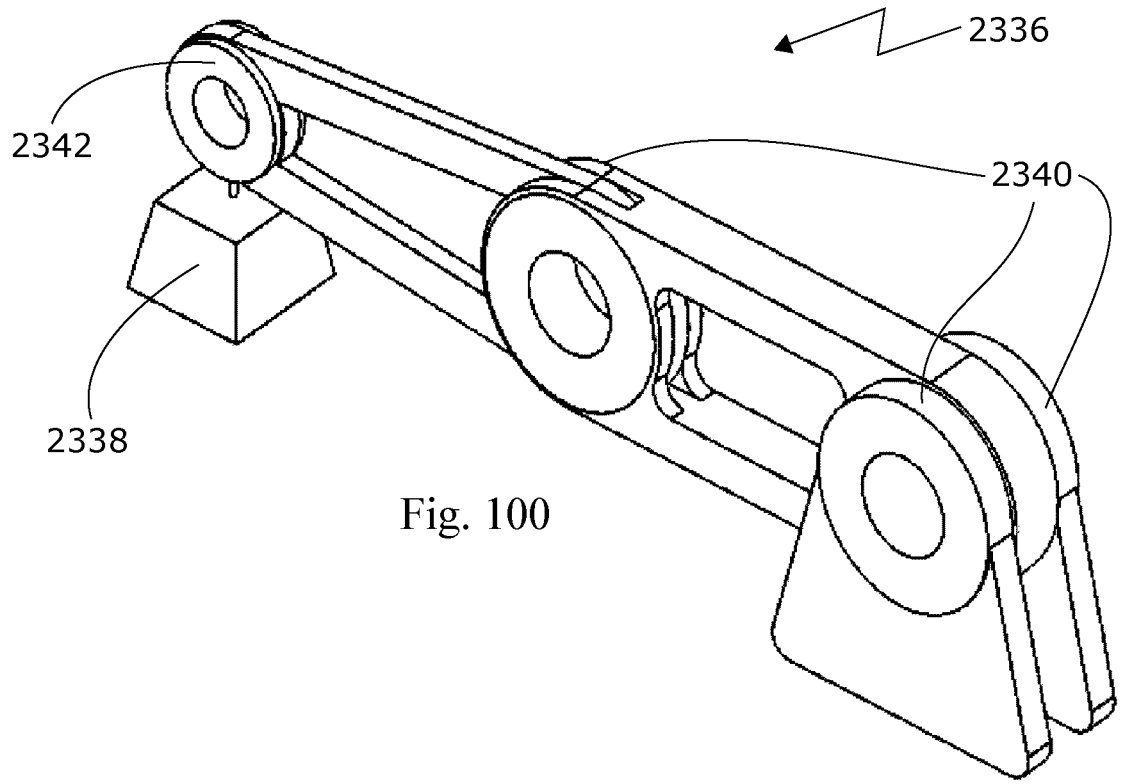
FIG. 100 shows an exemplary configuration of a robotic arm having a series of electric machines acting as actuators and being spaced along the arm.
Figure 101:
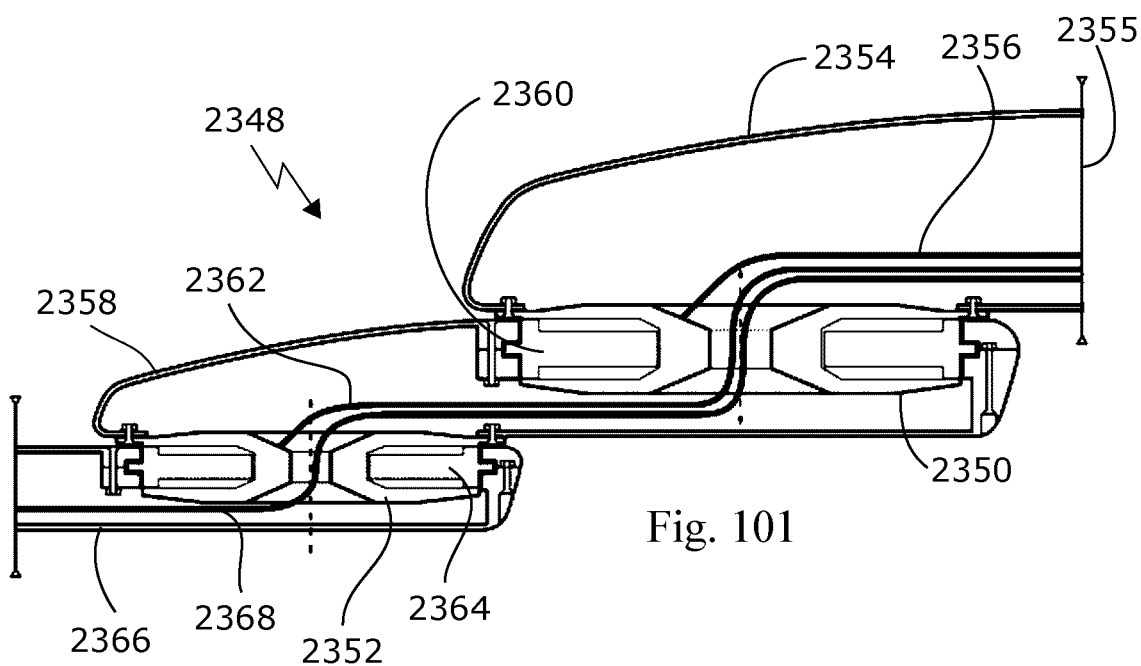
FIG. 101 shows a mounting configuration for an electric machine on a robotic arm.

Although, as described elsewhere, bolts, rivets, or similar may be used to hold the two halves 2262, 2264 of the rotor 2260 together, an additional or alternative retention method is to use an external ring 2278 with one or two internal tapered faces 2280 as shown in FIG. 92. The inside diameter of the external ring can be used to ensure concentricity between the two halves 2262, 2264 of the rotor. This external ring 2278 could be installed by generating a thermal differential between it and the two halves 2262, 2264 of the rotor. The use of a high expansion material for the ring 2278 such as, but not limited to, an aluminum alloy, would reduce the temperature difference necessary to install the ring 2278.

Various embodiments may include: one rotor adjacent to one stator, a rotor is on each side of one stator, a rotor is on each side of a pair of back-to-back stators, or combinations of these configurations.

Solid and Laminated Stator or Rotor Constructions

In some embodiments, a laminated stator or rotor may be used. In FIG. 103 a laminated post stator configuration is shown. This exemplary embodiment has an array of slots 2380 to receive the array of laminated posts 2382. The backiron disk 2384 can be a laminated construction or a sintered construction or a solid construction as shown here. The lines of flux travel generally tangentially in an axial flux motor so an effective laminate structure will need to have the laminates for each post and backiron aligned tangentially. One method of achieving this alignment is to coil a strip of laminate in a tight spiral, like a roll of tape, with an adhesive layer between each laminate layer. After the coil is cured, material is removed by a machining process to form radial posts and slots.

The high number of relatively small posts of an embodiment of an electric machine with features in the disclosed range makes it desirable to use as few parts as possible in the construction of the stator. If laminates are used, the number of laminated parts can be reduced by the use of radially aligned laminates as shown in FIG. 104. A drawback of this embodiment construction is shown schematically in FIG. 104 at the junction of the backiron 2384 and a laminated post 2382 where the flux 2386 that links from post to post though the backiron 2384 must pass through one or more insulation layers 2388 between the lamination layers 2390. The insulation layers (shown schematically at post 2382 as heavy lines) are useful and possibly necessary for the reduction of eddy currents, but they act as airgaps which increase the reluctance of the flux path with a resulting loss of torque and efficiency. Another drawback of this construction geometry is the minimal glue line 2392 that results from the very thin backiron 2384 of an electric machine having features in the disclosed range. Considering the very high axial loading on the posts 2382 of an embodiment of an electric machine, it may be structurally unsound to rely on this glue line 2392 for some applications.

Figure 105:
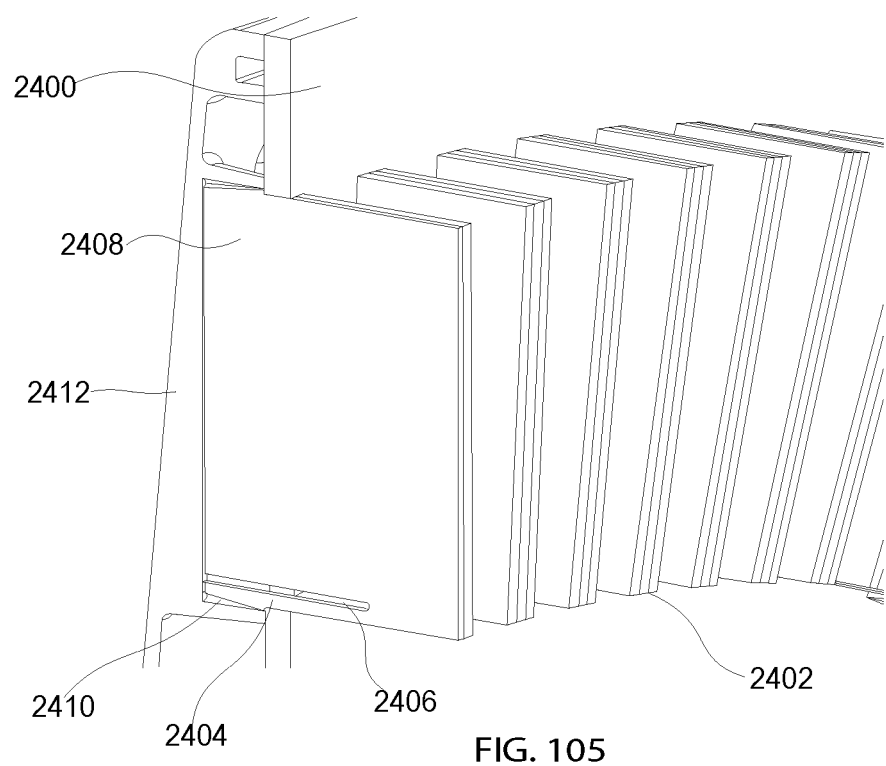
FIG. 105 shows an exemplary embodiment of a laminated post construction with posts extending through the backiron, with tapered barbs as mechanical pull-out stops.
Figure 106:
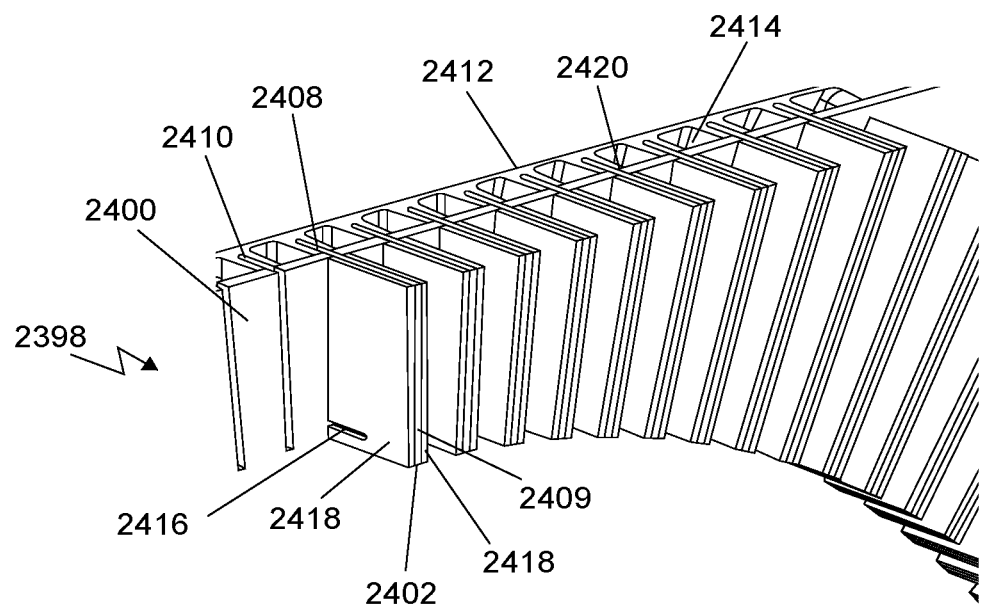
FIG. 106 is a section view of the embodiment shown in FIG. 105.

A construction is proposed to help prevent stator posts from being pulled out of their slots while at the same time providing metal to metal contact between the posts and backiron so the flux is not forced to cross through any insulation layers. FIG. 105 and FIG. 106 show a non-limiting exemplary embodiment of a laminated post construction of a stator 2398 and housing or cover member 2412 that provides adequate pull-out strength as well as metal-to-metal contact for the majority of the flux linkage connection between the back iron 2400 and the posts 2402. To accomplish the necessary structural integrity, the posts 2402 extend through the backiron 2400 enough to provide multiple functions. The extended material allows the use of a tapered barb 2404 to allow ease of assembly and provide a mechanical pull-out stop. In this non-limiting exemplary embodiment, a barb 2404 is proximal to a slit 2406 which is long enough to allow elastic deformation of a post 2402 during assembly. Other mechanical means may be used to act as mechanical pull-out stops, allowing insertion of the posts from one side and subsequently providing resistance to extraction of the posts from that side. For instance, a ratchet-like design may be used, with contacting surfaces of the posts and the backiron shaped in a manner that prevents them from sliding past each other in the direction of extraction under the application of pressure to the surfaces, either by a spring configured to do so, or by other mechanical means, activated after insertion of the posts into the stator.

The protruding section 2408 of a post 2402 beyond the back surface of the backiron 2400 is inserted into a slot 2410 of similar width in the cover member 2412. In an embodiment, this cover 2412 is made of a lightweight material such as aluminum or a composite such as carbon fiber. The surface area of the protruding section 2408 of a post 2402 is adequate to allow the bond with the cover slots 2410 to add the necessary rigidity to the assembly to withstand the high magnetic forces of an embodiment of an electric machine having features in the disclosed range. The embodiment shown comprises one central laminate 2409, with a protruding section 2408, per post; however, more than one laminate with a protruding section can be used per post.

Radial spaces 2414 between the slots 2410 on the inner surface of the cover member 2412 can be used for weight reduction and for flow of cooling fluid. Also shown in FIG. 106 is the use of a slit 2416 in the post 2402, passing through the protruding centre laminate 2409 as well as through the axially shorter laminates 2418 on a post 2402, even though the shorter laminates 2418 do not comprise a barb 2404. This is to allow the barb 2404 on the protruding laminate(s) to flex during assembly.

Each post 2402 in this exemplary embodiment is glued together in sub-assemblies before insertion into stator slots 2420. Conductors (not shown) are then wound or placed around the posts 2402 and conductors are then potted with a potting compound. In addition to the stabilizing effect of the cover member slots 2410, the potting compound will serve to provide circumferential strength and rigidity to the laminated posts 2402.

Note that powdered metal or solid material can be used with similar retaining features as shown here for the laminated posts. If solid or powdered metal is used for the posts, it is believed to be less complex and expensive as well as mechanically stronger to make the posts and backiron of unitary construction.

Figure 107:
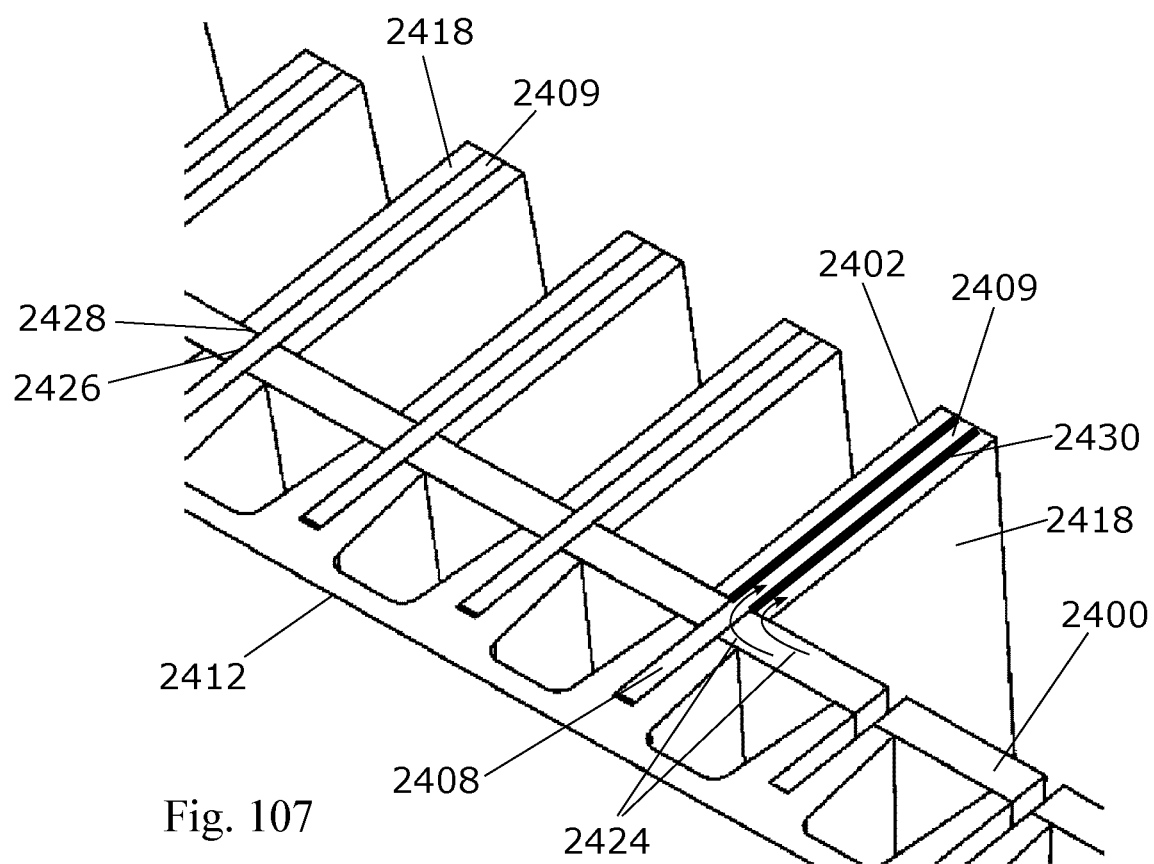
FIG. 107 is a section view of the embodiment shown in FIG. 105, showing the pattern of insulation between laminations and a portion of the resulting magnetic flux path.
Figure 108:
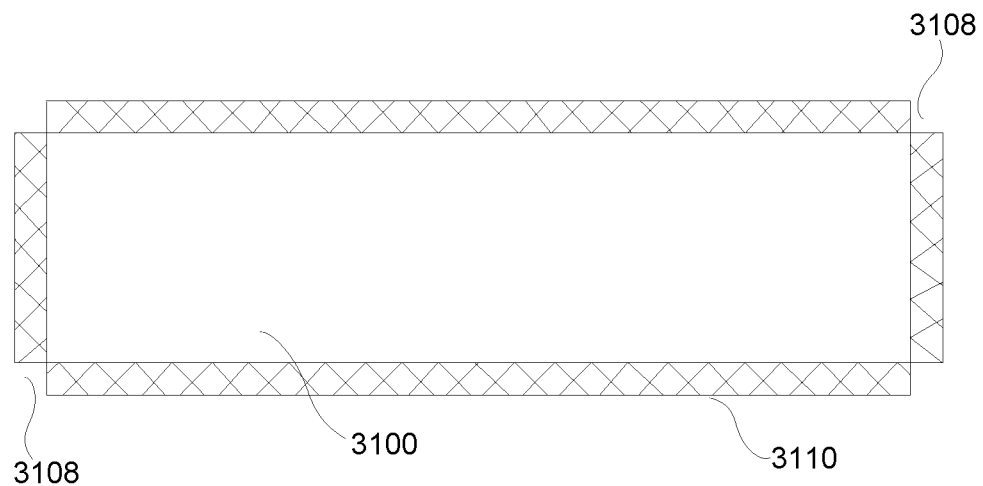
FIG. 108 is a schematic drawing showing the effect of anodizing a sharp edge.
Figure 109:
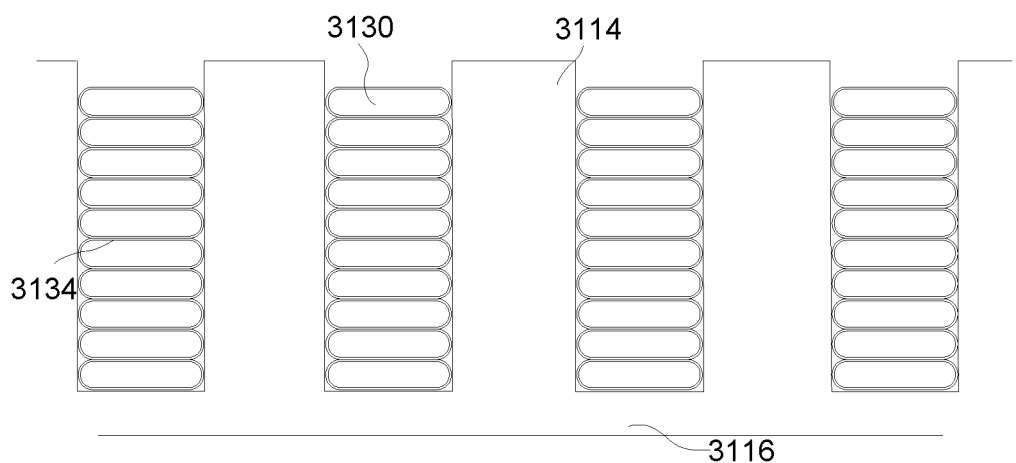
FIG. 109 is a schematic drawing of a stator section comprising conductors with rounded edges.
Figure 110:
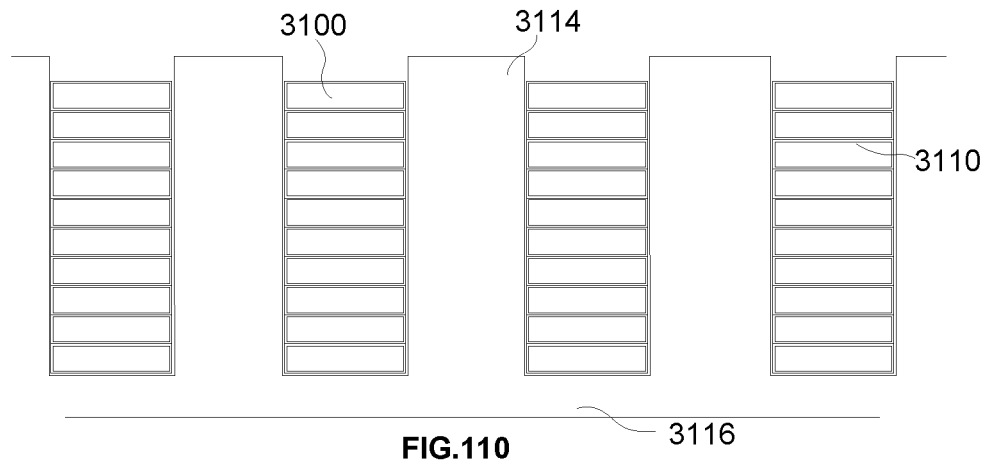
FIG. 110 is a schematic drawing of a stator section comprising conductors with sharp edges.
Figure 111A:
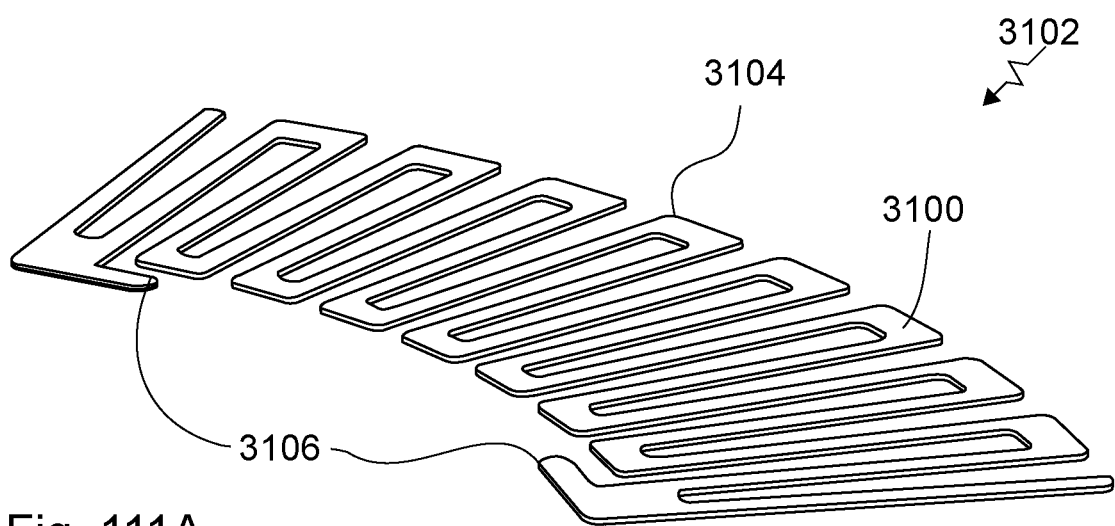
FIG. 111A is a perspective view of a first layer of stackable flat conductors before assembly.
Figure 111B:
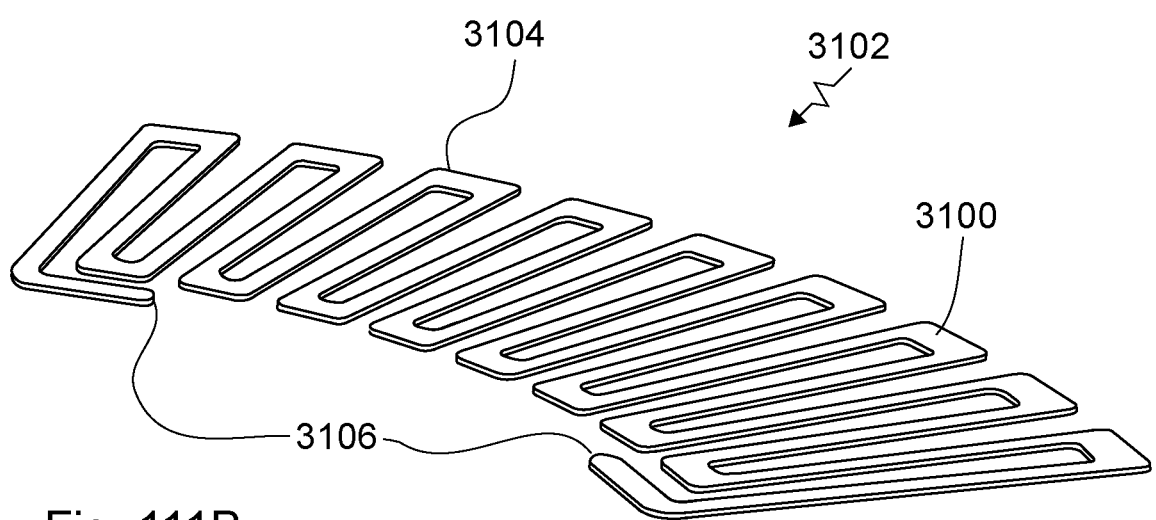
FIG. 111B is a perspective view of a second layer of stackable flat conductors before assembly.
Figure 112:
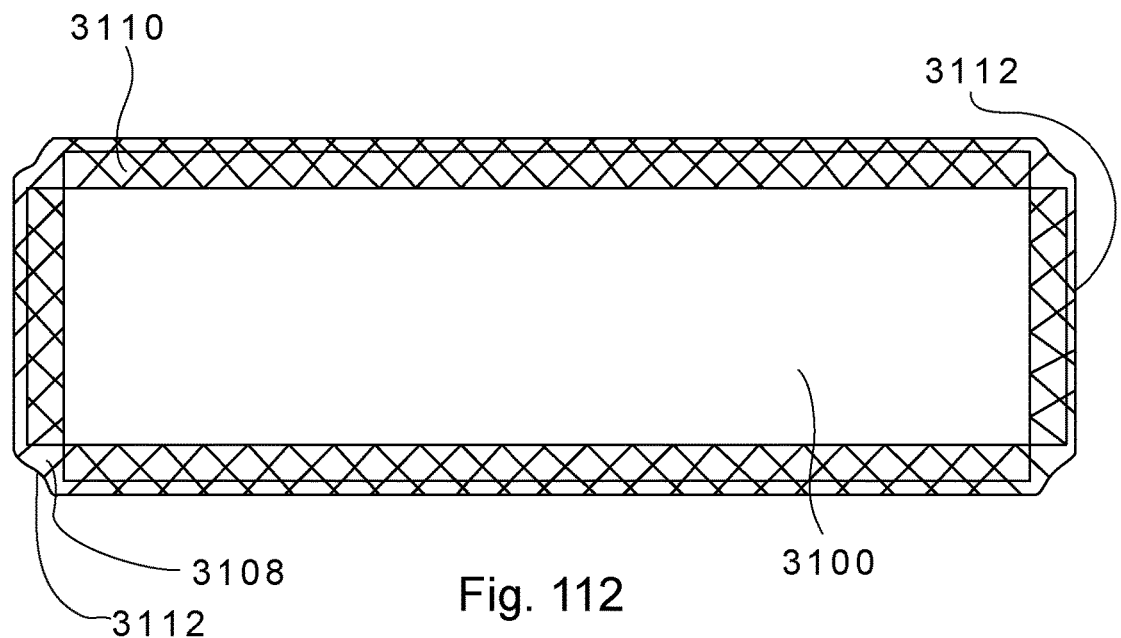
FIG. 112 is a schematic drawing showing an example of a coated conductor, with dielectric coating over the surface of an anodized conductor
Figure 113:
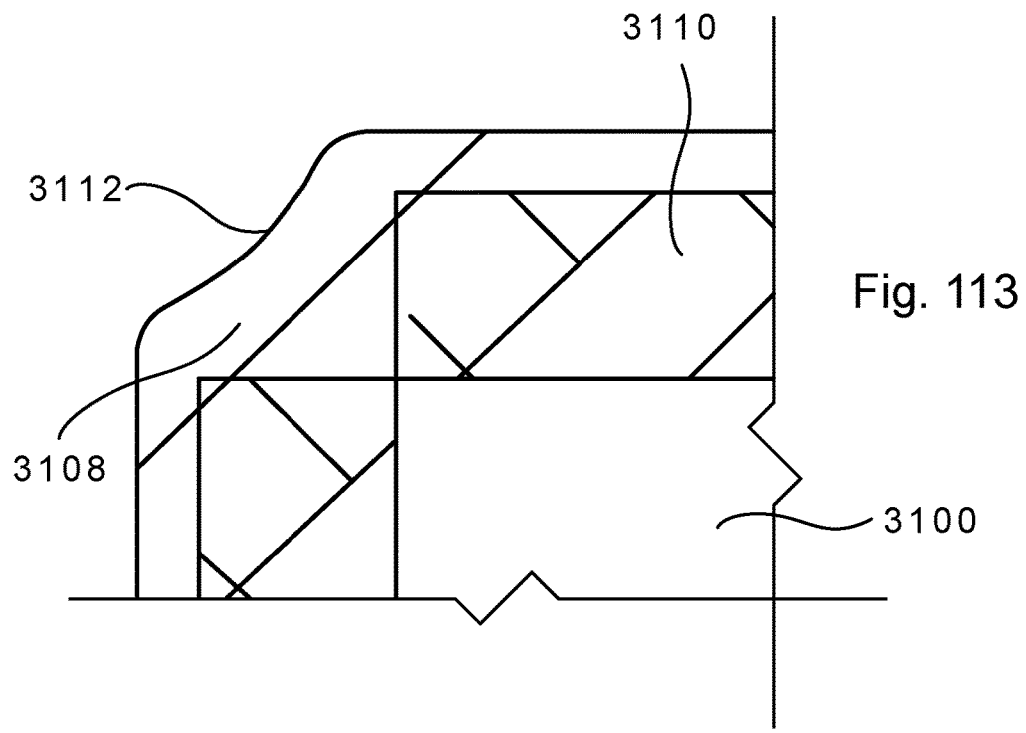
FIG. 113 is a close-up of a corner of the conductor of FIG. 112.
Figure 114:
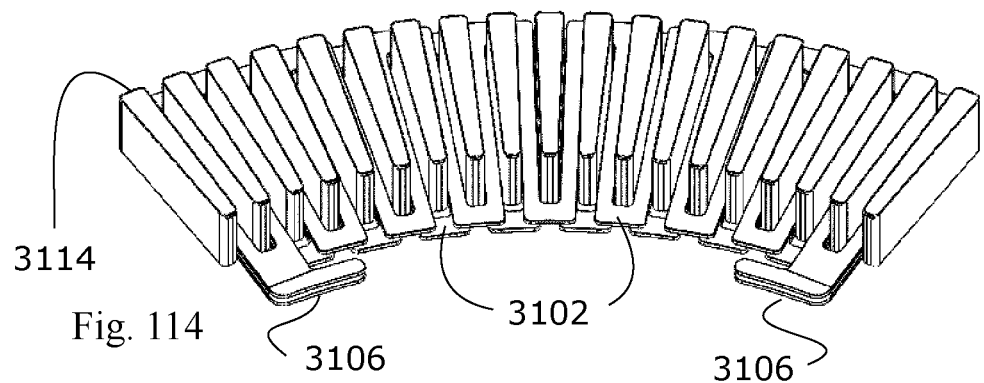
FIG. 114 is a perspective view showing conductors stacked together into layers with the conductor pair stacked between stator posts.
Figure 115:
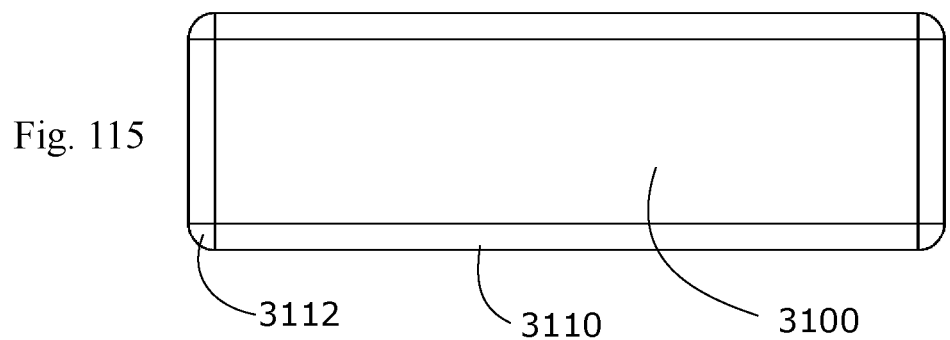
FIG. 115 is a schematic drawing showing an example of a coated conductor, with complete coverage of the gaps at the sharp edges.
Figure 116:
FIG. 116 is a schematic drawing showing an example of a coated conductor, with more than complete coverage of the gaps at the sharp edges.
Figure 117:
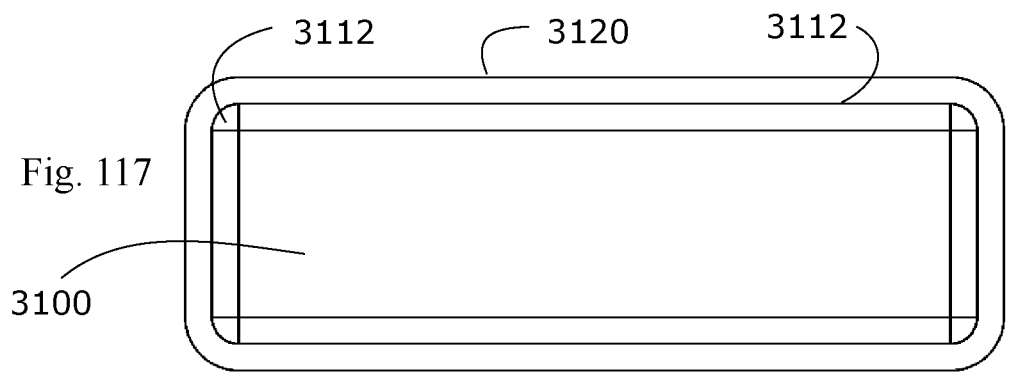
FIG. 117 is a schematic drawing showing an example of a coated conductor of FIG. 115, coated with a further polymer layer.
Figure 118:
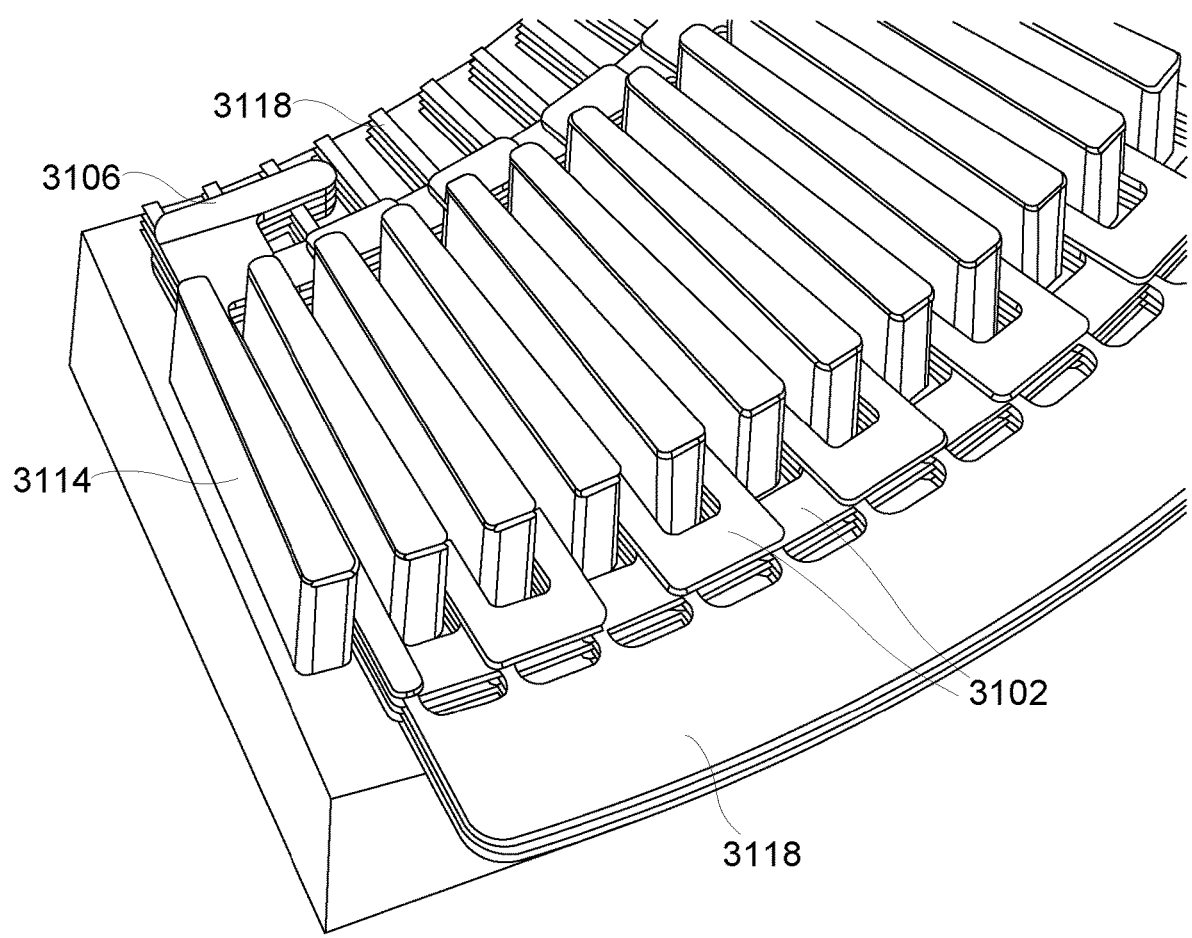
FIG. 118 shows a section view of an assembled stator and conductors with a spacer between one or more conductor layers in one or more slots
Figure 119:
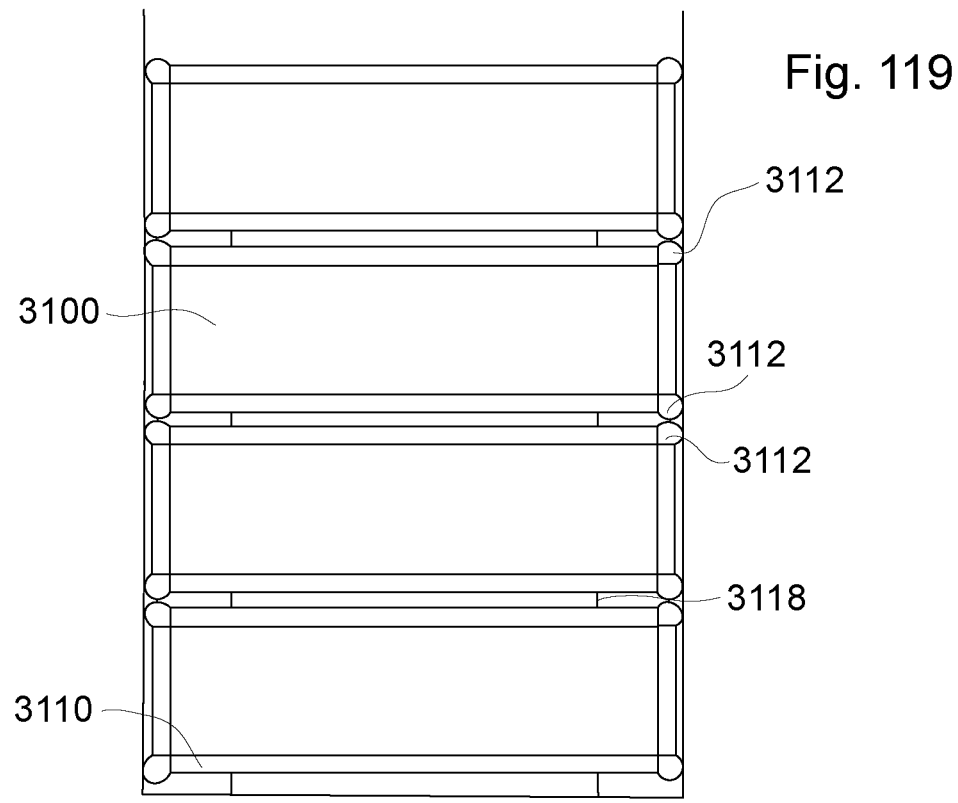
FIG. 119 shows a section view of the conductors and spacers before spacer removal with the powder edge coating contacting and adhering the conductors to each and/or to the post sidewalls.
Figure 120:
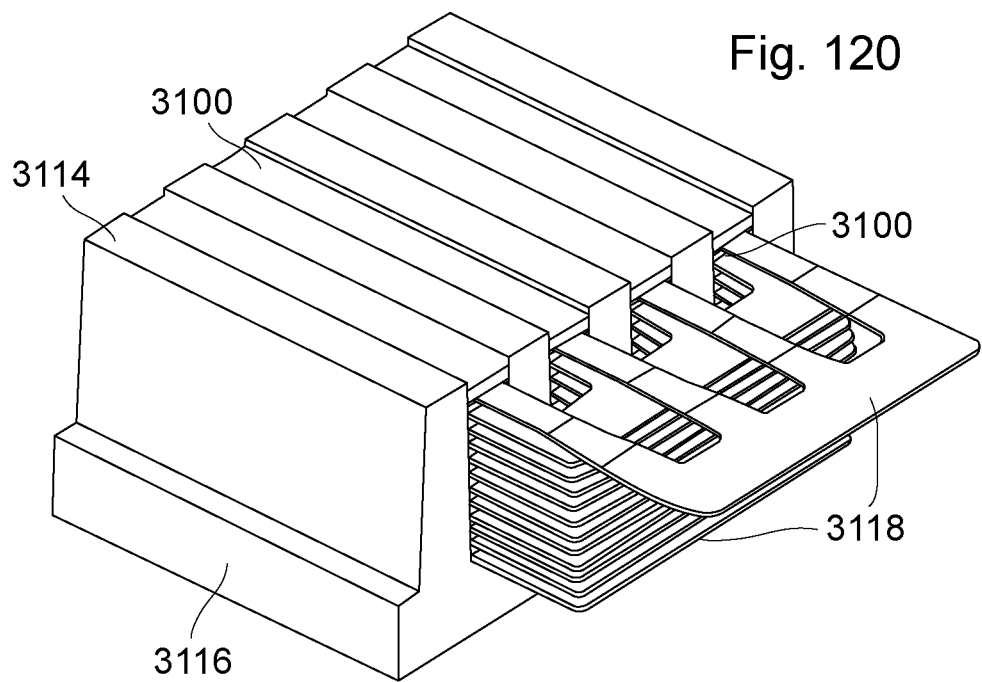
FIG. 120 shows a simplified section of stator with a spacer component being removed.
Figure 121:
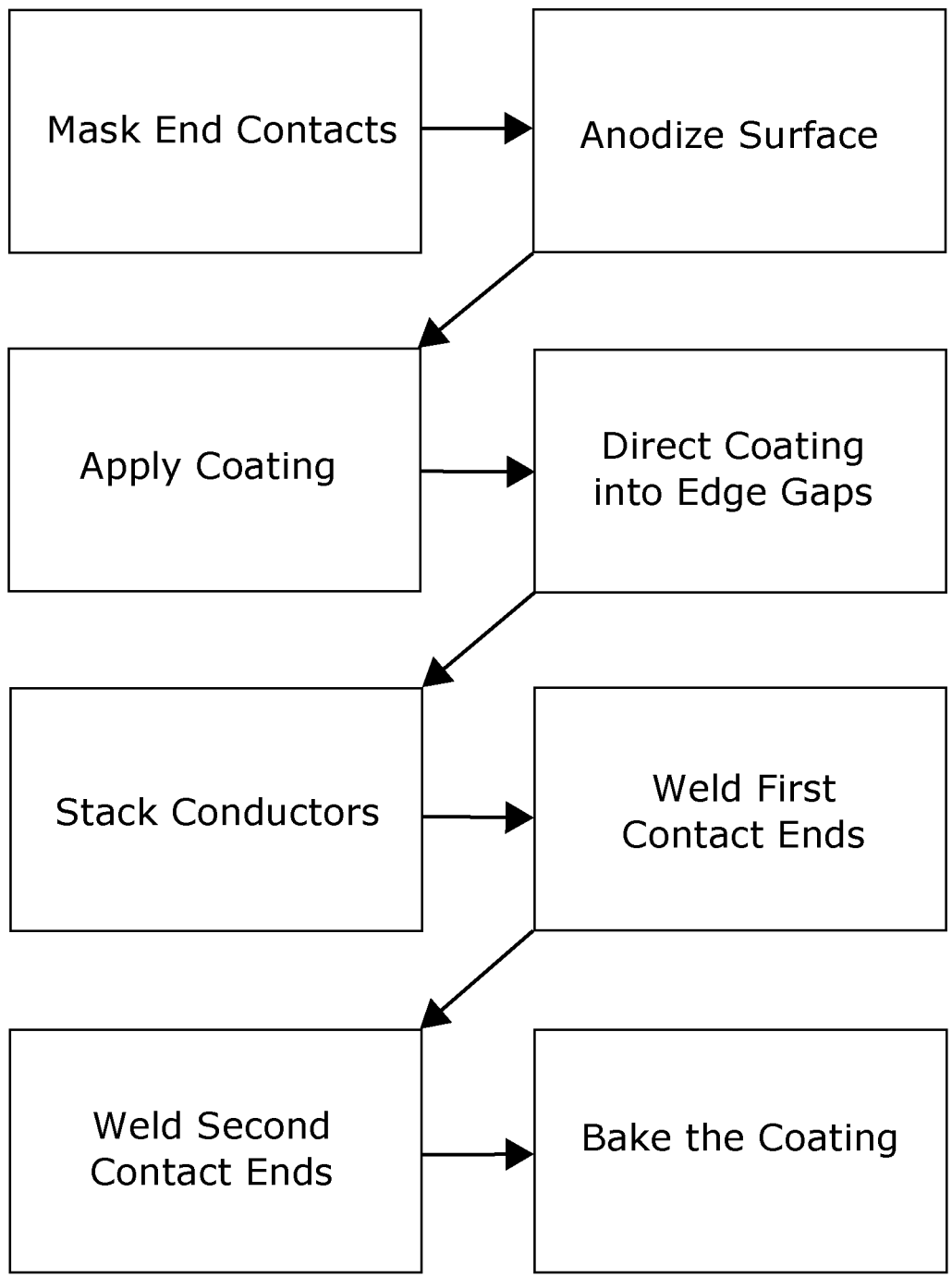
FIG. 121 shows a method of making anodized conductors.
Figure 122:
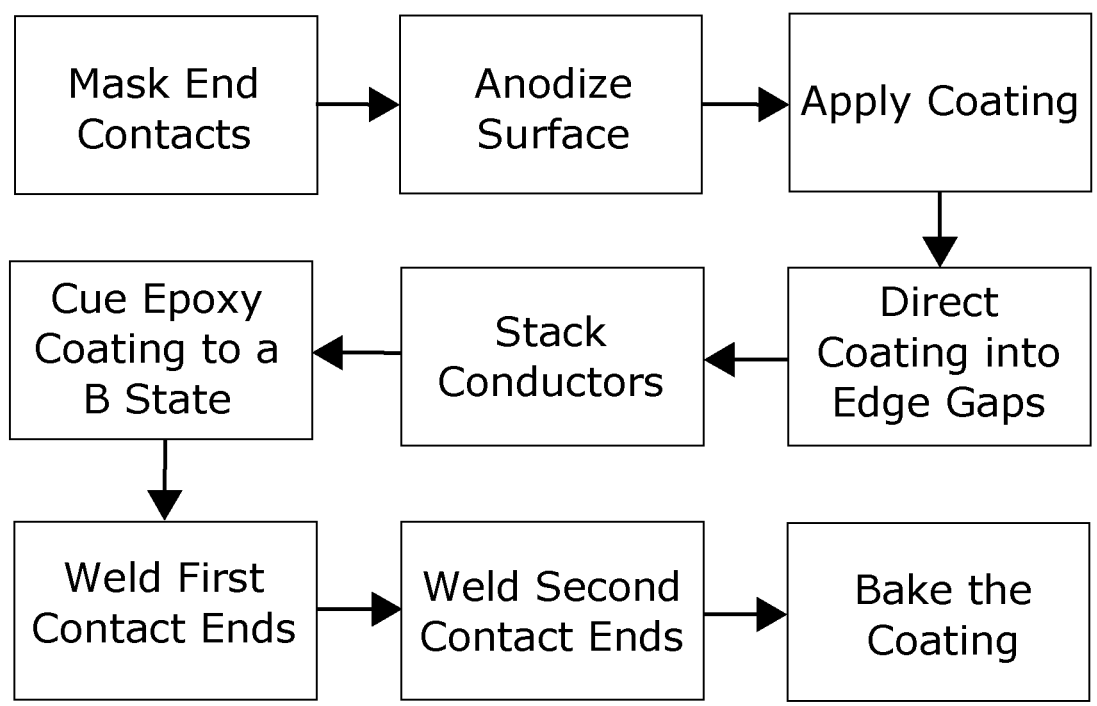
Figure 123:
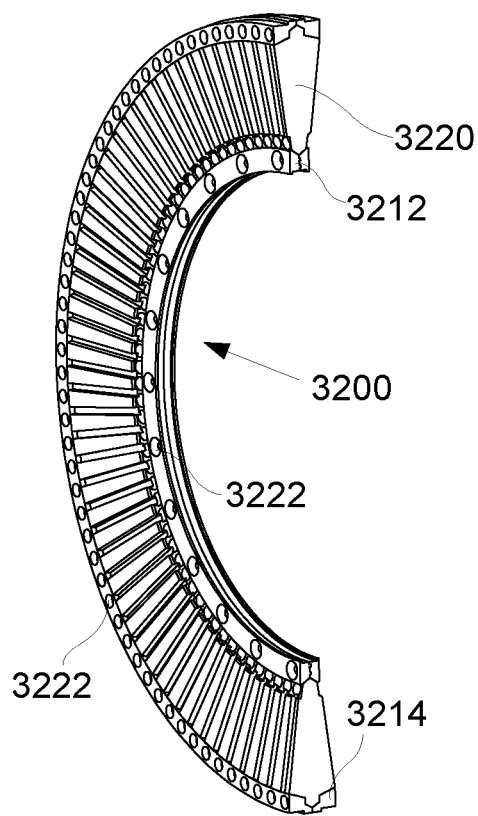
Figure 124:
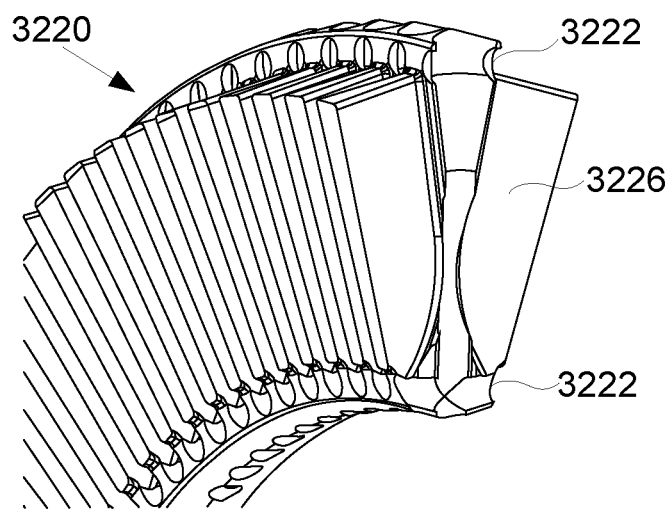
Figure 125:
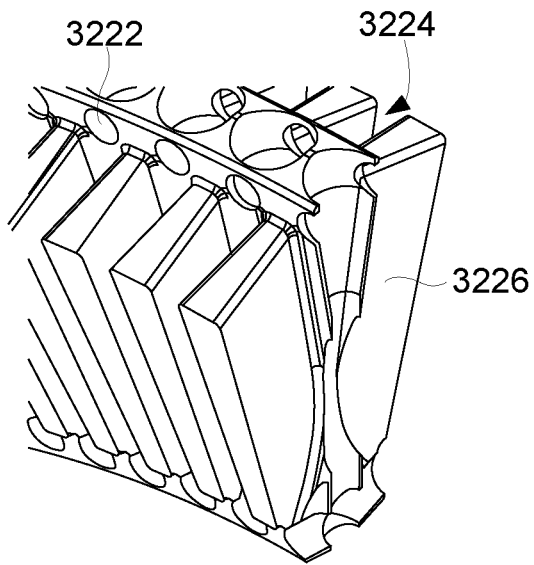
Figure 126:
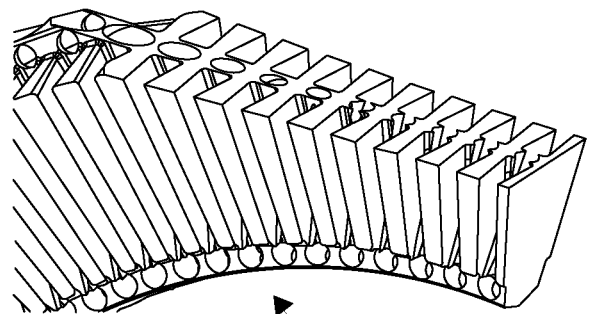
Figure 127:
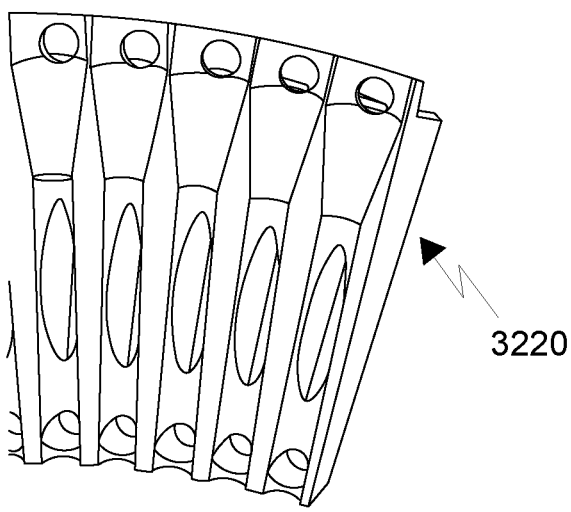

Magnetic flux path integrity is achieved in this exemplary embodiment by the use of axially shorter laminates 2418 on the side of a longer laminate 2409, of which a part 2408 protrudes through the backiron 2400, as demonstrated in FIG. 107. To achieve adequate metal-to-metal contact between the stator backiron 2400 and posts 2402 for low reluctance flux linkage 2424, all insulation at the junctions 2426 between the backiron 2400 and the laminates 2409 and the junctions 2428 between the backiron 2400 and the laminates 2418 have been removed, as shown in FIG. 107. The remaining insulation 2430 is shown schematically at one of the posts 2402 as a heavy line. Unlike the removal of insulation from the flux path of the exemplary embodiments in FIG. 104 at 2388, the removal of insulation in FIG. 107 at 2426 and 2428 results in metal-to-metal contact both between laminates 2409 and the backiron 2400 and between laminates 2418 and the backiron 2400 for low reluctance flux linkage 2424.

In the exemplary embodiment shown in FIG. 107, the use of a solid back iron disk 2400 is believed to reduce eddy currents substantially compared to a 100% solid stator and posts due to the backiron being a relatively small part of the flux path (not shown) and because the backiron disk 2400 can be axially thick enough to reduce the flux density compared to the flux density in the posts 2402. Eddy current and hysteresis losses increase with flux density, so for certain applications where the benefit of laminated posts is deemed to be worthwhile, the use of a backiron disk made of a solid metal such as iron or a cobalt or nickel alloy may offer adequate efficiency and the necessary structural integrity. With solid material used for the backiron an alloy with low electrical conductivity (and high heat conductivity) and high flux density may be used.

Adhering the protruding post sections to the slots of the cover can be done with epoxy or other adhesives or solder or brazing or ultrasonic welding, etc. A high strength solder has the advantage of providing good heat transfer which is helpful for cooling.

Exemplary Concentrated Flux Rotor Configurations:

Referring to FIG. 146 and FIG. 147, there is shown an angled section view of an embodiment of a concentrated flux rotor in a radial flux configuration. Rotor posts 3304 include an rotor relief 3320 which prevents the magnet 3302 from moving radially out of the rotor slot 3306. The rotor posts 3304 are connected by side iron 3312 (not shown in FIG. 146, but see FIG. 147). Side iron 3312 creates a flux linkage path that allows magnetic flux to pass through side iron 3312 and create an attractive magnetic force between the permanent magnet 3302 and the side iron 3312. The combination of the side iron 3312 and rotor relief 3320 positively retains permanent magnets 3302 in the rotor 3300. In this embodiment, part of the rotor post 3304 is relieved to help retain the magnets in the bottom of the slot (radially outward in this case) and a magnet securing FIG. 148 shows an angled section view of concentrated flux rotor posts 3304 and side iron 3312 in combination with mills that may be used to form the posts and side iron structure from a single block of material, such as of soft magnetic material. A regular end mill 3370 may be used to cut a wide recess into the block, working in from the outer circumference of the rotor. A smaller diameter end mill 3372 may be used to form a recess into which the permanent magnet 3302 can be inserted. A relieved shaft end mill 3374 can then be used to mill the rotor post 3304 to form the rotor relief 3320. The smaller diameter end mill 3372 and relieved shaft end mill 3374 can work in from the inner circumference of the rotor 3300. One or more walls may be left at axial ends of the block of material to form the side iron 3312.

While FIG. 146 to FIG. 148 show a radial flux configuration, an axial flux configuration variant of this design could be made with equivalent structures and methods.

Referring now to FIG. 149 there is shown a slot geometry in a schematic FEMM analysis of a linear representation of the rotor of the embodiment shown in FIG. 146 to FIG. 148. FIG. 149 shows the flux paths of two slot geometries of rotor. The four permanent magnets 3302 on the left side of the schematic are rectangular. The four permanent magnets 3302 on the right side of the schematic have a tapered end 3316 which increases the magnetic force retaining the permanent magnets 3302 in the slot. This may have the advantage of reducing the need for other methods of securing the permanent magnets in the slot.

FIG. 150 shows an angled section view of embodiment of a rotor 3300 in a radial flux configuration with an end iron 3314. In this embodiment the rotor posts 3304 include rotor relief 3320, and tapered rotor post ends 3318. The tapered rotor post ends 3318 can serve to reduce the weight of the rotor 3300. Rotor reliefs 3320 can help retain permanent magnets 3302 and in some variations can extend full across the slot to form a back iron 3310, with the effect of providing extra rigidity and helping to retain the permanent magnets 3302 in the slot by magnetic force.

Referring to FIG. 151 there is shown a stator-rotor-stator configuration with an end iron 3314. The end iron 3314 and rotor posts 3304 can be formed from a single piece of isometric soft metallic material, with a single array of permanent magnets 3302 fitting between rotor posts 3304. End iron 3314 is formed at both ends of the rotors 3304. In this embodiment, flux path restrictions 3328 can be included as shown in FIG. 152.

FIG. 152 shows an embodiment of a stator-rotor-stator configuration with a back iron 3310, end iron 3314 and flux path restrictions 3328. In this embodiment the two array of permanent magnets 3302 are separated by back iron 3310.

Flux path restrictions 3328 are formed as bores at the ends of the permanent magnets 3304 to reduce the flux leakage in the end iron 3314.

FIG. 153 shows an embodiment of a rotor-stator-rotor configuration. Two concentrated flux rotors 3300 engage a central stator 3330. The rotors 3300 each include end iron 3314 and flux path restriction 3328. In many applications end iron only or back iron only will be sufficient to provide adequate rigidity to the concentrated flux rotor 3300.

FIG. 154 shows an embodiment of a rotor-stator-rotor configuration. The embodiment is essentially the same as that shown in FIG. 153 with the addition of a think back iron 3310 on each rotor 3300.

FIG. 155 shows an embodiment of a trapezoidal stator-rotor-stator configuration. Stators 3330 are shown without conductor layers 3334. The rotor 3300 includes a back iron 3310 and end iron 3314 and has a roughly trapezoidal shape in a cross-section along the cylindrical axial direction. The rotor is composed of two rotor halves, and the combination with both a back iron 3310 and end iron 3314 provides high mechanical rigidity to the rotor. FIG. 156 shows a variation of the embodiment of a stator-rotor-stator configuration shown in FIG. 155 with only an end iron 3314 and no back iron 3310.

FIG. 157 shows an embodiment of a trapezoidal rotor-stator-rotor configuration. Stator 3330 are shown without conductor layers 3334. The rotors 3300 include end irons 3314 shown at the inner diameter and outer diameter ends of the permanent magnets 3302. In this embodiment the back surface of the rotors 3300 is interlocked with a low density housing component. FIG. 158 shows an embodiment of the trapezoidal rotor-stator-rotor configuration shown in FIG. 157 with a back iron 3310 and no end iron 3314.

FIG. 159 shows an embodiment of a rotor-stator-rotor configuration of a linear flux machine. The stator 3330 has an array of posts 3332, no conductors 3334 are shown. The rotor surrounds the stator and is made of one or more pieces material, for example, a soft magnetic isotropic material. Receiving slots for the permanent magnets 3302 on the internal structure of the rotor housing 3300 act as rotor posts 3304, rotor back iron 3310 and rotor end iron 3314. Many constructions for a linear motor are conceived by the inventor. The side section of the rotor 3330, for example, may be of a different material than the upper and lower rotor portions. FIG. 160 shows an embodiment of the rotor-stator-rotor configuration of a linear flux machine shown in FIG. 159 without a back iron 3310 on the rotor 3300.

FIG. 161 shows an embodiment of a stator-rotor-stator configuration of a linear flux machine with the rotor 3300 being formed of two arrays of magnets 3302 separated by rotor posts 3304 and back iron 3310. As with other concentrated flux rotors, the permanent magnets are alternating polarity in the linear direction, and may be the same polarity as opposing magnets on the other side of the back iron or may be opposite polarity as opposing magnets on the other side of the back iron. The traveler in this embodiment may be made of an isotropic soft magnetic material. FIG. 162 shows a partially assembled embodiment of a stator-rotor-stator configuration of a linear flux machine in which the rotor 3300 has end iron 3314 and no back iron 3310. In this arrangement the permanent magnets stops are used to position the magnets at precis locations in the slots. Permanent magnets in the top and bottom of the rotor may be of the same polarity or opposite polarity but are preferably of the same polarity to reduce flux linkage from top to bottom magnets through the rotor posts. Rotor posts 3304 and end iron 3314 may be made from a single piece of isotropic soft magnetic material.

It has been shown by FEMM analysis that removing material from part of the side of the rotor posts can result in a positive retention force on the permanent magnets with an additional benefit of reducing the rotor mass.

FIG. 163 and FIG. 164 show an isotropic rotor post array with an interrupted back iron 3310 and a relief 3322 on the rotor post wall toward the center plane of the rotor. In this embodiment, the permanent magnets are circumferentially polarized and opposite polarity to the axially aligned counterpart. The effect of this is to retain the permanent magnets into the bottom of the slots with significant force in the passive state, even though more than 50% of the flux lines from the permanent magnet are linking across the airgap. In order to provide an adequately strong and stiff isotropic post and connector member for an embodiment with an interrupted back iron, as shown here, there will need to be an end-iron connector on at least one end of the rotor posts (not shown). The longer the permanent magnets (in the Z axis of FIG. 163) the less effect the end iron will have on the flux in the airgap and the torque (or force in the case of a linear motor) which can be produced.

General Principles for Some Embodiments

Any of the disclosed structures may be used with an electric machine that has electromagnetic elements including posts and slots between the posts, where the posts are wound to create poles, at least on either of a stator or rotor, where the pole density is within a range of pole density defined by the equations specified in this patent document and the post height is within a range of post height defined by the equations specified in this patent document. These equations each define a bounded area. The bounded areas are dependent on the size of the electric machine, where the size is defined by the radius of the machine. The bounded areas together define a bounded surface in a space defined by pole density, post height and size of machine. For each radius of an electric machine, the bounded region is believed by the inventors to be new and unobvious.

Based on modelling studies and FEMM analysis, the inventors believe the following, at least beyond a specific pole density and for a specified conductor volume or post height for a given diameter of motor: 1) an electric machine having pole density and conductor volume or post height as disclosed has increased heat production (and thus lower efficiency) for a given torque or force as compared with an otherwise equivalent machine having lower pole density and/or higher conductor volume but has corresponding effective heat dissipation; and 2) the increased pole density and lower conductor volume or post height also has the effect of decreasing mass as compared with an otherwise equivalent machine having lower pole density and/or higher conductor volume, with an overall increased torque to mass ratio (torque density).

An electric machine with increased torque to mass ratio is particularly useful when several of the electric machines are spaced along an arm, such as a robotic arm, since efficiency is less important relative to the need for one electric machine to lift or accelerate one or more other electric machines. The inventor believes that improved performance of an electric machine having pole density and conductor volume or post height as disclosed results at least in part from 1) a narrower slot having a shorter heat flow path from the hottest conductor to a post and 2) a shorter heat flow path from the top of a post to a heat dissipation surface.

For example, each electric machine embodiment disclosed is shown as having a pole density and post height that is within the definition of pole density and post height that is believed to provide a benefit in terms of $K_R$.

With a pole density in the range of 0.5 and higher, for example, and considering that it is not unusual for a slot to be about as wide as a tooth, tooth width can be in the order of 1 mm for a 25 mm wide machine. Narrower teeth can be used. An advantage of thinner teeth is that solid materials such as, but not limited to steel or iron or a magnetic metal alloy, may can be used with minimal eddy currents due to the teeth being closer to the thickness of normal motor laminations. A common motor lamination for this size of motor can be in the range of 0.015" to 0.025". The proposed pole density and tooth geometry (many short posts) also helps avoid eddy currents in the first carrier (stator). For example, for an electric machine with 144 slots, eddy current loss was found to be only 7% of the total resistive losses in the windings at 200 rpm and 70 A/mm². Use of solid (non-laminated) materials provides advantages in strength, stiffness and reliability.

Embodiments of the disclosed machines may use fractional windings. Some embodiments may use distributed windings; another embodiment uses concentrated windings. Distributed windings are heavier due to more copper in the end turns and lower power (requiring a bigger motor). They also require thicker backiron because the flux has to travel at least three posts, rather than to the next post as with a fractional winding. Distributed windings produce more heat because of the longer conductors (the result of longer distance the end turns have to connect between).

An embodiment of an electric machine with the proposed pole density may have any suitable number of posts. A minimum number of posts may be 100 posts. A high number of posts allows fewer windings per post. In a non-limiting exemplary embodiment, the windings on each posts are only one layer thick (measured circumferentially, outward from the post). This reduces the number of airgaps and/or potting compound gaps and/or wire insulation layers that heat from the conductors conduct through for the conductors to dissipate heat conductively to the stator posts. This has benefits for heat capacity (for momentary high current events) and for continuous operation cooling. When direct cooling of the coils by means of gas or liquid coolant in direct contact with the conductors, a low number of circumferential layers, and for example a single circumferential layer of wire on a post, combined with high pole density, results in a very high surface area of the conductors (relative to the volume of the conductors) exposed to the cooling fluid. This is beneficial for cooling the conductors and is one of many exemplary ways to take advantage of the low conductor volume as disclosed. A single row (or low number of rows) of coils per posts also reduces manufacturing complexity allowing for lower cost production. In another embodiment, the windings of each post are two layers thick.

For a 175 mm or more average airgap electric machine, the number of slots may be 60 or more, or 100 or more for an axial flux electric machine, for example 108 slots in an exemplary 175 mm diameter embodiment. In addition, for such an electric machine, the average radial length-to-circumferential width of the posts may be above 4:1, such as about 8:1 but may go to 10:1 and higher. For the exemplary 108 slot embodiment, the ratio is about 8:1. With such a configuration, the heat dissipation is improved. A lower aspect ratio would be a lot of material for very little torque, so the aspect ratio helps achieve torque useful for high KR and robotics while at the same time taking advantage of the heat dissipation effects.

Equations Defining Pole Density and Post Height

Ranges of pole pitch (or density) and conductor volume have been found which give a significant benefit either in terms of KR, or in terms of a weighting function combining torque, torque-to-weight, and $K_m$ (as described further). The amount of benefit in terms of the weighting function is dependent on the amount of cooling and other factors, but the equations define novel structures of electric machines that provide benefits as indicated. Equations are given which define bounded regions determined by the ranges of pole density and conductor volume which yield these benefits.

In an embodiment, advantages are obtained by operating within a region of a phase space defined by machine size, pole density and post height. A series of graphs shown in FIG. 170A to FIG. 170F, show torque density (z axis) v slot density (x axis) and post height (y axis) for an exemplary series of linear motor section geometries, created and analysed using FEMM software using an automated solver generated in OCTAVE™ (which is a program for solving numerical computations). Slot density was used in this example because it is the same as pole density.

The following rules and assumptions were applied to all of the motors in the series. Each section consisted of 144 electromagnets and 146 permanent magnets. The rotor comprised sections of NdFeB 52 magnets and M-19 silicon steel. Every permanent magnet was placed tangentially to the rotor and oriented so that its magnetic field direction was aligned tangentially to the rotor and are opposite to its adjacent permanent magnets. M-19 silicon steel sections were placed between permanent magnets. The stator was made from M-19 silicon steel. The electromagnets used concentrated winding coils in a 3-phase configuration. A 75% fill factor of the coils was assumed, consisting of 75% of the slot area. The two variables that were investigated were the post height and slot density. The remainder of the geometry variables were scaled according to the following relationships: 1.25 inches constant model thickness across all simulations, Rotor permanent magnet width is set at 50% of permanent magnet pitch, Rotor permanent magnet height is set at 2.3 times of permanent magnet width, Stator slot width is 50% of stator electromagnet pitch (equal width of posts and slots), Stator back iron height is set at 50% of stator post width, Airgap axial height of 0.005 inches.

The bounded region which represents the unique geometry disclosed is modeled for the preferred embodiment, namely the embodiment which will yield the highest torque-to-weight and KR. Certain design choices have been made in this embodiment such as the selection of grade N52 NdFeB magnets in the rotor, a rotor pole to stator post ratio of 146:144, and a flux concentrating rotor with back iron. To the best of the inventor's knowledge, this configuration represents one of the highest practical torque-to-weight configurations for sizes of actuators in the disclosed diameters while still retaining a reasonable level of manufacturability and structural stability. Many other configurations are possible such as different rotor types (surface permanent magnet, buried permanent magnet, etc), different magnet materials and grades including but not limited to ceramic, samarium cobalt, and high-temperature NdFeB, different rotor pole to stator post ratios, different stator winding configurations, different stator materials, etc. In many cases, different design choices for these parameters will not have as great a KR benefit as compared to the preferred embodiment by either resulting in reduced torque or increased weight for the same pole pitch and post height as the preferred embodiment. However, for the majority of designs, there is a benefit to KR by using the pole pitch and post height of inside the disclosed region over geometry outside the disclosed region when all other design variables and geometrical relationships are held constant. This principle holds true for both concentrated and distributed winding designs, for linear motors, axial flux rotary motors, radial flux rotary motors, trapezoidal/toroidal rotary motors, and transverse flux linear and rotary motors.

For each of those motor section geometries, magnetic simulation and heat simulation were performed. For every magnetic simulation, the program yielded values for mass, horizontal force, and power consumption. Geometrical extrapolations of the coil cross sections were used to find the mass and power consumption of the end windings in order to more accurately predict the mass and power consumption of the entire system. For calculating stall torque and torque at low speed, the square root of resistive losses is the dominant part of the power consumption, with a multiplier based on the slot geometry to account for the resistive losses of the end windings. These values were used to calculate the mass force density (force per unit mass) and the area-normalized force (force per unit area of the airgap) of each simulation. For every heat simulation, the program yielded values for coil temperature, rotor temperature and stator temperature. A set cooling rate was applied to the stator inner surface using water as the coolant and a convection coefficient of 700 $W/m^2K$. The temperature of the water was set at 15° C. and it had a flow rate between 6-20 mm/s. Steady state conditions were assumed.

For constant current density simulations, a fixed current density was applied to the conductor and the resulting force, mass, power consumption, and maximum stator temperature were calculated by the program.

For constant temperature, force per area, or force density simulations, the current density was adjusted at each geometry point until the parameter of interest reached the target value, and the other parameters were recorded at that point. The target error for constant temperature, force per area, and force density simulations are 1 degrees, 0.002 $N/mm^2$, and 1 N/kg respectively. This data can be directly applied to any size of rotary motor by multiplying the area-normalized force by the circumferential area of the airgap in the rotary motor, and multiplying the force by the diameter to yield the resulting torque. There will be some small deviations due to the radius of curvature of the motor, and the errors associated with approximating a curved structure with a linear one, however our simulations have shown the rotary simulated torque typically to be within 10% of that predicted by the linear model.

High torque-to-weight is of benefit in some applications, but a minimum level of torque may be necessary for applications such as robotics where the arm, no matter how light it may be as a result of high torque-to-weight actuators, must still have enough torque to lift and move a payload. Electric machines having a pole density and conductor volume within the ranges disclosed in this patent document provide high torque and torque-to-weight at acceptable power consumption levels.

The force per area at a constant current density 2320 is plotted in FIG. 170A as a function of slot pitch and post height. The same current applied to all motors in the virtual series results in dramatically lower force per area in the disclosed ranges 2322 (indicated schematically by the dashed lines). The dashed lines correspond to the middle boundary from each size (25 mm, 50 m, 100 mm and 200 mm as discussed in relation to the equations below) projected onto the 3D surface. The middle boundaries correspond to the sets of equations A2, B2, C2 and D2. In this graph, the force per area at constant current density 2320 is shown for a series of motors that were analyzed in FEMM using a script in OCTAVE to find the highest torque rotary position for a given 3 phase input power. These motors are identical in every way apart from the conductor volume and slot density, which are varied as shown.

The highest current density possible at a given temperature 2324 is plotted in FIG. 170B as a function of slot pitch and post height. The exponentially higher heat dissipation characteristic in the disclosed ranges 2322 allows much higher current density at a given temperature. Low conductor volume tends to reduce the actuator weight, but low conductor volume also tends to reduce the actuator torque. When the conductor volume and slot density is in the disclosed ranges, however, there is a dramatic reduction in the heat flow resistance from the conductors to the back of the stator or to any other surface where cooling can be applied, thus allowing very high current densities to be applied to the conductors without overheating the actuator.

In FIG. 170B, the same series of motors is used as in FIG. 170A, but instead of constant current density applied to each motor, the current density was varied until the steady state temperature of the conductors was ~70° C. A reasonable representation of a typical water cooling effect was applied to the outer axial surface of the stators at a convection coefficient of 700 $W/m^2K$. The temperature of the water was set at 15° C. Ambient temperature was set at 15° C. No air convective cooling was applied to the rotor for simplicity because the water cooled surface was highly dominant in terms of cooling and because the rotor was not producing heat of its own. Steady state conditions were assumed. For each point on the 3D graph, the current density of the motor was increased from zero until the temperature of the coils reached ~70 deg C.

FIG. 170C is the same as FIG. 170D except that it has constant current at 6 $A/mm^2$ as apposed to constant temperature of 70 deg C. Thus demonstrating how the heat dissipation benefit of short posts give unexpected benefit disclosed range FIG. 170C was developed using the following weighting convention, Torque—weighting of 1, Torque-to-weight—weighting of 3, Power consumption—weighting of 2. Torque-to-weight was the most highly weighted because the weight of the arm is determined by the weight of the actuator and because the weight of the arm will typically be significantly higher than the weight of the payload. Torque was weighted at 1 to include it as an important consideration but recognizing that the payload may be quite a bit lower than the weight of the arm. Power consumption was given a moderate weighting because it is an important consideration, but power consumption is known to benefit from lower arm weight, as is accomplished by a higher weighting on torque-to-weight, so a higher weighting on power consumption was deemed to be potentially counter-productive.

By applying a constant current density to the series of motors, and combining the results with the above weighting, the surface 2328 in FIG. 170D shows a trend toward lower overall performance toward and continuing through the disclosed ranges 2322 of slot (or pole) density and conductor volume. FIG. 170D shows a benefit in the disclosed range when the constant temperature current density is applied from FIG. 170B.

An industry standard metric for motor capability is the KM which is basically torque-to-power consumption. KM assumes sufficient cooling for a given electrical power. It only considers the amount of power required to produce a certain level of torque. The $K''_m$ surface 2330 as a function of slot pitch and post height is plotted in FIG. 170E.

The torque to weight to power consumption shows the most unexpected and dramatic benefit in the disclosed ranges 2322 as seen from the graph of the $K''_R$ surface 2332 as a function of slot pitch and post height in FIG. 170F. High $K_R$ may not be of great benefit in stationary applications, but in applications such as robotics, $K_R$ indicates that power consumption benefits can be achieved by reducing the weight of the entire system.

A method of producing a graph showing how $K''_R$ varies with pole density and post height is as follows. Consider a motor section with geometry A having low conductor volume (low post height) and low pole density. The motor section with geometry A is simulated; a set cooling rate is applied to the stator inner surface using water as the coolant and a convection coefficient of 700 W/m²K. The temperature of the water is set at 15° C. and it has a flow rate between 6-20 mm/s. Steady state conditions are assumed. The current passing through the conductor of geometry A is then increased until the maximum temperature of the conductors reaches 70° C. The torque density of geometry A at this point is then recorded and plotted in the graph for the corresponding values of post height and pole density. The process is repeated for other geometries, obtained, by example, through varying the post height and pole density and scaling the remaining parameters as described above. For instance, a geometry B may be is obtained from geometry A by increasing the post height, with all other parameters scaled as described above. A geometry C may have the same post height as geometry A but greater pole density. A geometry D may have increased post height and increased pole density as compared to geometry A. Plotting the torque densities results in a surface in a graph.

It is found that the torque density increases as pole density increases and post height decreases. No such increase in torque density is shown to occur with geometries having either a low post height or a high pole density; the benefit in torque density is only observed for geometries combining these two factors. Yet, in this region, efficiency is decreasing. While the graph was produced based on the assumptions indicated, the inventor soundly predicts, based on the disclosed cooling effect and reduction of flux losses of increasing pole density and decreasing conductor volume or post height, that the same geometry will have a benefit at other values of the parameters that were used in the simulations. Changes in motor design elements which do not affect post height or pole density are not expected to result in a loss of the benefits. For instance, an electric machine comprising a rotor with tangentially oriented permanent magnets and an analogous electric machine comprising a rotor with surface-mounted permanent magnets may possess somewhat different $K''_R$ surfaces; nonetheless, the principles described above will still apply and a benefit would still be predicted within the region of geometries of low post height and high pole density described previously. As currently understood, the principles apply only to electric machines with posts, such as axial flux and radial flux machines.

In the disclosed equations and graphs, the parameter $K''_R$ is size-independent and has been converted from a conventional $K_R$ to use force instead of torque, and to be independent of both circumferential length and axial length. Therefore, the conventional $K_R$ of any size motor can be found from the $K''_R$ value. And for two motors of identical size (diameter at the airgap and axial length) but different geometry (i.e. pole density and/or post height), the multiplying factor will be the same, so the motor with higher $K''_R$ will have a higher conventional $K_R$.

$K''_R$ as a function of pole density and post height greatly resembles the surface of a graph showing conventional KR. However, this particular surface, corresponding to the torque density, may change considerably when different temperatures are used as the constraint in the analysis. $K''_R$, by contrast, does not change substantially (provided the current doesn't get sufficiently high for the motors in the series start to saturate; then the 3D curve shape will change.) It is the $K''_R$, therefore, that is used to define the specific range of pole density and post height which result in the previously-discussed benefits.

The ranges of benefit disclosed depend on the resultant motor diameter at the airgap. Smaller motors are more constrained because the physical size of the motor prevents lower slot densities from being used. We have defined 4 discrete motor diameter ranges corresponding to 200 mm and above, 100 mm and above, 50 mm and above, and 25 mm and above. For each diameter range, we describe three levels of $K''_R$. The first corresponds to where a small benefit to $K''_R$ begins, the second to a moderate $K''_R$ benefit, and the third to a high $K''_R$ benefit for that specific diameter range. Higher $K''_R$ values generally correspond to lower overall torque values for that motor size range.

These motor sizes disclosed (25 mm and up to 200 mm diameter and above) represent small to large motors. The airgap of 0.005 inches used in the simulation is believed to be the smallest reasonable airgap size for this range of motors. Smaller airgaps are not practical for this motor range due to manufacturing tolerances, bearing precision, component deflection, and thermal expansion.

The coefficients in the equations above were chosen in a manner to bound the region of interest and make the resulting relation nearly continuous.

A 50:50 ratio of post:slot width was chosen for these simulations, as analysis had shown that highest benefits are obtained when the ratio is between 40:60 and 60:40. A 50:50 ratio represents a typical best-case scenario; at fixed post height, using a 10:90 slot:post width ratio will have a significantly degraded performance by comparison. Analysis shows that at constant post height, an embodiment exhibits the maximum of torque and torque density at a 50% slot width, and the maximum of Km and Kr at 40% slot width. However, the maximum values of Km and Kr are within 5% of the values given at a 50:50 geometry; consequently a 50:50 ratio was viewed as a reasonable choice of scaling parameter for the simulations. Other ratios of post:slot width would give a portion of the benefits disclosed.

Equations and graphs are discussed below which show the ranges of pole density and conductor volume which give a significant benefit either in terms of KR, or in terms of a weighting function combining torque, torque-to-weight, and Km, for different embodiments. As with the previously-described equations, the region of benefit in terms of the weighting function is dependent on the amount of cooling.

Size of an electric machine means the airgap diameter of an axial flux machine or radial flux machine as defined herein or the length in the direction of translation of the carriers of a linear machine.

The first bounded region corresponds to regions where a significant $K_R$ benefit is found with respect to the rest of the geometries in the domain. For a given device size, $K_R$ has a higher value in the disclosed range of geometry than anywhere outside of the range, indicating potential benefits to overall system efficiency for certain applications using devices of these geometries. The graph of $K''_R$ is used to define the boundary by placing a horizontal plane through at a specified $K''_R$ value. Four values of $K''_R$ are used to define areas of benefit for four different actuator size ranges corresponding to sizes of 200 mm and larger, 100 mm and larger, 50 mm and larger, and 25 mm and larger.

In the following tables, pole pitch is represented by the variable S, in mm. Post height is also represented in millimetres.

In a machine with 25 mm size, the boundary line for $K''_R > 3.3$ is defined by the values shown in Table 1 and the corresponding graph is FIG. 180.

TABLE 1

Set A1

| | | | Points | |
|---|---|---|---|---|
| | | | Pole Pitch | Post Height |
| Post Height> | | | | |
| −1.070*S + 2.002 | for | 0.572 < S < 1.189 | 0.572 | 1.390 |
| 1.175*S + −0.667 | for | 1.189 < S < 2.269 | 1.189 | 0.730 |
| 13.502*S − 28.637 | for | 2.269 < S < 2.500 | 2.269 | 1.999 |
| Post Height< | | | 2.500 | 5.118 |
| −5.898*S + 19.863 | for | 1.970 < S < 2.500 | 1.970 | 8.244 |
| 0.229*S + 7.794 | for | 1.349 < S < 1.970 | 1.349 | 8.102 |
| 7.607*S − 2.160 | for | 0.723 < S < 1.349 | 0.723 | 3.340 |
| 11.430*S − 4.924 | for | 0.572 < S < 0.723 | 0.572 | 1.614 |
| | | | 0.572 | 1.390 |

In a machine with 25 mm size, the boundary line for $K''_R > 3.4$ is defined by the values shown in Table 2 and the corresponding graph is FIG. 181.

TABLE 2

Set A2

| | | | Points | |
|---|---|---|---|---|
| | | | Pole Pitch | Post Height |
| Post Height> | | | | |
| −1.340*S + 2.305 | for | 0.619 < S < 1.120 | 0.619 | 1.475 |
| 1.100*S − 0.429 | for | 1.120 < S < 2.074 | 1.120 | 0.803 |
| 3.830*S − 6.082 | for | 2.074 < S < 2.269 | 2.074 | 1.852 |
| Post Height< | | | 2.269 | 2.598 |
| −69.510*S + 160.318 | for | 2.222 < S < 2.269 | 2.222 | 5.865 |
| −3.430*S + 13.492 | for | 1.667 < S < 2.222 | 1.667 | 7.770 |
| 2.830*S + 3.056 | for | 1.133 < S < 1.667 | 1.133 | 6.260 |
| 8.650*S − 3.545 | for | 0.619 < S < 1.133 | 0.619 | 1.812 |
| | | | 0.619 | 1.475 |

In a machine with 25 mm size, the boundary line for $K''_R > 3.6$ is defined by the values shown in Table 3 and the corresponding graph is FIG. 182.

TABLE 3

Set A3

| | | | Points | |
|---|---|---|---|---|
| | | | Pole Pitch | Post Height |
| Post Height> | | | | |
| −4.160*S + 5.032 | for | 0.723 < S < 0.967 | 0.723 | 2.024 |
| 0.839*S + 0.198 | for | 0.967 < S < 1.692 | 0.967 | 1.009 |
| 2.713*S − 2.973 | for | 1.692 < S < 1.939 | 1.692 | 1.617 |
| Post Height< | | | 1.939 | 2.287 |
| −53.233*S + 105.506 | for | 1.879 < S < 1.939 | 1.879 | 5.481 |
| −1.406*S + 8.122 | for | 1.465 < S < 1.879 | 1.465 | 6.063 |
| 3.898*S + 0.353 | for | 1.035 < S < 1.465 | 1.035 | 4.387 |
| 7.535*S − 3.412 | for | 0.723 < S < 1.035 | 0.723 | 2.036 |
| | | | 0.723 | 2.024 |

In a machine with 50 mm size, the boundary line for $K''_R > 2.2$ is defined by the values in Table 4 and the corresponding graph is FIG. 177.

TABLE 4

Set B1

| | | | Points | |
|---|---|---|---|---|
| | | | Pole Pitch | Post Height |
| Post Height> | | | | |
| 0.254*S + 0.462 | for | 0.319 < S < 3.667 | 0.319 | 0.543 |
| 2.665*S + −8.380 | for | 3.667 < S < 5.000 | 3.667 | 1.394 |
| | | | 5.000 | 4.947 |
| Post Height< | | | 4.500 | 14.088 |
| −18.282*S + 96.357 | for | 4.500 < S < 5.000 | 2.738 | 22.304 |
| −4.663*S + 35.071 | for | 2.738 < S < 4.500 | 1.447 | 18.967 |
| 2.585*S + 15.227 | for | 1.447 < S < 2.738 | 0.319 | 0.904 |
| 16.013*S − 4.204 | for | 0.319 < S < 1.447 | 0.319 | 0.543 |

In a machine with 50 mm size, the boundary line for $K''_R > 2.5$ is defined by the values in Table 5, and the corresponding graph is FIG. 178.

TABLE 5

Set B2

| | | | Points | |
|---|---|---|---|---|
| | | | Pole Pitch | Post Height |
| Post Height> | | | | |
| 0.269*S + 0.456 | for | 0.380 < S < 3.016 | 0.380 | 0.558 |
| 3.051*S − 7.936 | for | 3.016 < S < 4.167 | 3.016 | 1.267 |
| | | | 4.167 | 4.779 |
| Post Height< | | | | |
| −14.766*S + 66.309 | for | 3.667 < S < 4.167 | 3.667 | 12.162 |
| −3.952*S + 26.654 | for | 2.315 < S < 3.667 | 2.315 | 17.505 |
| 3.108*S + 10.310 | for | 1.278 < S < 2.315 | 1.278 | 14.282 |
| 14.542*S − 4.303 | for | 0.389 < S < 1.278 | 0.389 | 1.354 |
| 88.444*S − 33.051 | for | 0.380 < S < 0.389 | 0.380 | 0.558 |

In a machine with 50 mm size, the boundary line for $K''_R > 2.9$ is defined by the values in Table 6, and the corresponding graph is FIG. 179.

TABLE 6

Set B3

|  |  | Points | |
|---|---|---|---|
|  |  | Pole Pitch | Post Height |
| Post Height> | | | |
| 0.191*S + 0.626 | for 0.472 < S < 2.181 | 0.472 | 0.716 |
| 2.135*S − 3.613 | for 2.181 < S < 3.095 | 2.181 | 1.043 |
| 53.475*S − 162.511 | for 3.095 < S < 3.175 | 3.095 | 2.994 |
| Post Height< | | 3.175 | 7.272 |
| −5.095*S + 23.450 | for 2.222 < S < 3.175 | 2.222 | 12.128 |
| 0.805*S + 10.339 | for 1.381 < S < 2.222 | 1.381 | 11.451 |
| 10.251*S − 2.706 | for 0.572 < S < 1.381 | 0.572 | 3.158 |
| 24.420*S − 10.810 | for 0.472 < S < 0.572 | 0.472 | 0.716 |

In a machine with 100 mm size, the boundary line for $K''_R > 1.5$ is defined by the values in Table 7, and the corresponding graph is FIG. 174.

TABLE 7

Set C1

|  |  | Points | |
|---|---|---|---|
|  |  | Pole Pitch | Post Height |
| Post Height> | | | |
| 0.322*S + 0.359 | for 0.233 < S < 6.667 | 0.233 | 0.434 |
| 2.202*S − 12.179 | for 6.667 < S < 8.333 | 6.667 | 2.504 |
| Post Height< | | 8.333 | 6.173 |
| −25.555*S + 219.122 | for 7.778 < S < 8.333 | 7.778 | 20.356 |
| −5.585*S + 63.794 | for 4.000 < S < 7.778 | 4.000 | 41.455 |
| 3.214*S + 28.600 | for 1.793 < S < 4.000 | 1.793 | 34.362 |
| 21.749*S − 4.633 | for 0.233 < S < 1.793 | 0.233 | 0.434 |

In a machine with 100 mm size, the boundary line for $K''_R > 1.7$ is defined by the values in Table 8, and the corresponding graph is FIG. 175.

TABLE 8

Set C2

|  |  | Points | |
|---|---|---|---|
|  |  | Pole Pitch | Post Height |
| Post Height> | | | |
| 0.277*S + 0.593 | for 0.250 < S < 5.182 | 0.250 | 0.662 |
| 2.342*S − 10.111 | for 5.182 < S < 7.222 | 5.182 | 2.026 |
| Post Height< | | 7.222 | 6.804 |
| −13.149*S + 101.763 | for 6.111 < S < 7.222 | 6.111 | 21.412 |
| −4.885*S + 51.265 | for 3.333 < S < 6.111 | 3.333 | 34.983 |
| 4.291*S + 20.680 | for 1.520 < S < 3.333 | 1.520 | 27.203 |
| 20.788*S − 4.395 | for 0.251 < S < 1.520 | 0.251 | 0.823 |
| 161.000*S − 39.588 | for 0.250 < S < 0.251 | 0.250 | 0.662 |

In a machine with 100 mm size, the boundary line for $K''_R > 1.9$ is defined by the values in Table 9, and the corresponding graph is FIG. 176.

TABLE 9

Set C3

|  |  | Points | |
|---|---|---|---|
|  |  | Pole Pitch | Post Height |
| Post Height> | | | |
| 0.277*S + 0.591 | for 0.278 < S < 4.425 | 0.278 | 0.668 |
| 1.916*S − 6.663 | for 4.425 < S < 6.111 | 4.425 | 1.817 |
| Post Height< | | 6.111 | 5.048 |
| −21.337*S + 135.438 | for 5.556 < S < 6.111 | 5.556 | 16.890 |
| −4.985*S + 44.588 | for 3.175 < S < 5.556 | 3.175 | 28.76 |
| 2.749*S + 20.031 | for 1.560 < S < 3.175 | 1.560 | 24.320 |
| 18.321*S − 4.260 | for 0.278 < S < 1.560 | 0.278 | 0.833 |
|  |  | 0.278 | 0.646 |

In a machine with 200 mm size, the boundary line for $K''_R > 1.3$ is defined by the values in Table 10, and the corresponding graph is FIG. 171.

TABLE 10

Set D1

|  |  | Points | |
|---|---|---|---|
|  |  | Pole Pitch | Post Height |
| Post Height> | | | |
| 0.257*S + 0.327 | for 0.208 < S < 7.778 | 0.208 | 0.381 |
| 1.977*S + −13.044 | for 7.778 < S < 9.444 | 7.778 | 2.330 |
| Post Height< | | 9.444 | 5.623 |
| −36.195*S + 347.445 | for 8.889 < S < 9.444 | 8.889 | 25.711 |
| −5.777*S + 77.062 | for 4.833 < S < 8.889 | 4.833 | 49.142 |
| 1.950*S + 39.718 | for 2.222 < S < 4.833 | 2.222 | 44.051 |
| 20.301*S + −1.058 | for 0.389 < S < 2.222 | 0.389 | 6.839 |
| 34.481*S + −6.574 | for 0.208 < S < 0.389 | 0.208 | 0.598 |
|  |  | 0.208 | 0.381 |

In a machine with 200 mm size, the boundary line for $K''_R > 1.5$ is defined by the values in Table 11, and the corresponding graph is FIG. 172.

TABLE 11

Set D2

|  |  | Points | |
|---|---|---|---|
|  |  | Pole Pitch | Post Height |
| Post Height> | | | |
| 0.322*S + 0.359 | for 0.233 < S < 6.667 | 0.233 | 0.434 |
| 2.202*S + −12.179 | for 6.667 < S < 8.333 | 6.667 | 2.504 |
| Post Height< | | 8.333 | 6.173 |
| −25.555*S + 219.122 | for 7.778 < S < 8.333 | 7.778 | 20.356 |
| −5.585*S + 63.794 | for 4.000 < S < 7.778 | 4.000 | 41.455 |
| 3.214*S + 28.600 | for 1.793 < S < 4.000 | 1.793 | 34.362 |
| 21.749*S + −4.633 | for 0.233 < S < 1.793 | 0.233 | 0.434 |

In a machine with 200 mm size, the boundary line for $K''_R > 1.8$ is defined by the values in Table 12, and the corresponding graph is FIG. 173.

TABLE 12

Set D3

| | | | Points | |
|---|---|---|---|---|
| | | | Pole Pitch | Post Height |
| Post Height> | | | | |
| 0.212 *S + 0.600 | for | 0.264 < S < 4.833 | 0.264 | 0.656 |
| 3.017 *S + −12.960 | for | 4.833 < S < 6.667 | 4.833 | 1.623 |
| Post Height< | | | 6.667 | 7.157 |
| −12.356 *S + 89.531 | for | 5.556 < S < 6.667 | 5.556 | 20.884 |
| −4.551*S + 46.170 | for | 3.175 < S < 5.556 | 3.175 | 31.72 |
| 3.850 *S + 19.496 | for | 1.502 < S < 3.175 | 1.502 | 25.279 |
| 19.751 *S + −4.387 | for | 0.264 < S < 1.502 | 0.264 | 0.827 |
| | | | 0.264 | 0.656 |

At each machine size, each boundary line is defined for a given K" value, such that for each machine size there is a set of K" values and a corresponding set of boundary lines. Pairs of boundary lines can be chosen, in which one boundary line is chosen from each of two consecutive sizes of device, i.e. 25 mm and 50 mm, 50 mm and 100 mm, or 100 mm and 200 mm. The boundary lines occupy a space or volume defined by size, pole pitch and post height. A boundary surface may be defined as the two-dimensional uninterrupted surface in the space that is the exterior surface of the union of all lines that connect an arbitrary point in the first boundary line and an arbitrary point in the second boundary line. The boundary surface encloses a benefit space. For each pair of boundary lines, the boundary surface defines a benefit space. An electric machine with a size, pole pitch and post height that is within a given benefit space is considered to fall within the embodiment defined by the corresponding boundary lines for that size of machine.

For machine sizes greater than the largest calculated size, the boundary lines calculated for the largest calculated size are used. The benefit space beyond the largest calculated size is thus simply the surface defined by the calculated boundary lines for that size and the volume of points corresponding to greater size but with pole pitch and post height equal to a point on the surface.

The main components of an electric machine comprise a first carrier (rotor, stator, or part of linear machine) having an array of electromagnetic elements and a second carrier having electromagnetic elements defining magnetic poles, the second carrier being arranged to move relative to the first carrier for example by bearings, which could be magnetic bearings. The movement may be caused by interaction of magnetic flux produced by electromagnetic elements of the first carrier and of the second carrier (motor embodiment) or by an external source, in which case the movement causes electromotive force to be produced in windings of the electric machine (generator embodiment). An airgap is provided between the first carrier and the second carrier. The electromagnetic elements of the first carrier include posts, with slots between the posts, one or more electric conductors in each slot, the posts of the first carrier having a post height in mm. The first carrier and the second carrier together define a size of the electric machine. The magnetic poles having a pole pitch in mm. The size of the motor, pole pitch and post height are selected to fall within a region in a space defined by size, pole pitch and post height. The region is defined by 1) a union of a) a first surface defined by a first set of inequalities for a first size of electric machine, b) a second surface defined by a second set of inequalities for a second size of electric machine; and c) a set defined as containing all points lying on line segments having a first end point on the first surface and a second end point on the second surface, or 2) a surface defined by a set of inequalities and all points corresponding to greater size but with pole pitch and post height corresponding to points on the surface.

The first set of inequalities and the second set of inequalities are respectively sets of inequalities A and B, or B and C, or C and D where A is selected from the group of sets of inequalities consisting of the equations set forward in Tables 1, 2 and 3 (respectively sets of equalities A1, A2 and A3), B is selected from the group of sets of inequalities consisting of the equations set forward in Tables 4, 5 and 6 (respectively sets of equalities B1, B2 and B3), C is selected from the group of sets of inequalities consisting of the equations set forward in Tables 7, 8 and 9 (respectively sets of inequalities C1, C2, C3) and D is selected from the group of sets of inequalities consisting of the inequalities set forward in Tables 10, 11 and 12 (respectively sets of inequalities D1, D2 and D3).

The space in which the electric machine is characterized may be formed by any pair of inequalities that are defined by sets of inequalities for adjacent sizes, for example: A1 B1, A1 B2, A1 B3, A2 B1, A2 B2, A2 B3, A3 B1, A3 B2, A3 B3, B1 C1, B1 C2, B1 C3, B2 C1, B2 C2, B2 C3, B3 C1, B3 C2, B3 C3, C1 D1, C1 D2, C1 D3, C2 D1, C2 D2, C2 D3, C3 D1, C3 D2, C3 D3. It may also be formed by any set of inequalities and all points corresponding greater size but having post height and pole pitch within the region defined by the set of inequalities.

All of the devices described in this application may have sizes, pole pitches and post heights falling within the regions and spaces defined by these equations.

Figure 129:
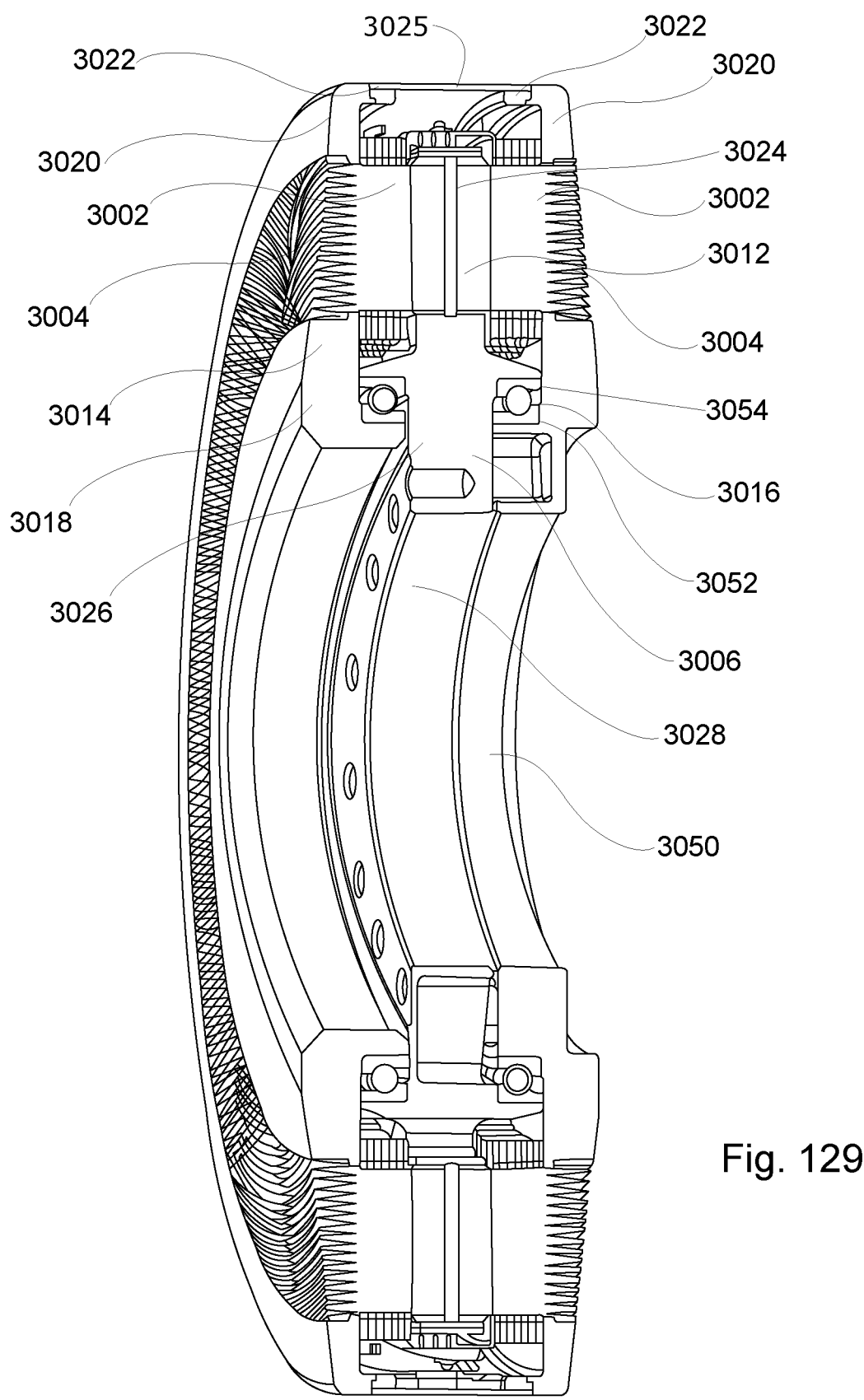
Figure 133:
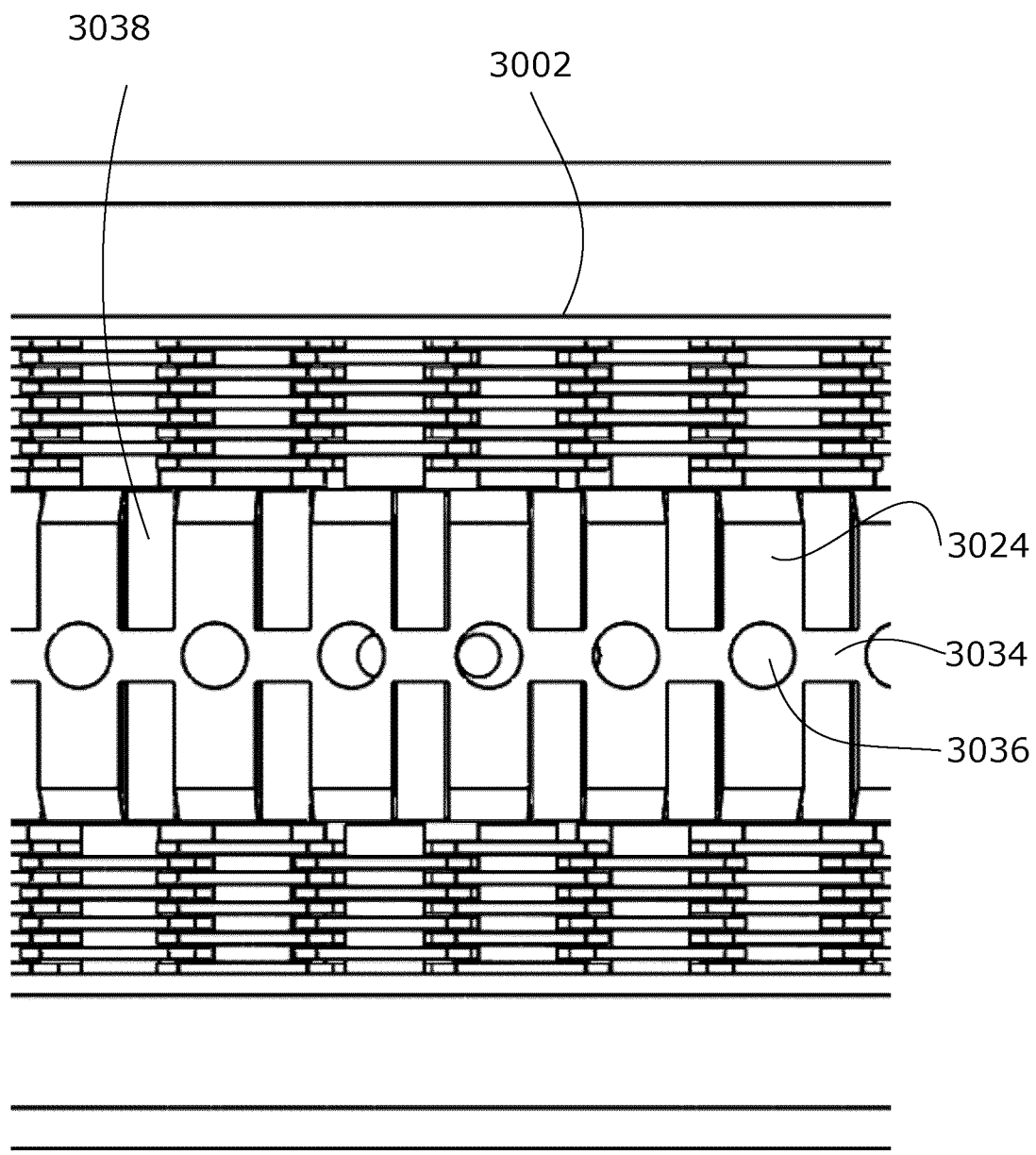

In a simulation of geometry of the embodiment represented by FIG. 1-FIG. 5, using a 0.005" air gap and using N52 magnets, the simulation yields a KR" of 1.53 Nm/kg/ VV which is inside of the benefit range for that size. A simulation of the geometry of the embodiment shown in FIG. 128-FIG. 129 yielded a KR" of 2.13 Nm/kg/VV which also falls within the benefit range for that size.

Amplified Magnetic Rotor

An electric motor comprises two carriers of electromagnetic elements that interact magnetically to drive one carrier relative to the other. In a permanent magnet electric motor, the permanent magnets create magnetic flux. The permanent magnets can be used in conjunction with posts made of a magnetic material such as iron to magnetize the posts and amplify the magnetic flux. A post can be sandwiched between two magnets which are both magnetized with north pole faces facing the post or both magnetized with south pole faces facing the post. This arrangement of the posts and magnets to amplify the flux of permanent magnets is referred to in this document as "concentrated flux". It is desirable for a large amount of magnetic flux to cross an airgap between the carriers to interact with the electromagnetic elements of the other carrier.

The posts require a supporting structure to support them. For strength and ease of construction, it would be desirable to construct the posts and supporting structure together as a single piece of material. The part of the material linking the posts is referred to as an "end iron". However, the end iron provides a flux linkage path 4134, shown with curved arrows in FIG. 215 and FIG. 216, for flux to circle from one pole of a magnet to the other without entering the airgap.

Flux resistors such as shown for example in FIG. 144 at the ends of every or every second rotor post on the OD and ID reduce flux linkage between adjacent posts and thereby increase output torque. Flux resistors are cavities or gaps that cause there to be areas of decreased flux path cross section area between North and South rotor posts, below the cross section of either a post or an end iron. In the case of a gap that completely interrupts the flux path, and the material within the gap is non magnetic, such as air, vacuum etc., the. the cross section of the flux path at the gap may be regarded as zero (i.e. the flux path cross section is defined as the cross section of the soft magnetic material in the flux path) although some magnetic field lines will cross the gap.

However, flux resistors also reduce the strength and ease of construction of the electromagnetic carrier.

The examples shown in FIG. 215 and FIG. 216 show an electromagnetic carrier 4144, typically a rotor, having permanent magnets 4130 supported within a structure 4140 made of a magnetically susceptible material that surrounds the magnets 4130 in the two dimensions shown as parallel to the page. Though the magnetically susceptible material may be formed of a single piece, it can be conceptualized as being formed of portions between the magnets, referred to as posts 4120, and portions above and below the magnets 4139 and posts 4120 that link the posts together, referred to as end irons 4142 (above and below refers to direction on the page, not in actual space). The magnets have poles 4132 oriented in the sideways direction on the page, which corresponds to the circumferential direction in an axial or radial flux motor or the direction of motion in a linear motor. An airgap would be present separating the electromagnetic carrier from another electromagnetic carrier having electromagnets, but is not visible in these figures as the airgap would be parallel to the page. FIGS. 215 and 216 may be considered to show a cutaway view removing the other carrier of the electric motor, the view being from what would be across the airgap between the carriers if the other carrier were present.

The illustrations in FIG. 215 and FIG. 216 can represent axial or radial flux motors, or their "straightened out" linear equivalents. For an axial flux motor, "up" on the page in FIGS. 215 and 216 represents the radial direction, and sideways on the page represents the circumferential direction. For a radial flux motor, "up" on the page represents the axial direction and sideways on the page represents the circumferential direction.

The following terminology will be used in this disclosure: the width of an element is a dimension of the element in the circumferential direction for a rotary motor and the direction of travel of a linear motor. The width is represented as sideways in FIGS. 215 and 216. The depth of an element is a dimension of the element in a direction perpendicular to an airgap between electromagnetic carriers of the electric motor. The depth is represented by a direction perpendicular to the page in FIGS. 215 and 216. The length of an element is a dimension of the element in a direction perpendicular to the width and depth. In FIGS. 215 and 216, it is represented by the up/down direction.

With a low aspect ratio, as shown in FIG. 215, a high percentage of the magnetic flux will link from N to adjacent S poles along flux paths shown by solid arrows 4134 unless there is some type of flux resistor. By contrast, if a high aspect ratio is used, as shown in FIG. 216, the flux from the center plane of the magnets is more restricted from linking at the post ends because the posts are already at very high flux density, so lining across the motor airgap becomes a lower reluctance flux path than the flux path 4134 around the radial ends of the posts (in an axial flux example). Thus, a high enough aspect ratio between magnet radial length to circumferential width (in the example of an axial flux machine) reduces the need for flux resistors to achieve high torque.

Embodiments of the present device provide increased flux density at the rotor posts as compared to the maximum flux density of the permanent magnets, as well as high structural strength and stiffness necessary to maintain the airgap in an electric machine such as, but not limited to an axial or radial or linear motor.

It has been shown by simulation that a tangential magnet width (and iron post width) of $\frac{1}{16}$" and a radial magnetic length of 1" with a magnetic depth of $\frac{1}{4}$" results in a torque increase of only 10-15% by using flux resistors at the ends of the rotor posts. Flux resistors require extra machining time and they also reduce the strength and stiffness of the rotor. For this reason is may be beneficial in some applications to reduce or eliminate the need for flux resistors through the use of high aspect ratio magnets.

Each post is adjacent to two magnets in the width direction, facing the north poles of both magnets or the south poles of both magnets to provide a net magnetic flux into the posts from the magnets. As the posts are made of a magnetic material, this magnetic flux is amplified by the magnetization of the posts themselves, up to a limit where the posts become substantially fully magnetized, known as saturation.

It is preferable for a large amount of the net magnetic flux entering each post from the adjacent magnets, and amplified by in the posts (as a result of two magnets providing flux to the same post and by the depth of the magnets being higher than the width of the post), to cross the airgap in the depth direction to interact with the electromagnets of the other carrier. Flux linkage through the end irons, as shown in FIGS. 215 and 216, leads some of the magnetic flux to cross over to other posts, and thus not enter the airgap.

A flux linkage path as shown in FIGS. 215 and 216, when the magnetic field within the path is substantially below saturation, will tend to divert a very large portion of the flux. the lower the reluctance of the flux path fom post to post through the end iron, the lower the amount of the flux that will take the high reluctance path across the airgap. In order to deal with this, the inventors have previously used flux resistors, that is, cavities or restrictions that make part of the flux linkage path have a very small total cross section. Using a very thin end iron 4142 is another approach that could be used to make part of the flux path have a small cross section. The material in the small cross section part of the flux linkage path is saturated by a magnetic flux lower than the total magnetic flux, leading the additional flux beyond the saturating flux to have a lower propensity to follow the flux linkage path.

It has been found that, by changing the aspect ratios of the components, even without any cavity or restriction in the flux linkage path 4134, and even with a thick end iron 4142, the total flux can be made to greatly exceed the saturating flux through the flux linkage path, leading to a large proportion of the flux going across the airgap rather than through the flux linkage path.

Avoiding the use of flux resistors and using a thick end iron eases construction and results in higher strength.

In an embodiment without flux resistors and using an end iron as thick or thicker than a post, as shown in FIG. 216, the cross section of the flux linkage path is proportional to depth times width of the post. The total magnetic flux also increases with the depth, assuming the magnets are scaled in depth proportionately. The total magnetic flux also scales with length of the magnets. A high ratio of total magnetic flux to saturation flux of the flux linkage path can thus be achieved by having a high magnet length-to-post width ratio. In a design as shown in FIG. 216, the posts are the portions of the piece of material that forms the posts and end iron that are between the holes that accommodate the permanent magnets. Thus, the length of the magnets in this design cannot exceed the length of the posts. Thus, another way to state this length-to-width ratio is that a high post length to post width ratio will allow accommodating magnets to generate a high total flux relative to the saturation flux of the flux linkage path. In some embodiments, the post width and magnet width may be similar. In such embodiments, a high magnet length to magnet width ratio will provide a high total flux relative to saturation flux of the flux linkage path.

The magnets shown in FIGS. 215 and 216 extend the full length of the gaps between the posts. This maximizes the total magnetic flux for a given post length. However, the lengthwise tips of the magnets, being adjacent to the end irons, may produce fields which form a flux linkage through the end irons without entering the posts. Thus, using shorter magnets that don't extend the full length of the gaps may result in only a small reduction in the flux entering the airgap.

FIG. 162, described above, shows an example embodiment of a linear motor with high aspect ratio magnets. This embodiment uses a moving carrier 3300 (which will be described here as a rotor) configured to move within a stator 3330 that has electromagnets on both sides of the rotor. The rotor 3300 in this embodiment is formed of two arrays of magnets 3302 in order to interact with stator elements on both sides of the rotor 3300. The permanent magnets are alternating polarity in the linear direction, and may be the same polarity as opposing magnets on the other side of the rotor or may be opposite polarity as opposing magnets on the other side of the rotor. They are preferably of the same polarity as the directly opposing magnets to reduce flux linkage from top to bottom magnets through the rotor posts 3304. In this embodiment permanent magnet stops are used to position the magnets at precise locations in the slots.

The invention claimed is:

1. A permanent magnet carrier for an electric motor, the permanent magnet carrier comprising:
   a first end iron having first tabs;
   a second end iron having second tabs;
   an array of posts each extending from one of the first and second end irons towards the other of the first and second end irons, successive posts of the array of posts extend alternately from the first and second end irons to interdigitate, the first end iron and the posts extending from the end iron being formed of a first single piece of magnetic material, and the second end iron and the posts extending from the second end iron being formed of a second single piece of magnetic material;
   an array of permanent magnets arranged between the posts of the array of posts, each permanent magnet being magnetized in a direction oriented between a respective pair of posts of the array of posts adjacent to the magnet; and
   each post being connected to the end iron it does not extend from with a connection portion,
   wherein the first and second tabs retain the permanent magnets.

2. A permanent magnet carrier for an electric motor, the permanent magnet carrier comprising:
   a first end iron;
   a second end iron;
   an array of posts each extending from at least one of the first end iron and the second end iron towards the other of the first end iron and the second end iron, the first end iron and the posts extending from the first end iron being formed of a first single piece of magnetic material, and the second end iron and the posts extending from the second end iron being formed of the first single piece of magnetic material or of a second single piece of magnetic material; and
   an array of permanent magnets arranged between the posts of the array of posts, each permanent magnet being magnetized in a direction oriented between a respective pair of posts of the array of posts adjacent to the magnet,
   wherein a supporting structure comprises the first end iron, the second end iron, and the array of posts, the supporting structure defining a first respective flux path between each respective pair of posts through the first end iron, and a second respective flux path between each respective pair of posts through the second end iron, the first respective flux path having a first gap or a first restriction portion having a cross section smaller than a post cross section and smaller than a first end iron cross section, and the second respective flux path having a second gap or a second restriction portion having a cross section smaller than a post cross section and smaller than a second end iron cross section.

3. A permanent magnet carrier for an electric motor, the permanent magnet carrier comprising:
   a first end iron;
   a second end iron;
   an array of posts each extending from one of the first end iron and the second end iron towards the other of the first end iron and the second end iron, the first end iron and the posts extending from the end iron being formed of a first single piece of magnetic material, and the second end iron and the posts extending from the second end iron being formed of the first single piece of magnetic material or of a second single piece of magnetic material; and
   an array of permanent magnets arranged between the posts of the array of posts, each permanent magnet being magnetized in a direction oriented between a respective pair of posts of the array of posts adjacent to the magnet,
   wherein a supporting structure comprises the first end iron, the second end iron, and the array of posts, the supporting structure defining a first respective flux path between each respective pair of posts through the first end iron, and a second respective flux path between each respective pair of posts through the second end iron, the first respective flux path having a first saturation portion with a first respective saturation flux and the second respective flux path having a second saturation portion with a second respective saturation flux, the magnets generating a total magnetic flux in conjunction with the posts that exceeds a sum of the first respective saturation fluxes and the second respective saturation fluxes,
   wherein successive posts of the array of posts extend alternately from the first and second end irons to interdigitate, each post being connected to the end iron it does not extend from with a connection portion smaller in cross section than the post, the first saturation portion and the second saturation portion of each respective pair of posts being the connection portions.

4. The permanent magnet carrier of claim 3 further comprising a support element supporting the first end iron relative to the second end iron.

5. The permanent magnet carrier of claim 4 in which the support element comprises a support ring defining grooves for receiving the posts.

6. The permanent magnet carrier of claim 3 in which the posts connect the first end iron and the second end iron, and the end irons define holes, portions of the end irons around the holes being the saturation portions.

7. The permanent magnet carrier of claim 3 in which the posts connect the first end iron and the second end iron, the permanent magnets having a length in a direction aligned with the posts sufficient to generate a flux exceeding a saturation flux of the posts so that the posts act as the saturation portions.

8. The permanent magnet carrier of claim 3 further comprising tabs on the first end iron and the second end iron for retaining the permanent magnets.

9. An axial flux motor comprising a permanent magnet carrier of claim 3 in which the posts extend in a radial direction and the direction oriented between the respective pair of posts is a circumferential direction.

10. A radial flux motor comprising a permanent magnet carrier of claim 3 in which the posts extend in an axial direction and the direction oriented between the respective pair of posts is a circumferential direction.

11. A linear motor comprising a permanent magnet carrier of claim 3 in which the posts extend in a direction substantially perpendicular to a direction of motion of the motor and to a direction perpendicular to an airgap between the permanent magnet carrier and an electromagnet carrier, and the direction oriented between the respective pair of posts is the direction of motion of the motor.

12. The permanent magnet carrier of claim 3 in which the posts connect the first end iron and the second end iron, the permanent magnets having a length in a direction aligned with the posts sufficient to generate a flux exceeding a saturation flux of the end irons so that portions of the end irons connecting between the posts act as the saturation portions.

13. The permanent magnet carrier of claim 12 in which the magnets have a ratio of magnet length in the direction aligned with the posts to magnet width in the direction oriented between the respective pair of posts greater than 4/1, 5/1, 6/1, 7/1, 8/1, 9/1, 10/1, 11/1, 12/1, 13/1, 14/1, 15/1, or 16/1.

14. The permanent magnet carrier of claim 12 in which the posts have a ratio of post length to post width greater than 4/1, 5/1, 6/1, 7/1, 8/1, 9/1, 10/1, 11/1, 12/1, 13/1, 14/1, 15/1, or 16/1.

15. The permanent magnet carrier of claim 12 in which each post of the array of posts has a respective cross section and the first end iron has a first end iron cross section and each post connects to the first end iron with no part of the connection having substantially lower cross section than a lowest of the respective cross section and the first end iron cross section.

16. The permanent magnet carrier of claim 15 in which the first end iron cross section is equal to or greater than each respective cross section of the posts of the array of posts.

17. The permanent magnet carrier of claim 15 in which the second end iron has a second end iron cross section and each post of the array of posts connects to the second end iron with no part of the connection having substantially lower cross section than a lowest of the respective cross section and the second end iron cross section.

18. The permanent magnet carrier of claim 17 in which the second end iron cross section is greater than or equal to each respective cross section of the posts of the array of posts.

19. The permanent magnet carrier of claim 12 in which each magnet extends substantially the full length of a space between successive posts.

\* \* \* \* \*